United States Patent
Kim et al.

(10) Patent No.: US 10,158,536 B2
(45) Date of Patent: Dec. 18, 2018

(54) SYSTEMS AND METHODS FOR INTERACTION WITH AN IOT DEVICE

(71) Applicant: Belkin International, Inc., Playa Vista, CA (US)

(72) Inventors: Ryan Yong Kim, Rolling Hills Estates, CA (US); Jon Robertsen Plummer, Los Angeles, CA (US); EuChong Son, Aliso Viejo, CA (US); Venkata Subba Rao Pathuri, Alpharetta, GA (US)

(73) Assignee: BELKIN INTERNATIONAL INC., Playa Vista, CA (US)

( * ) Notice: Subject to any disclaimer, the term of this patent is extended or adjusted under 35 U.S.C. 154(b) by 16 days.

(21) Appl. No.: 14/959,380

(22) Filed: Dec. 4, 2015

(65) Prior Publication Data

US 2016/0226732 A1     Aug. 4, 2016

Related U.S. Application Data

(63) Continuation-in-part of application No. 14/326,393, filed on Jul. 8, 2014, which is a continuation of application No. 14/267,834, filed on May 1, 2014.
(Continued)

(51) Int. Cl.
| | |
|---|---|
| *G06F 15/16* | (2006.01) |
| *H04L 12/24* | (2006.01) |
| *H04L 29/08* | (2006.01) |
| *H04L 12/28* | (2006.01) |
| *G06F 21/73* | (2013.01) |
| *H04W 4/70* | (2018.01) |
| *H04W 12/04* | (2009.01) |

(52) U.S. Cl.
CPC .............. *H04L 41/22* (2013.01); *G06F 21/73* (2013.01); *H04L 12/2807* (2013.01); *H04L 12/2818* (2013.01); *H04L 12/2834* (2013.01); *H04L 41/0853* (2013.01); *H04L 67/125* (2013.01); *H04L 67/2842* (2013.01); *H04W 4/70* (2018.02); *H04L 2012/2841* (2013.01); *H04W 12/04* (2013.01)

(58) Field of Classification Search
CPC ... H04L 29/08072; H04L 29/06; H04L 67/42; H04L 67/2847; H04L 51/12
USPC .......................... 709/220, 224, 228, 225, 232
See application file for complete search history.

(56) References Cited

U.S. PATENT DOCUMENTS 9,189,225 B2 * 11/2015 Boone ....................... G06F 8/65
9,613,158 B1 *  4/2017 Lepeska ................ H04L 67/104
(Continued)

*Primary Examiner* — Khanh Q Dinh
(74) *Attorney, Agent, or Firm* — Kilpatrick Townsend & Stockton, LLP

(57) ABSTRACT

The present disclosure relates to techniques for interacting with an electronic device. More specifically, the present disclosure relates to initiating action(s) using an interface configured to control operation of IoT devices. An example embodiment includes receiving, at a computing device, a communication including a unique identifier for a network device connected to a network, using the unique identifier to determine a resource bundle for the network device, the resource bundle defining an interface module for the network device, wherein the interface module is configured to display one or more interface elements usable to control the network device, and transmitting the resource bundle, wherein when the resource bundle is received, the resource bundle facilitates generating the interface module.

27 Claims, 63 Drawing Sheets

Related U.S. Application Data

(60) Provisional application No. 62/087,466, filed on Dec. 4, 2014, provisional application No. 62/087,753, filed on Dec. 4, 2014, provisional application No. 62/087,756, filed on Dec. 4, 2014, provisional application No. 62/088,297, filed on Dec. 5, 2014, provisional application No. 62/115,467, filed on Feb. 12, 2015.

(56) References Cited

U.S. PATENT DOCUMENTS

| | | | | |
|---|---|---|---|---|
| 9,654,356 | B2* | 5/2017 | Varney | H04L 41/0893 |
| 9,667,506 | B2* | 5/2017 | Varney | H04L 41/0893 |
| 9,749,335 | B2* | 8/2017 | Boone | G06F 8/65 |
| 9,755,914 | B2* | 9/2017 | Newton | H04L 41/0893 |
| 9,813,379 | B1* | 11/2017 | Shevade | H04L 63/0272 |
| 2006/0174035 | A1* | 8/2006 | Tufail | H04L 45/02 |
| | | | | 709/239 |
| 2006/0174337 | A1* | 8/2006 | Bernoth | H04L 63/0263 |
| | | | | 726/11 |
| 2007/0266158 | A1* | 11/2007 | Bernoth | H04L 63/0236 |
| | | | | 709/225 |
| 2008/0047016 | A1* | 2/2008 | Spoonamore | G06F 21/577 |
| | | | | 726/25 |
| 2009/0063518 | A1* | 3/2009 | Jung | H04L 51/12 |
| 2012/0263049 | A1* | 10/2012 | Venkatachalapathy | |
| | | | | H04L 41/0893 |
| | | | | 370/252 |
| 2014/0365680 | A1* | 12/2014 | van Bemmel | H04L 29/06 |
| | | | | 709/232 |

* cited by examiner

| CURRENT STATE 2805 | ACTION(S) 2810 | ADDITIONAL ACTION(S) 2820 | ACTIVATION TIME 2830 | ACCESS CONTROL(S) 2840 | NOTIFICATION(S) 2850 | USER MODE(S) 2860 | SCHEDULE 2870 |
|---|---|---|---|---|---|---|---|
| LIGHT BULB: POWER STATE ("OFF") | LIGHT BULB: POWER STATE ("ON") | INDOOR LIGHTING: POWER STATE ("ON") EXTERIOR LIGHTING: POWER STATE ("OFF") SECURITY SENSOR(S): POWER STATE ("OFF") | 5 SECONDS | USER 1 ("SON") USER 2 ("DAUGHTER") | USER 3 ("PARENT") | HOME | ANYTIME |
| LIGHT BULB: POWER STATE ("ON") | LIGHT BULB: POWER STATE ("OFF") | INDOOR LIGHTING: POWER STATE ("ON") BRIGHTNESS 25% EXTERIOR LIGHTING: POWER STATE ("ON") SECURITY SENSOR: POWER STATE ("ON") | 15 SECONDS | USER 1 ("SON") USER 2 ("DAUGHTER") | USER 3 ("PARENT") | AWAY | 7PM -6AM |
| ... | ... | ... | ... | ... | ... | ... | ... |

| Scene | Action(s) | Additional Action(s) | Activation Time | Notification(s) |
|---|---|---|---|---|
| Movie | Light Bulb: Power State ("On") | Living Room Lights:<br>Power State ("On")<br>Brightness (20%)<br>Popcorn Maker: Power State ("On")<br>Speakers:<br>Power State ("On")<br>Mode (Theater) | 5 Seconds | All Users |
| Normal | Light Bulb: Power State ("On") | Living Room:<br>Power State ("On")<br>Brightness (65%)<br>Popcorn Maker: Power State ("Off")<br>Speakers:<br>Power State ("On")<br>Mode (Theater) | 5 Seconds | None |
| Reading | Light Bulb: Power State ("On") | Living Room:<br>Power State ("On")<br>Brightness (80%)<br>Television: Power State ("Off") | 5 Seconds | User 1 ("Spouse") |
| Default | Light Bulb: Power State ("Off") | Living Room:<br>Power State ("On")<br>Brightness (80%)<br>Other Devices: Power State ("Off") | 5 Seconds | None |
| ... | ... | ... | ... | ... |

FIG. 29

| Device Identifier 5820 | Device Type 5830 | Interface ID 5840 | Control Info 5850 |
|---|---|---|---|
| Device A | Light Bulb | Interface_ID1 | Settings_1 |
| Device B | Heater | Interface_ID2 | Settings_2 |
| Device C | Heater | Interface_ID3 | Settings_3 |
| Device D | Sensor | Interface_ID4 | Settings_4 |

FIG. 58

SYSTEMS AND METHODS FOR INTERACTION WITH AN IOT DEVICE

CROSS-REFERENCE TO RELATED APPLICATIONS

This application claims the benefit of and priority to U.S. Provisional App. No. 62/087,466, titled "DYNAMIC REGISTRATION AND DISTRIBUTION OF NETWORK DEVICE INTERFACES," filed on Dec. 4, 2014, U.S. Provisional App. No. 62/087,753, titled "TECHNIQUES FOR CACHING AT A NETWORK DEVICE TO IMPROVE RESPONSIVENESS FOR OPERATION OF DEVICES CONNECTED TO A NETWORK," filed on Dec. 4, 2014, U.S. Provisional App. No. 62/087,756, titled "TECHNIQUES FOR PRESENTING INTERFACES TO DISPLAY A STATUS OF DEVICES," filed on Dec. 4, 2014, U.S. Provisional App. No. 62/088,297, titled "TECHNIQUES FOR INITIATING ACTIONS USING AN INTERFACE CONFIGURED TO CONTROL A DEVICE," filed on Dec. 5, 2014, and U.S. Provisional App. No. 62/115,467, titled "DISCOVERY OF CONNECTED DEVICES TO DETERMINE CONTROL CAPABILITIES AND META-INFORMATION," filed on Feb. 12, 2015, each of which are incorporated by reference herein for all purposes. This application is also a continuation-in-part of U.S. application Ser. No. 14/326,393, titled "CONTROLLING SETTINGS AND ATTRIBUTES RELATED TO OPERATION OF DEVICES IN A NETWORK," filed on Jul. 8, 2014, which is a continuation of U.S. application Ser. No. 14/267,834, titled "CONTROLLING SETTINGS AND ATTRIBUTES RELATED TO OPERATION OF DEVICES IN A NETWORK," filed on May 1, 2014, each of which are incorporated by reference herein for all purposes.

FIELD

The present disclosure relates to techniques for interacting with an electronic device. More specifically, the present disclosure relates to initiating action(s) using an interface configured to control operation of IoT devices.

BRIEF SUMMARY

Embodiments of the present invention may include a computer-implemented method, comprising receiving, at a computing device, a communication including a unique identifier for a network device connected to a network, using the unique identifier to determine a resource bundle for the network device, the resource bundle defining an interface module for the network device, wherein the interface module is configured to display one or more interface elements usable to control the network device, and transmitting the resource bundle, wherein when the resource bundle is received, the resource bundle facilitates generating the interface module.

In another aspect, when the resource bundle is received, the resource bundle facilitates executing an application that generates the interface module. In another aspect, when the resource bundle is received by an access device, the resource bundle facilitates executing an application that generates the interface module. In another aspect, the method further comprises receiving a request for the resource bundle from an access device, and transmitting the resource bundle to the requesting access device, wherein when the resource bundle is received by the access device, the resource bundle facilitates executing an application at the access device that generates the interface module. In another aspect, the method further comprises receiving an updated resource bundle for the network device, registering the updated resource bundle, and transmitting the updated resource bundle, wherein when the resource bundle is received, the resource bundle facilitates generating an updated interface module for the network device. In another aspect, when the updated resource bundle is received at an access device, the access device generates the updated interface module for the network device. In another aspect, the one or more interface elements correspond to controls or sub-controls of the network device. In another aspect, the resource bundle defines the interface module to include a contextual menu for the network device, the contextual menu corresponding to a secondary control of the network device, and wherein the secondary control is associated with a primary control of the network device. In another aspect, interface elements are selectable, wherein selecting an interface element displays a menu, and wherein the menu includes a changeable setting associated with the network device. In another aspect, interface elements display a state of the network device.

Alternative embodiments of the present invention may include one or more data processors, and a non-transitory computer-readable storage medium containing instructions which when executed on the one or more data processors, cause the one or more data processors to perform operations. The operations may include receiving a communication including a unique identifier for a network device connected to a network, using the unique identifier to determine a resource bundle for the network device, the resource bundle defining an interface module for the network device, wherein the interface module is configured to display one or more interface elements usable to control the network device, and transmitting the resource bundle, wherein when the resource bundle is received, the resource bundle facilitates generating the interface module.

Alternative embodiments of the present invention may include a computer-program product tangibly embodied in a non-transitory machine-readable storage medium of a computing device, including instructions configured to cause one or more data processors to receive a communication including a unique identifier for a network device connected to a network, use the unique identifier to determine a resource bundle for the network device, the resource bundle defining an interface module for the network device, wherein the interface module is configured to display one or more interface elements usable to control the network device, and transmit the resource bundle, wherein when the resource bundle is received, the resource bundle facilitates generating the interface module.

Embodiments of the present invention may include a computer-implemented method, comprising receiving, by a computing device, information associated with a device connected to a network, wherein the information includes criteria for operation of the device, storing the information on a cache of the computing device, receiving updated information associated with the device, wherein the updated information includes updates to the stored information, modifying the information stored on the cache using the updated information, detecting a request for current information associated with the device, retrieving the current information from the information stored on the cache, and transmitting the retrieved current information to the network.

In another aspect, the information includes device information identifying devices connected to the network. In another aspect, the request includes a discovery request for current device information identifying devices connected to the network. In another aspect, the computing device is included in a router device. In another aspect, the criteria includes operation criteria and instruction criteria. In another aspect, the method may further comprise transmitting, to the network, a request for updates to the stored information, wherein the request indicates a version of the information currently stored on the cache. In another aspect, the updated information is received from a device connected to the network. In another aspect, modifying the information stored on the cache includes identifying a difference between the updated information and the information stored on the cache, and updating the cache with the updated information based on the identified difference. In another aspect, requests for current information associated with a device are received and transmitted using a cloud network. In another aspect, the method may further comprise determining whether an amount of computing resources available for the computing device satisfies a resource threshold, and determining whether updates exists for the information stored on the cache when the resource threshold is satisfied.

Alternative embodiments of the present invention may include a system, comprising one or more data processors, and a non-transitory computer-readable storage medium containing instructions which when executed on the one or more data processors, cause the one or more processors to perform operations. The operations may include receiving information associated with a device connected to a network, wherein the information includes criteria for operation of the device, storing the information on a cache of the computing device, receiving updated information associated with the device, wherein the updated information includes updates to the stored information, modifying the information stored on the cache using the updated information, detecting a request for current information associated with the device, retrieving the current information from the information stored on the cache, and transmitting the retrieved current information to the network.

Alternative embodiments of the present invention may include a computer-program product tangibly embodied in a non-transitory machine-readable storage medium, including instructions configured to cause a data processing apparatus to receive, by a computing device, information associated with a device connected to a network, wherein the information includes criteria for operation of the devices, store the information on a cache of the computing device, receive updated information associated with the device, wherein the updated information includes updates to the stored information, modify the information stored on the cache using the updated information, detect a request for current information associated with the device, retrieve the current information from the information stored on the cache, and transmit the retrieved current information to the network.

Embodiments of the present invention may include a computer-implemented method, comprising determining, by a computing device, that a device is connected to a network, generating a graphical interface, wherein the graphical interface includes an interactive area corresponding to the device, displaying the graphical interface, receiving input corresponding to an interaction with the interactive area, wherein the input is associated with an adjustment for controlling operation of the device, detecting continued interaction with the interactive area, wherein the continued interaction causes an action to be performed, performing the action, and transmitting the adjustment, wherein operation of the device is controlled using the transmitted adjustment.

In another aspect, the input corresponds to a pre-determined time period, and wherein the continued interaction exceeds the pre-determined time period. In another aspect, actions are related to adjustments. In another aspect, adjustments and actions are device specific. In another aspect, the interaction and the continued interaction are performed using one or more contacts with the interactive area. In another aspect, continuous contact with the interactive area is maintained during the interaction and the continued interaction. In another aspect, the action includes sending a notification related to the operation of the device. In another aspect, actions include controlling operation of one or more devices. In another aspect, wherein the method may further comprise receiving criteria for controlling operation of devices in the network, and using the criteria to determine one or more actions to be performed. In another aspect, the criteria corresponds to a mode for controlling operation of devices connected to the network, and wherein modes includes home modes, away modes, or sleep modes. In another aspect, performing the action may include displaying an additional graphical interface including an interactive area for receiving criteria usable to modify an action. In another aspect, the action is a scheduled action. In another aspect, performing the action may include transmitting a request including an adjustment for controlling operation of devices connected to the network. In another aspect, the method may further comprise receiving a response including indications of devices that have been adjusted, and modifying the graphical interface based on the response.

Alternative embodiments of the present invention may include a system, comprising one or more data processors, and a non-transitory computer-readable storage medium containing instructions, which when executed on the one or more data processors, cause the one or more processors to perform operations. The operations may include determining that a device is connected to a network, generating a graphical interface, wherein the graphical interface includes an interactive area corresponding to the device, displaying the graphical interface, receiving input corresponding to an interaction with the interactive area, wherein the input is associated with an adjustment for controlling operation of the device, detecting continued interaction with the interactive area, wherein the continued interaction causes an action to be performed, performing the action, and transmitting the adjustment, wherein operation of the device is controlled using the transmitted adjustment.

Alternative embodiments of the present invention may include a computer-program product tangibly embodied in a non-transitory machine-readable storage medium. The machine-readable storage medium including instructions configured to cause a data processing apparatus to determine that a device is connected to a network, generate a graphical interface, wherein the graphical interface includes an interactive area corresponding to the device, display the graphical interface, receive input corresponding to an interaction with the interactive area, wherein the input is associated with an adjustment for controlling operation of the device, detect continued interaction with the interactive area, wherein the continued interaction causes an action to be performed, perform the action, and transmit the adjustment, wherein operation of the device is controlled using the transmitted adjustment.

Embodiments of the present invention may include a computer-implemented method, comprising receiving, by a computing device, input corresponding to an interaction with an interactive area on an interface, wherein the interface corresponds to a device, and wherein the input corresponds to an action for controlling operation of the device, using the input to determine the action for controlling operation of the device, transmitting data indicating the action for controlling operation of the device, wherein transmitting the data causes the action to be performed, determining that the interaction with the interactive area exceeds a threshold time period, and performing the action when the interaction exceeds the threshold time period.

In another aspect, actions are related to adjustments. In another aspect, actions are device specific. In another aspect, the interaction is performed using one or more contacts with the interactive area. In another aspect, actions include sending notifications related to operation of devices. In another aspect, actions include controlling operation of devices. In another aspect, the method may further comprise receiving criteria for controlling operation of devices, and using the criteria to determine actions to be performed. In another aspect, the criteria correspond to a mode for controlling operation of devices connected to the network, and wherein modes include home modes, away modes, or sleep modes. In another aspect, the method may further comprise receiving criteria usable to modify actions. In another aspect, actions are performed according to a schedule. In another aspect, the action causes operation of devices to be controlled, and wherein performing action includes transmitting data indicating the action to control operation of devices. In another aspect, the method may further comprise transmitting a status including indications of devices that have been controlled.

Alternative embodiments of the present invention may include a system comprising one or more data processors, and a non-transitory computer-readable storage medium containing instructions, which when executed on the one or more data processors, cause the one or more processors to perform operations. The operations may include receiving input corresponding to an interaction with an interactive area on an interface, wherein the interface corresponds to a device, and wherein the input corresponds to an action for controlling operation of the device, using the input to determine the action for controlling operation of the device, transmitting data indicating the action for controlling operation of the device, wherein transmitting the data causes the action to be performed, determining that the interaction with the interactive area exceeds a threshold time period, and performing the action when the interaction exceeds the threshold time period.

Alternative embodiments of the present invention may include a computer-program product tangibly embodied in a non-transitory machine-readable storage medium, including instructions configured to cause a data processing apparatus to receive input corresponding to an interaction with an interactive area on a interface, wherein the interface corresponds to a device, and wherein the input corresponds to an action for controlling operation of the device, use the input to determine the action for controlling operation of the device, transmit data indicating the action for controlling operation of the device, wherein transmitting the data causes the action to be performed, determine that the interaction with the interactive area exceeds a threshold time period, and perform the action when the interaction exceeds the threshold time period.

Embodiments of the present invention may include a computer-implemented method, comprising determining, at a network device, that the network device is connected to a network, receiving data determined at an access device, wherein the data indicates an adjustment of an attribute related to operation of the network device, and wherein the data indicates a threshold time period associated with the adjustment, detecting input corresponding to an interaction with an interactive area of an interface corresponding to the network device, determining, using the detected input, that the interaction with the interactive area of the interface exceeds the threshold time period, and sending information indicating the adjustment when the interaction exceeds the threshold time period, wherein the sent information causes operation of the network device to be controlled using the adjustment.

In another aspect, the data is determined based on input corresponding to an interaction with an interactive area of a graphical interface displayed by the access device. In another aspect, the interaction is performed by one or more contacts with the interactive area. In another aspect, the interaction with the interactive area is continuous and occurs for a duration of the threshold time period. In another aspect, the method may further comprise determining a status related to operation of the network device using the adjustment, and sending a message indicating that the status, wherein the sent message causes a modification to a graphical interface displayed by the access device, and wherein the modification includes displaying the status. In another aspect, the method may further comprise generating a graphical interface, wherein the graphical interface includes an interactive area to configure operation of one or more network devices connected to the network, displaying the graphical interface, and determining additional data based on input corresponding to an interaction with the interactive area included in the graphical interface, wherein the additional data indicates a modification to the threshold time period associated with the adjustment. In another aspect, the method may further comprise determining a status related to operation of the network device using the adjustment, and modifying the graphical interface to indicate that the determined status. In another aspect, adjustments are device specific. In another aspect, the method may further comprise sending the information indicating the adjustment includes transmitting the information.

Alternative embodiments of the present invention may include a system comprising one or more data processors, and a non-transitory computer-readable storage medium containing instructions, which when executed on the one or more data processors, cause the one or more processors to perform operations. The operations may include determining that a network device is connected to a network, receiving data determined at an access device, wherein the data indicates an adjustment of an attribute related to operation of the network device, and wherein the data indicates a threshold time period associated with the adjustment, detecting input corresponding to an interaction with an interactive area of an interface corresponding to the network device, determining, using the detected input, that the interaction with the interactive area of the interface exceeds the threshold time period, and sending information indicating the adjustment when the interaction exceeds the threshold time period, wherein the sent information causes operation of the network device to be controlled using the adjustment.

Alternative embodiments of the present invention may include a computer-program product tangibly embodied in a non-transitory machine-readable storage medium, including instructions configured to cause a data processing apparatus to determine that a network device is connected to a network, receive data determined at an access device, wherein the data indicates an adjustment of an attribute related to operation of the network device, and wherein the data indicates a threshold time period associated with the adjustment, detect input corresponding to an interaction with an interactive area of an interface corresponding to the network device, determine, using the detected input, that the interaction with the interactive area of the interface exceeds the threshold time period, and send information indicating the adjustment when the interaction exceeds the threshold time period, wherein the sent information causes operation of the network device to be controlled using the adjustment.

Embodiments of the present invention may include a gateway device, comprising one or more processors, and a non-transitory machine-readable storage medium containing instructions which when executed on the one or more data processors, cause the one or more processors to perform operations. The operations may include detecting a network device connected to the gateway device, wherein the gateway device provides communication routing for the network device, and probing the network device for meta-information and control capabilities of the network device, and a receiver configured to receive the meta-information and the control capabilities of the network device, wherein the meta-information includes identifying information of the network device, wherein the non-transitory machine-readable storage medium further contains instructions which when executed on the one or more data processors, cause the one or more processors to perform operations including, determining a device specific interface object for the network device using the meta-information, determining one or more primary control capabilities corresponding to the network device, and transmitting a device specific interface object module and the one or more primary control capabilities, wherein the device specific interface object module and the one or more primary control capabilities facilitate display of a gateway device interface, wherein the gateway device interface displays the device specific interface object and a control object, wherein the control object allows control of the network device using the one or more primary control capabilities, and wherein the one or more primary control capabilities include less than all control capabilities of the network device that are provided in a proprietary interface of the network device.

In another aspect, the meta-information includes the device specific interface object module. In another aspect, the meta-information includes a unique identifier for the network device, and further comprising instructions which when executed on the one or more data processors, cause the one or more processors to perform operations. The operations may include transmitting the unique identifier to a cloud server, receiving information identifying a type of the network device, and determining the device specific interface object for the network device using the information identifying the type of the network device. In another aspect, determining the device specific interface object for the network device further comprises monitoring behavior characteristics of the network device, determining a type of the network device based on the monitored behavior characteristics, and determining the device specific interface object for the network device using the determined type of the network device. In another aspect, instructions which when executed on the one or more data processors, cause the one or more processors to perform operations including transmitting the meta-information of the network device to a second network device. In another aspect, the device specific interface object includes the control object, and wherein the device specific interface object is selectable to control the network device using the one or more primary control capabilities. In another aspect, the gateway device interface includes a proprietary interface object, wherein the proprietary interface object is selectable to launch the proprietary interface of the network device to allow execution of a control capability outside of the primary control capabilities. In another aspect, the gateway device interface displays information corresponding to a plurality of network devices connected to the gateway device.

Alternative embodiments of the present invention may include a computer-implemented method, comprising, detecting, by a gateway device, a network device connected to the gateway device, wherein the gateway device provides communication routing for the network device, probing the network device for meta-information and control capabilities of the network device, receiving the meta-information and the control capabilities of the network device, wherein the meta-information includes identifying information of the network device, determining a device specific interface object for the network device using the meta-information, determining one or more primary control capabilities corresponding to the network device, and transmitting a device specific interface object module and the one or more primary control capabilities, wherein the device specific interface object module and the one or more primary control capabilities facilitate display of a gateway device interface, wherein the gateway device interface displays the device specific interface object and a control object, wherein the control object allows control of the network device using the one or more primary control capabilities, and wherein the one or more primary control capabilities include less than all control capabilities of the network device that are provided in a proprietary interface of the network device.

Alternative embodiments of the present invention may include a computer-program product tangibly embodied in a non-transitory machine-readable storage medium of a gateway device, including instructions configured to cause one or more data processors to detect a network device connected to the gateway device, wherein the gateway device provides communication routing for the network device, probe the network device for meta-information and control capabilities of the network device, receive the meta-information and the control capabilities of the network device, wherein the meta-information includes identifying information of the network device, determine a device specific interface object for the network device using the meta-information, determine one or more primary control capabilities corresponding to the network device, and transmit a device specific interface object module and the one or more primary control capabilities, wherein the device specific interface object module and the one or more primary control capabilities facilitate display of a gateway device interface, wherein the gateway device interface displays the device specific interface object and a control object, wherein the control object allows control of the network device using the one or more primary control capabilities, and wherein the one or more primary control capabilities include less than all control capabilities of the network device that are provided in a proprietary interface of the network device.

Embodiments of the present invention may include a computer-implemented method, comprising, determining, by a computing device, a current status associated with a device on a network, wherein the current status indicates availability of the device on the network, generating a graphical interface, wherein the graphical interface includes an interactive element corresponding to the device, and wherein the interactive element indicates the current status associated with the device, displaying the graphical interface, determining a change to the current status, wherein determining the change includes determining a type of status corresponding to the change, determining an updated status associated with the device, determining that the device is associated with the updated status for a threshold time period, and modifying the graphical interface according to the type of status when the threshold time period is reached, wherein the modified graphical interface includes a modified interactive element corresponding to the device, and wherein the modified interactive element indicates the updated status associated with the device.

In another aspect, the modified interactive element has a modified graphical appearance that indicates the updated status. In another aspect, a threshold time period corresponds to a type of status. In another aspect, the method may further comprise determining that the type of status corresponds to a firmware update on the device, wherein the modified interactive element has a modified graphical appearance that indicates the firmware update. In another aspect, interaction with an interactive element in the graphical interface controls operation of a device corresponding to the interactive element. In another aspect, when the updated status corresponds to unavailability of the device, modifying the graphical interface includes disabling interaction with the modified interactive element. In another aspect, modifying the graphical interface includes removing the interactive element from the graphical interface when the updated status corresponds to unavailability of the device. In another aspect, the method may further comprise upon detecting that that device is available on the network, modifying the graphical interface to include the interactive element that was previously removed and to remove the modified interactive element. In another aspect, the method may further comprise receiving input at the modified interactive element, wherein the input corresponding to a request to remove the modified interactive element, and modifying the graphical interface to remove the modified interactive element. In another aspect, the method may further comprise receiving input corresponding to an interaction with the interactive element, wherein the input is associated with an adjustment for controlling operation of the device, and transmitting the adjustment, wherein operation of the device is controlled using the transmitted adjustment.

Alternative embodiments of the present invention may include a system, comprising one or more data processors, and a non-transitory computer-readable storage medium containing instructions, which when executed on the one or more data processors, cause the one or more processors to perform operations. The operations may include determining a current status associated with a device on a network, wherein the current status indicates availability of the device on the network, generating a graphical interface, wherein the graphical interface includes an interactive element corresponding to the device, and wherein the interactive element indicates the current status associated with the device, displaying the graphical interface, determining a change to the current status, wherein determining the change includes determining a type of status corresponding to the change, determining an updated status associated with the device, determining that the device is associated with the updated status for a threshold time period, and modifying the graphical interface according to the type of status when the threshold time period is reached, wherein the modified graphical interface includes a modified interactive element corresponding to the device, and wherein the modified interactive element indicates the updated status associated with the device.

Alternative embodiments of the present invention may include a computer-program product tangibly embodied in a non-transitory machine-readable storage medium, including instructions configured to cause a data processing apparatus to determine a current status associated with a device on a network, wherein the current status indicates availability of the device on the network, generate a graphical interface, wherein the graphical interface includes an interactive element corresponding to the device, and wherein the interactive element indicates the current status associated with the device, display the graphical interface, determine a change to the current status, wherein determining the change includes determining a type of status corresponding to the change, determine an updated status associated with the device, determine that the device is associated with the updated status for a threshold time period, and modify the graphical interface according to the type of status when the threshold time period is reached, wherein the modified graphical interface includes a modified interactive element corresponding to the device, and wherein the modified interactive element indicates the updated status associated with the device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 28 illustrates examples of information including criteria for initiating actions according to some embodiments.

FIG. 29 illustrates examples of information including criteria for initiating actions according to some embodiments.

FIGS. 58-60 show data structures for managing operations of network devices, in accordance with some embodiments.

DETAILED DESCRIPTION

Figure 1:
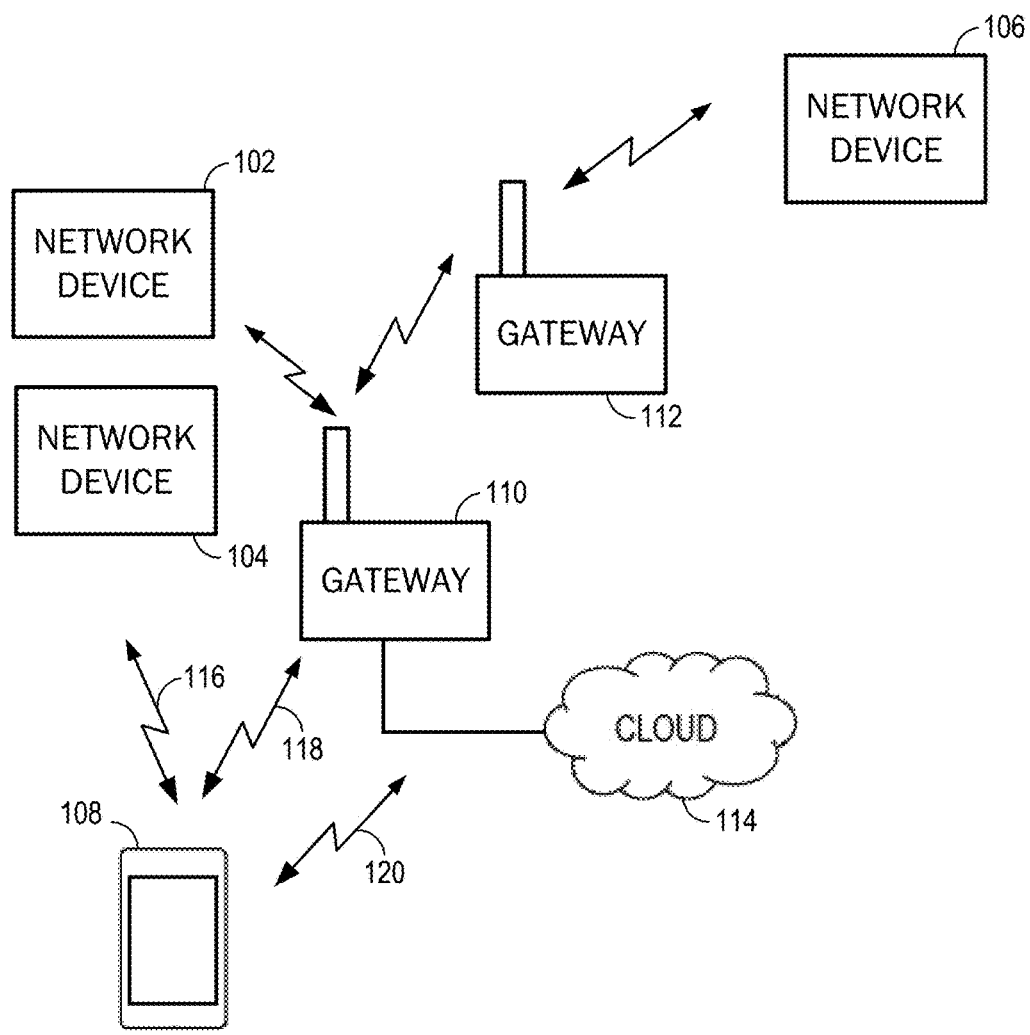
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, an infrared (IR) transceiver, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. In some embodiments, the network devices 102, 104, 106 may connect directly to the cloud network 114, for example, using broadband network access such as a cellular network. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
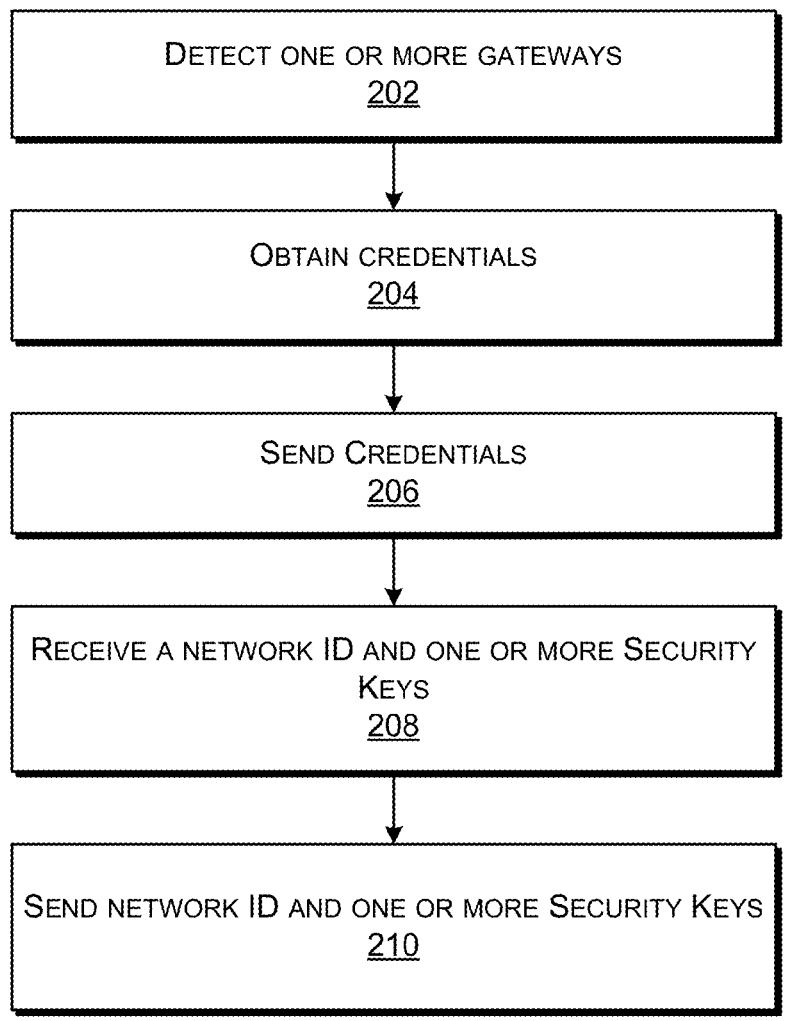
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys.

Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1 (PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
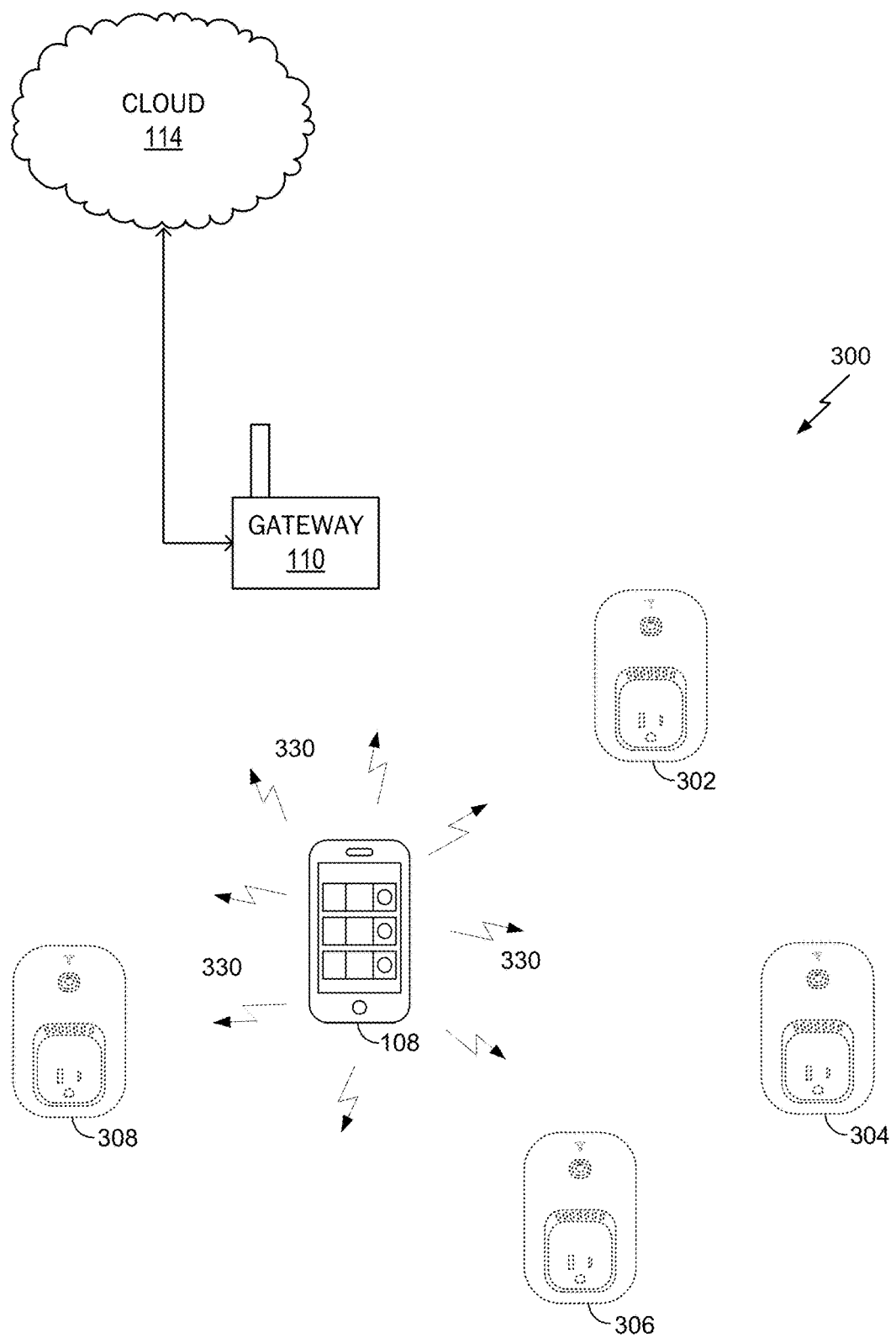
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses.

Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
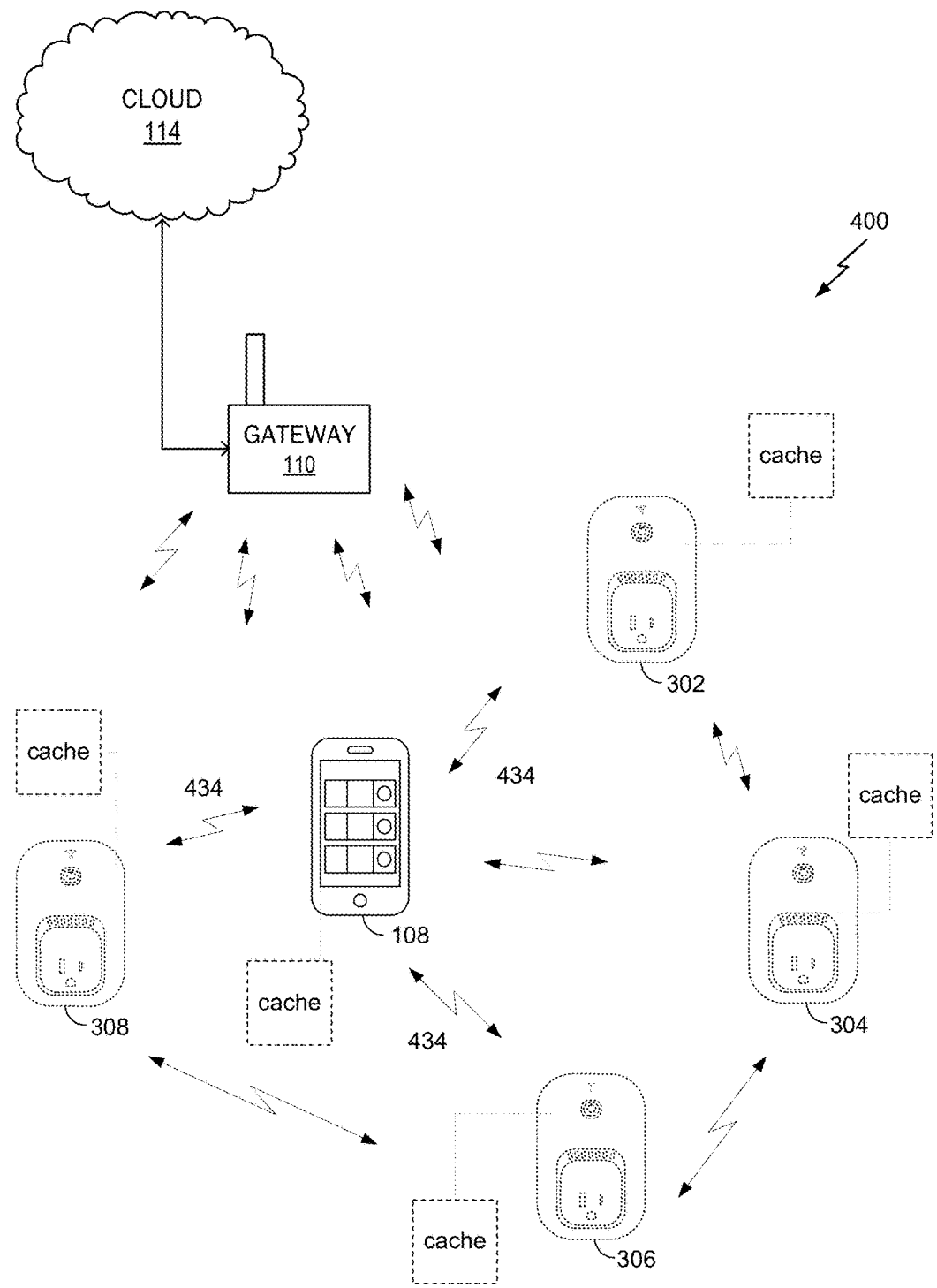
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
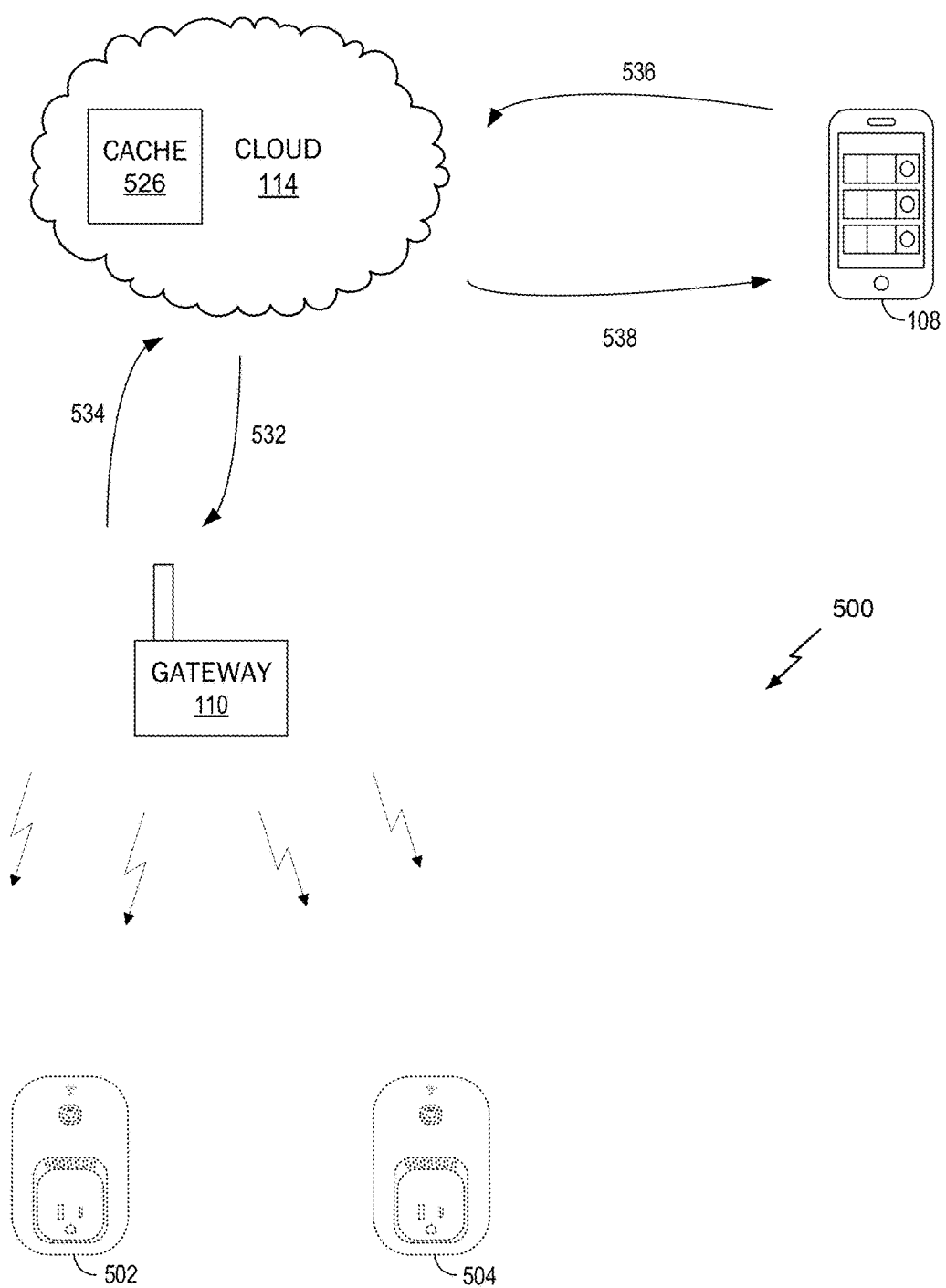
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Figure 6:
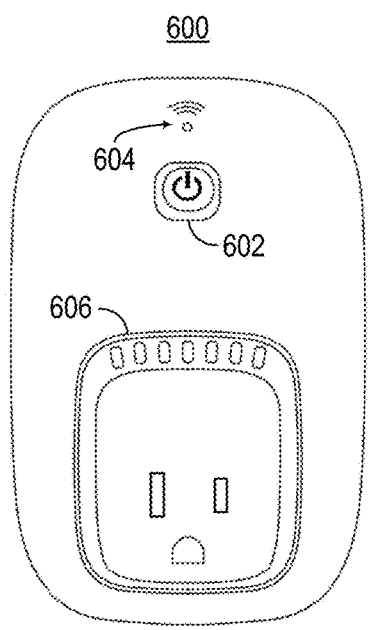
FIG. 6 is an illustration of an example of a front view of a network device, in accordance with an embodiment.
Figure 7:
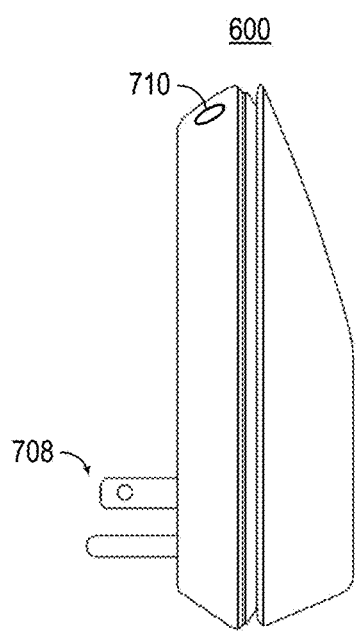
FIG. 7 is an illustration of an example of a side view of a network device, in accordance with an embodiment.

FIG. 6 illustrates an example of a front view of a network device 600. FIG. 7 illustrates an example of a side view of the network device 600. The network device 600 may include any of the network devices 102, 104, or 106 described herein. In some embodiments, the network device 600 may be a home automation network device. For example, the network device 600 may include a home automation switch that may be coupled with a home appliance. A user may wirelessly access the network device 600 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 600 may include a WiFi enabled switch that connects home appliances and other electronic devices to a compatible 802.11b/g/n/ac WiFi network. The network device 600 may thus allow users to locally or remotely turn devices on or off from anywhere, program customized notifications, and/or change device status. The network device 600 may further allow a user to create custom schedules or have devices respond to sunrise or sunset.

The network device 600 includes an power switch 602 that may be depressed in order to turn the network device 600 on and off. In some embodiments, a light source may be integrated with or located behind the power switch. For example, a light-emitting diode (LED) may be located on a circuit board under the power button 602. The light source may be illuminated when the network device 600 is powered on, and may not be illuminated when the network device 600 is powered off.

The network device 600 further includes a communications signal indicator 604. The signal indicator 604 may indicate whether the network device 600 has access to a communications signal, such as a WiFi signal. For example, the signal indicator 604 may include a light source (e.g., a LED) that illuminates when the network device 600 is connected to a communications signal. The light source may depict different colors or other characteristics (e.g., flashing, dimming, or the like) to indicate different levels of signal strength or mode of operation.

The network device 600 includes a restore button 710. The restore button 710 may allow a user to reset the network device 600 to factory default settings. For example, upon being depressed, the restore button 710 may cause all software on the device to be reset to the settings that the network device 600 included when purchased from the manufacturer.

The network device 600 further includes a plug 708 and an outlet 606. The plug 708 allows the network device 600 to be plugged into a wall socket, such as a socket providing 120V, 220V, or the like. In turn, an appliance may be plugged into the outlet 606. Once the network device 600 is registered according to the techniques described above, an appliance plugged into the socket 606 may be controlled by a user using an access device (e.g., access device 108).

Figure 8:
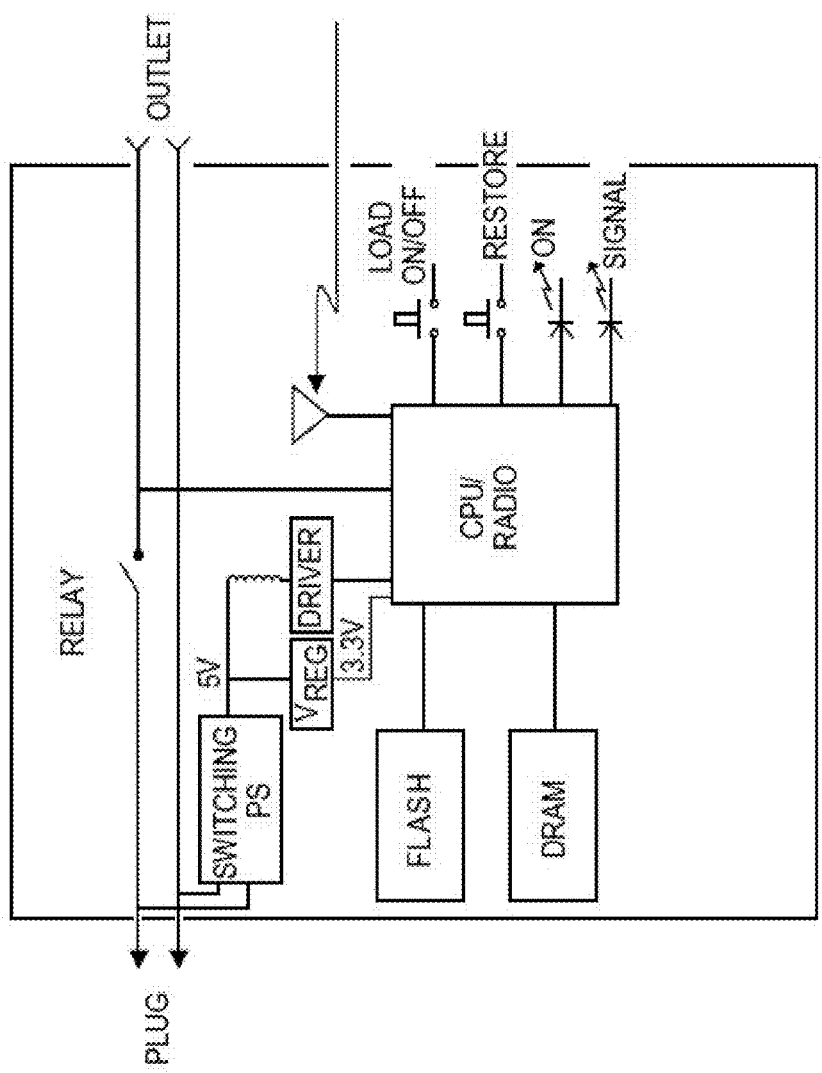
FIG. 8 is an example of a block diagram of a network device, in accordance with an embodiment.

FIG. 8 is an example of a block diagram of the network device 600 depicting different hardware and/or software components of the network device 600. As described above with respect to FIGS. 6 and 7, the network device 600 includes the outlet 606, the plug 708, the power button 602, the restore button 710, and the communications signal indicator 604. The network device 600 also includes light source 828 associated with the power button 602. As previously described, the light source 828 may be illuminated when the network device 600 is powered on.

The network device 600 further includes a relay 810. The relay 810 is a switch that controls whether power is relayed from the plug 708 to the outlet 606. The relay 810 may be controlled either manually using the power button 602 or remotely using wireless communication signals. For example, when the power button 602 is in an ON position, the relay 810 may be closed so that power is relayed from the plug 708 to the outlet 606. When the power button 602 is in an OFF position, the relay 810 may be opened so that current is unable to flow from the plug 708 to the outlet 606. As another example, an application or program running on an access device may transmit a signal that causes the relay 810 to be opened or closed. For instance, an access application may display a graphical interface on the access device that includes a power button. The user may tap or otherwise select the power button, and the access application may send a communication signal (e.g., over a WiFi network) to the network device 600 instructing the network device 600 to open or close the relay 810.

The network device 600 further includes flash memory 820 and dynamic random access memory (DRAM) 822. The flash memory 820 may be used to store instructions or code relating to an operating system, one or more applications, and any firmware. The flash memory 820 may include nonvolatile memory so that any firmware or other program can be can updated. In the event the network device 600 loses power, information stored in the flash memory 820 may be retained. The DRAM 822 may store various other types of information needed to run the network device 600, such as all runtime instructions or code.

The network device 600 further includes a CPU/Radio 818. The CPU/Radio 818 controls the operations of the network device 600. For example, the CPU/Radio 818 may execute various applications or programs stored in the flash memory 820 and/or the dynamic random access memory (DRAM) 822. The CPU/Radio 818 may also receive input from the various hardware and software components, interpret the input, and perform one or more functions in response to the input. As one example, the CPU/Radio 818 may determine whether the power button 602 has been pressed, and determines whether the relay 810 needs to be opened or closed. The CPU/Radio 818 may further perform all communications functions in order to allow the network device 600 to communicate with other network devices, one or more gateways, a cloud network, and/or one or more access devices. While the CPU and radio of the network device 600 are shown to be combined in the CPU/Radio 818, one of ordinary skill in the art will appreciate that, in some embodiments, the CPU and radio may be separately located within the network device 600. For example, CPU circuitry may be situated at a separate location on a circuit board from the location of radio circuitry, the CPU circuitry may be located on a different circuit board from the radio circuitry, or the like. Further, the network device 600 may include multiple radios that are configured to communicate using one or more communication protocols, such as any combination of a WiFi™ transceiver radio, a Bluetooth™ transceiver radio, a Zigbee™ transceiver radio, a UWB transceiver radio, a WiFi-Direct transceiver radio, a BLE transceiver radio, and/or any other wireless network transceiver radio or interface. In some embodiments, the network device 600 does not include a cellular network transceiver radio or interface, and thus may not be configured to directly communicate with a cellular network. In some embodiments, the network device 600 may include a cellular network transceiver radio, and may be configured to communicate with a cellular network using the cellular network transceiver radio.

The network device 600 may communicate with other devices and/or networks via antenna 824. For example, antenna 824 may include a 2.4 GHz antenna, a 5 GHz antenna, or the like, that can transmit and receive WiFi communications signals. The network device 600 may include other types of antennas that can communicate Bluetooth® signals, Zigbee® signals, Ultra-Wideband (UWB) signals, WiFi-Direct signals, BLE signals, and/or the like. In some embodiments, the antenna 824 may be configured to communicate different types of signals, such as the WiFi signals, Bluetooth® signals, Zigbee® signals, UWB signals, WiFi-Direct signals, BLE signals, and/or the like. In some embodiments, the network device 600 may include multiple antennas for communicating the different types of communication signals. As one example, the network device 600 may include both a 2.4 GHz antenna and a 5 GHz antenna.

The network device 600 further includes a driver 816, a switching power supply 812, and a voltage regulator 814. The driver 816 may include instructions or code that can be used to translate control signals or commands received from applications running on the DRAM 822 to commands that the various hardware components in the network device 600 can understand. In some embodiments, the driver 816 may include an ambient application running on the DRAM 822. The switching power supply 812 may be used to transfer power from the outlet in which the plug 708 is connected to the various loads of the network device 600 (e.g., CPU/Radio 818). The switching power supply 812 may efficiently convert the voltage and current characteristics of the electrical power to a level that is appropriate for the components of the network device 600. For example, the switching power supply 812 may perform AC-DC conversion. In some embodiments, the switching power supply 812 may be used to control the power that is relayed from the plug 708 to the outlet 606. The voltage regulator 814 may be used to convert the voltage output from the switching power supply 812 to a lower voltage usable by the CPU/Radio 818. For example, the voltage regulator 814 may regulate the DC voltage from 5V to 3.3V.

In various embodiments, functions may be stored as one or more computer-program products, such as instructions or code, in a non-transitory machine-readable storage medium, such as the flash memory 820 and/or the DRAM 822. The network device 600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a computer (or other device) to perform one or more operations in accordance with the described methods. Such functions or code may include code to perform the steps described above with respect to FIG. 2. The memory, such as the flash memory 820 and/or the DRAM 822, may be a processor-readable memory and/or a computer-readable memory that stores software code (programming code, instructions, etc.) configured to cause a processor(s) within the CPU/Radio 818 to perform the functions described. In other embodiments, one or more of the functions described may be performed in hardware.

A set of these instructions and/or code might be stored on a non-transitory machine-readable storage medium, such as the flash memory 820 and/or the DRAM 822. In some cases, the storage medium might be incorporated within a computer system, such as the CPU/Radio 818. In other embodiments, the storage medium might be separate from a computer system (e.g., a removable medium, such as a compact disc), and/or provided in an installation package, such that the storage medium can be used to program, configure and/or adapt a computer with the instructions/code stored thereon. These instructions might take the form of executable code, which is executable by the network device 600 and/or might take the form of source and/or installable code, which, upon compilation and/or installation on the network device 600 (e.g., using compilers, installation programs, compression/decompression utilities, etc.) then takes the form of executable code.

It should be appreciated that the network device 600 may have other components than those depicted in FIGS. 6-8. Further, the embodiment shown in the figures are only one example of a network device that may incorporate an embodiment of the invention. In some other embodiments, network device 600 may have more or fewer components than shown in the figure, may combine two or more components, or may have a different configuration or arrangement of components.

Figure 9:
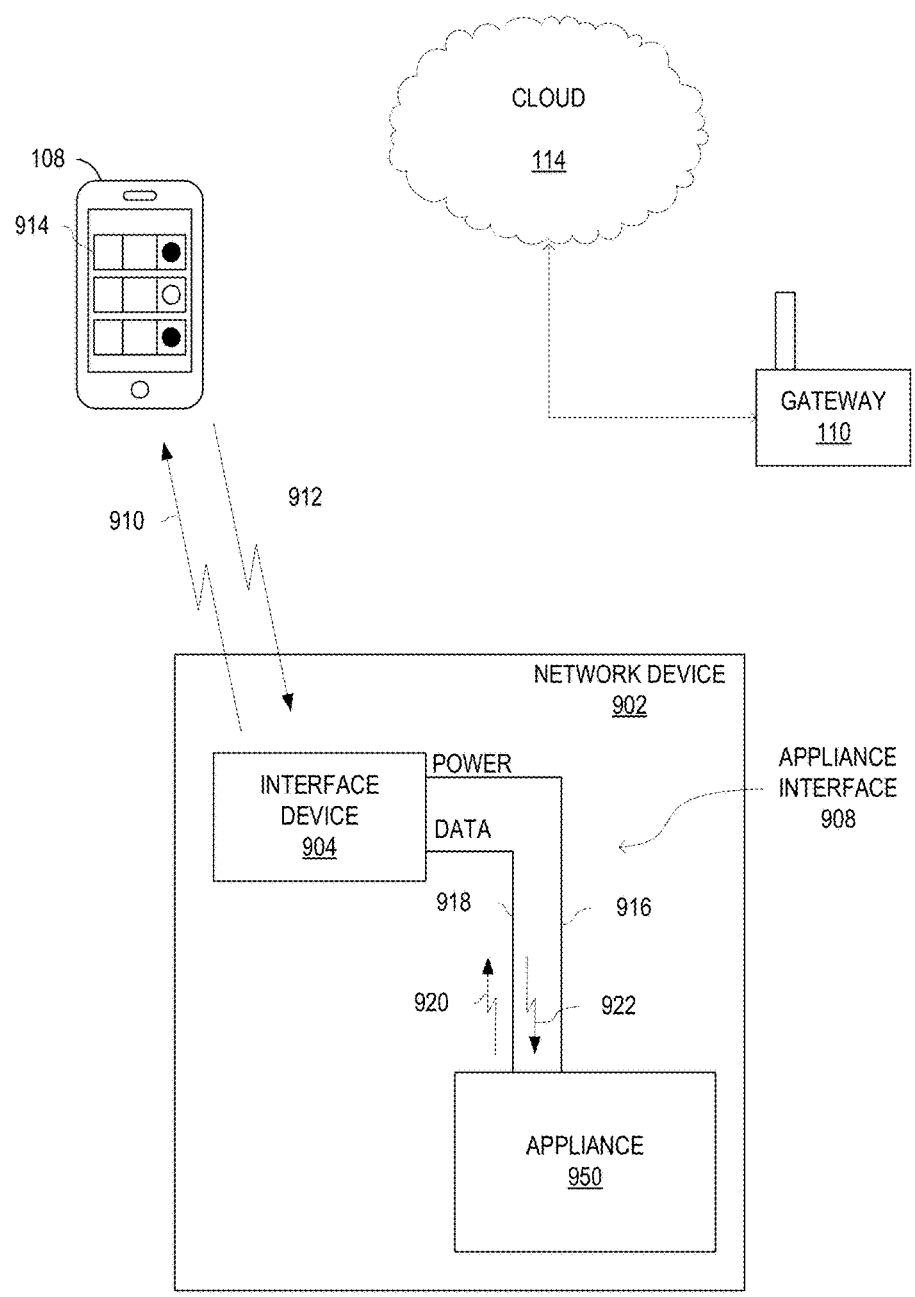
FIG. 9 is a schematic illustration of a local area network including a network device that includes an appliance, in accordance with an embodiment.

FIG. 9 is a schematic illustration of a local area network 900 including a network device 902 that includes an appliance 950. The network device 902 can comprise an interface device 904 and the appliance 950 connected by an appliance interface 908. The appliance interface 908 can include a data connection 918 and a power connection 916. The data connection 918 can be a serial connection (e.g., RS-232, USB, or other), or any other suitable data connection. The interface device 904 can be fully powered by the appliance 902 through the power connection 916, or can have a separate source of power.

The appliance 950 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 950 can be adapted to operate with the interface device 904. The appliance 950 can be any finite state machine. The appliance 950 can, but need not, know or store one or more states related to the appliance. For example, the appliance 950 may know or store data related to whether the appliance 950 is turned on, how long the appliance has been on (or off), among other status data.

The interface device 904 can be positioned within the housing of the appliance 950, or can be attached externally to the appliance 950. The interface device 904 can be removable from the appliance 950, or can be permanently installed in or on the appliance 950.

The interface device 904 can be connected to the local area network 900 through a network interface. The interface device 904 can be connected by a wired or wireless connection (e.g., WiFi, Zigbee, or others described herein or well known). In some embodiments, the interface device 904 can be connected directly to the cloud network 114 through a cellular internet connection (e.g., EDGE, LTE, or others).

The interface device 904 can communicate with another network device, an access device 108, or another client device through the network interface 906. The interface device 904 can transmit a status information signal 910 with status information to the access device 108, and the access device 108 can transmit a network device control signal 912 to the interface device 904. The status information signal 910 and the network device control signal 912 can be transmitted between the interface device 904 and the access device 108 using a telecommunications network (e.g., a cellular network, or other suitable broadband network), using a local area network 900 (e.g., through a gateway 110), or using the cloud network 114, although such a signal may pass through an intermediary device or network to do so.

The interface device 904 can interpret the network device control signal 912 and perform actions based on the contents of the network device control signal 912. The network device control signal 912 can include commands that can be performed by the interface device 904 itself. The network device control signal 912 can also include commands that are to be performed by the appliance 950. Commands that are to be performed by the appliance 950 can include commands like turn on or off, set a desired temperature (e.g., heat up or cool down to 215° F. or any other temperature), or other suitable commands depending on the particular appliance. The interface device 904 can interpret the network device control signal 912 and can send out a command 922, through the data connection 918 of the appliance interface 908, based on the network device control signal 912. The appliance 950 can then perform the command indicated in the network device control signal 912.

The interface device 904 can also transmit commands to the appliance 950 that are not based on a network device control signal received from the access device 108, but are rather based on programming in the interface device 904. Examples of such commands can include commands to update a communication rate, commands to check a state of the appliance 950, commands to set or get a clock time of the appliance 950, or any other suitable commands.

The interface device 904 can receive, through the data connection 918 of the appliance interface 908, a response (e.g., response 920) to any command from the appliance 950. In some examples, the response 920 can include an indication that the command 922 was received. In some examples, the response may include only an indication that a command is received (e.g., an ACK). In some examples, the response 920 can include information for some value on the appliance 950, such as an "on/off" state, a serial number, a product identification, a manufacturer identification, a temperature, a time since live, a setting, or any other value retrievable from the appliance 950. The interface device 904 can interpret the value and can send information about the value (e.g., the state of the appliance is "on," the temperature of the appliance, the time since the appliance first turned on, or other information) as status information (e.g. using status information signal 910) to the access device 108. Additionally, the interface device 904 can send status information about itself (e.g., time since live, supplied power, signal strength, and others) as status information (e.g. using status information signal 910) to the access device 108.

The interface device 904 can also use responses (e.g., response 920) from the appliance 950 to perform additional functions at the interface device 904, such as error handling. In some cases, when performing the additional functions, the interface device 904 does not transmit any status information 910 to the access device 108 based on those particular responses.

The access device 108 can include one or more display tiles (e.g., display tile 914) for displaying information and controls corresponding to the network device 102.

In some embodiments, the interface device 904 can transmit a heartbeat command (e.g., command 922) over the data connection 918 to the appliance 902 to determine whether the appliance 950 is working properly and/or in a state of readiness. If the interface device 904 determines that the appliance 950 has had some sort of failure (e.g., the appliance 950 sends a response 920 indicating a failure or the interface device 904 does not receive any response 920), the interface device 904 can take corrective action (e.g., restarting the appliance 950 or an element of the appliance 950), can log the event, or can alert the user).

Figure 10:
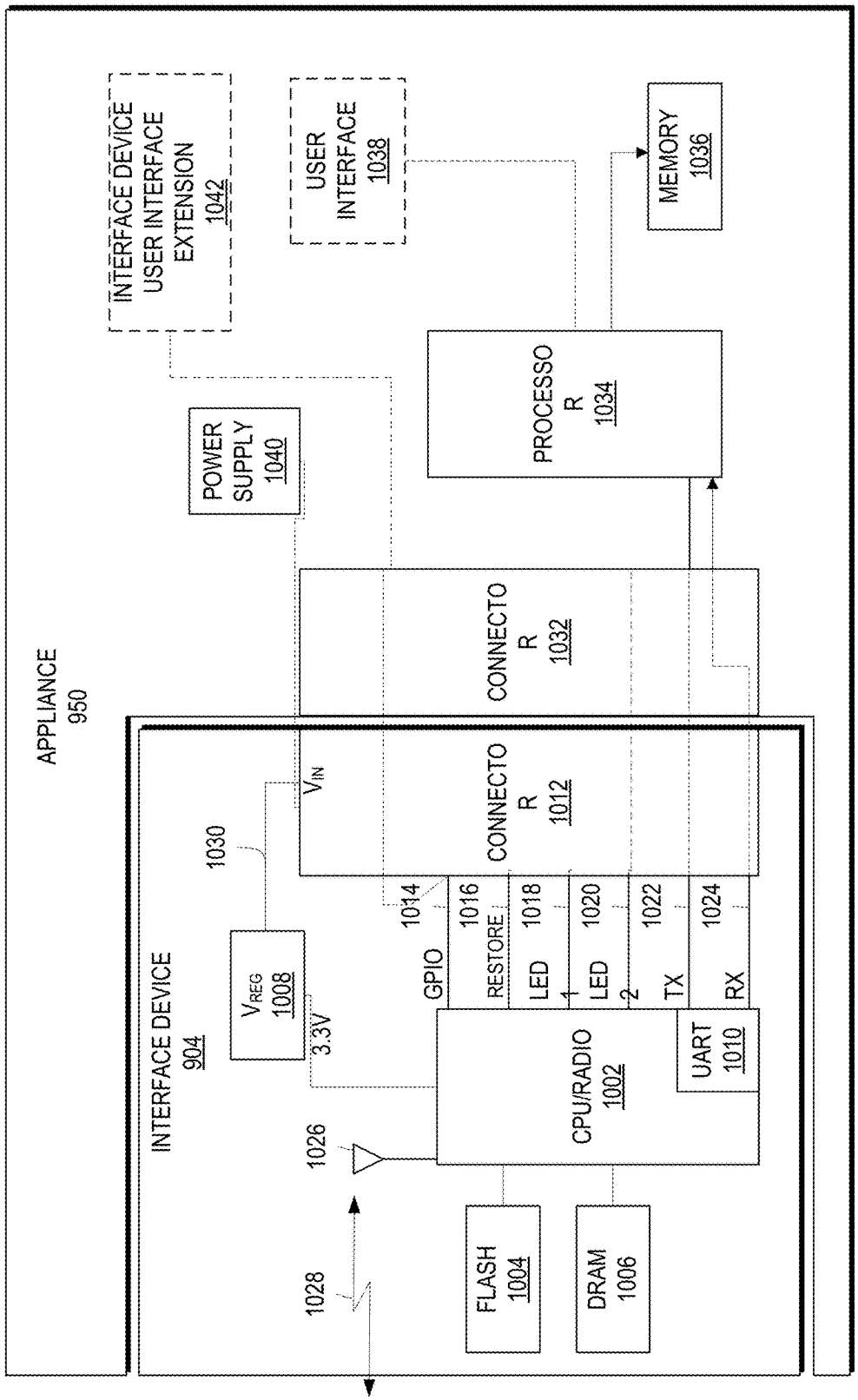
FIG. 10 is an example of a block diagram of a network device including an interface device attached to an appliance, in accordance with an embodiment.

FIG. 10 depicts a block diagram of a network device including an interface device 904 attached to an appliance 950 according to one embodiment. The interface device 904 can include connector 1012 that interacts with connector 1032 of the appliance 950.

The interface device 904 can include flash memory 1004 and dynamic random access memory (DRAM) 1006. The flash memory 1004 may be used to store instructions or code relating to an operating system, one or more applications, and any firmware. The flash memory 1004 can be used to store a cache. The flash memory 1004 may include non-volatile memory so that any firmware or other program can be can updated. In the event the interface device 904 loses power, information stored in the flash memory 1004 may be retained. The DRAM 1006 may store various other types of information needed to run the interface device 904, such as all runtime instructions or code. The flash memory 1004 or DRAM 1006 or a combination thereof may include all instructions necessary to communicate with an appliance 950, including all instructions necessary to communicate using the appliance serial protocol disclosed herein.

The interface device 904 further includes a CPU/Radio 1002. The CPU/Radio 1002 can control the operations of the interface device 904. For example, the CPU/Radio 1002 may execute various applications or programs stored in the flash memory 1004 and/or the dynamic random access memory (DRAM) 1006. The CPU/Radio 1002 may also receive input from the appliance 950, interpret the input, and perform one or more functions in response to the input. The CPU/Radio 1002 may further perform all communications functions in order to allow the interface device 904 to communicate with other network devices, one or more gateways, a cloud network, and/or one or more access devices. The interface device 904 may communicate with other devices and/or networks via antenna 1026. For example, antenna 1026 may include a 2.4 GHz antenna that can transmit and receive WiFi communications signals 1028. The antenna 1026 may include other types of antennas that can communicate Bluetooth® signals, Zigbee® signals, Ultra-Wideband (UWB) signals, and/or the like. In some embodiments, the interface device 904 may include multiple antennas for communicating different types of communication signals.

The CPU/Radio 1002 can include at least one universal asynchronous receiver/transmitter (UART) 1010. The CPU/Radio 903 can use the UART 1010 to send and receive serial communications. The CPU/Radio 903 can send data through a transmit line 1022 and a receive data through a receive line 1024. The CPU/Radio 903 can send and receive data through the transmit line 1022 and receive line 1024 using a serial protocol, such as RS232. The CPU/Radio 1002 can also include an input/output (GPIO) line 1014, a restore line 1016, an LED 1 line 1018, and an LED 2 line 1020. The CPU/Radio 1002 can have additional or fewer lines as necessary. The GPIO line 1014 can be used for any suitable function, such as powering an indicator light on an appliance 950 or accepting an input from the appliance 950. A signal sent on the restore line 1016 can be used to restore the CPU/Radio 1002 and/or the interface device 904 to factory defaults. The LED 1 line 1018 and LED 2 line 1020 can be used to power first and second LEDs that can be used to indicate various statuses, such as whether the interface device has a network connection and whether the interface device is powered on.

The interface device 904 further includes a voltage regulator 1008. The voltage regulator 1008 may be used to convert the voltage output from the appliance 950 to a voltage usable by the CPU/Radio 1002. For example, the voltage regulator 1008 may regulate the DC voltage from 5V to 3.3V. The voltage regulator 1008 can be supplied with power from a power line 1030.

Each of the interface lines, including the GPIO line 1014, the restore line 1016, the LED 1 line 1018, the LED 2 line 1020, the transmit line 1022, the receive line 1024, the power line 1030, and any additional lines, can be routed through connector 1012. Connector 1012 can be a proprietary or universal connector. Any appliance 950 to which the interface device 904 is attached through the connector 1012 can have the necessary hardware to make use of the interface lines, such as to provide power to the power line 1030 and to provide the first and second LEDs that are driven by the LED 1 line 1018 and LED 2 line 1020.

In alternate embodiments, some interface lines are not routed through the connector 1012. For example, the power line 1030 can be routed to a power supply attached directly to the interface device 904, and the LED 1 line 1018 and LED 2 line 1020 can be routed to first and second LEDs located within the interface device 904.

In various embodiments, functions may be stored as one or more instructions or code in memory, such as the flash memory 1004 and/or the DRAM 1006. The interface device 904 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1004 and/or the DRAM 1006, may be a processor-readable memory and/or a computer-readable memory that stores software code (programming code, instructions, etc.) configured to cause a processor(s) within the CPU/Radio 1002 to perform the functions described. In other embodiments, one or more of the functions described may be performed in hardware.

A set of these instructions and/or code might be stored on a computer-readable storage medium, such as the flash memory 1004 and/or the DRAM 1006. In some cases, the storage medium might be incorporated within a computer system, such as the CPU/Radio 1002. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 904 and/or might take the form of source and/or installable code, which, upon compilation and/or installation on the interface device 904 (e.g., using any of a variety of compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

The interface device 904 may have other components than those depicted in FIG. 10. Further, the embodiment shown in the figures are only one example of an interface device that may incorporate an embodiment of the invention. In some other embodiments, interface device 904 may have more or fewer components than shown in the figure, may combine two or more components, or may have a different configuration or arrangement of components.

The appliance 950 can have a processor 1034. The processor 1034 can be a microcontroller, such as a Peripheral Interface Controller (PIC). The appliance 950 can include a memory 1036 (e.g., a flash memory or other) that is readable by the processor 1034. The memory 1036 can include instructions enabling the innate functionality of the appliance 950, such as heating and timing for a crock pot.

The appliance 950 can include a user interface 1038. The user interface 1038 can provide buttons, displays, LEDs, knobs, and other input and output elements necessary for a user to interact with the appliance 950. For example, a user interface 1038 for a slow cooker can include a display, a power button, a temperature adjustment button, and a start button. The user interface 1038 can be driven and/or monitored by the processor 1034. In some embodiments, the appliance 950 is "headless" or has no user interface 1038.

The appliance 950 can include a power supply 1040 that can provide power to the voltage regulator 1038 of the interface device 904 through connector 1032, connector 1012, and power line 1030.

The appliance 950 can include an interface device user interface extension 1042. The interface device user interface extension 1042 can include various input and output elements that are passed directly to the interface device 904 without being processed by the processor 1034. Examples of input and output elements of the interface device user interface extension 1042 include LEDs associated with the LED 1 line 1018 and LED 2 line 1020, a hardware restore button associated with the restore line 1016, or any other suitable input/output element.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. As explained herein, techniques are provided that dynamically register and distribute resource bundles associated with network devices, thus allowing network devices to be controlled in a single application using interfaces defined by resource bundles. These techniques allow a user, whether located locally or remotely from the local area network, to access, monitor, and control all network devices in the local area network.

In an embodiment, a network device can be discovered by an access device, which then compares a unique identifier of the network device with a list of known resource bundles. The resource bundles can define respective interface modules for network devices. If the access device does not find a resource bundle for the network device in a local cache at the access device, the access device can display a generic interface for the type of network device it is while searching a cloud based service for an updated, more specific interface module for the network device.

According to embodiments, when a network device is initially connected to a network, it and an access device can exchange communications to provide the access device with information that can be used to determine a basic, default visual interface for the network device. The communications can convey the fundamental types of interactions the network device supports. For example, complex interactions between the access device and the network device can be simplified and distilled down to a relatively small set of classifications of interactions along with a certain limited set of characterizing attributes associated with each classification. In one non-limiting embodiment, there are seven classifications of interactions in the set of classifications. One example set of classifications includes the following interaction classifications: 1) Controllable or Observable; 2) Discrete or Continuous; 3) Bound or Unbound (e.g., bounded or unbounded); 4) Restful or Restless; 5) Fixed or Open State Transition Path; 6) Cyclical or Linear; and 7) Temporal (e.g., repetitive or non-repetitive over time). Examples of these interaction classifications are provided in the following paragraphs. According to embodiments, there is a fundamental minimum set of attributes that accompany each of these exemplary classes or types of interactions. For example, by using an associated set of attributes for each interaction type supported by a network device, a complete and fundamental model describing all interactions for the network device can be formed. This fundamental model can be used to determine a basic, default visual interface for the network device. For instance, such a model can be used to create a default visual interface in cases where a resource bundle for the network device is unavailable (e.g., when the bundle has not been developed and/or cloud connectivity is unavailable).

In some embodiments, controllable network devices are network devices that a user or an access device can interact with and manipulate in some physical way. For example, a default visual interface module can be configured to display one or more interface elements on a display of an access device, where the interface elements are usable to control the network device. The visual interface may not map out every physically possible activity or interaction with the network device. For example, picking up a network device and moving it to another physical location may not be within the scope of interactions and controls supported by a visual interface. Instead, a default visual interface module for the network device can define the supported interactions between the access device and the network device and attempt to capture the fundamental ways in which the access device can interact with the network device when performing basic functions.

According to some examples, observable interactions are provided by network devices that are configured to detect changes in the physical world in some way. For example, sensors that are able to monitor for, detect, measure, and convey changes in the observable environment support observable interactions. Non-limiting examples of such network devices include motion sensors, moisture sensors, thermometers, thermostats, microphones, pressure sensors, gas/smoke detectors, and the like. Such sensors can be configured to detect motion, temperature, sound, a change in air pressure, presence of a gas, presence of smoke, presence of a device, presence of a person, or presence of a liquid. In an embodiment, a change in the environment is observable if it can be noticed or perceived, and registered as being a significant change.

In some embodiments, discrete interactions define a fixed, finite limit to the number of states that a controllable thing (e.g., a network device) has. For example, discrete interactions can also define a finite number of states that an observable thing can be detected, noticed, or perceived to be in. Generally, digital or stepped mechanical devices are discrete. For example, a light switch network device and a digital television tuner support a discrete number of interactions. In contrast, continuous interactions apply to devices that have no finite number of controllable or observable states. Such devices can a virtually an unlimited number of continuous states. For example, analog continuous motion mechanical devices can be classified as continuous. Such continuous devices can include, but are not limited to, an analog thermostat, an analog joystick, a lever, a vehicle's accelerator pedal, a mechanical dial, a water faucet, and the like. Continuous devices can also be inferred to support linear controls (i.e., have linearity). For example, a temperature setting or range is continuous and linear. That is, an analog thermostat or thermometer cannot go from or detect a temperature of 75 degrees and instantly jump to 80 degrees without increasing continuously from 75 up to 80 degrees.

According to embodiments, device interactions are classified as bounded if they have a lower and/or upper bound. A given network device may have certain functionalities or controls that are bounded, while also having other functionalities or controls that are bounded. That is, a device can be partially bound, fully bounded, or unbounded. For example, a typical gate or door has a fully open state (i.e., maximum degree of openness) and fully closed state (i.e., minimum degree of closed). Such a gate or door can be classified as fully bounded. A steering wheel, a rotary dial, or an analog knob (e.g., a potentiometer with a sliding or rotating contact) are other examples of fully bounded controllable devices. An escalator, a revolving door, and a treadmill are examples of partially bound devices. This is because such devices generally continue in one direction without a bound, but they are bound at some point from moving in another direction. A bicycle wheel, an electric motor, a turntable, and a rotating tray (e.g., a lazy Susan) are examples of unbounded devices. Such unbounded devices can spin or rotate without bound in either direction. In certain embodiments, a majority of controllable or observable devices can be classified as being bounded.

Restful devices are devices that default back to a known, 'restful' state when external forces cease to be applied to them. That is, restful devices spring back or revert to their restful state when an external force is no longer applied to them. Doorknobs, accelerator pedals, and reset buttons are examples of restful devices. Non-restful devices maintain their most recent state when external forces cease to be applied. Light switches, dead bolts, water faucets, and thermostats, are examples of non-restful devices.

Fixed state devices are devices that can be locked into state transition paths that must be followed. Analog tuners, dishwashers with set cycles, and traffic signals for intersections are examples of fixed state devices. Open state transition devices are not locked into any particular state transition path and can take many different paths to transition from one state to any other state. Digital television tuners and keyboards are examples of open state transition devices.

Cyclic devices are devices that cycle back from an upper bound back to their lower bound and/or vice versa. A combination lock is an example of a cyclic controllable device. Linear devices do not circularly connect from one end to the other. Most devices can be categorized as either being linear or cyclic.

Temporal devices derive or represent their state over some period of time rather than a single point in time. That is, temporal devices must be observed over some period of time before rendering an observation. A seat belt warning tone generator, blinking hazard lights, an ambulance/emergency siren are examples of temporal devices. Temporal devices can have a direction and speed of travel of a state. For example, a network device embodied as a garage door opener can represent the state of a garage door as closing or opening. Also, for example, a space heater network device can represent the state of a room where it is located as heating. Similarly, a wall or window air conditioner (A/C) network device can represent the state of a room where it is located as cooling. The observable state of repetitive things can be accurately determined through observation over time as opposed to a single snap shot at a discrete point in time.

Using the above-described exemplary classifications, consider an example network device that supports interactions via an input device such as an analog joystick. Such an input device can be defined as being controllable and continuous (i.e., due to its analog mechanics). The input device can also be defined as being bounded by the physical limits of leftmost, uppermost, rightmost, and down most points. Continuing with the joystick example, this type of input device can be defined as being restful at positions $x=0$ and $y=0$, with open state transition paths (e.g., it can take any one of many paths to get from the leftmost point to the rightmost point). The classifications of interactions supported by a joystick input device can also be defined as being linear and non-repetitive.

Techniques are described for using third party, run time registerable, discoverable, and auto distributable interfaces for network devices that have not previously been seen or discovered by an access device in the past. The techniques dynamically register and distribute resource bundles defining interfaces for controlling network devices within wireless and wired networks. In some examples, methods distribute user interfaces (UIs) for network devices. The network devices can include internet of things (IoT) devices. The UIs can be third party, run time registerable, discoverable, and auto distributable to an access device. The UIs can be based on network devices that have not previously been seen by an application on the access device. In some examples, a server may determine that a resource bundle exists for a network device connected to a home local area network. In one example, the resource bundle can define a visual interface usable to control a network device within an application executing on an access device.

In other examples, resource bundles can define interfaces for wearable devices, ambient sensors, and other control interfaces having dynamically detected and updated interface control capabilities used to control network devices. Such wearable devices or ambient sensors and interfaces can use interfaces defined by resource bundles, but may not have visual interfaces. Thus, the interfaces defined by the resource bundles described herein can be part of visual and non-visual interfaces. The network device may be a newly discovered network device. The server may provide the resource bundle to an application installed on a mobile device so that the mobile device can use the resource bundle to generate an interface module for monitoring and controlling the network device using the application. The server can also provide the resource bundle to an application installed on a stationary device such as, for example, a network gateway, a personal computer, a connected television (i.e., a smart TV), or a touchscreen device mounted on a wall or other surface (e.g., a touchscreen integrated into the door of a refrigerator or another appliance), so that the application can generate a corresponding interface module that is usable to monitor and control the network device. For example, a home local area network may include a gateway connected to a discovered network device. The server may determine that a resource bundle defining an interface module exists for the network device, and thus that the interface module needs to be provided to the gateway and/or a mobile device associated with the network device. For example, the server may determine the existence of multiple interface modules corresponding to respective network devices based on communications from the network devices and/or communication from a mobile device that is associated with the network devices. Upon discovering a network device that is connected to a home local area network, the server may determine a unique ID for the network device and use the unique ID to identify an existing interface module for the network device.

In certain embodiments, a network device may have a unique interface identifier assigned to it. For example, a resource bundle for the network device may have been previously uploaded to the server, added to resource bundle registry, and assigned a resource bundle ID. According to these embodiments, the interface defined by such a resource bundle is designed for controlling and/or monitoring the network device. For example, the interface may be a modular tile for the network device, where the tile is defined by a resource bundle previously created, registered, uniquely identified, and uploaded to a resource bundle registration and discovery service hosted on the server. The server may then transmit the uniquely identified resource bundle to an access device associated with the home local area network. Once received by the access device, the resource bundle is executable to generate an interface with interactive elements usable to control the network device. For example, the interface module may be executable within an application installed on mobile device and the interface elements may include interactive elements for controlling the network device. Accordingly, an interface module for a newly discovered network device may be identified and transmitted to a mobile device so that the mobile device can be used to control the network device, regardless of whether the mobile device has previously been connected to or associated with the network device.

In some examples, network devices may send respective communications to a server indicating that they are connected to a local area network. For example, a first network device may send a first unique identifier and a second network device may send a second unique identifier to the server. The server can use the unique identifiers to determine respective resource bundles defining interfaces corresponding to each of the network devices. An access device such as a mobile device may subsequently discover the first and second network devices, retrieve their unique identifiers, and then use the unique identifiers to retrieve visual interface modules from the server, the interface modules having been designed for controlling the network devices. In an example, the interface modules can be tiles based on standardized design templates. For instance, the tiles can be developed in accordance with the design templates, uniquely identified, and uploaded to the server. In one example, the server can host a cloud-based tile registration and discovery service and the tiles can be uploaded to the service by tile creators and developers, such as network device manufacturers and third party developers.

Figure 11:
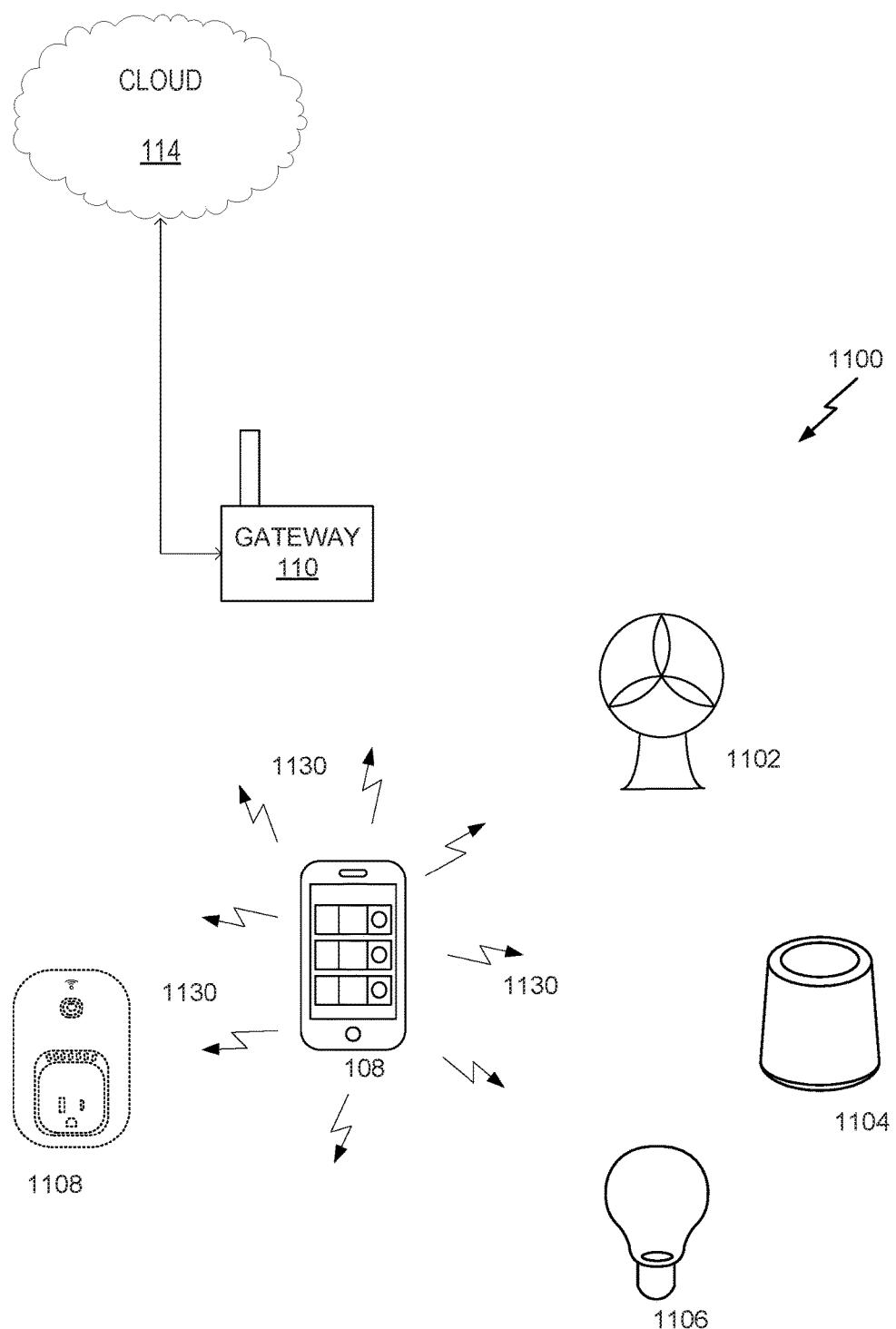
FIG. 11 is an illustration of an example of a network environment, in accordance with some embodiments.

FIG. 11 illustrates an example of a network 1100, according to embodiments of the present invention. Specifically, the network 1100 can be a wireless local area network enabling an access device to communicate with network devices to control adjustment of attributes related to operation of the network devices. Network 1100 includes network device 1102, network device 1104, network device 1106, and network device 1108. In some embodiments, each of the devices 1102, 1104, and 1106 may include a home automation network device that allow a user to access, control, and/or configure various appliances, such as a television, a space heater, a radio, a light, an electrical switch, a fan, a humidifier, a sensor, a microwave oven, an iron, and/or the like. For example, device 1102 may be configured to enable control of a fan, device 1104 may be configured to enable control of a motion sensor, device 1106 may be configured to enable control of a light, and device 1108 may be configured to enable control of an electrical switch. The network 1100 also includes access device 108. In other words, the network 1100 may be substantially similar to the network 100 except that access device 108 has been turned on near the network 1100, to which it is associated, or has entered the an area to which the network 1100 can reach.

When access device 108 can enter the network 1100 as shown in FIG. 11, access device 108 may be authenticated based on the access device's authentication with the logical network or may otherwise commence communication with cloud network 114. Access device 108 may also communicate notification of its presence or other information directly to other network devices 1102-1108 within network 1100, as shown in FIG. 11 by communication paths 1130. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 1100, including network device 1102, network device 1104, network device 1106, and network device 1108, information/data regarding its status. Such status data may include the fact that it is present and turned on, or other status data/information. At any time that network devices 1102, 1104, 1106 and 1108 recognize that access device 108 is present at network 1100, the network devices may communicate back to access device 108. For example, the network devices may send an acknowledgement (e.g. ACK signal) back to access device 108 to confirm that they received the status data sent by access device 108. The network devices may also send their own status data to access device 108.

While network devices 1102-1108 and access device 108 may each receive communication from other network devices around the network 1100, including the status of each of those network devices, network devices 1102-1108 and/or access device 108 may be continuously scanning network 1100 (including, for example, running discovery algorithms) to determine whether any devices within the network have moved, turned on/off or otherwise added to or subtracted from the network 1100, or have otherwise changed statuses.

Since network devices 1102-1108 and access device 108 may each receive communication from other devices around network 1100, including the status of each of those devices, each network device within network 1100 may know the status of each other network device in the network 1100. For example, access device 108 or devices 1102-1108 may not be required to communicate with cloud network 114 in order to obtain one or more of such statuses. Since cloud network 114 is an external network and may be remote from network 1100, communication between network devices within the network 1100 and cloud 114 may take more time than communication between two devices within network 1100. For example, communication between devices within network 1100 may take anywhere from 1 millisecond to 100 milliseconds, while communication between a device within network 1100 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 1100 may choose to send and receive/retrieve statuses directly with other devices within the network 1100 instead of communicating such information via cloud network 114. When a network device receives status data from another network device on the device's local area network 1100, it may store that status data so that it may retrieve and use that status data at a later time.

Figure 12:
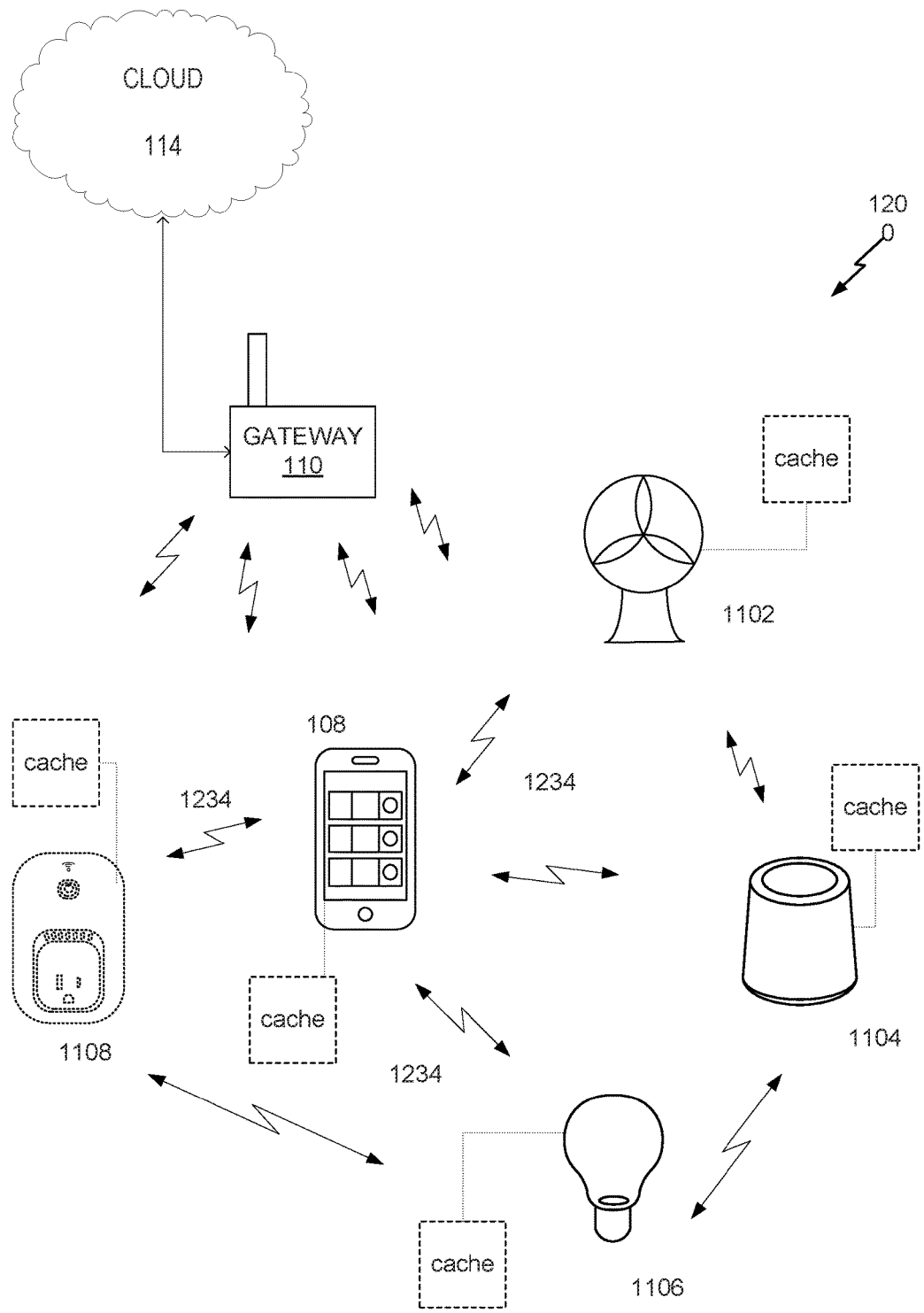
FIG. 12 is an illustration of an example of a network environment, in accordance with some embodiments.

FIG. 12 illustrates an example of a network 1200, according to embodiments of the present invention. The local area network 1200 may include network device 1102, network device 1104, network device 1106, network device 1108, and access device 108. FIG. 12 also illustrates that one or more network devices 1102-1108 and/or access device 108 may include a storage device, such as a cache, for storing data, including data regarding its own status and data regarding statuses received from the other devices within local area network 1200. For example, access device 108 may, after being powered up, broadcast/send its status to network device 1108 via communication 1234. Network device 1108 may store the status data received from access device 108 until the next time access device 108 updates its status by sending new/updated status data to network device 1108. Cache may be used for storage within network 1200 and/or access devices within the local area network 1200 so that each of the devices may be able to quickly retrieve the data it needs from storage. An application operating on the access device 108 can access the cache to obtain information to display the visual interface for each network device 1102-1108 registered within the network 1200. Although a caching device may be used to store such data within the network and/or access devices within the local area network 1200, other types of storage may be used.

The cache can contain a known interface list including interface information for different, known types of devices. The known list can include a record for each network device known by the access device 108 to exist on the network 1200. When an application is run on the access device 108, the access device 108 can access the known interfaces in the cache to present the display of access device 108. The display can present one or more visual interfaces, each corresponding to a network device known to exist on the network 1200. Each visual interface can be generated based on a visual interface module corresponding to each device on the network 1200. In an example, the display can include a visual interface (e.g., a module tile) for each device in the network 1200 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 1200. For example, the status display can include a speed of a fan (e.g., a fan speed of 56 in a range of values between 0 and 100) of the network device 1102 (e.g., a fan), a value of sensitivity of a sensor (e.g., a value of 34 in a range of values 0-100) for the network device 1104 (e.g., a motion sensor), a value of brightness (e.g., 65 percent brightness) for the network device 1106 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 1200 and can use that information to update its own cache, update the status display, and/or pass the information to the cloud network 114 and/or the gateway 110 for trouble shooting and/or storage.

Even though each network device may know and store (e.g. in cache) the state of each other network device within local area network 1200, a network device may not know when another network device changes status (e.g. turns/powers off). However, network devices and/or access devices within local area network 1200 may broadcast/send any updates in its status to other devices on the network. For example, if network device 1102 changes status, it may send status data to the other network devices, such as network devices 1104, 1106 and 1108 and to access device 108. However, network device 1102 may not know which devices to update since the other devices may change statuses periodically (e.g. turn off).

Therefore, a network or access device may subscribe to another network or access device within local area network 1200. For example, network devices 1104, 1106 and 1108 and access device 108 may subscribe to status data notifications/updates from network device 1102. Such a subscription may be registered for upon initial connection with network device 1102 when network device 1102 first enters local area network 1200 or at any other time after network device 1102 has been associated with local area network 1200. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 1102 may store a list of network devices 1104, 1106 and 1108 and access device 108 after those devices subscribe to network device 1102. Then, when network device 1102 undergoes a change in status, network device 1102 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 1200, each contain continuously updated statuses of each other device on the network and obtain those statuses and updates through direct communication without necessary use of the cloud.

Figure 13:
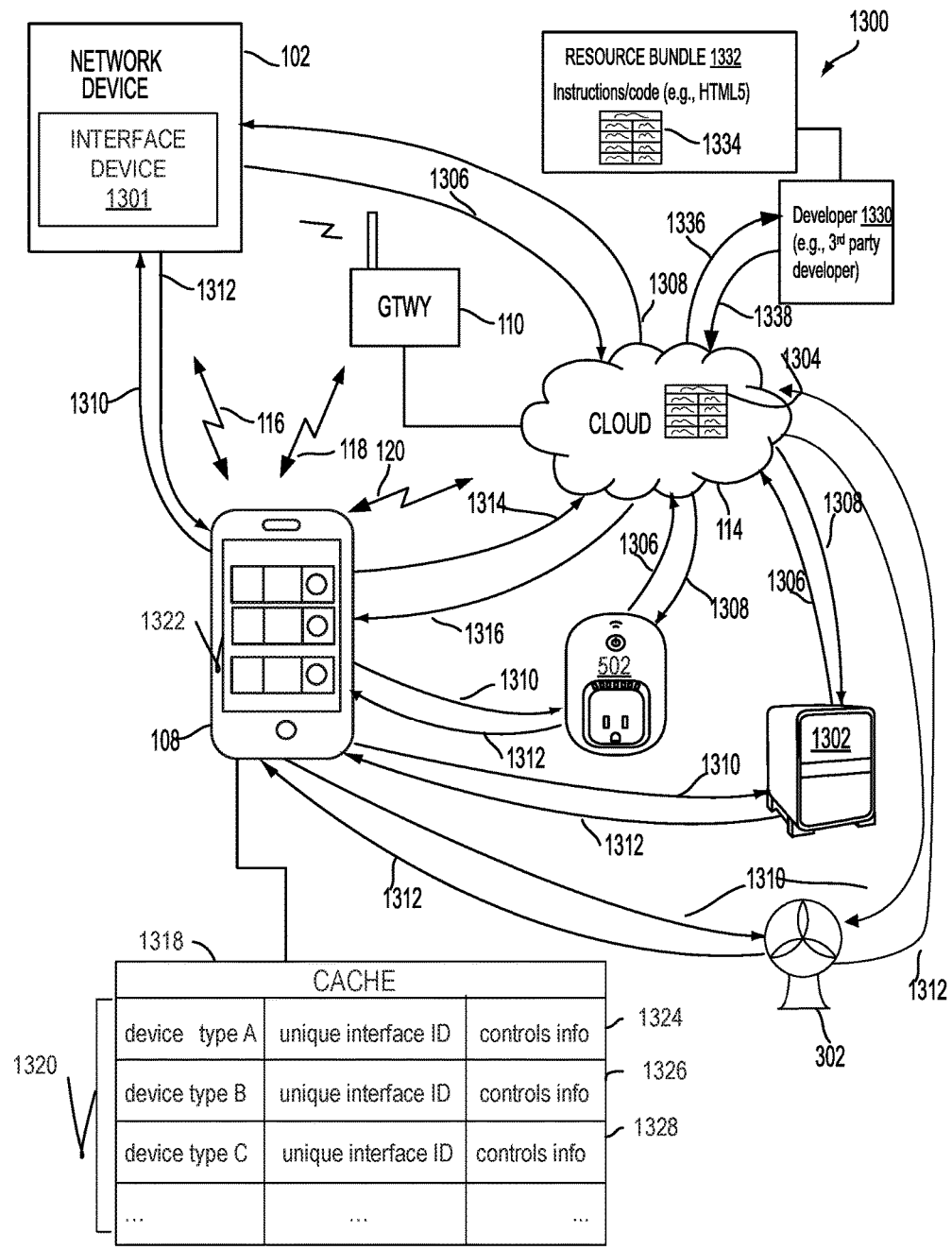
FIG. 13 is an illustration of data flows for providing resource bundles defining network device interfaces within an example wireless network environment, in accordance with some embodiments.

FIG. 13 illustrates an embodiment of a process 1300 for providing a resource bundle 1332 that defines a visual interface module for controlling a network device. As shown, the process 1300 can involve exchanging intra-network communications 1310 and 1312 between multiple network devices 102, 1102, 502, 1302 and an access device 108. The process 1300 can also generate a default interface using a fundamental model describing all supported interactions for a network device. For example, intra-network communication 1312 can be sent from network device 102 to access device 108 in response to a query 1310. Communication 1312 can include information describing interactions that network device 102 supports. In some embodiments, communication 1310 includes a set of attributes for each interaction type supported by network device 102. When these attributes are received by access device 108, access device 108 can use the attributes to form a complete and fundamental model describing all interactions for network device 102. This fundamental model can be used by access device 108 to determine a basic, default visual interface for network device 102. For instance, such a model can be used to create a default visual interface in cases where a resource bundle for network device 102 is otherwise unavailable (e.g., when a resource bundle 1332 has not been developed for network device 102 and/or access device 108 cannot connect to cloud network 114 to obtain resource bundle 1332). In an embodiment, the default visual interface can be included in a known interface list 1320 that is locally stored in cache 1318 on access device 108.

In one embodiment, a resource bundle 1332 can be stored in a memory or cache of a network device, such as a cache accessible by interface device 1301 of network device 102. For example, in environments where connectivity to cloud network 114 is unavailable, intermittent, or unreliable, an initial resource bundle 1332 stored in cache of network device 102 can be transmitted directly from network device 102 to access device 108. For example, this embodiment may include using communications 1310 and 1312 to transmit an initial, manufacturer-supplied resource bundle 1332 directly from a network device 102 to access device 108 in cases where access device 108 cannot connect to cloud network 114.

As shown, the process 1300 may be performed by one or more computing devices, such as network device 102, a server associated with cloud network 114, and access device 108 described above with reference to FIGS. 1, 5, and 11-12. In some embodiments, the network device 102 is associated with a home automation network, such as the local area network 100 described above with respect to FIGS. 1, 5, and 11-12. Process 1300 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various home appliances located within the user's home, such as a television, radio, light, microwave, iron, space heater, sensor, and/or the like. For example, the user can monitor and control network devices by interacting with a visual interface of the gateway 110 (i.e., a web page for gateway 110) and/or a visual interface rendered on display 1322 of the access device 108.

In an embodiment, an application may be run on the access device 108. The application may cause the access device 108 to use a resource bundle to present a display 1322 with a modular visual interface for each network device accessible on the local area network 100. When the application is run on the access device 108, the access device 108 can access a cache 1318.

The cache 1318 can be a local cache located in onboard storage of the access device 108. The cache 1318 can contain a known interface list 1320 with records 1324, 13213 and 1328 including interface information for different, known types of network devices. The interfaces in interface list 1320 can be defined by resource bundles, such as resource bundle 1332. In additional or alternative embodiments, one or more of the interfaces in interface list 1320 can be a default interface generated using a fundamental model describing all supported interactions for a network device. As shown, each of records 1324, 1326 and 1328 can include a device type, a unique interface module ID, and controls information. The known interface list 1320 can include a record for each device known by the access device 108 to exist on the local area network 100. When the application is run on the access device 108, the access device 108 can access the known interfaces 1320 in the cache 1318 to present the display 1322, which lists modular interfaces for each network device on the local area network 100. In an example, the display 1322 can include a modular tile for each connected network device having an interface in the known interface list 1320. Exemplary communications used to populate cache 1318 are described in the following paragraphs.

The process 1300 can include exchanging communications 1336 and 1338 between a third party interface developer 1330 and cloud network 114. In response to a request 1336 sent from cloud network 114, communication 1338 can be sent from a third party interface developer 1330 to cloud network 114. In some embodiments, request 1336 is not used as part of process 1300. For example, a third party developer 1330 of a visual interface module for network device 102 may initiate communication 1338 to cloud network 114 in order to transmit a resource bundle 1332 to cloud network 114. A resource bundle 1332 for a given network device can define an interface module for that device.

In one example, communication 1338 can include a resource bundle 1332 corresponding to network device 102. The resource bundle can be embodied as a structured folder structure whose contents define all visual and interactive elements in a tile for the network device. For example, resource bundle 1332 can be a zip file sent from a device manufacturer or a third party developer 1330 that is submitted or uploaded to cloud network 114. The resource bundle 1332 includes a unique device ID and files 1334 defining graphical content of a visual interface module. The graphical content can include definitions of interactive elements for the interface module. The resource bundle can include templates defining interactive control states for each of the interactive elements, language translations for tile text, any menus for the tile, and graphical content of the menus. For example, the resource bundle 1332 can define templates, text, and graphical content using a markup language, such as HTML5. According to an embodiment, after an initial resource bundle 1332 is uploaded from developer 1330 to cloud network 114 via communications 1338, a subsequent request 1336. In this embodiment, request 1336 is a request from cloud network 114 for an updated resource bundle 1332. If an updated resource bundle 1332 is available from developer 1330, then another communication 1338 is sent to upload the an updated resource bundle 1332 to cloud network 114.

The process 1300 can also include utilizing communications 1306 to send respective, unique identifiers for network devices 102, 1102, 502, and 1302 to a server of cloud network 114. In the example of FIG. 13, network device 1102 is a fan, network device 502 is a switch, and network device 1302 is a space heater. For simplicity, communications 1306 are shown as direct communications between network devices 102, 1102, 502, 1302 and cloud network 114. However, it is to be understood that in embodiments, communications 1306 can be sent from gateway 110 or respective manufacturers of network devices 102, 1102, 502, 1302 to cloud network 114.

In the example of FIG. 13, communications 1306 include respective registration information for network devices 102, 1102, 502, 1302. For example, communications 1306 can include respective, unique device IDs for network devices 102, 1102, 502, 1302. In some embodiments, the registration information may identify one or more sets of capabilities of network devices 102, 1102, 502, 1302. The registration information for each network device can include a unique identifier for the network device, a default name of the network device, one or more capabilities of the network device, and one or more discovery mechanisms for the network device.

Communications 1306 can be sent as part of the process 1300 in order to transmit an indication that network devices 102, 1102, 502, and 1302 are associated with the network. For example, network device 102 may transmit the indication to the server of the cloud network 114. In some embodiments, the transmitting may include transmitting a unique identifier (ID) for the network device 102. For example, the network device 102 may send a communication to the server indicating a unique device ID for the network device 102. In such embodiments, the server may then determine that a match between the unique device ID and a known resource bundle 1332 exists. The cloud network 114 can include a data store 1304 of known resource bundles 1332.

Access device 108 can request and download a resource bundle 1332 for a given network device by exchanging communications 1314 and 1316 with the cloud network 114. Once the resource bundle 1332 is received at access device 108 from the cloud network 114, the bundle can be used to generate a visual interface module. The visual interface module can then be used to render a modular interface within display 1322. In an embodiment, the interface module can be stored in cache 1318 at access device 108. For example, cache 1318 can be used to store a tile database where each record in the database is uniquely identified by a tile ID. In alternative or additional embodiments, cache 1318 can be used to store a known interface list 1320. As shown in the example of FIG. 13, known interface list 1320 can include records 1324, 1326 and 1328 with interface information for different, known types of network devices.

Cloud network 114 can use a unique device ID to determine a resource bundle 1332 that corresponds to one of the network devices 102, 1102, 502, 1302. As shown in FIG. 13, cloud network 114 can access a data store 1304 of resource bundles 1332. Each resource bundle 1332 can define a respective visual interface module for one of the network devices 102, 302, 502, 1302. A plurality of uniquely identified resource bundles 1332 can be stored in data store 1304. For example, each resource bundle 1332 in data store 1304 can be associated with a unique interface module ID. In an embodiment, data store 1304 is a database configured to store resource bundles 1332 defining modular tiles for a plurality of network devices, with each of the stored resource bundles 1332 being identified by a unique ID. For instance, network device 102 having a unique device identifier may be matched with an existing resource bundle 1332 based on comparing information received from the network device 102 with information stored in data store 1304. In cases where an existing resource bundle 1332 for network device 102 is not found in data store 1304, cloud network 114 can use information provided by network device 102 to generate a default interface module, where the information is provided via communication 1306 as part of a registration process for network device 102. The generated, default interface module can then be assigned a unique interface module ID and stored in the cloud network 114. In some embodiments, an updated resource bundle 1332 can be used to update an existing record stored in data store 1304.

After determining the resource bundle 1332 and/or the unique interface module ID for network device 102, cloud network 114 sends communication 1308 to network device 102 in order to provide a unique interface module ID to the network device 102. In one embodiment, communication 1308 can include a unique tile ID corresponding to a modular tile for network device 102 that is defined by a resource bundle 1332 stored in data store 1304. In some embodiments, communication 1308 includes a unique tile ID corresponding to a modular tile defined by a resource bundle 1332. Upon receiving communication 1308 with the unique interface module ID (e.g., a unique tile ID), the network device 102 can store the unique interface module ID. For example, the unique interface module ID can be stored by an interface device 1301 of the network device 102 that is configured to provide the interface module ID to a mobile device or gateway. In an embodiment, the interface device 1301 is implemented as a 'smart module' in hardware and firmware, such as, for example, a system on a chip (SOC) integrated into the network device 102.

The interface device 1301 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 1301 loses power, information stored in the flash memory may be retained. The DRAM of the interface device 1301 may store various other types of information needed to run the interface device 1301, such as all runtime instructions or code. The flash memory or DRAM or a combination thereof may include all instructions necessary to communicate with network device 102.

The process 1300 can include sending, from the access device 108, intra-network communication 1310 including a query, to the network device 102. The query can be a request for information such as a query for capabilities, a request for an identity of the network device 102, and/or a request for a unique interface module ID. For example, communication 1310 can be sent from access device 108 to network devices 102, 1102, 502, 1302 to query network devices 102, 1102, 502, 1302 about their respective identities and capabilities. In response to the query sent from access device 108, the process 1300 can include receiving intra-network communications 1312 at the access device 108 with device information for the network devices 102, 1102, 502, 1302. According to an embodiment, in response to the query, the network devices 102, 1102, 502, 1302 can send communications 1312 to inform the access device 108 of their identities and/or capabilities. For instance, in response to receiving the query, the network device 102 may send communications 1312 to the access device 108 with at least a unique interface module ID.

The process 1300 can include utilizing intra-network device communications 1310 and 1312 as part of a discovery process for the network device 102. For example, when the network device 102 is initially connected to the network, it and access device 108 can automatically exchange communications 1310 and 1312 to provide the access device 108 with information that can be used to determine a basic, default visual interface to be stored in cache 1318. In an embodiment, the process 1300 can generate a default interface using a fundamental model describing all supported interactions for a given network device. For example, intranetwork communication 1312 can be sent from network device 102 to access device 108 in response to a query included in communication 1310. Communication 1312 can include information describing interactions that a given network device (e.g., network device 102) supports. For instance, communication 1312 can includes a set of attributes for each interaction type supported by network device 102. When these attributes are received by access device 108, it can use the attributes to form a complete and fundamental model describing all interactions supported by network device 102. This fundamental model can then be used by access device 108 to determine a basic, default visual interface for network device 102. For example, such a model can be used to create a default visual interface in cases where a resource bundle 1332 for network device 102 is otherwise unavailable (e.g., when resource bundle 1332 has not been developed for network device 102 and/or when access device 108 cannot connect to cloud network 114 to obtain resource bundle 1332). In an embodiment, the default visual interface can be included in a known interface list 1320 that is locally stored in cache 1318 on access device 108.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 1312 may be received when the network device 102 is rebooted (e.g., powered on, reset or restored to default settings, or the like). For example, when the network device 102 is rebooted, it may broadcast one or more messages on the local area network 100 to discover whether there are any mobile devices in the local area network 100. For example, communication 1312 may be broadcast according to a UPnP protocol during a discovery process. The network device 102 may receive communications 1310 from access device 108 indicating that it is located within the local area network 100 and interrogating network device 102 about its functionalities. That is, after receiving a broadcast message from network device 102, access device 108 may then query network device 102 by sending communication 1310 in order to receive the communication 1312 including information about the network device.

After receiving communication 1312, if the access device 108 can access the cloud network 114, it sends a communication 1314 to the cloud network 114 as a request for a resource bundle 1332 for a given network device, such as network device 102. Communication 1314 is described in further detail below. Otherwise, if the access device 108 cannot access the cloud network 114, the access device 108 looks up the unique interface module ID received from the network device 102 in cache 1318. As discussed above, cache 1318 can be a local cache stored on the access device 108. Basic properties for known interfaces can be stored in cache 1318 as a device type and controls information. These basic properties can include, for example, a default icon, a default name, and interactive elements for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 1314 to query the cloud network 114 about a given network device (e.g., network device 102). The communication 1314 can include at least the unique interface module ID for the network device 102. The communication 1314 can include a query or request for a resource bundle 1332 for the network device 102. In cases where access device 108 already has a resource bundle 1332 for network device 102, communication 1314 can be request can be for an updated resource bundle. At this point, the cloud network 114 can compare the unique interface module ID of the network device 102 to known interface module IDs stored in data store 1304 in order to determine that there is a match between the unique interface module ID sent with communication 1314 and a resource bundle 1332. If the cloud network 114 finds a resource bundle 1332 for network device 102 in its data store 1304, it transmits the resource bundle 1332 to the access device 108 via communication 1316. For example, if the access device 108 is currently using a default interface module for network device 102 that was determined based on exchanging communications 1310 and 1312, and then subsequently is able to connect to the cloud network 114, communications 1314 and 1316 between the access device 108 and the cloud network 114 can be used to obtain a resource bundle 1332 for the network device 102. Once the resource bundle 1332 is downloaded to access device 108 from cloud network 114 using communications 1316, the resource bundle 1332 can be used to generate an updated interface module for the network device 102.

For example, upon receiving communication 1316 from the cloud network 114, the access device 108 can use a resource bundle 1332 to populate a record in cache 1318 corresponding to the network device 102 with device type and controls information defined in resource bundle 1332. That is, when the access device 108 is remote from the local area network 100, it can exchange communications 1314 and 1316 with the cloud network 114 to receive a resource bundle 1332 for a network device. Information received via communications 1316 can be used to populate records of cache 1318. Records in cache 1318 can be updated using resource bundles 1332 received via communication 1316. In additional or alternative embodiments, new records can be created in cache 1318 when communication 1316 includes a resource bundle 1332 for a newly discovered network device.

Records 1324, 1326, 1328 in cache 1318 store device types, unique interface module IDs, and controls information for known network devices. The access device 108 uses the records in cache 1318 to render visual interfaces in the display 1322. For example, the display 1322 can include a navigable list of modular tiles corresponding to network devices in the local area network 100.

Display 1322 can also include an indicator representing a state of network device 102. In embodiments, communications 1312 and/or 1314 can include a last known state of the network device 102 and/or historical data associated with the network device 102. In one embodiment, such state information can be based on information received via communication 1312 from the network device 102 when the access device 108 is connected to the local area network 100. In this way, display 1322 of the access device 108 can reflect a current state and historical data for the network device 102 when the mobile device is not connected to the local area network 100. In additional or alternative embodiments, the state information can be based on information received via communication 1316 from the cloud network 114 when the access device 108 is connected to the cloud network 114. Using the state information, an interface module or tile for the network device 102 within display 1322 can indicate an 'on' or 'off' state for the network device 102 when the network device is powered on or off.

Figure 14:
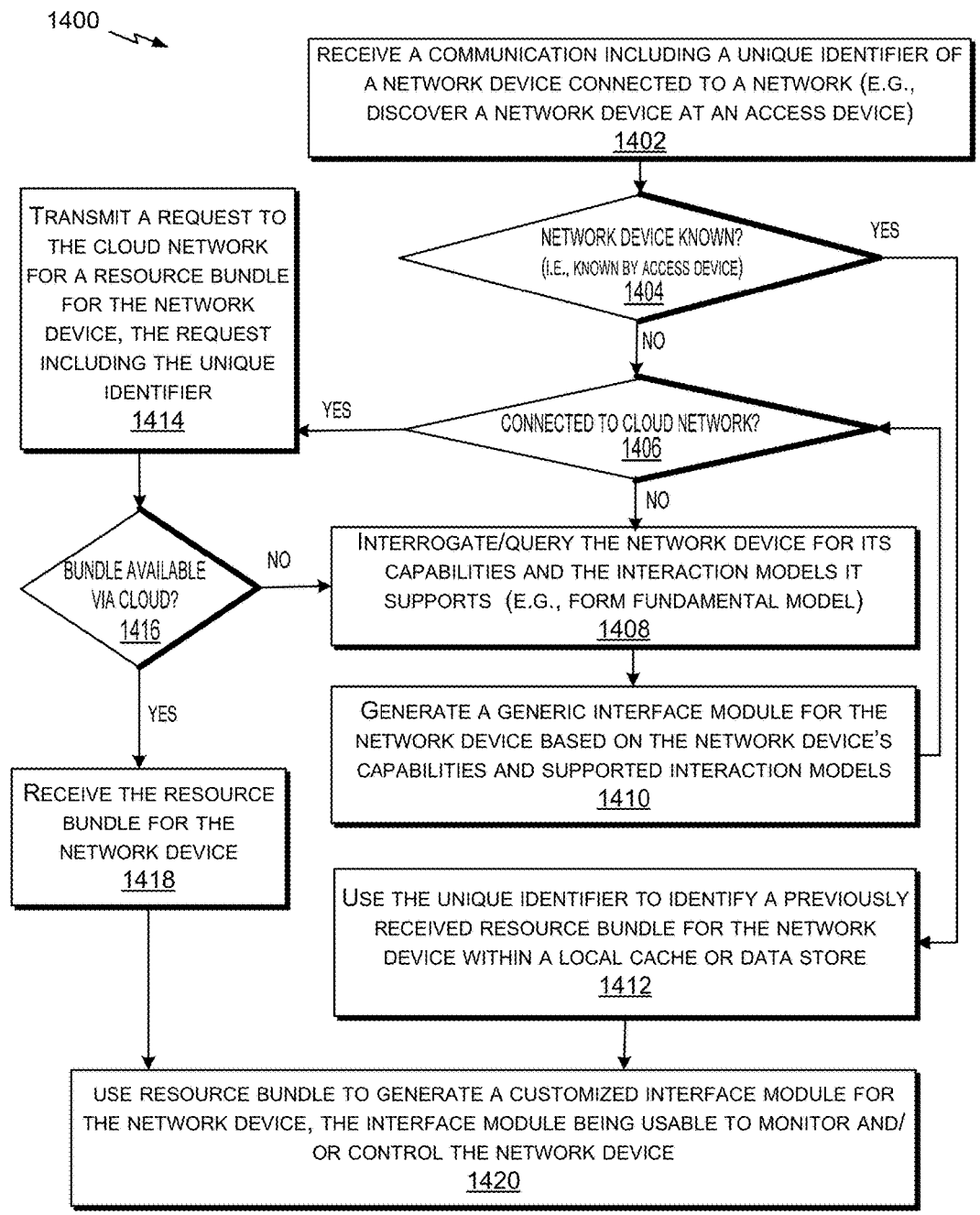
FIG. 14 is a flowchart illustrating a process for generating interface modules for network device interfaces, in accordance with some embodiments.
Figure 15:
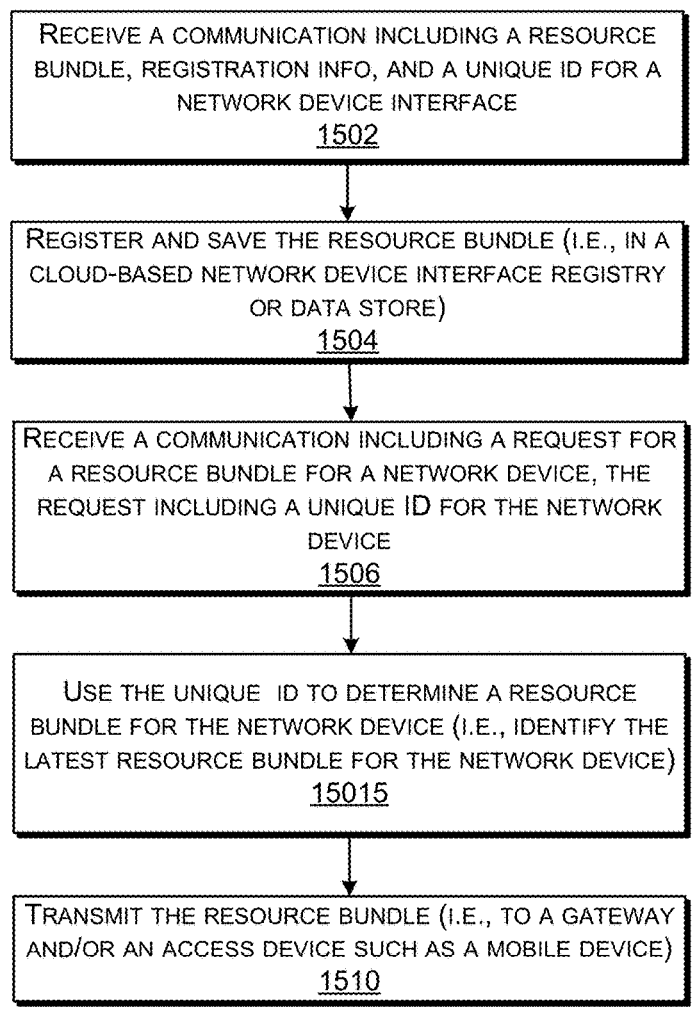
FIG. 15 is a flowchart illustrating a process for providing a resource bundle for a network device, in accordance with some embodiments.
Figure 16:
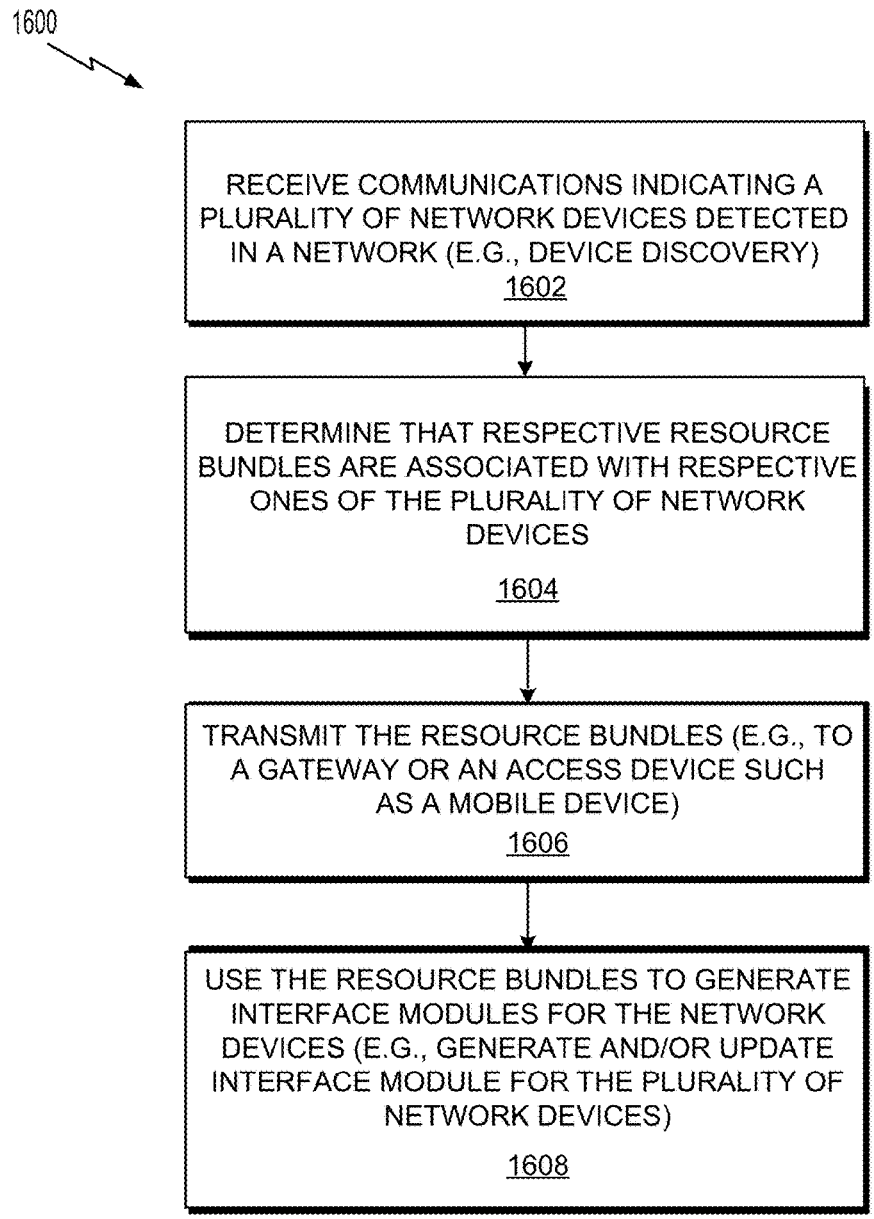
FIG. 16 is a flowchart illustrating a process for using resource bundles to generate interface modules for network devices, in accordance with some embodiments.

FIGS. 14-16 provide techniques for providing information used to define visual interface modules for controlling network devices that exist within a local area network. The techniques can provide resource bundles defining visual interface modules. The techniques allow a user of an access device to monitor and control network devices within the local area network regardless of whether the access device has previously been associated with or connected to the network devices. For example, using the techniques described below, the server of the cloud network 114 may determine that a newly discovered network device is connected with the wireless local area network 100, and use a unique ID to retrieve a previously registered resource bundle that defines a visual interface module for the network device. Upon determining that a visual interface module for the network device exists, the server may provide the resource bundle to an access device 108 associated with the wireless local area network 100 in order to facilitate generating an interface module for the network device.

Processes 1400, 1500, and 1600 are illustrated as a logical flow diagrams, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1400, 1500, and 1600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory. The processes 1400, 1500, and 1600 can utilize intra-network communications to inform an access device of the existence of a network device and to provide a resource bundle defining an interface module for the network device to the access device. In some aspects, the processes 1400, 1500, and 1600 may be performed by one or more computing devices, such as the server of the cloud network 114, the access device 108, the gateway 110, and the network devices 102, 1102, 1104, 1106, 1108, 1302 discussed above with respect to FIGS. 1 and 11-13.

FIG. 14 shows a flow chart showing an exemplary set of steps for a process 1400 of generating interface modules for network devices. The interface modules are usable for controlling the network devices. At 1402, the process 1400 includes receiving a communication including a unique identifier of a network device connected to a network. As shown in FIG. 14, this step can be performed as part of discovery of a network device. In an embodiment, the communication received in 1402 can include a unique device ID for a network device. For instance, step 1402 can be performed using communications 1310 and 1312 described above with reference to FIG. 13.

Next, at 1404, a determination is made as to whether the network device is known. As shown, 1404 can be performed by determining if the network device discovered at 1402 is already known by an access device. If it is determined that the network device is known, control is passed to 1412 where the unique identifier is used to identify a previously received resource bundle for the network device. As depicted in FIG. 14, 1412 can be performed by identifying a resource bundle in a local cache or data store. For example, 1408, the unique identifier received at 1402 can be used in step 1412 to identify a resource bundle for the network device within data store 1304. The resource bundle can define an interface module stored in local cache 1318 at access device 108. Otherwise, if it is determined that the network device is not known (e.g., has not been seen by the access device before), control is passed to 1406.

Next, at 1406, a determination is made as to whether a connection to a cloud network exists or can be established. If it is determined that a connection to the cloud network exists, control is passed to 1414 where a request is transmitted to the cloud network. The request transmitted in 1414 can be a request for a resource bundle defining an interface module for the network device, where the request includes the unique identifier received in 1402. Otherwise, if it is determined that no connection to the cloud network exists, control is passed to 1408.

At 1408, the network device is interrogated or queried to request its capabilities and the interaction models it supports. As shown, 1408 can include using the network device's capabilities and supported interaction models to form a fundamental model describing all interactions supported by the network device. After querying the network device and forming the fundamental model, control is passed to 1410 where a generic interface module for the network device is generated. The generic interface module is generated based on the network device's capabilities and supported interaction models obtained at 1408. After generating the generic interface module, control is passed back to 1406 to determine if a connection to the cloud network can now be established.

At 1414, a request is transmitted to the cloud network. The request transmitted in 1414 can be a request transmitted to cloud network 114. The request can be a request for a resource bundle 1332 defining an interface module for the network device. As shown in FIG. 14, the request transmitted at 1414 includes the unique identifier received in 1402. After transmitting the request, control is passed to 1416.

Next, at 1416, a determination is made as to whether a resource bundle for the network device is available from the cloud network. If it is determined that a resource bundle is available from the cloud network, control is passed to 1418 where the resource bundle for the network device is received from the cloud network. Otherwise, if it is determined that no resource bundle is available via the cloud network, control is passed to 1408.

At 1418, the process 1400 includes receiving a resource bundle for the network device. In an embodiment, the resource bundle is received from a cloud network 114 in response to the request transmitted at 1414. For example, steps 1414 and 1418 can be performed using communications 1314 and 1316 described above with reference to FIG. 13. The resource bundle received at 1418 can be a new resource bundle for a newly discovered network device or an updated resource bundle for the network device. For instance, in an embodiment, process 1400 can optionally perform steps 1414-1418 even if it is determined at step 1404 that the network device is a known, previously discovered network device. In this way, a request for an updated resource bundle can be transmitted in step 1414 and fulfilled in step 1418 in cases where an access device has an interface module for a known network device. This embodiment can be used to obtain updated resource bundles subsequent to receiving an initial resource bundle in the event that a third party developer 1330 or network device manufacturer uploads updated resource bundles to cloud network 114.

Next, at 1420, the process 1400 includes using a resource bundle to generate a customized interface module for the network device, the interface module being usable to monitor and/or control the network device. For example, 1420 can be performed by using either a previously received resource bundle identified at 1412, or a resource bundle received at 1418.

Step 1420 can be performed by application invoking the resource bundle to generate the interface module for the network device. Depending on the determination made in 1404, the resource bundle used at 1420 can be a resource bundle received from the cloud network or a previously received resource bundle identified at 1412. Step 1420 can be performed by an application executing on an access device or a gateway. When the interface module is subsequently executed at the access device or gateway, it displays interface elements usable to monitor and/or control the network device.

FIG. 15 illustrates an embodiment of a process 1500 for providing a resource bundle for a network device. The resource bundle defines an interface module usable to monitor and control the network device. In some aspects, the process 1500 may be performed by computing devices, such as access device 108, the gateway 110, and the server of the cloud network 114 discussed above with respect to FIGS. 1 and 11-13.

The process 1500 utilizes intra-network and inter-network communications to inform a cloud network server of the existence of a resource bundle for a network device and to provide the resource bundle defining an interface module for the network device to an access device and/or a gateway. At 1502, the process 1500 includes receiving a communication indicating that a resource bundle is available. The resource bundle can be for a network device that has been detected in a network. As shown in FIG. 15, 1502 can include receiving a communication including a resource bundle, registration information for the resource bundle, and a unique ID for a network device interface. In an embodiment, 1502 can include receiving the communication with a resource bundle 1332 from a third party developer 1330 or a network device manufacturer. For example, 1502 can be performed using communications 1336 and 1338 described above with reference to FIG. 13.

At 1504, the resource bundle received at 1502 is registered and saved. As shown, this can include registering the resource bundle in a cloud-based network device interface registry and saving the resource bundle in a data store. In one embodiment, the resource bundle is saved in data store 1304 in cloud network 114. After the resource bundle is registered and saved, control is passed to 1506.

At 1506, a communication is received, the communication including a request for a resource bundle for a network device. As shown, the request can include a unique ID for the network device. In an embodiment, 1506 can be performed using communication 1314 described above with reference to FIG. 13. After the communication is received, control is passed to 1506 where the unique ID is used to determine a resource bundle for the network device. In the example of FIG. 15, 1506 can include identifying the latest, most-recent resource bundle for the network device.

Next, at 1510, the resource bundle identified at 1508 is transmitted. In an embodiment, step 1510 can include transmitting a resource bundle defining an interface module for a network device to an access device 108 and/or a gateway 110 associated with a given network.

The process 1500 can further includes displaying, within an application executing on the access device and/or gateway, a tile defined by the transmitted resource bundle. This can be accomplished by rendering the display 1322 described above with reference to FIG. 13. For example, the tile can be configured to accept input corresponding to a selection of a setting for a primary function for the network device. In an embodiment, this can include receiving a touch input at an interactive element of a tile for the network device. Then, the process 1500 can include determining whether a secondary function is related to the primary function. If it is determined that there is a related secondary function, a sub-menu, such as, for example, a peekaboo drawer, can be displayed with options for the secondary function. In an embodiment, process 1500 can include automatically displaying the sub-menu and indicating a default selection for the secondary function. For example, if the primary function selected turned on a space heater network device 1302, process 1500 can include displaying low, eco, medium, and high secondary operational modes for the space heater and indicating that a default setting of eco mode has been selected.

FIG. 16 is a flowchart illustrating a process for using resource bundles to generate interface modules for network devices. FIG. 16 illustrates an embodiment of a process 1600 for providing a resource bundle for a network device. The resource bundle defines an interface module usable to monitor and control the network device. In some aspects, the process 1600 may be performed by computing devices, such as access device 108, the gateway 110, and the server of the cloud network 114 discussed above with respect to FIGS. 1 and 11-13.

The process 1600 utilizes intra-network communications to inform a cloud network server of the existence of network devices and to provide resource bundles defining corresponding interface modules for each of the network devices to an access device and/or a gateway. At 1602, the process 1600 includes receiving communications indicating that network devices have been detected in a network. As shown in FIG. 16, 1602 can be performed as part of device discovery.

At 1604, it is determined that respective resource bundles are associated with respective ones of the plurality of network devices. The respective resource bundles can define visual interface modules for the respective ones of the discovered network devices. This can be accomplished by looking up unique interface IDs in a data store 1304 of resource bundles. Next, at 1606, the resource bundles corresponding to the network devices are transmitted. In an embodiment, step 1606 can include transmitting resource bundles to an access device 108 and/or a gateway 110 associated with a given network.

At 1608, the process 1600 includes using the resource bundles to generate interface modules for the network devices. As shown, 1608 can include generating and/or updating interface modules by using respective resource bundles corresponding to respective ones of the plurality of network devices. In an embodiment, the resource bundles can be invoked within an application executing on an access device and/or gateway in order to generate tiles corresponding to the network devices. The tiles can be rendered by the application in the display 1322 described above with reference to FIG. 13.

Once any of the above techniques are used to provide a resource bundle defining an interface module corresponding to a network device, the interface module can be executed by an application executing on a mobile device in order to allow the mobile device to monitor and control the network device. The server may store unique identifier (e.g., network device MAC address) of a first network device 102 and a corresponding interface module ID in a first logical record of a data store 1304 of interfaces at a first memory space. The server may also store the unique identifier of a second network device 104 and its corresponding interface module ID in a second record of data store 1304 at a second memory space. In some embodiments, the data store 1304 of interfaces includes pointers. For example, a pointer stored with each record may point a program to a memory location where code of a resource bundle defining an interface module is stored. In an embodiment, the code can be in a markup language, such as, for example, HTML5. In certain embodiments, the code defines a modular tile having an icon, a name, and one or more interactive elements useable to control a network device. By storing pointers to resource bundles, all of the information needed to obtain resource bundle is accessible from the data store. For example, using a pointer, code in a resource bundle defining an interface usable to control network devices can be obtained and provided to an access device.

Another technique for providing an interface for controlling a network device may include using an existing, default interface in cases where a resource bundle is unavailable or is not readily obtainable. For example, this technique may include determining that a resource bundle for a network device does not exist, creating a new, default interface based on information about the network device, and designating the new interface as the interface to be used for controlling the network device. A new record may then be created including a unique interface identifier for the newly created interface. The access device may store the new interface in cache 1318 of interfaces.

Yet another technique for providing an interface for controlling a network device may include storing a resource bundle in a memory or cache of a network device. For example, in environments where cloud connectivity is unavailable or is not reliable, an initial resource bundle stored on a network device can be transmitted directly from the network device to an access device. For example, this technique may include using communications 1310 and 1312 described above with reference to FIG. 13 to transmit a manufacturer-supplied resource bundle 1332 directly from a network device 102 to an access device 108.

Once any of the above techniques are used to identify a resource bundle defining an interface module, the server may maintain a cloud-based registry of stored resource bundles in order to enable access devices such as mobile devices and gateways to control network devices by using interfaces defined by the resource bundles.

Figure 17:
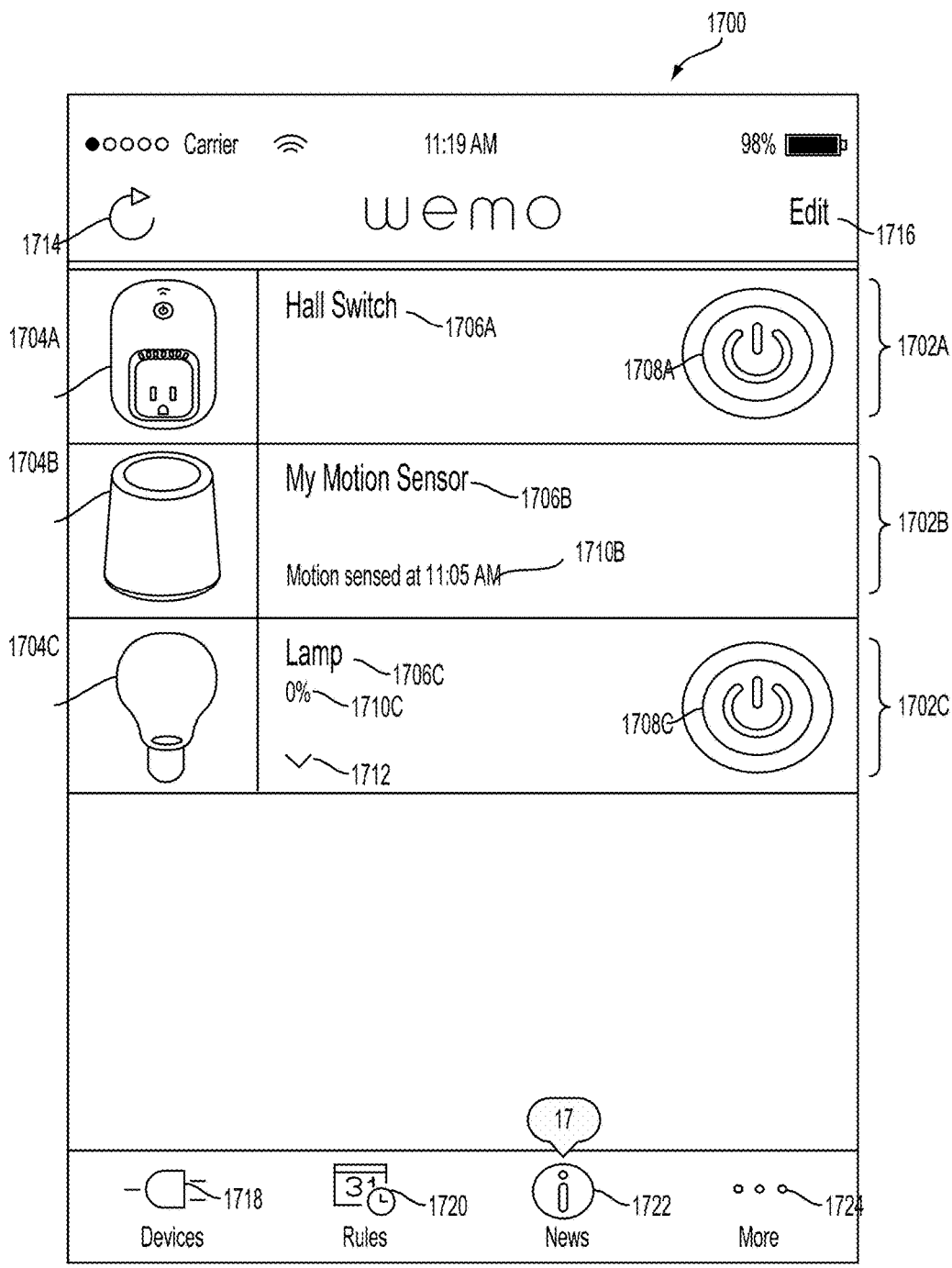
FIGS. 17-19 depict example interfaces for controlling network devices, in accordance with some embodiments.
Figure 18:
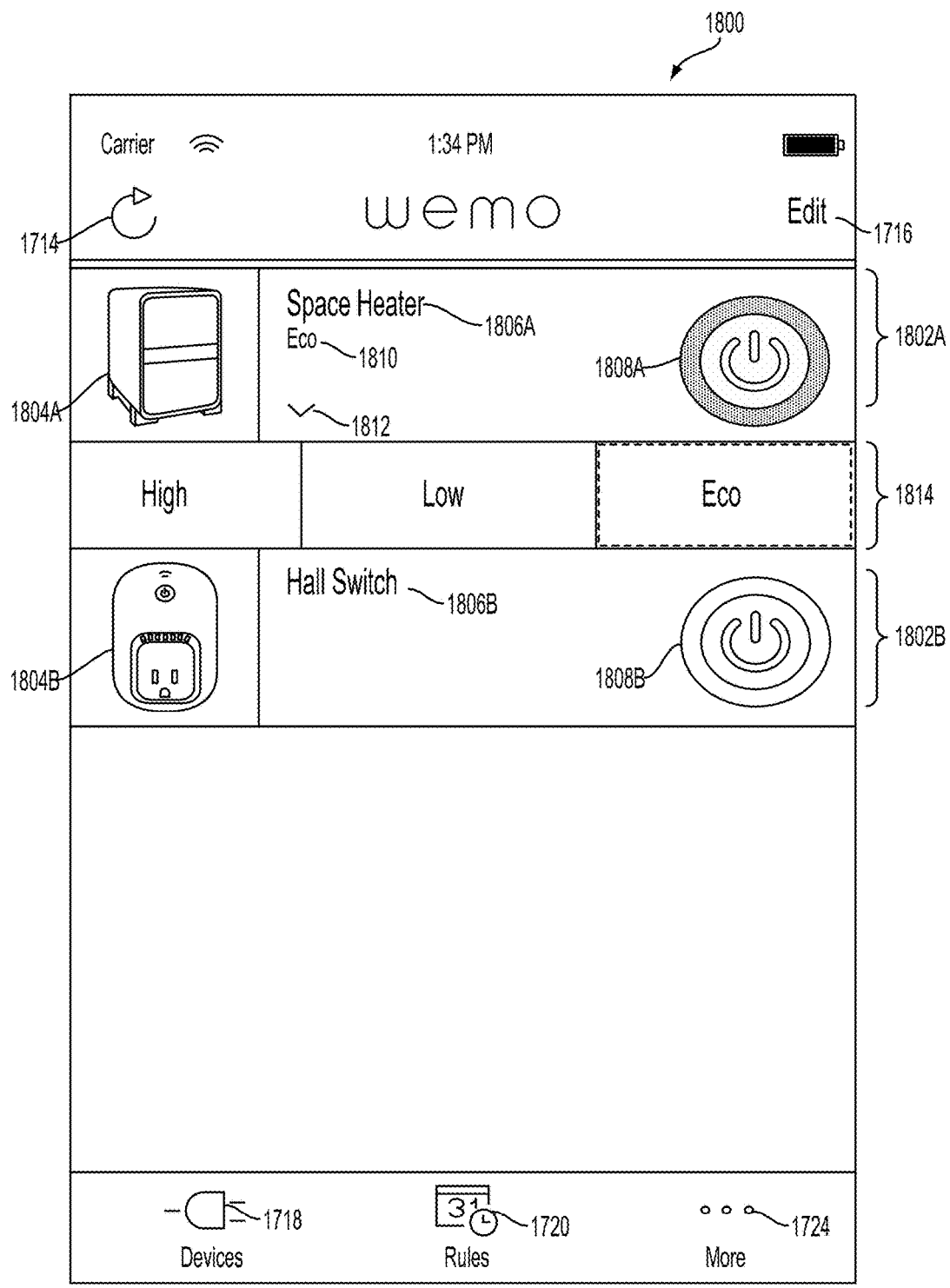
Figure 19:
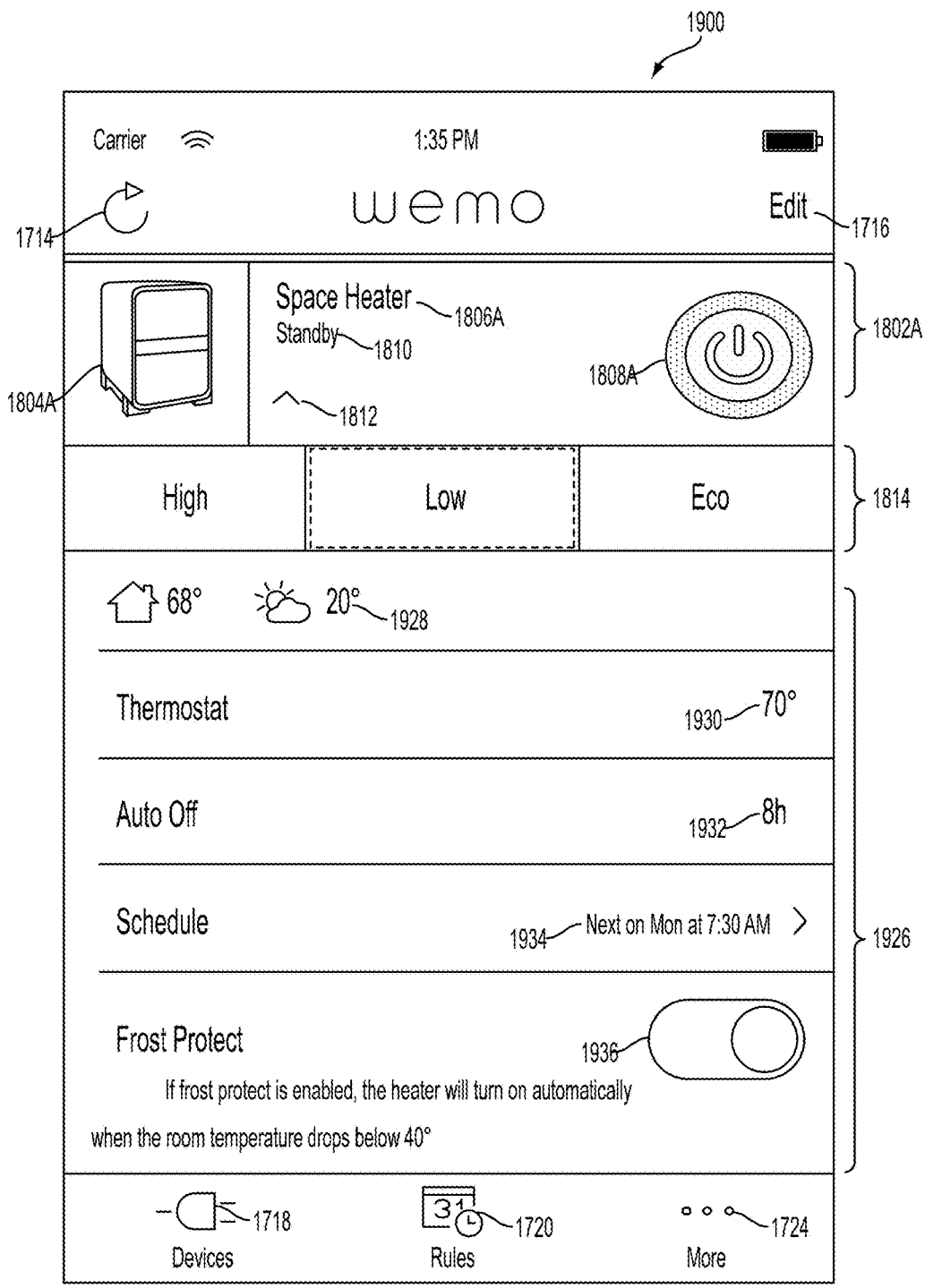

FIGS. 17-19 illustrate graphical interfaces, according to embodiments of the present disclosure. In particular, FIGS. 17-19 illustrate exemplary embodiments of user interface (UI) displays for an application on an access device. In some embodiments, the access device can be a mobile device, such as, for example, a smart phone or a tablet device. The graphical interfaces depicted in FIGS. 17-19 are described with reference to the embodiments of FIGS. 1 and 11-16. For example, portions of the visual interfaces illustrated in FIGS. 17-19 corresponding to specific network devices can be defined by resource bundles for the network devices. Also, for example, other portions of the interfaces of FIGS. 17-19 corresponding to other network devices can be default interfaces generated based on respective fundamental models describing supported interactions for those other network devices. However, the graphical interfaces of FIGS. 17-19 are not limited to the example embodiments described above with reference to FIGS. 1 and 11-16.

In an embodiment of the invention, the visual interfaces illustrated in FIGS. 17-19 are displayed on a mobile computing device, which can have a touch sensitive (i.e., touch screen) display device. For ease of explanation, the monitoring and control operations discussed below with reference to FIGS. 17-19 are described in the context of an application executing on an access device 108 with a touch-screen display device. However, the operations are not intended to be limited to the exemplary device shown in FIGS. 17-19. It is to be understood that the user interfaces illustrated in the exemplary embodiments of FIGS. 17-19 can be readily adapted to be rendered on displays of a variety of computing device platforms running a variety of operating systems.

Throughout FIGS. 17-19, displays are shown with various tiles, interactive elements, icons, links, command regions, windows, toolbars, sub-menus, drawers, and buttons that are used to initiate action, invoke routines, monitor network devices, configure network devices, control network devices, or invoke other functionality. The initiated actions include, but are not limited to, displaying a current state of a network device, displaying historical data associated with a network device, displaying a last known status of a network device, selecting one or more primary settings for a network device, selecting one or more secondary or tertiary settings of a network device, and other inputs and gestures. For brevity, only the differences occurring within the figures, as compared to previous or subsequent ones of the figures, are described below.

FIG. 17 shows an exemplary display 1700 of an application executing on a mobile device. The display 1700 includes modular tiles 1702A, 1702B, and 1702C for interacting with network devices in a network. The interactions can include monitoring and controlling the network devices. The tiles 1702A, 1702B, and 1702C each include respective icons 1704A, 1704B, and 1704C, and respective names 1706A, 1706B, and 1706C identifying different network devices. For example, tile 1702A corresponds to a switch and shows an interactive element depicted as a power button 1708A for turning the switch on and off. Similarly, tile 1702C shows a power button 1708C for turning a lamp on and off. In some embodiments, one or more of tiles 1702A, 1702B, and 1702C in display 1700 can be defined by respective resource modules corresponding to the network devices the tiles are associated with. In additional or alternative embodiments, one or more of tiles 1702A, 1702B, and 1702C can be determined using a fundamental model describing all interactions for the network devices the respective tiles are associated with. For example, if a resource bundle is unavailable for the lamp associated with tile 1702C, a fundamental model for the lamp can be used to determine default tile 1702C with name 1706C (e.g., 'lamp'), lamp icon 1704C, power button 1708C, and brightness control 1710C.

Display 1700 is a visual interface usable to monitor and control one or more network devices. Display 1700 includes modular tiles 1702 for discovered network devices, where the tiles 1702 each include an icon 1704 representing a network device and a name 1706 for the network device. In the example of FIG. 17, display 1700 includes tiles 1702A, 1702B, and 1702C corresponding to three different network devices. In particular, tile 1702A is configured to control a switch network device. Tile 1702A includes an icon 1704A representing the switch and a name 1706A for the switch. In embodiments, tiles 1702 are customizable by developers and/or manufacturers of the network devices. For, example, name 1706A is customized to indicate the name of a specific type of switch (e.g., 'Hall switch'). Tile 1702A also includes an interactive element 1708A that can be selected to control the switch. For example, interactive element 1708A can be selected with a click or press to turn the switch on and off. Tile 1702B includes an icon 1704B for a sensor network device. Tile 1702B includes an icon 1704B representing the sensor and a name 1706B for the sensor (e.g., 'My Motion Sensor'). In embodiments, tiles 1702 are customizable by developers and/or manufacturers of the network devices to display a current state or status of network devices. For, example, tile 1702B is customized to indicate a sensor-specific status (e.g., 'Motion sensed at 11:05 AM'). In additional or alternative embodiments, tiles 1702 can convey status information about a network device, including, but not limited to, a firmware version, a last known firmware update status, connectivity to cloud status, registration status (i.e., an indication that the network device has a key or does not), a primary mode of the network device (i.e., on, off), a secondary mode of the device (i.e., standby, high, low, eco), a schedule, and settings for the device (see, e.g., schedule 1934 in FIG. 19).

Depending on the type and capabilities of a network device, its tile 1702 can display a status or state 1710 of the device. For example, FIG. 17 shows how status 1710B indicates when a motion sensor last detected motion. In an embodiment, the display 1700 is flexible and can dynamically display the most appropriate tile 1702 for whatever environment the application is run in. For instance, the display 1700 enables a mechanism wherein a user can pre-configure a tile 1702B to display the most appropriate message for a connected sensor. For example, a user can connect any one of a plurality of types of sensors (e.g., water, humidity, temperature/heat, air pressure, light, sound, smoke, carbon monoxide, etc.) to a network. As shown in FIG. 17, instead of presenting a default interface stating a generic message like 'the sensor has detected something at a certain time' the tile 1702B can be configured it to provide a sensor-specific status (e.g., 'Motion sensed in the living room 11:05 AM' or 'someone is in the living room.'). Similarly, tiles 1702 for other types of sensor devices can be configured to present sensor-specific states 1710 or status messages such as, for example, 'the leak detector at a certain location has detected elevated levels of moisture' or 'the smoke detector has detected smoke in the kitchen.'

As shown in FIG. 17, the status 1710C in the tile 1702C for the lamp device can indicate a brightness level for the lamp. In the exemplary display 1700, status 1710C indicates that the lamp is at 0%, which corresponds to the lamp being turned off. In an embodiment, this status is also reflected by the power button 1708C for the lamp not being lit up or shaded/bolded. When a network device has extended capabilities, such as secondary or tertiary functionalities, an interactive element 1712 can be selected to expand and contract a menu including controllable settings for the capabilities. The menu can be, for example, a full drop down menu or drawer with interactive elements for setting the extended capabilities of the network device. Examples of such full menus and drawers are provided in FIG. 19, which is discussed below.

FIG. 17 also shows how display 1700 can include selectable icons and links 1714, 1716, 1718, 1720, 1722, and 1724 outside of the tile display area. In the example of FIG. 17, refresh icon 1714 can be selected to refresh information presented in display 1700, such as, for example, status and state information displayed in tiles 1702A, 1702B, and 1702C. For instance, the status 1710B in tile 1702B for the motion sensor can be refreshed on an automatic, periodic basis, in addition to being manually updated when refresh icon 1714 is selected. Similarly, the brightness status 1710C in tile 1702C for the lamp can be updated when refresh icon 1714 is selected. The edit link 1716 can be selected to edit the list of tiles 1702A, 1702B, and 1702C. For example, edit link 1716 can be selected to sort or re-order the sequence of tiles 1702A, 1702B, and 1702C displayed in display 1700. Edit link 1716 can also be selected to delete one of the tiles 1702A, 1702B, and 1702C in cases where a user no longer wants to view a given tile. Devices icon 1718 can be selected to list discovered network devices in a network.

Rules icon 1720 can be selected to display rules pertaining to network devices. For example, rules icon 1720 can be selected to display a rule that turns on the lamp of tile 1702C for a specified duration when the motion sensor of tile 1702B detects motion. That is, by selecting rules icon 1720, a user can create or edit a rule that turns on a porch light for a certain number of minutes when a motion sensor detects motion near the porch. In this way, rules can relate functionalities of multiple network devices to each other. News icon 1722 can be selected to review news items, such as news associated with network devices and/or the application. For instance, news icon 1722 can be selected to view announcements and news items relevant to network devices controlled via tiles 1702A, 1702B, and 1702C and/or information relevant to the application, such as notifications of available tile updates. The more icon 1724 can be selected to access additional features of the application.

FIG. 18 shows another exemplary display 1800 of an application executing on a mobile device. Display 1800 shows how the status of a space heater can be conveyed within tile 1802A. For example, tile 1802A can show that the heater is turned by coloring, animating, or shading a portion of power button 1808A. In one embodiment, a portion of power button 1808A can be shaded green or bolded to indicate that the space heater has been turned on. FIG. 18 also shows how a sub-menu 1814 can be exposed to select a secondary setting of the heater once power button 1808A is selected. The sub-menu 1814 can include settings related to the primary function of turning the network device on. In the example of FIG. 18, sub-menu 1814 is a drawer that shows secondary settings corresponding to high, low, and eco operational modes for the space heater when the power button 1808A is selected to turn the space heater on. Because sub-menu 1814 is typically not displayed and may only be momentarily displayed when the power button 1808A is selected, the sub-menu 1814 can be conceptualized as a 'peekaboo drawer.' For example, sub-menu 1814 may be temporarily displayed within the context of the heater being turned on. The sub-menu 1814 may include a default choice for a secondary function space heater (i.e., eco mode), and can also be used to select other secondary functions (e.g., high or low). In this way, with a single input of selecting or pressing power button 1802A, both primary and secondary functionalities can be set via a single input. Additional functionalities and capabilities of the space heater can be displayed by selecting interactive element 1812 to expand a full menu. One example of the full menu is shown in FIG. 19, which is described below.

FIG. 19 shows another exemplary display 1900 of an application executing on an access device. In the example of FIG. 19, the status indicator 1810 shows that the space heater is in standby mode. As shown in FIG. 19, this standby status can be visually reinforced by the power button 1808A being lightly shaded. In some embodiments, the status indicator 1810 and power button 1808A can transition when the status of the space heater is changed. For example, when the power button 1808A is selected to turn on the space heater, and secondary mode of low' is selected in sub-menu 1814, the power button 1808A can become more fully illuminated as compared to FIG. 19. Additionally, status indicator 1810 can transition from 'Eco' as shown in FIG. 18 to 'High', low' or 'Standby' (e.g., as shown in FIG. 19) to reflect selections in sub-menu 1814 and/or a full menu 1926. An exemplary full menu 1926 for a space heater network device is described in the following paragraph.

FIG. 19 also shows how detailed status and extended functionalities of the space heater network device can be conveyed within a full menu 1926 accessed via tile 1802A. In particular, full menu 1926 can be displayed as drawer when interactive element 1812 is selected. In the example of FIG. 19, the full menu 1926 can include interactive elements 1930, 1932, 1936 for selecting settings or actions corresponding to tertiary or extended functions of the space heater. In particular, the exemplary full menu 1926 is shown as a drawer displaying room and external temperature readings 1928, thermostat setting 1930, an auto off setting 1932, schedule information 1934 for the space heater, and a frost protection setting 1936. In the example of FIG. 19, the auto off setting 1932 is a selectable duration (i.e., a number of hours). In embodiments, the auto off setting 1932 can be changed via a scroll wheel interface element and/or directly entered as text. Full menu 1926 can be implemented as a drawer showing historical data associated with a network device, such as, for example, past temperature readings 1928 and patterns of temperature readings 1928. The historical data may be used to determine tertiary settings or functionalities, such as, for example, the frost protection setting 1936. As shown, the frost protection setting 1936 can be toggled on an off within full menu 1926. In the exemplary display 1900, the space heater will automatically turn on if the room temperature falls below 40 degrees Fahrenheit. Certain extended capabilities can be tied to rules. For example, the rule for frost protection can be changed by selecting rules icon 1720 in order to edit the logic for the rule.

As shown in the embodiments of FIGS. 17-19, the status or state of a network device can be indicated within the tile with text and/or graphically. For instance, coloring or shading of an interactive element, such as power button 1808A, can indicate whether a network device is connected to the network, powered off, on, restarting, or in a standby, sleep or hibernation mode. In accordance with these examples, part of the power button 1808A in the tile 1802A can be shaded green when the space heater is powered on, red or un-shaded when the space heater is off, and yellow or lightly shaded when the space heater is in standby mode. In additional or alternative embodiments, a power button can pulsate or slowly blink when the device is in a transitional state. Examples transitional states include booting up, restarting, connecting to a network, or re-connecting to the network.

In some embodiments, the displays of FIGS. 17-19 can be rendered by performing a computer-implemented method. For example, the method can include receiving, at a computing device, one or more interface modules, wherein each interface module defines a tile associated with a corresponding network device on a network, and then presenting, on a display of the computing device, a graphical interface including the one or more tiles, wherein each tile includes information identifying the corresponding network device and one or more interactive elements usable to control the network device. For example, the computing device can be access device 108, the display can be display 622, and the tiles can include tiles 1702A, 1702B, 1702C and 1802A. The one or more interactive elements can correspond to a primary setting or function of the network devices, such as, for example, power buttons 1708A, 1708C and 1808A. In embodiments, the information identifying the network devices can include an icon, name, and state for each of the network devices. For example, the information identifying the network devices can include icons 1704A, 1704B, 1704C and 1804A, and corresponding device names 1706A, 1706B, 1706C, and 1806A. The information identifying a state of a network device can be status indicators 1710B, 1710C, and 1810. In some embodiments, the method can also include receiving, at the computing device, input corresponding to a selection of a primary setting for the network device, and the tile can include a contextual menu or drawer, such as sub-menu 1814, corresponding to a secondary setting or functionality for the network device, wherein the secondary setting or functionality is associated with the primary setting or functionality. According to certain embodiments, a tile 1802A associated with a network device having extended or tertiary functionalities includes a full menu or drawer 1926, wherein the full menu 1926 is displayed in response to receiving input corresponding to a selection of interactive element 1812. For example, the full menu 1926 can include interactive elements 1930, 1932, 1936 for selecting settings or actions corresponding to tertiary or extended functions of the network device. The full menu 1926 can be embodied as a drawer including a status indicator 1710B, 1710C, 1810 for the network device, schedule data 1934, and historical data associated with the network device, such as, for example, temperature readings 1928.

In embodiments, the display device used to display the user interfaces shown in FIGS. 17-19 may be the display output device 1614 described below with reference to FIG. 16. According to embodiments, user inputs can be received at the touch screen displays shown in FIGS. 17-19 via the input device 1616 described below with reference to FIG. 16. However, alternative and additional input devices can be used, such as a finger, a stylus, a mouse, a keyboard, a keypad, a joy stick, a voice activated control system, or other input devices used to provide interaction between a user and an application. As described below with reference to FIGS. 17-19, such interaction can be used to indicate a network device to be monitored and/or controlled, to navigate through contextual menus associated with a network device, and make selections in the menus.

Figure 20:
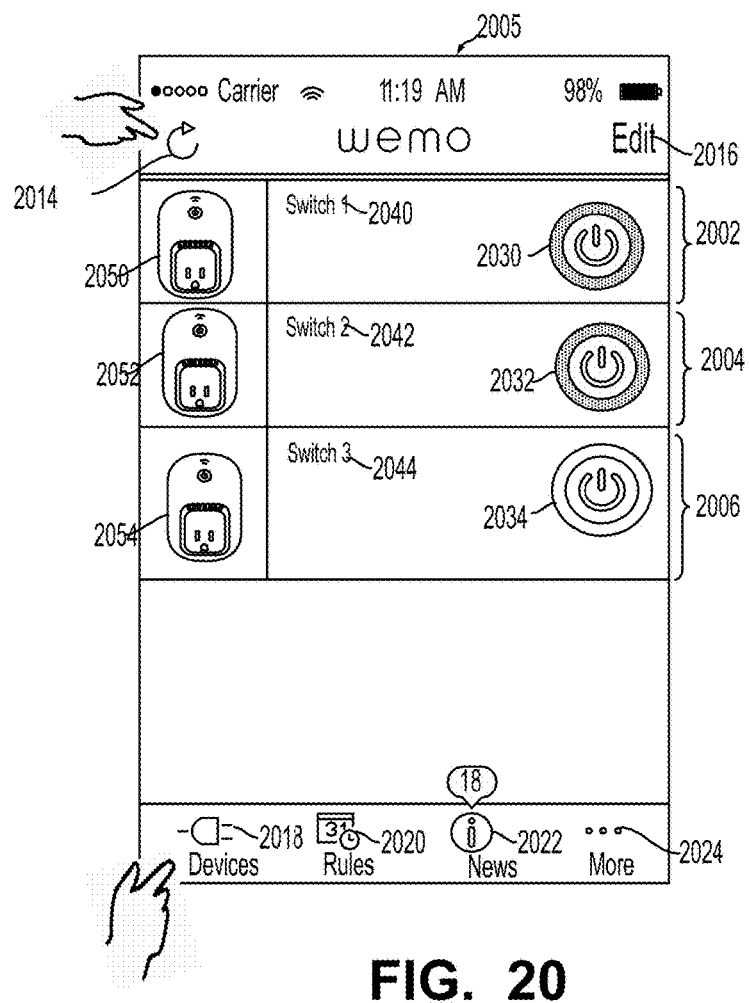
FIG. 20 is an illustration of an interface for displaying network devices in accordance with some embodiments.

FIG. 20 shows that the interface 2005 may include interactive elements (e.g., selectable icons and links) 2014, 2016, 2018, 2020, 2022, and/or 2024 outside of the modular tiles 2002, 2004, 2006. For example, refresh icon 2014 may be selected to refresh information presented in interface 2005, such as, for example, status and state information displayed in the modular tiles 2002, 2004, 2006. For instance, one or more of the statuses for each of the modular tiles 2002, 2004, 2006, respectively, may be refreshed on an automatic, periodic basis, in addition to being manually updated when refresh icon 2014 is interacted with (e.g., selected). In some embodiments, interaction with refresh icon 2014 may cause interface 2005 to be updated with modular tiles corresponding to network devices identified on a network (e.g., the network 100). The network devices identified on a network may be determined by an access device that displays the interface 2005. The access device may receive information from another network device, e.g., the gateway 104. Such information may include device information about network devices discovered on a network. Described below with reference to FIGS. 22-25 are techniques for caching information (e.g., device information) to improve responsiveness of an access device to present information about network devices discovered on a network.

In some embodiments, the interface 2005 may include an edit link 2016. Interaction with the edit link 2016 may enable one or more of the modular tiles 2002, 2004, 2006 to be editable. For example, edit link 2016 may be selected to sort or re-order the sequence of the modular tiles 2002, 2004, 2006 displayed in the interface 2005. Upon interaction with the edit link 2016, one or more of the modular tiles 2002, 2004, 2006 may be interacted with to be disabled or removed. Devices icon 2018 may be selected to cause the interface 2005 to be displayed with one or more network devices that are discovered in a network.

In some embodiments, the interface 2005 may include a rules icon 2020. Interaction with a rules icon 2020 may enable a graphical interface that enables customization of display rules pertaining to the network devices. The graphical interface may provide one or more interactive elements to control one or more rules related to control of the network devices (e.g., the network devices 302, 304, 306). In some embodiments, interaction with the rules icon 2020 may enable a graphical interface to enable a user to configure rules, modes, notifications, additional actions, or combinations thereof. The graphical interface may be presented in the interface 2005 or may be shown separately from the interface 2005. An embodiment of such a graphical interface presented upon interaction with the rules icon 2020 is described with reference to FIG. 21.

In some embodiments, the interface 2005 may include a news icon 2022. Interaction with the news icon 2022 may enable a graphical interface to be display which presents news including information associated with the network devices and/or the applications. For instance, interaction with the news icon 2022 may cause a graphical interface to be displayed in the access device to present information related to the network devices controlled via the modular tiles 2002, 2004, 2006 and/or information relevant to the application, such as notifications of available tile updates.

In some embodiments, the interface 2005 may include a more icon 2024. Interaction with the more icon 2024 may provide one or more additional graphical interfaces to enable access to additional features for controlling and/or monitoring the network devices in a network. For example, an additional graphical interface may be displayed to control one or more settings and/or attributes of any network devices connected to a network. In another example, an additional graphical interface may be displayed to configure secondary options to be initiated by an interface used to control a network device.

Figure 21:
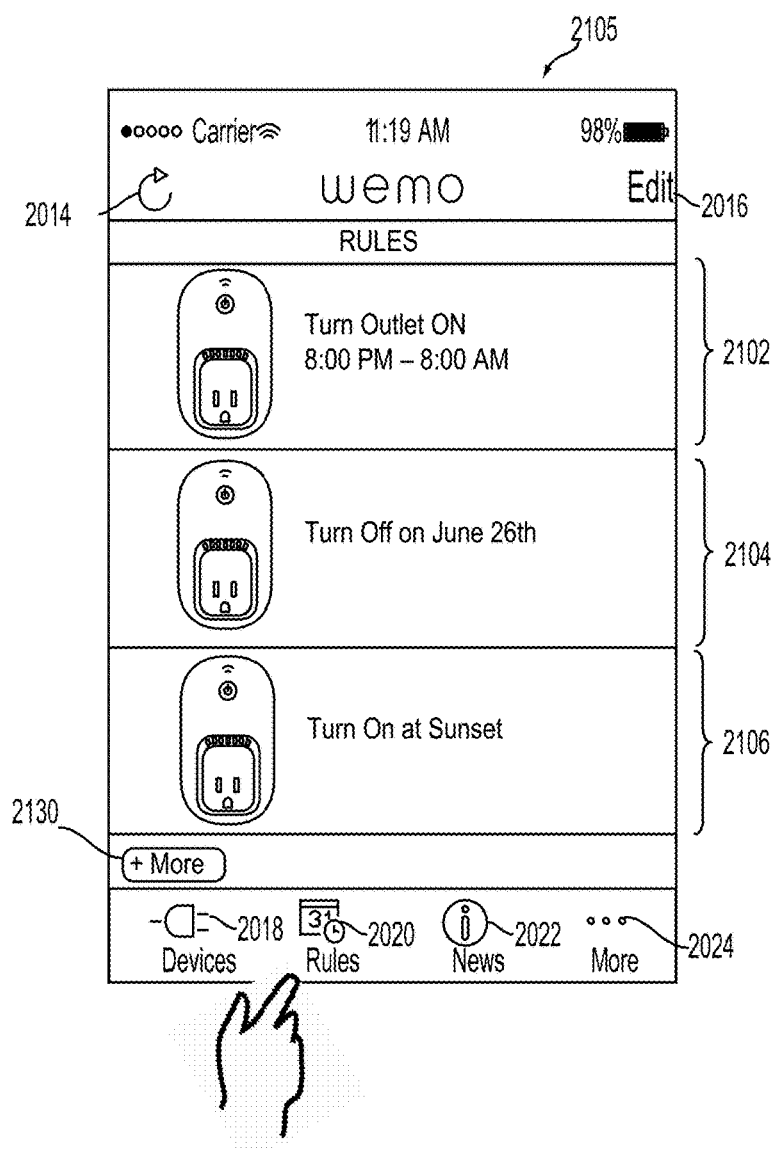
FIG. 21 is an illustration of an interface for displaying rules for controlling operation of network devices in accordance with some embodiments.

FIG. 21 is an illustration of an interface 2105 for displaying rules for controlling operation of network devices in accordance with some embodiments. The interface 2105 may be displayed by a device, e.g., the access device 108. The interface 2105 may include or display a graphical interface. The interface 2105 may include references to elements described with reference to FIG. 20. In the example shown in FIG. 21, the interface 2105 is presented in response to interaction with the interactive elements 2020. The interface 2105 may present rules information associated with one or more network devices, e.g., any of the network devices 302, 304, 306, 308 or any of the network device 502, 504. The interface 2105 may be presented as part of an application. The interface 2105 may be presented when an application is started. In some embodiments, the interface 2105 may present information associated with a network device when the network device is discovered on a network (e.g., the local area network 300). In some embodiments, the information may be presented in the interface 2105 upon receiving input indicating interaction with the interactive element 2020 ("Rules"). As will be described below, the interface 2105 may be presented based on information received from a computing device, such as a computing device described with reference to FIG. 22. The information presented in the interface 2105 may be received from the computing device rather than other network devices connected to the network. The computing device may provide the information in response to a request by the access device or may provide the information without a request from the access device. In doing so, the computing device may reduce communication time for the access device to receive current information, thereby enabling the access device to improve responsiveness for presenting the current information associated with network devices in the interface 2105.

In certain embodiments, the interface 2105 may present one or more graphical interfaces with information indicating one or more criterion (e.g., a rule) related to operation of one or more devices. For example, the interface 2105 may display modular tiles 2102, 2104, 2106, each corresponding to a one or more criterion related to operation of one or more network devices. The modular tile 2102, modular tile 2104, and the modular tile 2106 may correspond to a rule for operation the network device 302, the network device 304, and the network device 306, respectively. For example, the modular tile 2102 may display criteria indicating that the network device 302 is to be turned on between 8 am and 8 pm daily. In another example, the modular tile 2104 may display criteria indicating that the network device 304 is to be turned off on a particular date (e.g., July 26$^{th}$). In another example, the modular tile 2106 may display criteria indicating that the network device 306 is to be turned on at sunset.

The information presented in the modular tiles 2102-2106 may be determined based on information stored by the access device. Updates to such information may be received from a computing device, e.g., a computing device described with reference to FIG. 22. The modular tiles 2102-2106 may be updated or deleted and new modular tiles may be added based on updates to rules stored by the access device. In some embodiments, the interface 2105 may include interactive elements to configure the rule corresponding to each of the modular tiles 2102-2106. The interface 2105 may include interactive elements to create new rules.

Figure 22:
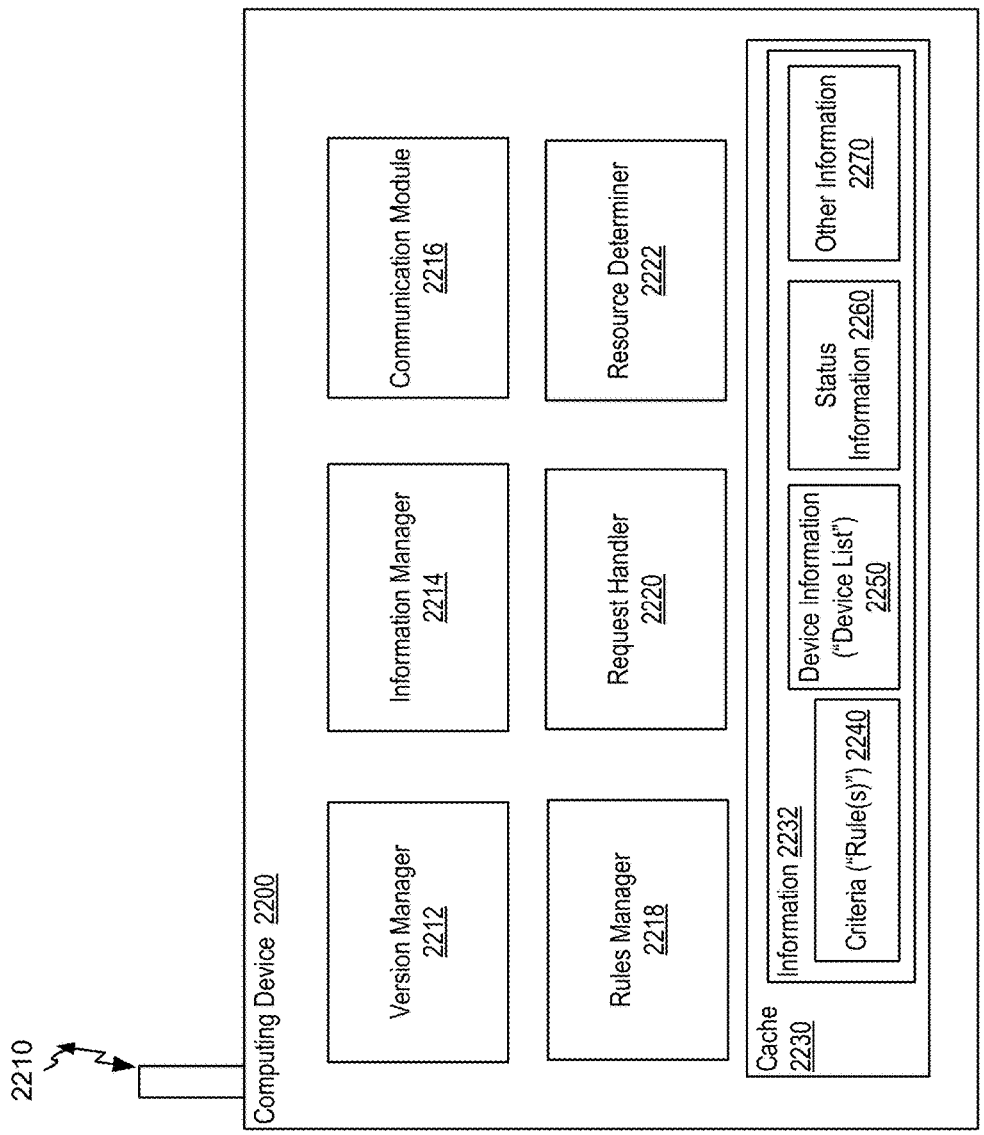
FIG. 22 shows a block diagram of a computing device for caching information associated with network devices in accordance with some embodiments.

Now turning to FIG. 22, a block diagram of a computing device 2200 for caching information associated with network devices is shown in accordance with some embodiments. In particular, the computing device 2200 may store information associated with network devices (e.g., the network device 302, the network device 304, the network device 306, and/or the network device 308) in cache 2230.

The computing device 2200 may store information 2232 in the cache 2230. The information 2232 may be associated with one or more of the network devices. The information 2232 may include one or more criterion 2240 related to operation of one or more network devices (e.g., a network device). A criterion 2240 may include a criterion for operating one or more devices (e.g., an "operation criterion"). For example, an operation criterion may indicate a value for an attribute, a setting, a mode, or the like related to operation of a network device. The criterion 2240 may include a criterion indicating an instruction for controlling operation of one or more network devices (e.g., an "instruction criterion"). For example, an instruction criterion may indicate conditions for applying an operation criteria. A rule may be based on an instruction criterion and an operation criterion. The conditions may be based on time, date, weather, geographical location, an event, or combinations thereof. The information 2232 may include device information 2250 (e.g., "Device List"). The device information 2250 may include information corresponding to each network device connected to a network. For example, the device information 2250 may include a device list. The network may be a network to which the computing device 2200 is connected. In some embodiments, the device information 2250 may include an identifier (e.g., a device identifier) corresponding to each network device on the network, an device address (e.g., a device IP address), other information about the network device, or combinations thereof. The device information 2250 may include status information corresponding to each network device. The information 2232 may include status information 2260 related to a status of one or more network devices connected to a network. The status information 2260 may be based on status data received from one or more network devices. The status information 2260 may include other status information about network devices, e.g., current information related to operation of each network device. For example, the status information may include a current value of a setting of a network device, a current value of an attribute of a network device, a current state of a network device, a current mode of a network device, a current value of a configuration of a network device, or combinations thereof. The information 2232 may include other information 2270 related to one or more network devices connected to a network. Such information 2270 may include registration information for a network device connected to a network. The other information 2270 may include information communicated between network devices.

In certain embodiments, the computing device 2200 may include or be implemented as a network device (e.g., the network device 102), a router, a gateway (e.g., the gateway 110), a hub device, a repeater device, a range extender, an access point, a bridge, a base station, a Node B device, eNode B device, an access point base station, a Femtocell device, a modem, any other device that provides network access among one or more computing devices and/or external networks, the like, or a combination thereof. The computing device 2200 may include a home automation device such as one that may be included in the network device 102 or the network device 302. The computing device 2200 may include an IoT device. The computing device 2200 may include any human-to-machine interface with network connection capability that allows access to a network. For example, the computing device 2200 may include a stand-alone interface (e.g., a cellular telephone, a smartphone, a home computer, a laptop computer, a tablet, a PDA, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). The computing device 2200 may be configured to execute an application, a web browser, a proprietary program, or any other program executed and operated by a computing device.

In certain embodiments, the computing device 2200 may be implemented as one or more functional blocks or modules configured to perform various operations for caching information associated with network devices (e.g., the network device 302, the network device 304, the network device 306, and/or the network device 308). The functional blocks and modules may be implemented in hardware, firmware, software, or combinations thereof. The computing device 2200 may include a version manager 2212, an information manager 2214, a communication module 2216, a rules manager 2218, a request handler 2220, and a resource determiner 2220.

The communication module 2216 may support communication with other devices, such as a network device (e.g., one or more of the network devices 302-308). The communication module 2216 may include one or more wireless transceivers operable to receive and transmit wireless signals (e.g., signal 2210). The wireless signals may be received and transmitted via an antenna of the computing device 2200. The communication module 2216 may communicate with other devices via a local area network. The local area network may include a wireless network, a wired network, or a combination of a wired and wireless network. The communication module 2216 may provide network access to other network devices. The network access may be of any type of network familiar to those skilled in the art that can support data communications using any of a variety of commercially-available protocols. In some embodiments, the wireless network may be any wireless network such as a wireless local area network (e.g., local area network 100), such as WiFi, a PAN, such as Bluetooth® or Zigbee®, or a cellular network (e.g. a GSM, WCDMA, LTE, CDMA2000 network). For example, the communication module 2216 may provide wireless communication capabilities for a local area network using a communications protocol, such as WiFi™ (e.g., IEEE 802.11 family standards, or other wireless communication technologies, or any combination thereof). Using a communications protocol(s), the communication module 2216 may support radio frequencies on which wireless enabled devices in the local area network can communicate.

The communication module 2216 may be configured to enable devices (e.g., the network device 302, the network device 304, the network device 306, and/or the network device 308) to communicate with each other in a local area network (e.g., the network 300). In some embodiments, the communication module 2216 may provide devices with access to one or more external networks, such as a cloud network (e.g., the cloud network 114), the Internet, and/or other wide area networks.

In some embodiments, the communication module 2216 may communicate directly with a network device (e.g., any of the network devices 102-106 or any of the network device 302-208). For example, the communication module 2216 may enable the computing device 2200 to communicate directly with a network device using Zigbee™ signals, Bluetooth™ signals, WiFi™ signals, infrared (IR) signals, or the like. In some embodiments, the communication module 2216 may communicate with a network device and/or a cloud network.

In some embodiments, the communication module 2216 may send and receive unicast transmissions. For example, the communication module 2216 may send a unicast transmission directly to another device. The unicast transmission may include a request for information, such as the information 2232, associated with a device. The device may be identified using the device information 2250 corresponding to the device to which the communication is directed. In another example, the communication module 2216 may receive a unicast transmission from another device. A unicast transmission may be routed through another network device, such as the gateway 110. The communication module 2216 may support unicast transmission using UDP, TCP, HTTP, HTTPS, or other suitable protocol.

In some embodiments, the communication module 2216 may send and receive transmissions broadcasted via a network to which the computing device 2200 is connected. The transmissions may include multicast transmissions and/or broadcast transmissions. The communication module 2216 may communicate using UDP, UPnP, or other suitable protocol.

The request handler 2220 may classify communication with other devices, e.g., transmissions that are received from other devices. A transmission may be classified based on a type of communication protocol used for the transmission. For example, the request handler 2220 can classify a transmission as a broadcast request or multicast request based on determining that the transmission was sent using a protocol supporting multicast transmission. In some embodiments, the request handler 2220 may process data received via a transmission to determine whether the data includes a request and if so, classifies the request. Data received in a transmission may include information indicating a request, in which case the request handler 2220 can determine that a request is being made. In some embodiments, the request handler 2220 can determine a type of request based on a communication protocol by which the request was received. For example, a request may be identified as a unicast request by being received via a unicast transmission.

The request handler 2220 may process a data received via a transmission to further determine details about a request included in the data. For example, the request handler 2220 can determine whether a request is communicated to obtain information (e.g., a discovery request) or whether the request communicated to disseminate information, such as a criterion related to operation of a device, device information, status information, other information, or combinations thereof. The request handler 2230 may inspect a received request to determine details based on the type of request. The request handler 2220 may process a request that is sent via unicast transmission to determine whether the unicast request includes information intended for a recipient of the unicast request. In some embodiments, a request may include type information indicating a type of information requested, such as a criterion related to operation of a device or device information. A request may include version information (e.g., a version identifier) that indicates a version of the information currently stored by the device that sent the request. In some embodiments, a request from a device may include information currently stored on a device that sent the request. Such information may be used to determine differences from the information 2232 stored locally on the cache 2230. The type of information or the version information may be used by the request handler 2220 to determine whether the request is to obtain additional information, such as updates to current information, if any.

The request handler 2220 may determine whether data received by the computing device 2200 should be communicated to other devices on a network to which the computing device is connected. In some embodiments, the request handler 2220 may determine whether data received via the communication module 2216 includes a request for information associated with a device. The request handler 2220 may use the classification of a transmission to detect a request for information. Data may indicate a type of a request and/or may include information indicating information sought, e.g., criteria related to operation of devices, device information, or status information. The data may indicates a version or other identifier of information sought by the request. In some embodiments, based on the type of communication, the request handler 2220 can determine whether received data includes information (e.g., a criterion related to operation of a device or device information) to be distributed to the computing device or other devices. For example, based on determining that data received in a unicast request via a unicast transmission, the request handler 2220 may determine that the data is intended for distribution to the computing device 2200. In another example, the request handler 2220 may determine that the data is intended for distribution to other devices based on determining that the data is received via a multicast transmission, which intended for distribution to other devices connected to a network. Upon determining that data is to be communicated to a device, the request handler 2220 may instruct the communication module 2216 to transmit the received data. In some embodiments, the request handler 2220 may determine whether to transmit the request based on a determination by the information manager 2214 as to whether the information 2232 stored in the cache includes information to satisfy the request. In some embodiments, the received data may be transmitted after being processed by the information manager 2214. The information manager 2214 is described further below.

In some embodiments, the request handler 2220 may determine whether to request that data be transmitted to a device. The request handler 2220 may determine whether to transmit data to a device, e.g., the device 2302 or the device 2306, based on whether the information 2232 stored in the cache 2230 includes updates to be shared with other devices. An indication whether the information 2232 includes updates may be determined by the information manager 2214. Upon determining that the information 2232 includes updates, the request handler 2220 may instruct the communication module 2216 to transmit data including the updates. Updates may be transmitted via a unicast transmission or a multicast transmission. In some embodiments, the request handler 2220 may request for updates to the information 2232 to be transmitted to other devices upon determining that the information 2232 has been updated. In some embodiments, the request handler 2220 may transmit updated information stored in the cache 2230 based on whether a resource threshold is satisfied. As explained further below, the resource determiner 2222 may determine whether the resource threshold is satisfied.

In some embodiments, the request handler 2220 may determine whether a request for updates to the information 2232 stored on the cache 2230 should be transmitted to other devices. The information manager 2214 may provide an indication as to whether to update the information 2232. In some embodiments, the request handler 2220 may instruct the communication module 2216 to send a request to other devices to obtain updates to the information 2232, if any. Such a request may include version information indicating a current version of the information 2232 stored in the cache. The request to other devices may be sent periodically or intermittently. The request may be sent before another device requests for updated information. In some embodiments, the request for updates may be sent based on determining whether a resource threshold is satisfied. In some embodiments, the request handler 2220 may instruct for a request for updates to the information 2232 to be transmitted based on receiving a request for updates from another device.

The information manager 2214 may manage storage of the information 2232 in the cache 2230. The information manager 2214 may determine whether to store information obtained from received data (e.g., data received from a transmission received using the communication module 2216) in the cache 2230. The information manager 2214 may process the received data to identify one or more types of information, e.g., criteria related to operation of a device or device information. In some embodiments, the received data may indicate the types of information in the received data.

In some embodiments, the version manager 2212 may process the information in the received data to determine a version of the information. The version may be determined from the received data or may be determined by comparing the information from the received data with the information 2232 on the cache 2230. The differences in the information may be used to determine a version of the information. In some embodiments, received data may include version information indicating a version corresponding to the different types of information. In some embodiments, the received data may include a modifier that indicates changes information associated with devices. For example, the received data may include a modifier of a rule indicating changes to a previous version of a rule.

In some embodiments, the information manager 2214 may identify updated information in data received from a device. The updated information may include updates to the information 2232 stored on the cache 2230. The information manager 2214 may update or modify the information 2232 stored on the cache 2230 with the updated information. In some embodiments, the information manager 2214 may determine a difference between the updated information and the information 2232 stored on the cache 2230. The difference may be determined based on a version of the information determined for the updated information. The difference may be determined based on a comparison of the updated information and the information 2232. In some embodiments, the comparison may be performed for the type of information included in the updated information. Upon identifying a difference between the updated information and the information 2232, the information manager 2214 may update the cache 2230 with the updated information based on the identified difference. In some embodiments, updating the cache 2230 may include merging the information 2232 with the updated information. For example, the updated information may include changes or modifications to the information 2232, such as a change in a criterion related to operation of a device. In such instances, the information 2232 may be modified based on the modification indicated by the updated information.

The rules manager 2218 may manage rules based on one or more criterion 2240 stored on the cache 2230. In some embodiments, the rules manager 2218 may determine when the computing device 2200 is to perform an operation based on a criterion 2240. The operation may include instructing the communication module 2216 to transmit data with a request to another device to perform an operation based on the criterion 2240. In some embodiments, the rules manager 2218 may determine for the information manager 2214, differences between updated information and the criteria 2240 stored on the cache 2230. The rules manager 2218 may perform processing to merge the updated information with the criteria 2240 to produce an updated criteria for storage in the cache 2230.

As mentioned earlier, the resource determiner 2222 may determine availability and/or capabilities of computing resources (e.g., processor(s), storage, cache, or the like) for the computing device 2200. In some embodiments, the resource determiner 2222 may determine whether a computing resource satisfies a resource threshold. For example, a resource threshold may be a particular amount of processing availability. The resource threshold may be specified by information stored in the cache 2230. The resource threshold may be configurable. As explained above, the resource determiner 2222 may provide information indicating whether a resource threshold is satisfied. The resource threshold may be used to determine whether to request other devices for updated information. For example, the computing device 2200 may request for updated information during greater processor availability. Other operations described as being performed by the computing device may be performed based on satisfaction of a resource threshold.

Figure 23:
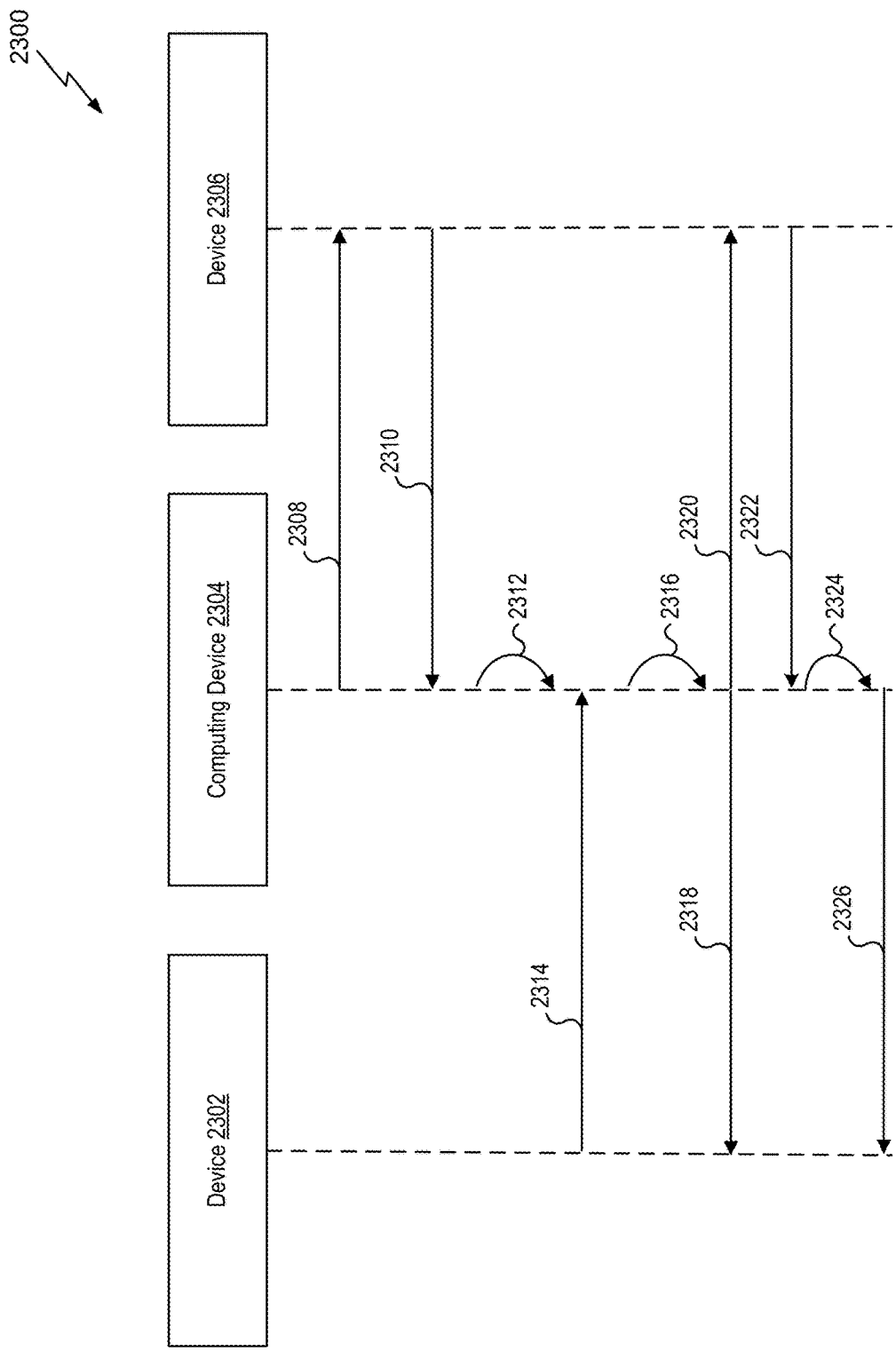
FIGS. 23 and 24 illustrate sequence diagrams of processes of caching information associated with network devices in accordance with some embodiments.
Figure 24:
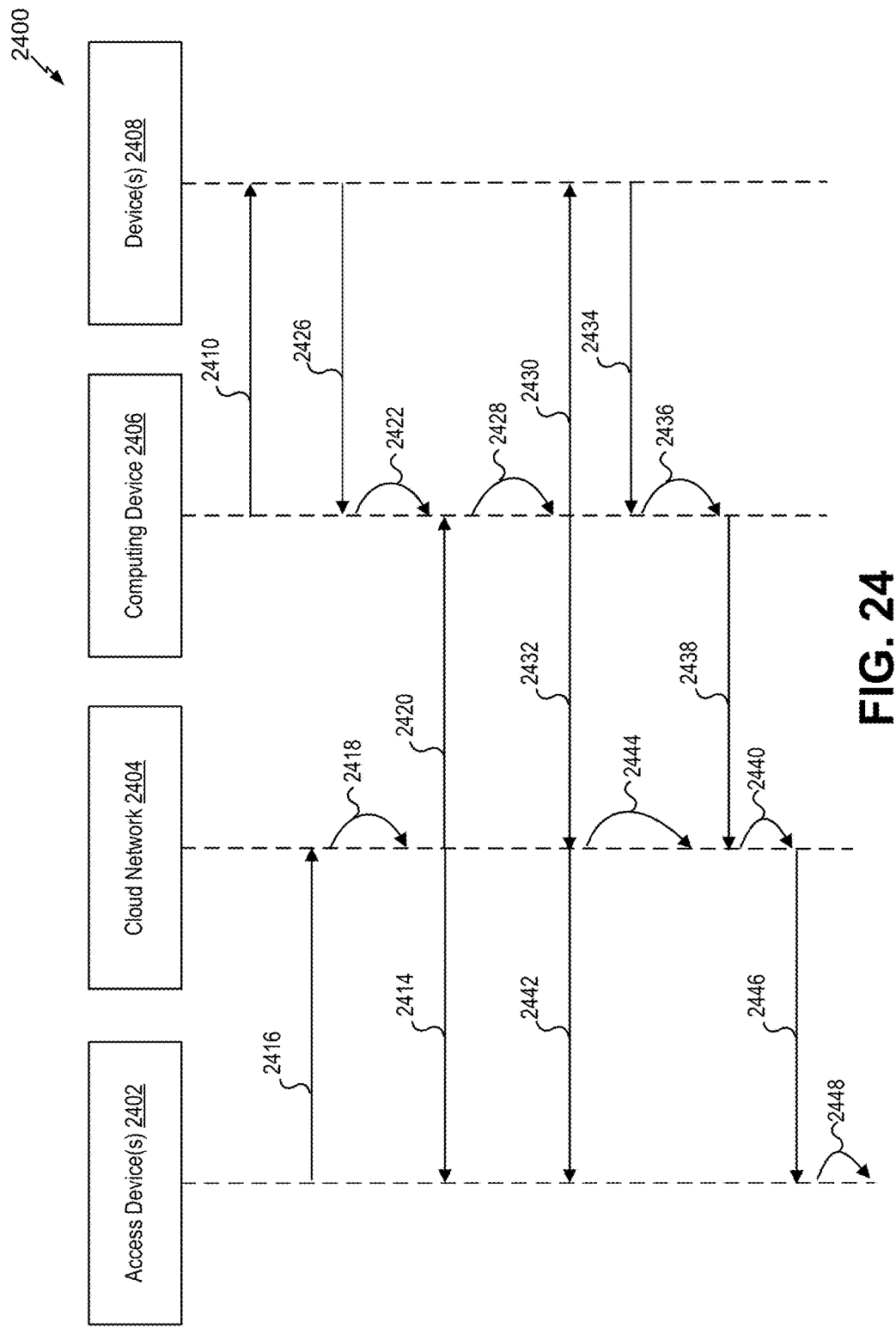

FIGS. 23 and 24 illustrate sequence diagrams of processes of caching information associated with network devices in accordance with some embodiments. Specifically, each of the sequence diagrams show an example of at least one scenario in which a computing device (e.g., the computing device 2200) may be implemented to cache information associated with network devices to improve responsiveness for operation of a device (e.g., a network device) connected to a network.

Now turning to FIG. 23, a sequence diagram of a process 2300 of caching information associated with network devices is shown in accordance with some embodiments. The sequence of steps shown for the process 2300 may be implemented by a combination of a device 2302, a computing device 2304, and a device 2306. The device 2302 can include a network device (e.g., the network device 302, the network device 304, or the network device 306) or an access device (e.g., the access device 108). The device 2306 can include a network device (e.g., the network device 302, the network device 304, or the network device 306) or an access device (e.g., the access device 108). The device 2302, the computing device 2304, and the device 2306 may be communicatively connected through a network (e.g., the network 100 or the network 300). In some embodiments, the computing device 2304 may include a network device that is different from other network devices connected to the network. For example, the computing device 2304 may include a network device, such as a router or a gateway (e.g., the gateway 110). In another example, the computing device 2304 may include any one of the network devices 302-308 that is distinct from other devices (e.g., the device 2302 and/or the device 2306) connected to a network. The device 2200 of FIG. 22 can be included or implemented in any of the devices 2302-2306. In the example shown in FIG. 23, the computing device 2200 may be included or implemented in the computing device 2304. The network devices 2302-2306 may be in communication with each other via a network (e.g., the network 300).

The process 2300 illustrated in FIG. 23 enables the computing device 2304 to cache information associated with network devices connected to a network. For example, the information to be cached may be associated with the device 2302, the computing device 2304, the device 2306, or combinations thereof.

By operating within a communication path of devices (e.g., the device 2302 and the device 2304), the computing device 2304 may receive information (e.g., a rule or device information) associated with other devices (e.g., a network device) connected to a network. The information may include current information associated with devices. The information may be acquired during communication between the devices 2302, 2306, which may be facilitated via the computing device 2304. The computing device 2304 can intercept communications between devices (e.g., the device 2302 and the device 2306) to cache information (e.g., a rule or device information) communicated between these devices. The cached information can be provided to devices, whether requested or not, to improve each of their response time for operation using current information associated with devices (e.g., a rule or device information). An improvement in response time for obtaining current information may enable a device, e.g., the device 2302, to improve its own responsiveness for operation. For example, the device 2302 may afford a faster response time for presenting the current information to its user and/or may operate faster by receiving a faster response with the current information, which may be used by the device 2302 for its operation. The device 2304 may provide cached information to satisfy a request from the device 2302 by intercept the request for current information directed to devices on a network.

The process 2300 may begin by the device 2306 communicating with the device 2304. The process 900 may include the device 904 receiving a data transmission 2310 from the device 2306. The data transmission 2310 may be facilitated through use of a network. The data transmission may include information associated with devices connected to the network. The information may include current information associated with devices. The information may include a criterion related to operation of a device, device information, status information, other information stored by a device connected to the network, or combinations thereof. The information may be distributed for synchronization of information between the network devices connected to the network. Alternatively or additionally, the data transmission 2310 may be performed for information discovered and/or created at the device 2306. For example, the information may be received upon registration of the device 2306 to the network.

In some embodiments, the data transmission 2310 may occur in response to receiving a request 2308 transmitted by the computing device 2304 to one or more devices, e.g., the device 2306, connected to the network. The request 2308 may be sent periodically or intermittently to obtain current information (e.g., criteria related to operation of a device or device information) stored by devices connected on a network, such as the device 2306. For example, the computing device 2304 may send the request 2308 to obtain updated information associated with devices, e.g., the device 2302 or the device 2306. The computing device 2304 may store information (e.g., device information) about devices connected to the network. The computing device 2304 may use device information stored in its cache to send the request 2308. In one example, the request 2308 may be a unicast request sent directly to the device 2306. In another example, the request 2308 may be a multicast request transmitted to the network for delivery of the request 2308 to devices on the network. In some embodiments, the computing device 2304 may transmit the request 2308 to obtain information before other devices, e.g., the device 2302, request current information from other devices, such as the device 2306.

In certain embodiments, the computing device 2304 may include or implement a network device (e.g., the gateway 110) that can receive data transmissions from a network device, such as the network device 2306. The data transmission 2310 may be initiated by the device 2306 for distribution to a network to which network devices (e.g., the device 2302) are connected. In some embodiments, the computing device 2304 may be a gateway that receives data transmissions (e.g., the data transmission 2310) for communication to the network. Alternatively or additionally, the computing device 2304 may be a network device that receives data transmissions, e.g., the data transmission 2310, from other devices on the network, e.g., the device 2306.

In some embodiments, the device 2306 may be an access device, e.g., the access device 108. In such embodiments, the data transmission 2310 may occur upon creation or modification of information by the device 2306. Information such as rules may be created at the device 2306 through an interface presented by the device 2306. The new rules may be communicated to the network for distribution to devices, e.g., the device 2302 and the computing device 2304.

The process 2300 may include the computing device 2304 performing one or more operations 2312 using information received from the data transmission 2312. One operation 2312 may include storing information received via the data transmission 2310. For example, the computing device 2304 may store information included in the data transmission 2310 in a cache of the computing device 2304. The information received via the data transmission 2310 may include updates to information already stored on the cache of the computing device 2304. In such instances, the updated information may be stored on the cache. In some embodiments, the information included in the data transmission 2310 may include information that is already existing on the computing device 2304. Another operation 2312 may include determining differences between the information stored on the cache and the information received via the data transmission 2310. The differences, if any, may be stored or updated to the information on the cache. In some embodiments, the information included in the data transmission 2310 may include an identifier or a modifier indicating a version of the information and/or indicating the updates to the information stored on the cache.

In some embodiments, the device 2306 may transmit data, e.g., the data transmission 2310, periodically or intermittently. In some embodiments, the data transmission 2310 may occur asynchronously from the requests, e.g., the request 2308, by the computing device 2304.

The process 2300 may include the device 2302 sending a request 2314 to the computing device 2304. The request 2314 may be sent to obtain information (e.g., current information) associated with devices on the network. The information requested may include a criterion related to operation of one or more devices on the network (e.g., a rule), device information, status information, other information related to operation of a device on a network, or combinations thereof.

In some embodiments, the device 2302 may send the request 2314 directly to the computing device 2304. The request 2314 may be sent when the device 2302 first registers with the network connected to the devices 2302-2306 or later when the device 2302 requests for the information to synchronize its locally stored information. For example, when the computing device 2304 is implemented as a gateway (e.g., the gateway 110), the request 2314 may be a multicast request to the network for current information associated with devices. In another example, the device 2302 may send the request 2314 as a unicast request directly to the computing device 2304 for current information when the computing device 2304 is operating as a network device. In this example, the request 2314 may be for current information, such as a criterion related to operation of a device on the network (e.g., a rule), device information, status information, other information related to operation of a device on a network, or combinations thereof. The request 2314 may include type information indicating a type of information requested, such as a criterion related to operation of a device or device information. The request 2314 may include version information (e.g., a version identifier) that indicates a version of the information currently stored by the device 2302. In some embodiments, the request 2314 may include information currently stored on the device 2302. Such information may be used by a recipient device to determine differences from the information stored locally on the recipient device.

The process 2300 may include the computing device 2304 performing one or more operations 2316. One operation 2316 may include detecting that a request 2314 is to obtain information associated with a device connected to the network. For example, the computing device 2304 may determine whether the request 2314 is a multicast request to obtain information associated with a device connected to the network. Upon detecting that the request 2314 is for information associated with a device connected to the network, the computing device 2304 may perform another operation 2316. In some embodiments, the operation 2316 performed based on the detected request may include searching the cache of the computing device 2304 for stored information associated with a device connected to a network. By searching the cache for information that may satisfy the detected request 2314, the computing device 2304 may be able to locate information satisfying the request 2314 without having to communicate, or forward, the request 2314 to other devices to retrieve information sought by the device 2302. The computing device 2304 may include in its cache all or some of the information that may satisfy the request 2314. The computing device 2304 can locate information satisfying the request 2314 without having to request other devices (e.g., the device 2306) for information. By doing so, the computing device 2304 can provide a faster response to the request 2314 from the device 2302. The device 2302 may not have to wait as long to receive requested information. The faster response may translate to improved responsiveness at the device 2302 for use of the information. The device 2302 may be able to reduce response time for presenting or using the current information associated with devices.

In some embodiments, the cache of the computing device 2304 may be searched using information (e.g., version information or type information). For example, the cache may be searched to identify information corresponding to the type information. In another example, the computing device 2304 may search the cache to identify information having a version that is more current than the version indicated by the version information received in the request 2314. The process 2300 may include the computing device 2304 determining whether information satisfying the request has been located in the cache. In some embodiments, the cache may not store all the current information, which may satisfy the request. In such cases, the computing device 2304 may send a request to other devices (e.g., the device 2306) for information that is not located on the cache. In some embodiments, the operation 2316 may include determining a different between information stored on the cache of the computing device 2304 and the information included in the request 2314.

In some embodiments, the process 2300 may include the computing device 2304 sending data to the device 2302 via a data transmission 2318. The transmitted data may include information located in the cache in satisfaction of the request 2314. By sending the information retrieved from the cache of the computing device 2304, the device 2302 may receive all or some information responsive to the request 2314 faster. In some embodiments, the computing device 2304 may not have to send the request 2314 to other devices on the network. The communication of a request to another device (e.g., the device 2306) may incur additional time for retrieval of current information. Thus, by avoiding such communication when information is located on the cache of the computing device 2304, a response time can be reduced for providing current information.

In some embodiments, the process 2300 may include the computing device 2304 sending a request 2320 to one or more other devices, e.g., the device 2306, connected to the network. The request 2320 may be sent to a device obtain information which can satisfy the request 2314. Such information that may be retrieved from the device 2306 may be information that is not stored on the cache of the computing device 2304. The request 2320 may be sent to multiple devices on the network, e.g., all devices on the network. For example, the request 2320 may be sent as a unicast request directed to each individual device (e.g., the device 2306) connected to the network. In another example, the request 2320 may be sent as a multicast request to be distributed to devices (e.g., the device 2306) connected to the network. In some embodiments, the request 2320 may be based on the request 2314. For example, when the request 2314 is a multicast request, the computing device 2304 may send the request 2320 based on the request 2314 to devices on the network.

The request 2320 may include one or more criterion for requesting information from the device 2306. In some embodiments, the request 2320 may include information included in the request 2314. For example, the request 2320 may include type information and/or device information to indicate information sought by the computing device 2304. In some embodiments, request 2320 may indicate information that is sought, which may not have been stored locally on the cache of the computing device 2304.

In some embodiments, to improve response time for providing information that satisfies the request 2314, the process 2300 may include the computing device 2304 transmitting data via the data transmission 2318 concurrently with sending the request 2320. By doing so, a response time may be reduced for retrieving information in satisfaction of the request 2314. In some embodiments, the device 2302 may be able to update and/or use the data received via the data transmission 2318 before information, if any, is retrieved from the device 2306 in response to the request 2320.

The process 2300 may include the computing device 2304 receiving data via a data transmission 2322 from one or more devices, e.g., the device 2306, connected to the network. The data transmitted for the data transmission 2322 may include information that satisfies the request 2320. The process 2300 may include the computing device 2304 receiving the data transmitted via the data transmission 2322.

The process 2300 may further include the computing device 2304 performing one or more operations in response to the data received via the data transmission 2322. The computing device 2304 may transmit data via a data transmission 2326. The transmitted data may include the data received via the data transmission 2322 from the device 2306. In some embodiments, the computing device 2304 may combine data stored locally on the computing device 2304 with data received from the device 2306. The data transmitted via the data transmission 2326 may include the combined data. The received data may be merged with cached information. The computing device 2304 may determine differences between the cached information and the received data and may store the differences. Version information in the cached information and the received data may be used to determine the differences.

By implementing a computing device that can communicate with devices on a network, the computing device can store information (e.g., a criterion related to operation of a device, device information, etc.) on the computing device for quick retrieval when a device requests for updated information. In doing so, additional communication with devices on the network can be reduced for retrieving the information associated with a device. Further, bandwidth consumption in a network can be reduced based on a reduction in communication between devices to retrieve current information associated with a device.

Now turning to FIG. 24, a sequence diagram of a process 2400 of caching information associated with network devices is shown in accordance with some embodiments. The sequence of steps shown for the process 2400 may be implemented by a combination of an access device 2402, a cloud network 2404, a computing device 2406, and a device 2408. The access device 2402 may include or implement the access device 108. The device 2408 can include a network device (e.g., the network device 302, the network device 304, or the network device 306) or an access device (e.g., the access device 108). The access device 2402, the cloud network 2406, the computing device 2408, and the device 2408 may be communicatively connected through a network (e.g., the network 100 or the network 300). In some embodiments, the computing device 2406 may include a network device that is different from other network devices connected to the network. For example, the computing device 2406 may include a network device, such as a router or a gateway (e.g., the gateway 110). In another example, the computing device 2406 may include any one of the network devices 302-308 that is distinct from other devices (e.g., the device 2402 and/or the device 2406) connected to a network. The device 2200 of FIG. 22 can be included or implemented in any of the devices 2402-2408. In the example shown in FIG. 24, the computing device 2200 may be included or implemented in the computing device 2406. In some embodiments, the cloud network 2404 may include or implement the cloud network 114.

The process 2400 illustrated in FIG. 24 enables the computing device 2406 to cache information associated with network devices connected to a network (e.g., the network 300). Specifically, the process 2400 shows how a computing device, e.g., the computing device 2406 storing information (e.g., the information 2232) can improve responsiveness for an access device (e.g., the access device 2402) to operate and/or present information associated with devices (e.g., device information or a criterion related to operation of a device) when the access device is controlled remotely via a cloud network, e.g., the cloud network 2404. In some embodiments, the computing device 2406 can store information associated with network devices as it is received from the cloud network 2404 or other devices, e.g., the device 2408. In some embodiments, the computing device 2406 can communicate with network devices to obtain information including updates to existing information stored in a cache of the computing device 2406. As described above with reference to FIG. 23, by maintaining communication with a device (e.g., the device 2408), the computing device 2406 may receive information (e.g., rules or device information) associated with devices connected to a network. The computing device 2406 may maintain current information associated with devices such that the computing device 2406 may provide information to other devices to improve their responsiveness for presenting and/or operating using the information.

The process 2400 may include the access device 2402 transmitting data to the cloud network 2404 via a data transmission 2416. A request for information associated with devices, e.g., the device 2408) may be sent via the data transmission 2416. For example, a request may be sent via the data transmission 2416 to obtain device information and/or a criterion related to operation of a device to present at the access device 2402, such as the access device shown in FIGS. 20 and 21. In some embodiments, the data transmission 2416 may transmit current information associated with devices on the network. For example, the access device 2402 may communicate updates to device information and/ or a criterion related to operation of a device to the network to be provided to other devices, e.g., the computing device 2406 and/or the device 2408.

The process 2400 may include the cloud network performing one or more operations 2418 in response to data transmitted via the data transmission 2416. For example, the cloud network 2404 may store information received via the data transmission 2416. The stored information may be retrieved in response to a request for information from the access device 2402. The cloud network 2404 may search its local storage for cached information that may satisfy a request for information received via the data transmission 2416. The cached information may include information such the type of information stored in the cache 2230 of the computing device 2200. In some embodiments, the process 2400 may include the cloud network 2404 communicating with the access device 2402 via a data transmission 2414. The cloud network 2404 may send via the data transmission 2414 information responsive to a request received via the data transmission 2416.

In some embodiments, the cloud network 2404 may communicate with the computing device 2406 via a data transmission 2420. The cloud network 2404 may send, via the data transmission 2420, a data received from the access device 2402. The data received from the access device 2402 may include the data received by the cloud network 2404 via the data transmission 2416. In some embodiments, the cloud network 2404 may send a new request via the data transmission 2420 to obtain information not retrieved from local storage of the cloud network 2404.

The process 2400 may include the computing device 2406 communicating with one or more network devices, e.g., the device 2408, via a data transmission 2424. The computing device may store information associated with devices on a network. The information may include a criterion related to operation of a device, device information, or status information. The computing device 2406 may send its cached information to the device 2408 periodically or intermittently to enable the device 2408 to remain synchronized with its information. In some embodiments, the computing device 2406 may send a request to the device 2408 for updates to information (e.g., criteria related to operation of devices and device information) stored on the computing device 2406. The request may include a version identifier to identify a version of the information stored on the cache of the computing device 2406. The request may be sent before, after, or concurrently with receiving the data transmission 2420.

The process 2400 may include the device 2408 communicating with the computing device 2406 via a data transmission 2426. The device 2408 may transmit via the data transmission 2426, information associated with devices (e.g., a criterion related to operation of devices or device information). The information may be sent in response to a request via the data transmission 2424. The information may include updates to information associated with devices and may include version information indicating a version of the information that is sent. The device 2408 may send updates to the information periodically or intermittently.

The process 2400 may include performing one or more operations 2422 to store the data received via the data transmission 2426. One operation may include storing information included in the data received from the device 2408. In some embodiments, the computing device 2406 may determine differences between information in the data received via the data transmission 2426 and cached information on the computing device 2406. The computing device 2406 may store information received from the device 2408 that is different from the data stored in its cache.

The process 2400 may include the computing device 2406 performing one or more operations 2428 in response to a request received via the data transmission 2420. In some embodiments where the data transmission 2420 includes information associated with devices, one operation may include the computing device 2406 storing such information received from the cloud network 2404. The computing device 2406 may determine differences between information received via the data transmission and cached information on the computing device 2406. The computing device 2406 may store the information received from the cloud network 2404 that is different from the cached information. Another operation may include the computing device. Another operation may include detecting that a request (e.g., a multicast request) is received, via the data transmission 2420, for information associated with devices. Upon detecting a request for information, the computing device 2406 may perform another operation for searching its cache for stored information satisfying the request. By storing information associated with devices in the cache of the computing device 2406, the computing device 2406 may have all or some information of the request. As such, the computing device 2406 may search its cache for information requested from the cloud network 2404 and may retrieve information located in the cache. By locating such information from the cache, the computing device 2406 may provide information to the access device 2402 faster, without having to request the information from other devices, e.g., the device 2408. By providing the information faster, the access device 2402 may improve its responsiveness based on receiving the information. For example, the access device 2402 may present updated information about rules and/or device information faster in a graphical interface such as those shown in FIGS. 20 and 21.

The process 2400 may include the computing device 2406 sending the information retrieved from the cache to the cloud network 2404 via a data transmission 2432. In some embodiments, although not shown, the computing device 2406 may send the information directly to the access device 2402 if the access device 2402 becomes connected to a network to which the computing device is connected.

The process 2400 may include the computing device 2406 sending a request to the device 2408 via a data transmission 2430 to obtain information associated with the devices. Information that is not located in the cache may be requested from the device 2408 via the data transmission 2430. In some embodiments, the data transmission 2430 and the data transmission 2432 may occur concurrently to improve response time for retrieving information requested via the data transmission 2420.

The process 2400 may include the cloud network 2404 sending, via a data transmission 2442, the information received from the computing device 2406 via the data transmission 2432. The access device 2402 may control operation of devices and/or presenting information based on the information received via the data transmission 2442. In some embodiments, the cloud network 2404 may perform operations 2444, such as storing in its local cache the information received via the data transmission 2432.

The process 2400 may include the device 2408 sending, to the computing device 2406 via a data transmission 2434, the information associated with devices (e.g., a criterion related to operation of devices or device information) requested via the data transmission 2430. The computing device 2406 may perform one or more operations in response to the data received via the data transmission 2434. The computing device 2406 may store the received data. In some embodiments, the computing device 2406 may determine differences between cached information and the received data. Such differences may be determined using version information and/or type information determined from the data. The computing device 2406 may send the received data to the cloud network 2404 via a data transmission 2438. In some embodiments, the computing device 2406 may send updates or differences from the cached information via the data transmission 2438.

The process 2400 may include the cloud network 2404 performing one or more operations 2440 in response to receiving data via the data transmission 2438. One operation 2440 may include storing the data received via the data transmission 2438. In some embodiments, the cloud network 2404 may determine differences between previously stored information associated with devices and information associated with devices included in the data received via the data transmission 2438. The cloud network 2404 may store the differences in local storage. Another operation 2440 may include the cloud network 2404 sending the information to the access device via a data transmission 2446. The cloud network 2404 may send the information received via the data transmission 2438 to the access device 2402. In some embodiments, the cloud network 2404 may send the differences determined based on the stored information.

Upon receiving the information via the data transmission 2446, the access device 2402 may perform one or more operations 2448 using the received information. One operation 2448 may include displaying all or some of the information received via the data transmission in an interface (e.g., the interface 2005 or the interface 2105) of the access device 2402. Another operation 2448 may include controlling operation of devices based on the received information.

Figure 25:
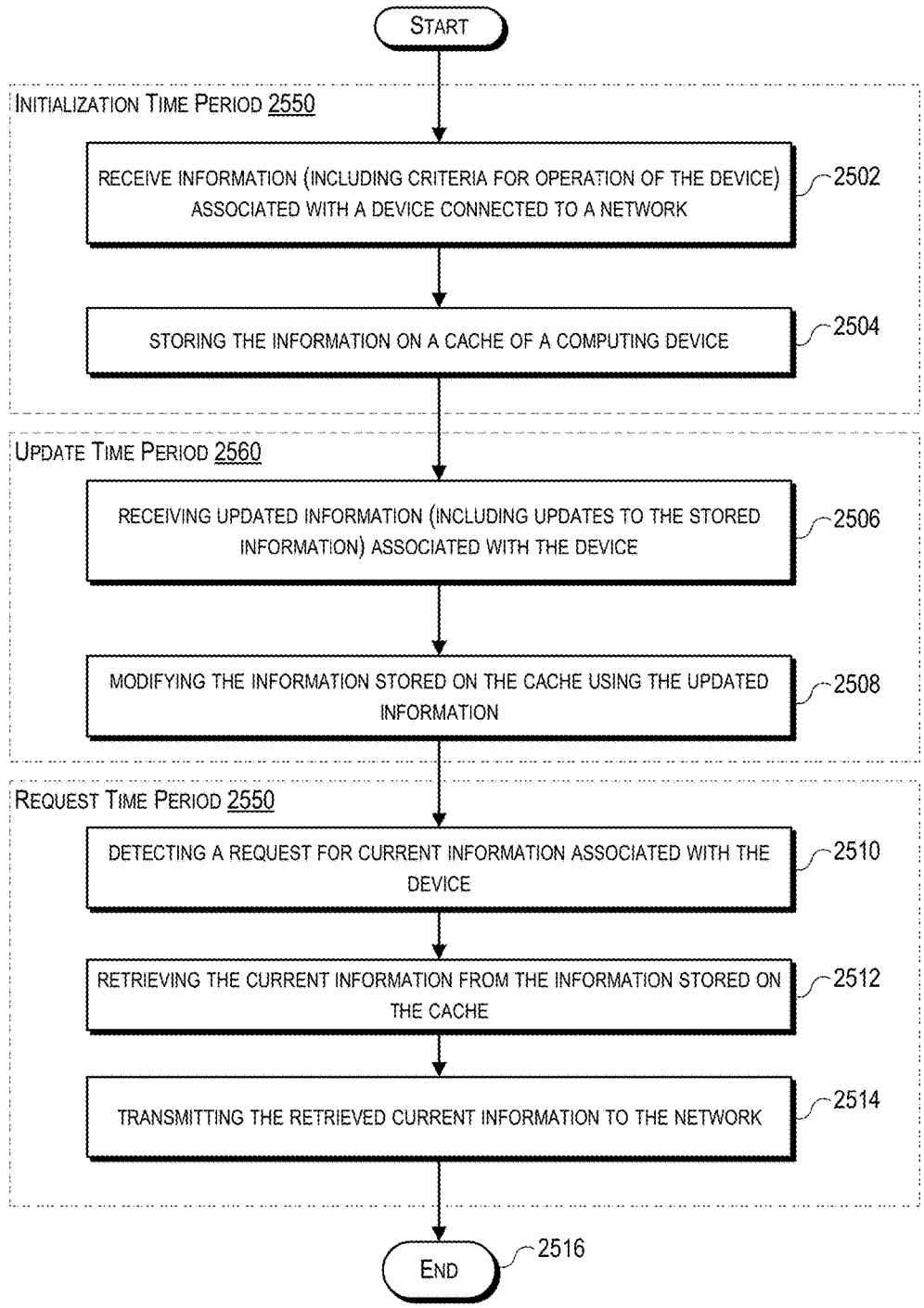
FIG. 25 shows flowchart illustrating a process for caching information in accordance with some embodiments.

Now turning to FIG. 25, a flowchart is shown illustrating a process 2500 for caching information in according with some embodiments. Specifically, the process 2500 provides techniques for storing information (e.g., the information 832), such as criteria (e.g., criteria related to operation of devices), device information, status information, icons, meta-information, or interfaces) received from network devices (e.g., any of the network devices 302-308) and/or access devices (e.g., the access device 108) on a network. By implementing the process 2500, information received for communication from one device to another via a device (e.g., a router device) can be stored to improve response time for retrieving such information. In some embodiments, process 2500 may be performed by a computing device, e.g., the computing device 800. Requests from a network device to other devices (e.g., network devices 302-308 and/or access devices 108) for data, such as rules, device information, status information, or other data, may be retrieved from local cache by the process 2500 and provided back to a requesting device. By intercepting requests at a computing device (e.g., a router device), the process 1200 can reduce communication with one or more devices to obtain information associated with devices. A computing device in communication with devices on a network can store information as it is received from other devices. The computing device can determine differences to maintain current information. By maintaining current information, the computing device can provide current information requested by a device, thereby improving a response time for retrieving the information.

Process 2500 is illustrated as a logical flow diagram, the operation of which represents operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Additionally, the process 2500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Beginning at block 2502, the process 2500 may include receiving information associated with a device (e.g., the network device 302, the network device 304, the network device 306, or the network device 308) connected to a network (e.g., the network 300). For example, the process 2500 may receive from a network device (e.g., the network device 302) device information about network devices connected to a network. In some embodiments, the received information may include device information identifying one or more devices connected to a network. The device information may include device identifiers, each device identifier corresponding to a distinct device connected to a network. In another illustrative example, the process 2500 may include receiving, from an access device, a criterion related to operation of one or more devices (e.g., the network device 302, the network device 304, the network device 306, or the network device 308) connected to a network. The criterion may include rules for performing actions, which indicate settings and/or attributes related to operation of a device. For example, the criterion may include an operation criterion such as value or a range of values for a setting and/or an attribute related to controlling operation of a device. In another example, the criterion may include an instruction criterion that indicates an instruction for operating a device. An instruction may include a condition by which to control operation of a device. The condition may be based on time, date, weather, location, an event, or the like, when a device is to perform an operation.

At block 2504, the process 2500 may include storing the information (e.g., the information received at block 2502) on a cache of a computing device. In some embodiments, the computing device which includes the cache may be the same computing device that performs the process 2500.

At block 2506, the process 2500 may include receiving updated information associated with the device. For example, the process 2500 may receive updated information associated with a device from a device connected to a network. The device may include a network device (e.g., the network device 302, the network device 304, the network device 306, or the network device 308) or an access device (e.g., the device 108). The updated information may be received from a network device that is different from a network device from which the stored information was received. In some embodiments, the updated information may include a new criterion (e.g., a new rule) for operation of a device (e.g., the network device 302, the network device 304, the network device 306, or the network device 308). The updated information may be received from a network device that is associated with the updated information. In some embodiments, updates to the information stored on the cache may be received in parts, each from a different device connected to a network. In some embodiments, the updated information may be received from a device (e.g., the access device 108) that is different from the device associated with the updated information. In some embodiments, the updated information may include device information identifying new devices connected to a network. The updated information may include updates to the information stored in the cache. For example, the updated information may include updates to a criterion (e.g., a rule) related to operation of a device. The updates to the criterion may include an identifier that indicates the modification to the criterion (e.g., a rule modifier). The updated information may include information indicating a version (e.g., a version identifier) corresponding to the updated information. In some embodiments, the updated information may include updated device information, which may indicate updates to the device information stored on the cache. The updated device information may indicate updates to the devices connected to a network. Such updates may indicate an update of the devices connected to the network. The updates may be used to determine devices that are no longer connected to the network.

At block 2508, the process 2500 may include modifying the information stored on the cache using the updated information. A computing device that implements the process 2500 may be the computing device including cache that is modified with respect to the stored information. In some embodiments, the process 2500 may modify information stored on the cache by updating the information stored on the cache based on the updates received in the updated information. The process 2500 may determine differences between the stored information and the updates. The process 2500 may modify the information stored on the cache based on the determined differences. In some embodiments, the process 2500 may modify the information stored on the cache by replacing the information with the updated information. In some embodiments, the information stored on the cache may be modified with the updated information based on version information included in the updated information. When the updated information includes new information not stored on the cache, the information stored on the cache may be modified to include the new information.

At block 2510, the process 2500 may include detecting a request for current information associated with a device. For example, the process 2500 may detect a request from an access device (e.g., the access device 108) for current information associated with a network device (e.g., the network device 302, the network device 304, the network device 306, or the network device 308). In this example, the request from the access device may be for current information associated with a device. Such information may be used, for example, to display a graphical interface that presents information about devices (e.g., a device list) connected to a network. The request for current information associated with devices connected to a network may be transmitted via a multicast request. The process 2500 may detect a request for current information, such as when a multicast request is directed to devices connected to a network. In some embodiments, the request for current information may include version information indicating a version of information stored by the device that sends the request. The version information may be used to detect that a request is for current information associated with a device.

At block 2512, the process 2500 may include retrieving the current information from the information stored on the cache. The current information may be retrieved from cache of a computing device implementing the process 2500. The current information that is retrieved may include all information stored on the cache. In some embodiments, the process 2500 may determine information to retrieve based on information indicated in the detected request at block 2510. The request may indicate a type of information (e.g., a criterion related to operation of devices or device information) that is requested. In some embodiments, version information included in the detected request may be used to retrieve the current information. For example, based on version information, the process 2500 may determine information stored on the cache that is different (e.g., new or updated) that information stored on a device that sent the detected request. The version indicated in the detected request may be compared to version information associated with information stored on the cache. Information stored on the cache may be different when a version does not match a version indicated by the detected request. Information that corresponds to a different version may be identified as current information to be retrieved by the process 2500.

At block 2514, the process 2500 may include transmitting the retrieved current information to the network. For example, the process 2500 may transmit the retrieved current information to a network on which one or more network devices may be connected. By transmitting the retrieved current information to the network, other network devices on the network, such as those which did not send the detected request, may receive updated information. The network devices may be able to determine whether the current information contains updates to information stored on each of the network devices individually. In some embodiments, the retrieved information may be transmitted to the network, but directed to a device that sent the detected request. In some embodiments, the retrieved current information may be transmitted with information indicating the type of information included in the current information. The retrieved current information may be transmitted with version information to indicate a version corresponding to the current information. For example, the retrieved current information may include version information (e.g., a version identifier) corresponding to one or more criterion related to operation of devices. In another example, the retrieved current information may include version information for device information. The information indicating the type of information included in the retrieved current information may enable a device (e.g., an access device or a network device) to determine information to update locally on the device.

It will be appreciated that process 2500 is illustrative and that variations and modifications are possible. Steps described as sequential may be executed in parallel, order of steps may be varied, and steps may be modified, combined, added or omitted. In some embodiments, steps of the process 2500 may be performed during different time periods or the blocks may correspond to steps performed in a different order than shown.

In some embodiments, steps of the process 2500 may be performed during different time periods or the blocks may correspond to steps performed in a different order than shown.

In some embodiments, the blocks 2502 and 2504 may be performed during an initialization time period 2550. During the initialization time period 2550, a computing device that implements the process 2500 may receive information associated with devices connected to a network. Such information may be received, for example, from an access device that is communicating the information upon configuration by a user. In another example, the information associated with a device connected to a network may be received via a communication from one network device to another network device via a computing device connected to the same network. The block 2502 and 2504 may be implemented for the process 2500 each time new information is received. For example, new information may be received when a new device is discovered on the network 2500.

In some embodiments, the blocks 2506 and 2508 may be performed during an update time period 2560 during which a computing device that performs the process 2500 may receive updates to information stored on the computing device. The update time period 2560 may occur immediately after the initialization time period 2550 or may occur after a time period occurring after the initialization time period 2550. The blocks 2506 and 2508 may be implemented when information is to be stored on the cache is updated. For example, updates to different types of information may be received during different update time periods 2560. The updated information may be received from a network device via the network. The updated information may be received from an access device via the network. The updated information may be generated based on an update to such information at the access device.

In some embodiments, the blocks 2510-2514 may be performed during a request time period 270. The request time period 2570 may occur after the initialization time period 2550. In some embodiments, the request time period 2570 may occur after the update time period 2560. The blocks 2510-2514 may be implemented for the process 2500 when a request is received.

During the request time period, the process 2500 may detect a request for current information associated with a device connected to a network. The request may be detected for different types of information, such as criteria related to operation of a device and device information. Requests for different types of information may be received at different times, each occurring during a different request time period 2570.

Figure 26:
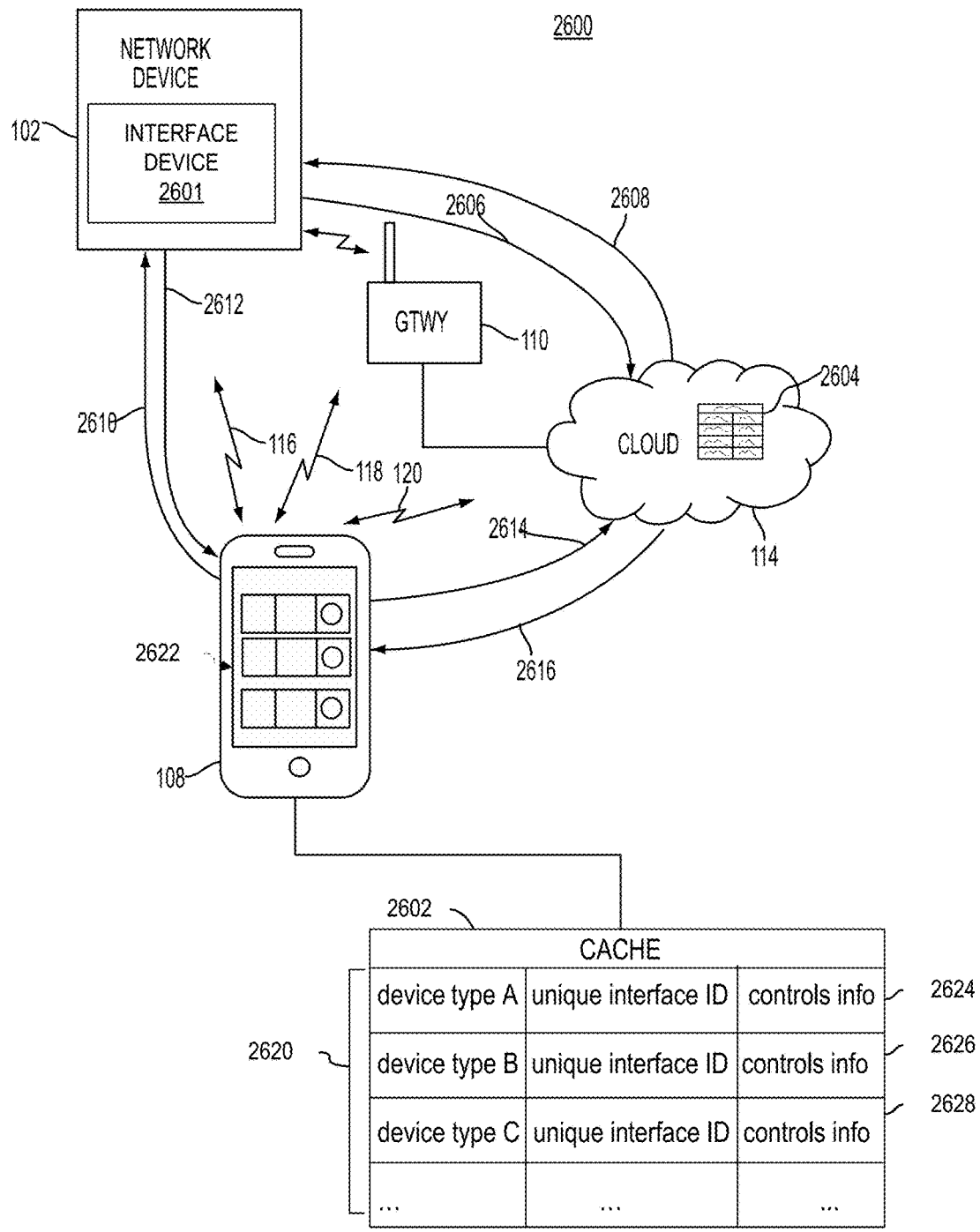
FIG. 26 shows an embodiment of a process for providing a visual interface module for controlling a network device in a wireless network according to some embodiments.

FIG. 26 illustrates an embodiment of a process 2600 for providing a visual interface module for controlling a network device. As shown, the process 2600 may be performed by one or more computing devices, such as the network device 102, a server associated with cloud network 114, or the access device 108 described above with reference to FIG. 1. In some embodiments, the network device 102 is associated with a home automation network, such as the local area network 100 described above with respect to FIG. 1. Process 2600 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various appliances, such as a television, radio, light bulb, microwave, iron, fan, space heater, sensor, and/or the like. In some embodiments, the user can monitor and control network devices by interacting with a visual interface rendered by the gateway 110 (i.e., a web page for gateway 110), a visual interface rendered on display 2622 of the access device 108, or a visual interface rendered by the network device 102.

In an embodiment, an application may be run on the access device 108. The application may cause the access device 108 to present a display 2622 with a modular visual interface for each network device accessible on the local area network 100. When the application is run on the access device 108, the access device 108 can access a cache 2602.

The cache 2602 can be a local cache located in onboard storage of the access device 108. The cache 2602 can contain a known interface list 2620 with records 2624, 2626 and 2628 including interface information for different, known types of network devices. As shown, each of records 2624, 2626 and 2628 can include a device type, a unique interface module ID, and controls information. The known interface list 2620 can include a record for each device known by the access device 108 to exist on the local area network 100. When the application is run on the access device 108, the access device 108 can access the known interfaces 2620 in the cache 2602 to present the display 2622, which lists modular interfaces for each network device on the local area network 100. In an example, the display 2622 can include a modular tile for each connected network device having an interface in the known interface list 2620. Examples of communications used to populate cache 2602 are described in the following paragraphs.

The process 2600 can include utilizing communication 2606 to register a visual interface module for a network device 102 with a server of cloud network 114. For simplicity, communication 2606 is shown as a direct communication between network device 102 and cloud network 114. However, it is to be understood that in an embodiment, communication 2606 can be sent from a manufacturer of network device 102 to cloud network 114. In an additional or alternative embodiment, communication 2606 is sent from third party interface developer to cloud network 114. For example, a third party developer of a visual interface module for network device 102 may initiate communication 2606 to cloud network 114. In the example of FIG. 26, communication 2606 includes registration information for the network device 102. For example, communication 2606 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 2606 can include a resource bundle corresponding to network device 102. The resource bundle can be embodied as a structured folder structure whose contents define all visual and interactive elements/areas in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements/areas for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 2606, the process 2600 includes transmitting an indication that network device 102 is associated with the network. For example, network device 102 may transmit the indication to the server of the cloud network 114. In some embodiments, transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 2604 of known interfaces. The access device 108 can download a visual interface module identified in data store 2604 from the cloud network 114, which can be used to render a modular interface within display 2622. In an embodiment, data store 2604 can be a tile database where each record in the database is uniquely identified by a tile ID.

Cloud network 114 can use the unique device ID to determine an interface module for network device 102. As shown in FIG. 26, cloud network 114 can access a data store 2604 of visual interface modules. A plurality of uniquely identified interface modules can be stored in data store 2604. For example, each interface module in data store 2604 can be associated with a unique interface module ID. In an embodiment, data store 2604 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 2604. In cases where an existing interface module for network device 102 is not found in data store 2604, cloud network 114 can use information in a resource bundle for the network device 102 to generate an interface module, where the resource bundle is provided as part of a registration process for a given network device. The generated interface module can then be stored in data store 2604 and assigned a unique interface module ID. In some embodiments, information in the resource bundle can be used to update an existing interface module stored in data store 2604. After determining the interface module for network device 102, cloud network 114 sends communication 2608 to network device 102 in order to provide a unique interface module ID to the network device 102. In one embodiment, communication 2608 can include a unique tile ID corresponding to a modular tile for network device 102 that is stored in data store 2604. In some embodiments, communication 2608 includes a unique tile ID corresponding to a modular tile defined for network device 102. Upon receiving communication 2608 with the unique interface module ID (i.e., a unique tile ID), the network device 102 can store the unique interface module ID. In one embodiment, for example, the unique interface module ID can be stored by an interface device 2601 of the network device 102 that is configured to provide the interface module ID to an access device or gateway. In an embodiment, the interface device 2601 is implemented as a 'smart module' in hardware and firmware, such as, for example, a system on a chip (SOC) integrated into the network device 102.

The interface device 2601 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 2601 loses power, information stored in the flash memory may be retained. The DRAM of the interface device 2601 may store various other types of information needed to run the interface device 2601, such as all runtime instructions or code. The flash memory or DRAM or a combination thereof may include all instructions necessary to communicate with network device 102.

The process 2600 can include sending, from the access device 108, intra-network communication 2610 including a query, to the network device 102. The query can be a request for information such as a query for capabilities, a request for an identity of the network device 102, and/or a request for a unique interface module ID. For example, communication 2610 can be sent from access device 108 to network device 102 to query network device 102 about its identity. In response to the query sent from access device 108, the process 2600 can include receiving intra-network communication 2612 at the access device 108 with device information for the network device 102. According to an embodiment, in response to the query, the network device 102 can send communication 2612 to inform the access device 108 of the identity and/or capabilities of the network device 102. For instance, in response to receiving the query, the network device 102 may send communications 2612 to the access device 108 with at least a unique interface module ID. The process 2600 can include utilizing intra-network device communications 2610 and 2612 as part of a discovery process for the network device 102. For example, when the network device 102 is initially connected to the network, it and access device 108 can automatically exchange communications 2610 and 2612 to provide the access device 108 with information that can be used to determine a basic, default visual interface stored in cache 2602.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 2612 may be received when the network device 102 is rebooted (e.g., powered on, reset or restored to default settings, or the like). For example, when the network device 102 is rebooted, it may broadcast one or more messages on the local area network 100 to discover whether there are any access devices in the local area network 100. For example, communication 2612 may be broadcast according to a UPnP protocol during a discovery process. The network device 102 may receive communications 2610 from access device 108 indicating that it is located within the local area network 100 and interrogating network device 102 about its functionalities. That is, after receiving a broadcast message from network device 102, access device 108 may then query network device 102 by sending communication 2610 in order to receive the communication 2612 including information about the network device.

After receiving communication 2612, if the access device 108 can access the cloud network 114, it sends a communication 2614 to the cloud network 114 as a request for an interface module for the network device 102. Communication 2614 is described in further detail below. Otherwise, if the access device 108 cannot access the cloud network 114, the access device 108 looks up the unique interface module ID received from the network device 102 in cache 2602. As discussed above, cache 2602 can be a local cache stored on the access device 108. Basic properties for known interfaces can be stored in cache 2602 as a device type and controls information. These basic properties can include, for example, a default icon, a default name, and interactive elements or interactive areas for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 2614 to query the cloud network 114 about network device 102. The communication 2614 can include at least the unique interface module ID for the network device 102. At this point, the cloud network 114 can compare the unique interface module ID of the network device 102 to known interface module IDs stored in data store 2604 in order to determine that there is a match between the unique interface module ID sent with communication 2614 and a known interface module. If the cloud network 114 finds an interface module in its data store 2604, it transmits the interface module to the access device 108 via communication 2616. For example, if the access device 108 is currently using a default interface module for network device 102 that was determined based on exchanging communications 2610 and 2612, and then subsequently is able to connect to the cloud network 114, communications 2614 and 2616 between the access device 108 and the cloud network 114 can be used to obtain an updated interface module for the network device 102.

Upon receiving communication 2616 from the cloud network 114, the access device 108 populates a record in cache 2602 corresponding to the network device 102 with device type and controls information received via communication 2616. That is, when the access device is remote from the local area network 100, it can exchange communications 2614 and 2616 with the cloud network 114 to receive an interface module for a network device. Information received via communications 2616 can be used to populate records of cache 2602. Records in cache 2602 can be updated using modular interfaces received via communication 2616. In additional or alternative embodiments, new records can be created in cache 2602 when communication 2616 includes a modular interface for a newly discovered network device.

Records 2624, 2626, 2628 in cache 2602 store device types, unique interface module IDs, and controls information for known network devices. The access device 108 uses the records in cache 2602 to render visual interfaces in the display 2622. For example, the display 2622 can include a navigable list of modular tiles corresponding to network devices in the local area network 100.

Display 2622 can also include an indicator representing a state of network device 102. In embodiments, communications 2612 and/or 2614 can include a last known state of the network device 102 and/or historical data associated with the network device 102. In one embodiment, such state information can be based on information received via communication 2612 from the network device 102 when the access device 108 is connected to the local area network 100. In this way, display 2622 of the access device 108 can reflect a current state and historical data for the network device 102 when the access device is not connected to the local area network 100. In additional or alternative embodiments, the state information can be based on information received via communication 2616 from the cloud network 114 when the access device 108 is connected to the cloud network 114. Using the state information, an interface module or tile for the network device 102 within display 2622 can indicate an 'on' or 'off' state for the network device 102 when the network device is powered on or off.

Figure 27A:
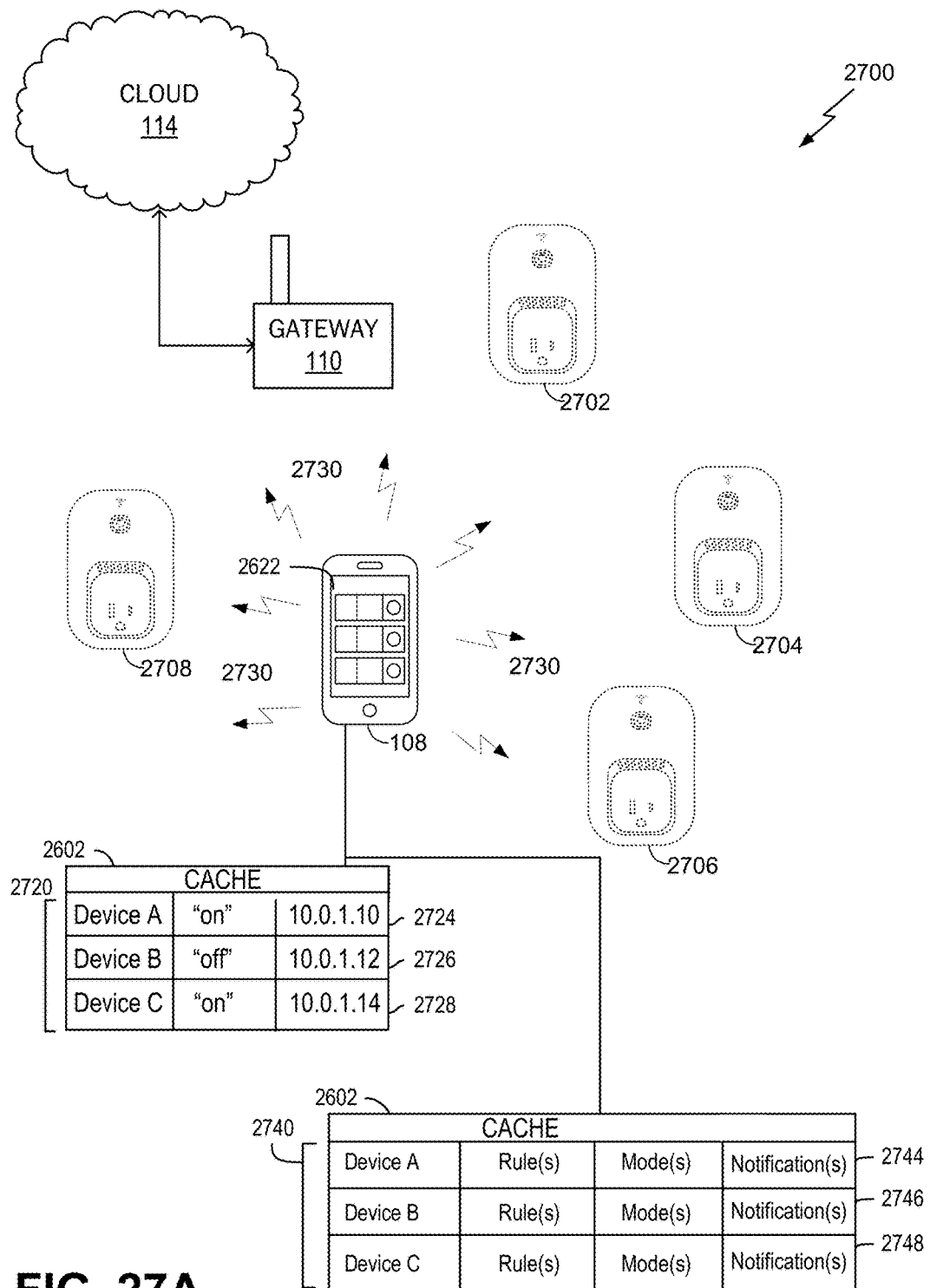
FIG. 27A is an illustration of an example of a network environment, in accordance with some embodiments.

FIG. 27A illustrates an example of a network 2700, according to embodiments of the present invention. Specifically, the network 2700 can be a wireless local area network enabling an access device to communicate with network devices to control adjustment of attributes related to operation of the network devices. Network 2700 includes network device 2702, network device 2704, network device 2706, and network device 2708. The network 2700 also includes access device 108. In other words, the network 2700 may be substantially similar to the network 100 except that access device 108 has been turned on near the network 2700, to which it is associated, or has entered an area to which the network 2700 can reach.

When access device 108 can enter the network 2700 as shown in FIG. 27A, access device 108 may be authenticated based on the access device's authentication with the logical network or may otherwise commence communication with cloud network 114. Access device 108 may also communicate notification of its presence or other information directly to other network devices 2702-2708 within network 2700, as shown in FIG. 27A by communication paths 2730. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 2700, including network device 2702, network device 2704, network device 2706, and network device 2708, information/data regarding its status. Such status data may include the fact that it is present and turned on, or other status data/information. At any time that network devices 2702, 2704, 2706 and 2708 recognize that access device 108 is present at network 2700, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 2702-2708 and access device 108 may each receive communication from other network devices around the network 2700, including the status of each of those network devices, network devices 2702-2708 and/or access device 108 may be continuously scanning network 2700 (including, for example, running discovery algorithms) to determine whether any devices within the network have moved, turned on/off or otherwise added to or subtracted from the network 2700, or have otherwise changed statuses.

Since network devices 2702-2708 and access device 108 may each receive communication from other devices around network 2700, including the status of each of those devices, each network device within network 2700 may know the status of each other network device in the network 2700. For example, access device 108 or devices 2702-2708 may not be required to communicate with cloud network 114 in order to obtain one or more of such statuses. Since cloud network 114 is an external network and may be remote from network 2700, communication between network devices within the network 2700 and cloud 114 may take more time than communication between two devices within network 2700. For example, communication between devices within network 2700 may take anywhere from 1 millisecond to 100 milliseconds, while communication between a device within network 2700 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 2700 may choose to send and receive/retrieve statuses directly with other devices within the network 2700 instead of communicating such information via cloud network 114. When a network device receives status data from another network device on the device's local area network 2700, it may store that status data so that it may retrieve and use that status data at a later time.

The network 2700 can enable user to monitor and/or control operation of the network devices 2702-2708. For example, the user can monitor and control network devices by interacting with a visual interface of the gateway 110 (i.e., a web page for gateway 110) and/or a visual interface rendered on display 2622 of the access device 108. In some embodiments, an application may be run on the access device 108. The application may cause the access device 108 to present a graphical interface (e.g., the display 2622) that includes a visual interface for each network device accessible on the network 2700.

The visual interface corresponding to a network device can provide a "status" of the network device. In certain embodiments, the status or state of a network device can be indicated within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a network device. The setting or the attribute can be adjustable within a range of values. For example, the network device can be a light bulb and the status can include a value corresponding to brightness (e.g., a percentage of total brightness) emitted by the light bulb when the light bulb is powered-on. In another example, the network device can be a motion sensor and the status can include a value corresponding to sensitivity of the sensor in a range of values between 0 to 100 when the sensor is powered-on. In yet another example, the network device can be a fan and the status can include a value corresponding to a speed of the fan on a scale of 0 to 100 when the fan is powered-on.

Figure 27B:
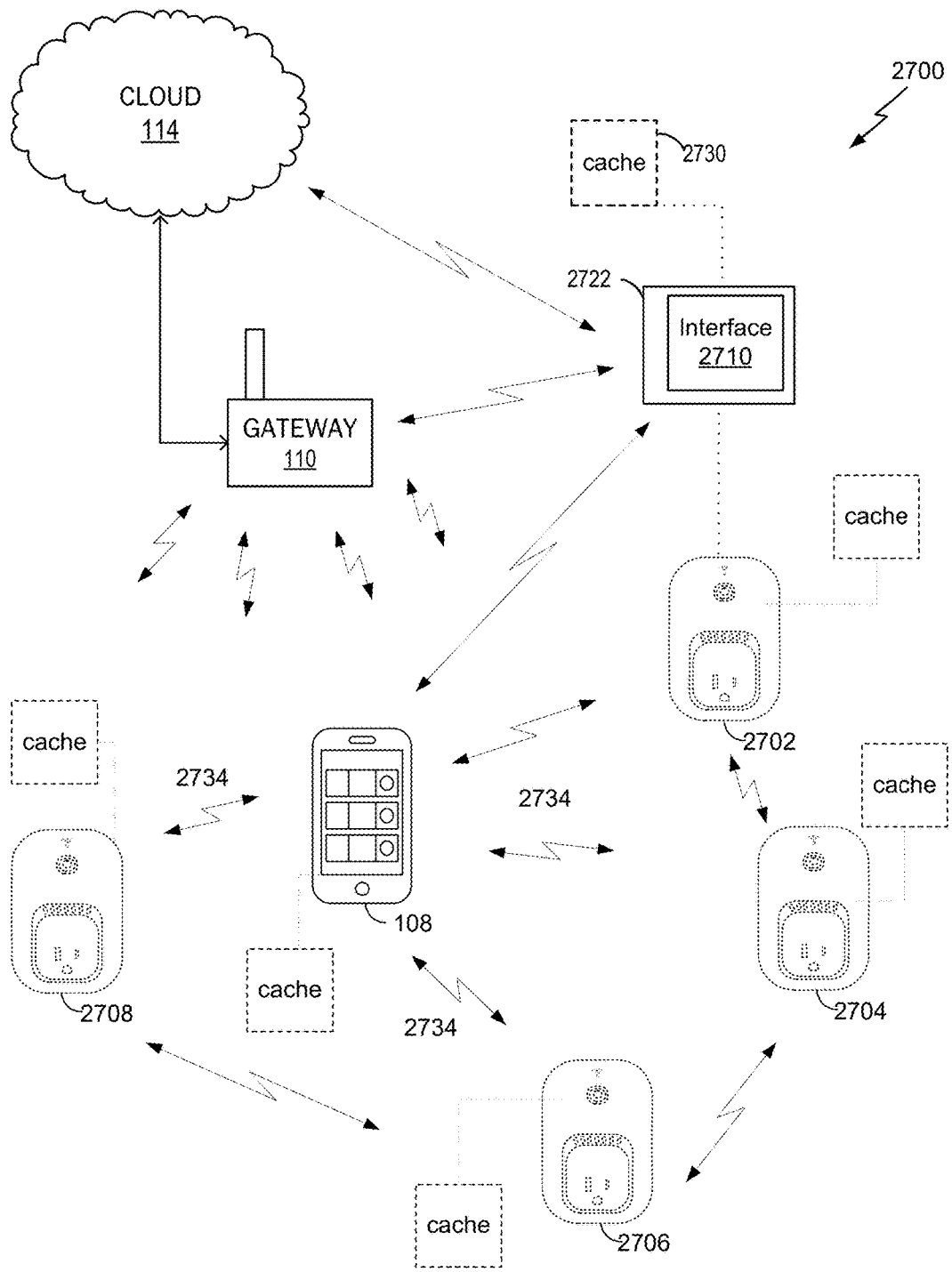
FIG. 27B is an illustration of an example of a network environment, in accordance with some embodiments.

An application operating on the access device 108 can access the cache 2602 to obtain information to display the visual interface for each network device 2702-2708 registered within the network 2700. FIG. 27B also illustrates that each of the network devices 2702-2708 may include a storage device, such as a cache, for storing data, including data regarding its own status and data regarding statuses received from the other devices within the network 2700.

As explained with reference to FIG. 2, the cache 2602 can contain a known interface list 220 including interface information for different, known types of devices. As explained earlier, the known interface list 220 can include a record for each network device known by the access device 108 to exist on the network 2700. When an application is run on the access device 108, the access device 108 can access the known interfaces 240 in the cache 2602 to present the display 2622. The display 2622 can present one or more visual interfaces, each corresponding to a network device known to exist on the network 2700. Each visual interface can be generated based on a visual interface module corresponding to each network device on the network 2700. In an example, the display 2622 can include a visual interface (e.g., a module tile) for each network device in the network 2700 having an interface in the known interface list 220.

The cache 2602 can also contain a known network device list 2720 with a Device A (e.g., network device 2702) last known address 2724, a Device B (e.g., network device 2704) last known address 2726, and a Device C (e.g., network device 2706) last known address 2728. The known device list 2720 can list each device known by the access device 108 to exist on the local area network 2700. Devices 2702-2706 can be present on the known device list 220 because the access device 108 or another device capable of updating the cache 2602 of the access device 108 has previously discovered network devices 2702-2706.

In addition to address information, the cache 2602 can contain known status information 204 about each network device in the known device list 2720. When the application is run on the access device 108, the access device 108 can access the known status information in the cache 2602 to present a status display 2622. The access device 108 can populate each tile with an indicator representing the respective known status information for each network device in the known device list 2720. For example, the status display 2622 can include an indicator representing an "on" state for Device A 2702 and Device C 2706, and an indicator representing "off" for Device B 2704. The status display 2622 can include an indicator of one or more attributes, one or more settings, or a combination thereof related to operation of each network device in the network 2700. For example, the status display can include a brightness of a bulb (e.g., a brightness of 56 in a range of values between 0 and 100) of the network device 2702 (e.g., a light bulb), a value of sensitivity of a sensor (e.g., a value of 34 in a range of values 0-100) for the network device 2704 (e.g., a motion sensor), and a value of brightness (e.g., 65 percent brightness) for the network device 2706 (e.g., a light bulb). Although shown as having a single indicator for an attribute or a setting related to operation of a network device, the status display 2622 can present a plurality of indicators corresponding to different attributes and/or settings related to operation of a network device.

In some embodiments, the cache 2602 can include other information about a network device. The other information can indicate a network device's firmware version, last known firmware update status, connectivity to cloud status, registration status (e.g., whether the network device has a key or not), and other such information. The cache 2602 can include information that could be used for troubleshooting. In embodiments described below, the access device 108 can access status information from another other device on the network 2700 and can use that information to update its own cache 2602, update the status display 2622, and/or pass the information to the cloud network 114 and/or the gateway 110 for trouble shooting and/or storage.

In some embodiments, the cache 2602 may store information 2740 including criteria for determining actions to initiate at the network device. The criteria may be configurable by input received from a user via an interactive area or interactive element of the display 2622. In some embodiments, the criteria may be received from another network device, such as one of the network devices 2702, 2704, 2706. The actions initiated at the network device based on the criteria may be in addition those actions, which are related to operation of the network device itself. The actions may be initiated from the access device 108, any of the network devices 2702, 2704, 2706, other devices within the network 2700, and/or devices outside the network 2700. The criteria may indicate when actions are to be performed. The criteria may indicate events based on which actions may be initiated. Such events may be related to interaction with an interface (e.g., a graphical interface or a physical interface) corresponding to a network device. An interface may control operation of a network device. In some embodiments, interaction with the interface may initiate additional actions in addition to controlling operation of a network device corresponding to the interface.

In some embodiments, the criteria may be determined by a computing system implemented by a third party. The computing system may implement a service that enables a user to configure the criteria (e.g., one or more rules) which can be used to determine actions to control operation of a network device, e.g., the network devices 2702-2708. In some embodiments, the computing system can determine actions to be performed based on satisfaction of the criteria. The third party service may enable a user to configure actions to be performed upon satisfaction of a rule.

The computing system of the third party may be "outside" the local area network 2700 such that it is remotely located (in an operational sense, a spatial sense, and/or a geographical sense) from network devices 2702-2708, the gateways 110 or 112, and/or the cloud network 114. The computing system may be configured to exchange communications with the cloud network 114.

In some embodiments, the computing system of the third party may determine whether a rule is satisfied based on information related to operation of a network device in the network 2700. Cloud network 114 may communicate information related to operation of a network device (e.g., a change in a state of the network device) to the computing system of the third party. The computing system may analyze one or more rules configured by a user to determine whether a rule has been satisfied based on information received from cloud network 114. Upon satisfaction of a rule, the computing system may communicate information (e.g., an instruction) to cloud network 114 indicating the rule that has been satisfied and one or more actions to be performed. The information may cause operation of one or more network devices to be adjusted (e.g., change an attribute or a setting related to operation of a network device).

Actions may include controlling operation of one or more network devices (e.g., the network device 2702, the network device 2704, or the network device 2706). Actions may include adjusting settings and/or attributes related to controlling operation of network devices. In some embodiments, actions may be specific to network devices, such as a type of network device, a group of network devices, combinations thereof, or other criteria associated with network devices. In some embodiments, an adjustment to a setting or an attribute of a network device may be specific based on a type of network device.

In some embodiments, the access device 108 may send communications to other devices, either on the network 400 or outside the network 400. The communications may be sent in response to initiation of an action based on the information 2740. The communications may include notifications, operations, actions, instructions, and/or data. The content of the communications may be determined based on the information 2740. For example, the access device 108 may send a notification to network devices in response to satisfaction of criteria (e.g., a rule) indicated by the information 2740 associated with the network devices. The notification may be sent to a destination indicated by the information 2740. In another example, the access device 108 may send an instruction indicating an action to be initiated based on satisfaction of criteria indicated by the information 2740. Examples of actions are described further with reference to FIGS. 28 and 29.

In some embodiments, the access device 108 may determine actions to perform based on input received from interaction with an interactive area of the display 2622 on the access device 108. The access device 108 may process the input to determine whether criteria indicated by the information 2740 are satisfied. In some embodiments, the input may correspond to a network device, such that the access device 108 determines whether criteria corresponding to the network device have been satisfied. The access device 108 may perform actions in response to determining that criteria are satisfied. As explained above, the criteria may correspond to rules, modes of operation, and/or notifications. The actions may include those, for example, described with reference to FIG. 27A.

In some embodiments, the actions may include sending communications to a network device (e.g., the network device 2702, the network device 2704, or the network device 2706). The communications may include data that indicates which actions are to be performed by the network device. A network device (e.g., the network device 2702, the network device 2704, or the network device 2706), which receives the data, may process the data to determine which actions it is to perform. In some embodiments, the network devices 2702, 2704, 2706, may store in their respective cache other criteria (e.g., rules). The actions performed based on the data received by the network device, may trigger other actions to be performed based on criteria stored locally in a network device's cache. Similarly, the access device 108 may receive data from any device, either on the network 400 or outside the network 400. The data may indicate actions for the access device 108 to perform. The access device 108 may process the data to determine the actions. The access device 108 may use the data to determine whether criteria in the information 2704 are being satisfied.

In some embodiments, the information 2740 may be stored in association with one or more network devices. The cloud network 114 may communicate the information 2740 to devices, e.g., the access device 108. The information 2740 may be received from a device remotely located from the network 2700 (e.g., not on the network 2700) or within the network, such as any one of the network devices 2702, 2704, 2706. In some embodiments, the information 2740 may be received from any of the network devices 2702, 2704, 2706 on the network. The information 2740 may be communicated to other network devices 2702, 2704, 2706 on the network 2700 and/or the cloud network 114. In some embodiments, the information 2740 may be generated based on input received from a user via a device, e.g., the access device 108. The information 2740 may include criteria indicating how other devices are to operate. The criteria may indicate actions to be performed by other devices. Examples of techniques for receiving input specifying the criteria in the information 2740 are described further with reference to FIGS. 33-35.

The information 2740 may include, among other types of criteria, rule(s), mode(s), scene(s), and/or notification(s), in association with a device. For example, in FIG. 27A, Device A 2702 may be associated with stored information 2744. Similarly, Device B 2704 and Device C 2706 may be associated with stored information 2746 and stored information 2748, respectively. The stored information 2744, 2746, 2748 corresponding to the network devices 2702, 2704, 2706 may include rule(s), mode(s), and/or notification(s). Actions may be determined based on such information stored in association with a network device. As such, actions that may be performed may be network device specific based on the stored information. Examples of information (e.g., rules, scenes, modes, and/or notifications) that may be stored in the cache 2602 are described further with reference to FIGS. 6 and 7.

In some embodiments, the information 2740 may include criteria such as rules. A rule may indicate criteria for performing actions. The criteria may be based on a schedule, a time of day, events, input, a state of network devices, combinations thereof, or any other information that can be used to determine what actions to perform and when to perform those actions. For example, a rule may indicate actions for controlling operation of network devices. The criteria in a rule may indicate the actions to perform, when to perform those actions, and/or how to perform those actions.

In some embodiments, the rules may map different types of input corresponding to actions that may be performed for a network device. The types of input may be defined based on input received at an interface, such as a tap, a click, a motion, a swipe, a movement, etc. The types of input may be based on a distance of movement corresponding to the input and/or an amount of time the input is received. In some embodiments, actions may be mapped to data corresponding to input such as coordinates, distance, motion, selections, taps, clicks, etc. The actions corresponding to the types of input may include adjusting a power state of a network device, attributes related to operation of a network device, settings related to operation of a network device, or combinations thereof.

In some embodiments, the information 2740 may indicate modes. A mode may correspond to a desired configuration of attributes related to operating network devices and performing actions (e.g., sending notifications and managing control of network devices). For example, in a home environment, modes may include home modes, away modes, sleep modes, or other modes related to configurations for using network devices in a home environment. Modes may be defined by criteria such as a schedule (e.g., a time and/or a date), user preferences related to use of certain types of network devices (e.g., lights, appliances, office equipment, etc.), settings and/or attributes related to operation of network devices, or other criteria for performing actions. Examples of modes are described with reference to FIG. 28. Modes may be chosen using a graphical interface, examples of which are described with reference to FIGS. 33-35.

In some embodiments, the information 2740 may include criteria about sending notifications. The criteria may indicate when to send notifications, where to send notifications, and/or how to send notifications. A notification may include information that notifies a user about occurrences of events. The events may relate to operation of the network devices (e.g., the network devices 2702, the network device 2704, or the network device 2706) or users operating network devices. The network devices may be on or outside the network 2700. A notification may be sent by the access device 108 upon satisfaction of criteria for the notification. The criteria may be indicated by rules, modes, and/or an occurrence of events related to network devices. Criteria about a notification may indicate a destination for sending a notification. The destination may include network devices, users, a device address, addresses (e.g., mailing address or email address), contact information, telephone number, email addresses, user names, any information that can identify a recipient, or a combination thereof. A notification may be generated in response to occurrence of one or more events that satisfy the criteria. A notification may be sent to a destination as a message and/or data, including details about one or more events. In some embodiments, a notification may include instructions, operations, and/or requests to perform other actions that may provide a notification to user at a device or cause a notification to be made. The notification may be displayed at a device. For example, a notification may be a message displayed at a device. The notification may include a visual indication displayed on a device, audio output by a device, other type of notifications that can be sensed or perceived by a user, or combinations thereof.

FIG. 27B illustrates an example of a network 2700, according to embodiments of the present invention. The local area network 2700 may include network device 2702, network device 2704, network device 2706, network device 2708, and access device 108. FIG. 27 also illustrates that one or more network devices 2702-2708 and/or access device 108 may include a storage device, such as a cache, for storing data, including data regarding its own status and data regarding statuses received from the other devices within local area network 2700. For example, access device 108 may, after being powered up, broadcast/send its status to network device 2708 via communication 2734. Network device 2708 may store the status data received from access device 108 until the next time access device 108 updates its status by sending new/updated status data to network device 2708. Cache may be used for storage within network devices 2702-2708 and/or access devices within the local area network 2700 so that each of the devices may be able to quickly retrieve the data it needs from storage. An application operating on the access device 108 can access the cache to obtain information to display the visual interface for each network device 2702-2708 registered within the network 2700. Although a caching device may be used to store such data within the network and/or access devices within the local area network 2700, other types of storage may be used.

The cache can contain a known interface list including interface information for different, known types of devices. The known list can include a record for each network device known by the access device 108 to exist on the network 2700. When an application is run on the access device 108, the access device 108 can access the known interfaces in the cache to present the display of access device 108. The display can present one or more visual interfaces, each corresponding to a network device known to exist on the network 2700. Each visual interface can be generated based on a visual interface module corresponding to each device on the network 2700. In an example, the display can include a visual interface (e.g., a module tile) for each device in the network 2700 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 2700. For example, the status display can include a speed of a fan (e.g., a fan speed of 56 in a range of values between 0 and 100) of the network device 2702 (e.g., a fan), a value of sensitivity of a sensor (e.g., a value of 34 in a range of values 0-100) for the network device 2704 (e.g., a motion sensor), a value of brightness (e.g., 65 percent brightness) for the network device 2706 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 2700 and can use that information to update its own cache, update the status display, and/or pass the information to the cloud network 114 and/or the gateway 110 for trouble shooting and/or storage.

Even though each network device may know and store (e.g. in cache) the state of each other network device within local area network 2700, a network device may not know when another network device changes status (e.g. turns/powers off). However, network devices and/or access devices within local area network 2700 may broadcast/send any updates in its status to other devices on the network. For example, if network device 2702 changes status, it may send status data to the other network devices, such as network devices 2704, 2706 and 2708 and to access device 108. However, network device 2702 may not know which devices to update since the other devices may change statuses periodically (e.g. turn off).

Therefore, a network or access device may subscribe to another network or access device within local area network 2700. For example, network devices 2704, 2706 and 2708 and access device 108 may subscribe to status data notifications/updates from network device 2702. Such a subscription may be registered for upon initial connection with network device 2702 when network device 2702 first enters local area network 2700 or at any other time after network device 2702 has been associated with local area network 2700. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 2702 may store a list of network devices 2704, 2706 and 2708 and access device 108 after those devices subscribe to network device 2702. Then, when network device 2702 undergoes a change in status, network device 2702 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 2700, each contain continuously updated statuses of each other device on the network and obtain those statuses and updates through direct communication without necessary use of the cloud.

In some embodiments, network 2700 may include a device 2722. The device 2722 may be located physically on one or more network devices 2702, 2704, 2706, 2708 or in communication with one or more network devices 2702, 2704, 2706, 2708. For example, the device 2722 may be in communication with the device 2702. Such communication with the device 2702 may occur through direct communication or wireless communication. Communication between the device 2722 and the device 2702 may use various protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. In some embodiments, the device 2722 may communicate directly with the network devices 2702, 2704, 2706, 2708. In some embodiments, the device 2722 may communicate with the network devices 2702-2708 via the gateways 110, 112 (e.g., communication) and/or the cloud network 114.

The device 2722 may be implemented as or included in a computing device with processing capabilities. For example, the device 2722 may include one or more memory storage devices and one or more processors. In some embodiments, the device 2722 may include local cache 2730. A memory storage device can be accessible to the processor(s) and can include instructions stored thereon which, when executed by the processor(s), causes the processor(s) to implement one or more operations disclosed herein as being performed by the device 2722. The device 2722 may include network connection capability to access to a network, such as the network 2700. The device 2722 may communicate with the network 2700 in a manner similar to that of the access device 108 or the devices 2702, 2704, 2706. The device 2722 may be located in a stationary position (e.g., mounted to a physical structure or on a device) or it may be a mobile. For example, when stationary, the device 2722 may be mounted to a wall (e.g., a wall mounted control unit).

In some embodiments, the device 2722 may store, either in its cache 2730 or memory, information to enable actions to be initiated at the device 2722. The information may be similar to the information 2740. The information may include criteria that indicate when actions are to be performed. The criteria may indicate events based on which actions may be initiated. Such events may be related to interaction with an interface 2710 (e.g., a graphical interface or a physical interface) corresponding to the device 2722. In some embodiments, interaction with the interface 2710 may initiate actions in addition those that may be performed to control operation of the device 2722 configured to be controlled by the interface 2710. The actions may be performed based on the information stored in the cache 2730. Actions may include those described in the present disclosure, which may be performed by a device.

The device 2722 may include an interface 2710. The interface 2710 may include any human-to-machine interface. For example, the device 2722 may include a standalone interface such as an interface found on a computing device (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an internet of things (IoT) device interface (e.g., an Internet enabled appliance such as a wall switch, a control interface, or the like). In some embodiments, the interface may include a capacitive touch area configured to detect motions, gestures, devices, or combinations thereof. The interface 2710 may be configured to control operation of one or more devices 2702, 2704, 2706, 2708 to which the device 2722 may communicate.

Figure 30:
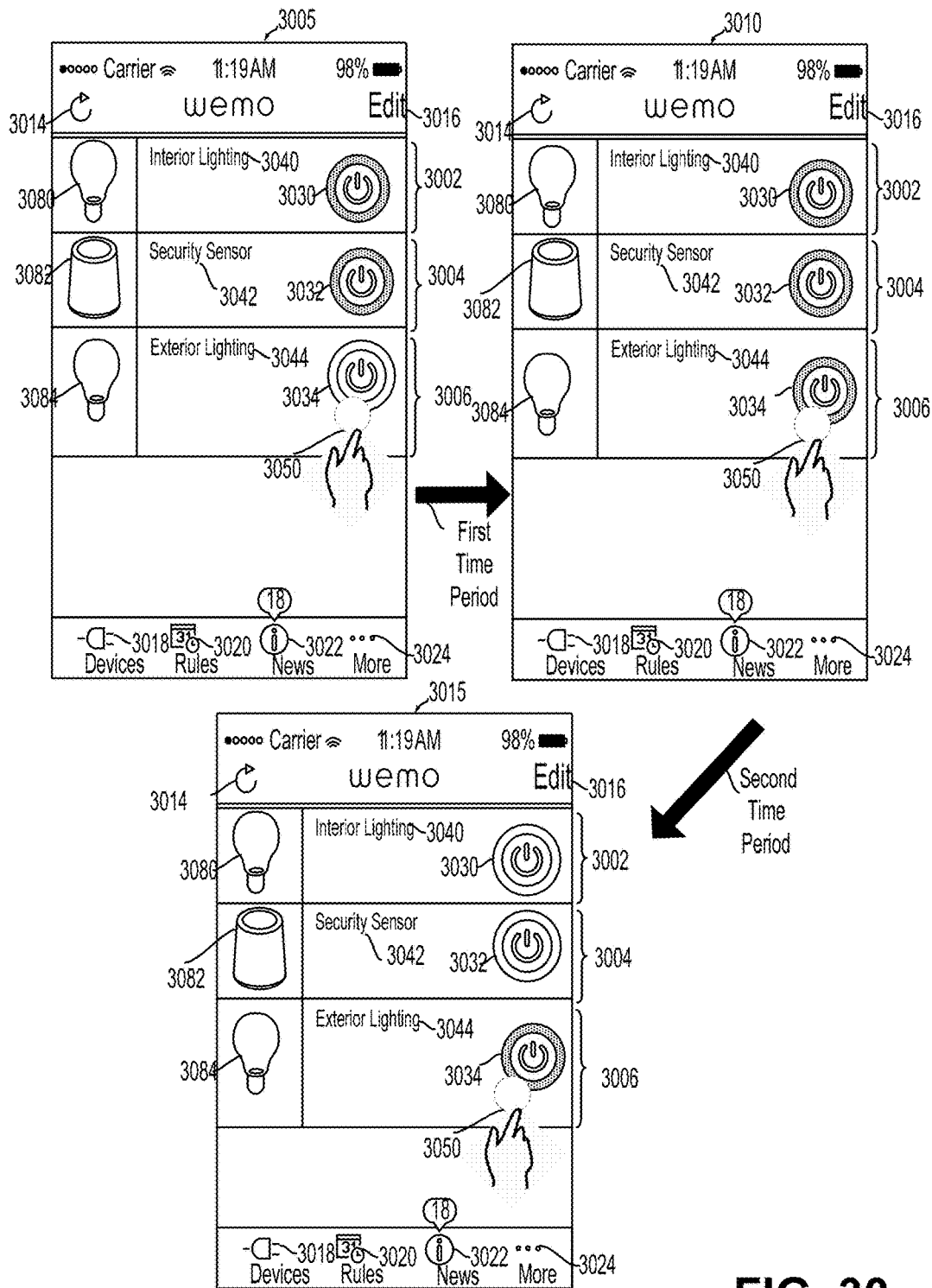
FIGS. 30-35 depict examples of various interfaces for initiating and/or configuring actions in accordance with some embodiments.
Figure 32:
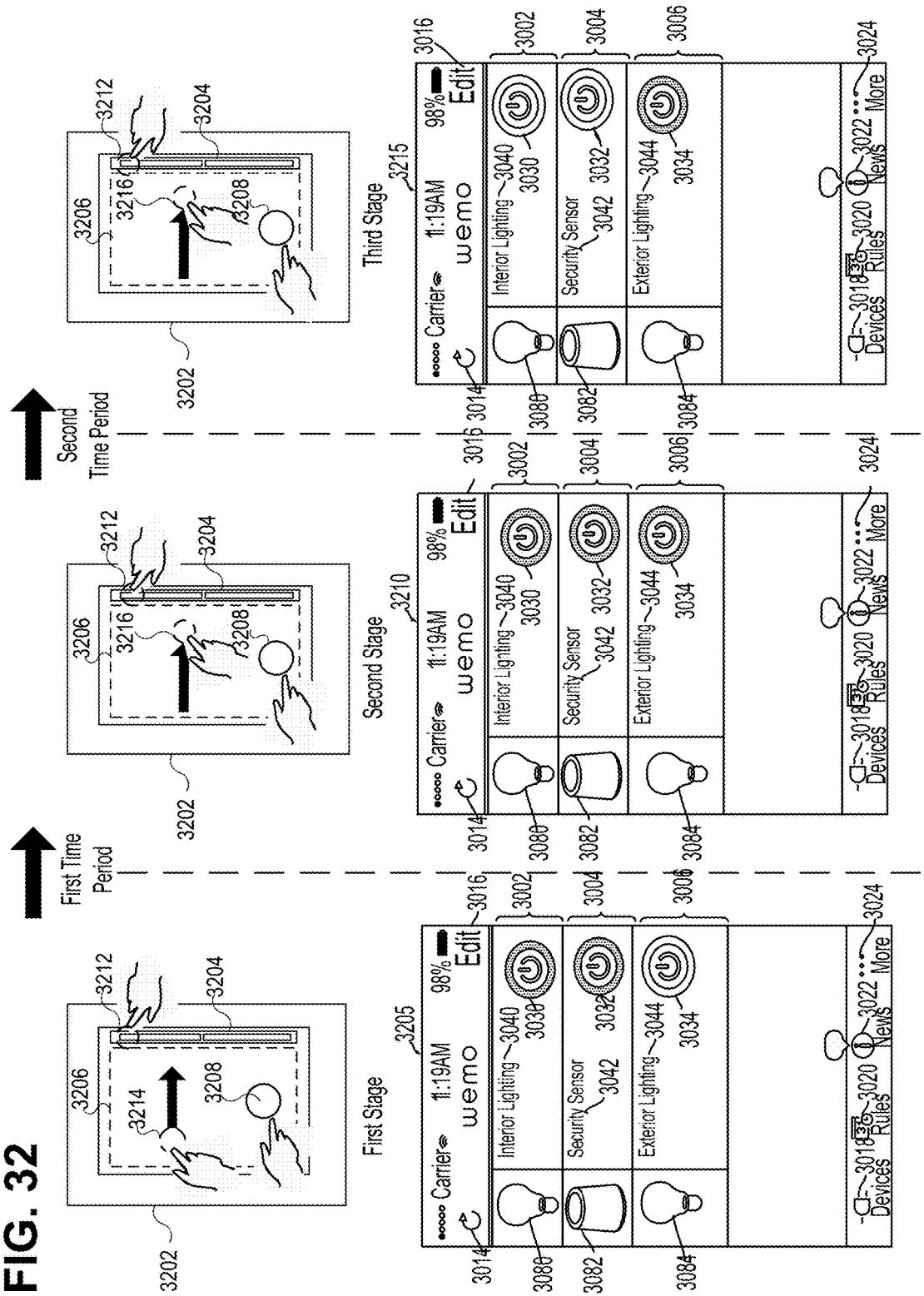
Figure 33:
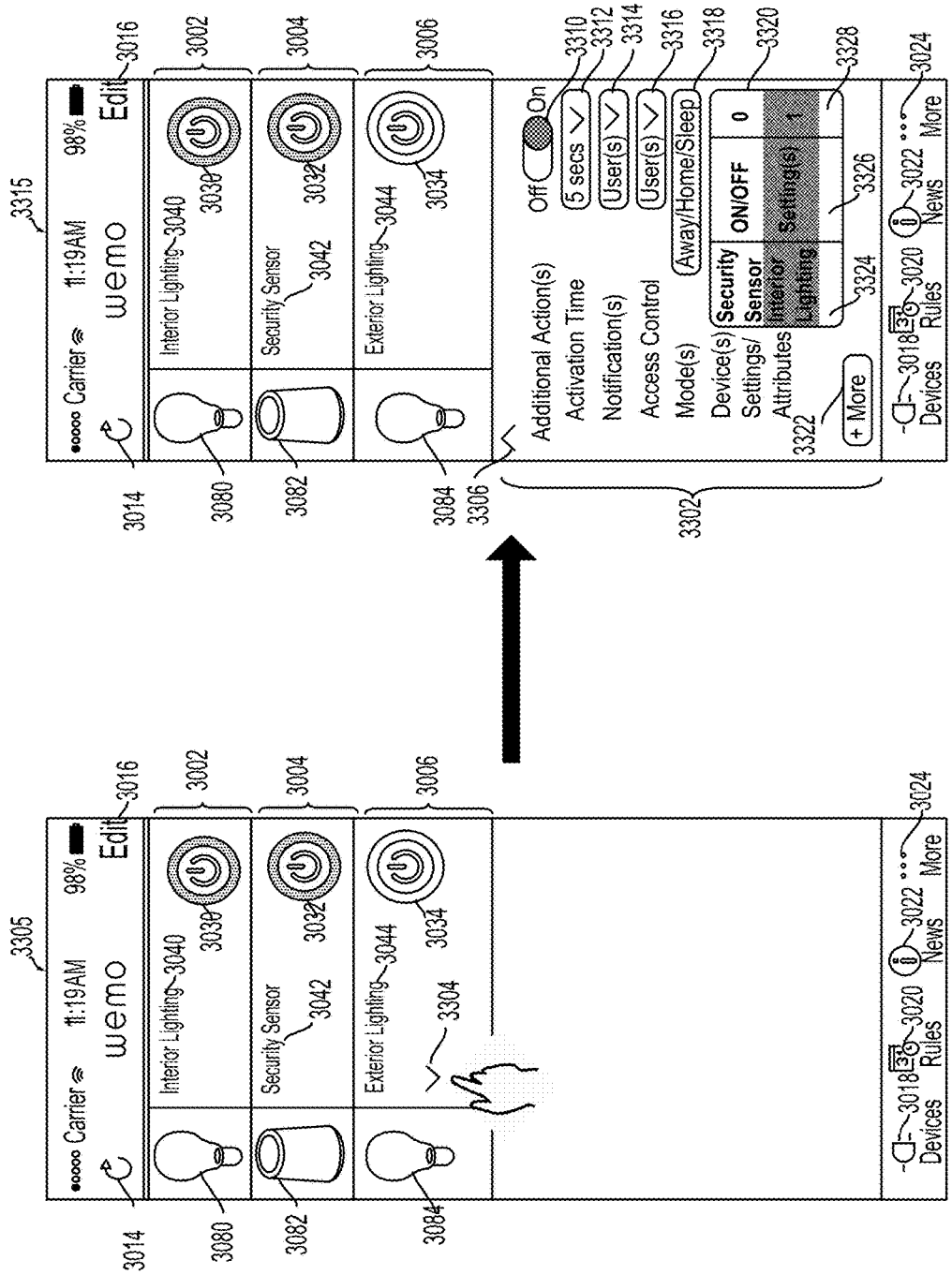
Figure 34:
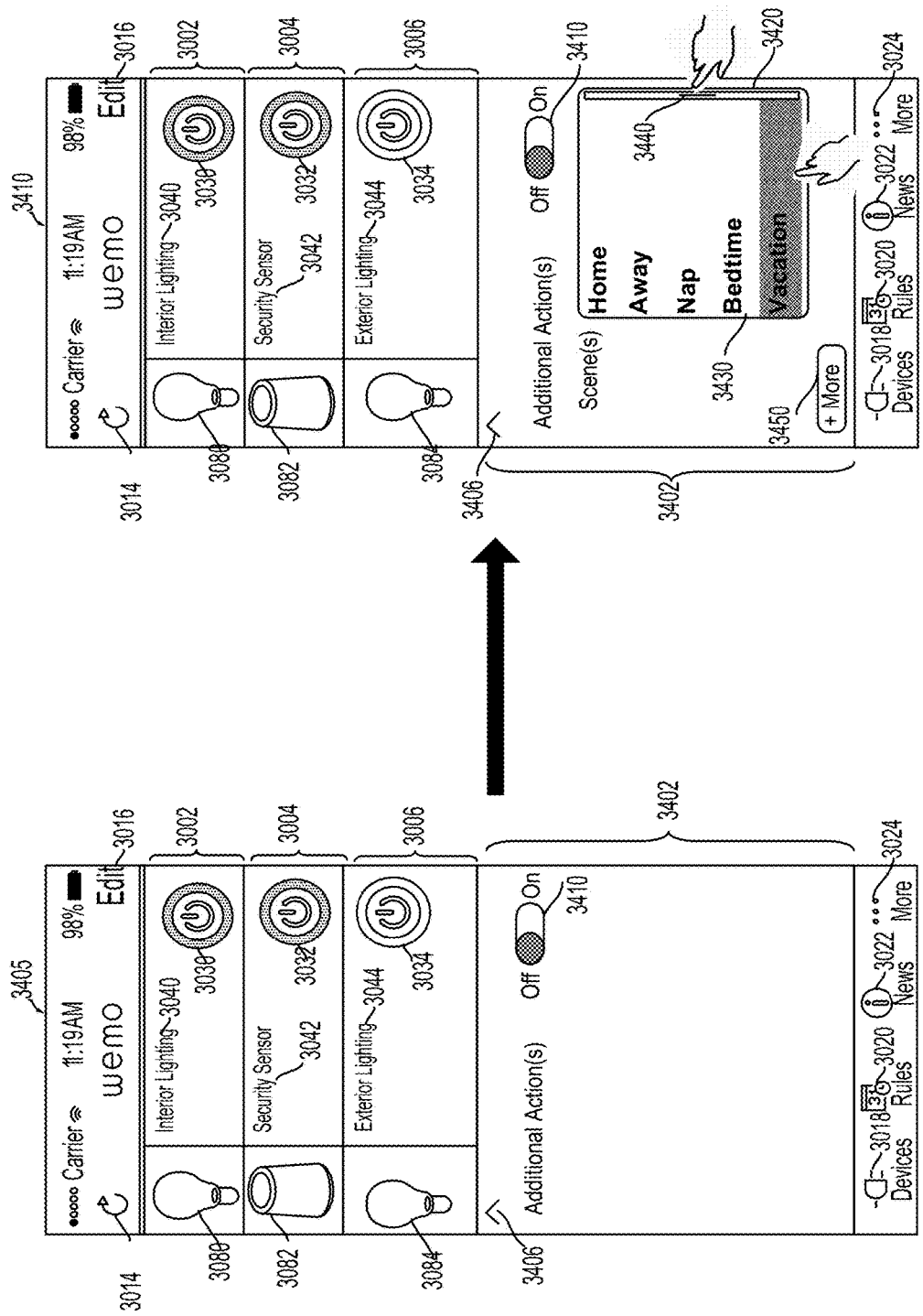
Figure 35:
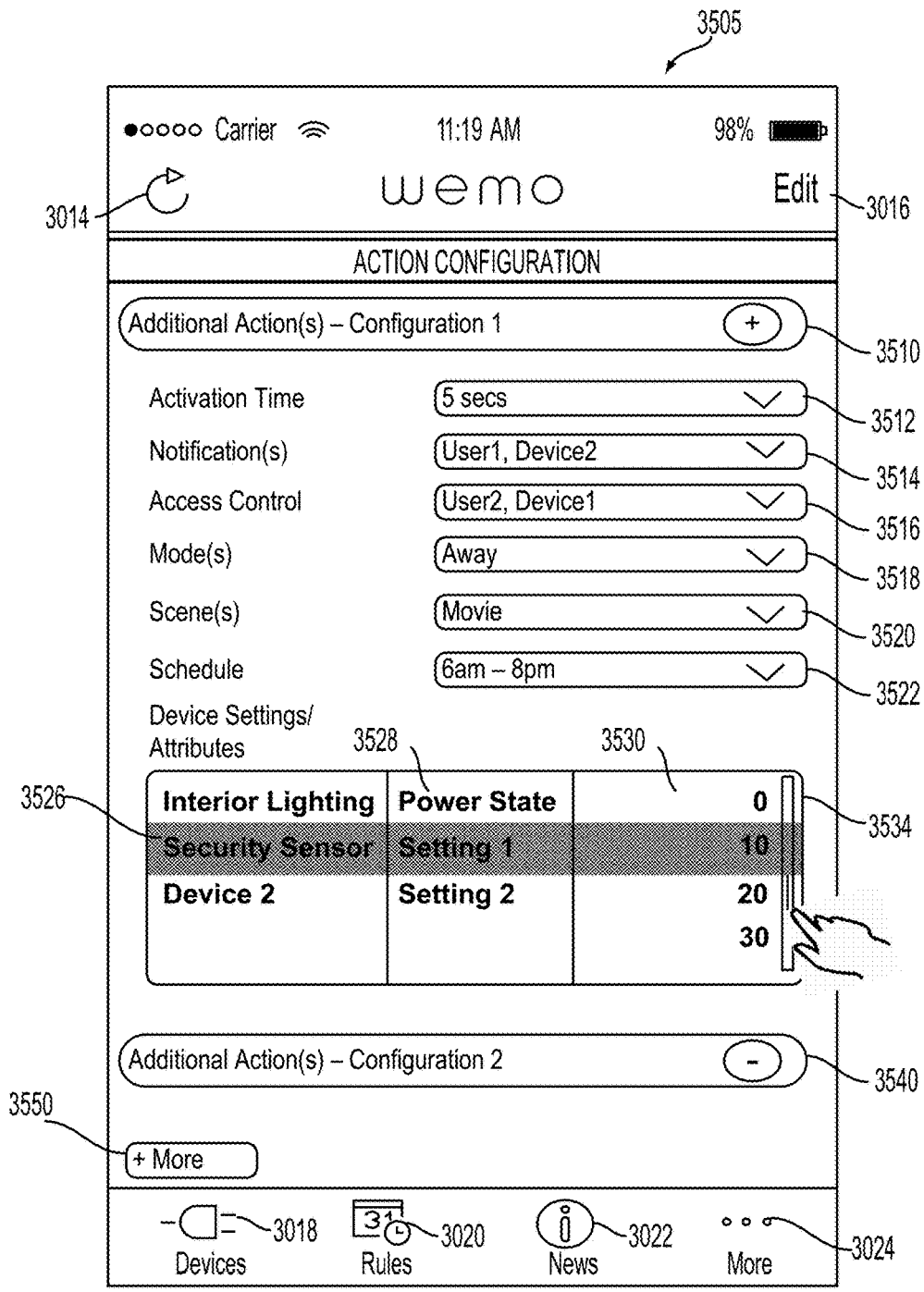

Through interaction with the interface 2710, actions may be performed based on criteria indicated by the information stored in cache 2730. In some embodiments, actions may be performed based on information received from other devices, such as one of the devices 2702, 2704, 2706, 2708 and/or the access device 108. The information may include criteria indicating what actions are to be performed and when such actions are to be performed. The interface 2710 may enable a user to specify criteria, e.g., the criteria in the information stored in cache 2730. Examples of the interface 2710 are described further with reference to FIG. 32. The interfaces described with reference to FIGS. 33-35 illustrate techniques for configuring criteria to perform actions. FIGS. 30 and 32 also show other examples of interfaces that may be implemented as the interface 2710.

FIG. 28 illustrates examples of information 2800 including criteria of initiating actions according to some embodiments. Specifically, the information 2800 can be stored by a device including any one of the access device 108, the device 422, the network device 2702, the network device 2704, the network device 2706, or the network device 2708). For example, the information 2800 can be included in the information 2740 and/or the information 540. The information 2800 may be useful to enable a device to determine actions to perform, when to perform those actions, and/or how to perform those actions. FIG. 28 shows an example representative of the type of information including criteria that a device may use to determine actions to be initiated based on input received from interaction with an interface (e.g., a physical interface or a graphical interface). In some embodiments, the information 2800 may include more or fewer actions and/or criteria. The information 2800 may be included in or may correspond to rules associated with network devices.

The information 2800 shown in FIG. 28 is an example of criteria for initiating actions at a device (e.g., a network device or an access device). The actions may be initiated upon satisfaction of the criteria. The information 2800 may include multiple records, each record containing action(s) 2810 and additional action(s) 2820 to initiate along with the actions(s) 2810. An action 2810 may be initiated for interaction with an interface (e.g., a graphical interface or a physical interface), such as the interface 410. The actions 2810 may be performed upon interaction with an interactive area of an interface. The interactive area may correspond to a one or more network devices. The additional action(s) 2820 may be performed based on extended or continued interaction with the interactive area. Extended or continued interaction may include interaction with the interactive area extending beyond a threshold time period, when additional action(s) are performed. The extended or continued interaction may occur for a longer period of time and/or may include interaction different from network devices than a device which caused initiation of the actions 2810. The action(s) 2810 may include adjusting or setting a state of operation (e.g., adjusting a power state for a network device). The additional action(s) 2820 may include adjusting one or more attributes and/settings corresponding to operation of one or more network devices. The attributes and/settings may include a power state related to operation of a network device. The information 2800 may include criteria configured based on input received from a user. The input may indicate criteria for performing actions 2820. In some embodiments, the action(s) 2810 may be performed for a network device corresponding to an interface and the additional action(s) 2820 may be initiated for the same network device and/or other network devices or group of network devices.

In some embodiments, the actions (e.g., the actions 2810 or the additional action(s) 2820) may be performed based on satisfaction of criteria including an activation time 2830 (e.g., a time period). The activation time 2830 may be pre-determined. The action(s) 2810 may be performed based on receiving input corresponding to an interaction with an interface. The interaction may be received in an interactive area corresponding to a network device. The actions 2810 may be performed for the network device corresponding to the interactive area. Additional action(s) 2820 may be performed based on input corresponding to interaction with the interactive area occurs for a time period that satisfies or exceeds threshold time period corresponding to the activation time 2830. The activation time 2830 may correspond to the network device, which corresponds to the interactive area. In some embodiments, multiple activation times may be configured for initiation of actions. A first activation time may correspond to a first threshold when additional action(s) 2820 may be initiated. A second activation time may correspond to a second threshold when other additional action(s) may be performed after the first activation time. The additional action(s) 2820 may include controlling operation of one or more network devices according to attributes and/or settings indicated by the information 2800. The additional action(s) 2820 may be chosen based on the network device for which input was received from the interactive area.

The information 2800 in FIG. 28 provides an example of criteria indicating actions to be performed based on interaction with an interface. The action(s) 2810 may be performed based on input received from interaction with the interface. In this example shown in FIG. 28, the actions 2810 include controlling a power state of a network device, such that an action is performed to adjust a network device to the power state indicated by the information 2800. The action(s) 2810 may be chosen based on a current state 2805 of an attribute (e.g., power state) of the network device to be adjusted. For example, for a light bulb, the action 2810 may include adjusting a power state to "ON" when the current power state of the light bulb is "OFF," or vice versa. Continuing with the example, the additional action(s) 2820 may include controlling operation of other network devices, such as network devices or group of network devices (e.g., an indoor lighting system, an exterior lighting system, or security sensor). The additional action(s) 2820 may be performed to adjust network devices upon determining that interaction with the interface occurs for at least the activation time 2830. The activation time 2830 may be chosen based on a current state of a network device before the action(s) 2810 is performed. In one example, the additional action(s) 2820 may include controlling a power state and/or adjusting one or more attributes (e.g., brightness) or settings of the network devices. The attributes and/or settings shown as the additional action(s) may indicate the desired settings and/or attributes to be adjusted. In some embodiments, the additional action(s) 2820 may include controlling operation of different types of network devices, such as a sensor and a light. In some embodiments, the additional action(s) 2820 may be performed to control network devices regardless of their current state.

In some embodiments, a record (e.g., the record 2802 or the record 2804) in the information 2800 may indicate criteria for an access control 2840. The access control 2840 may indicate one or more users that may configure and/or initiate actions corresponding to an action. For example, the record 2804 may include two users, a first user (e.g., "User 1"), such as a "Son," and a second user (e.g., "User 2"), such as a "Daughter," both of which may configure and initiate the actions in the record 2804. In some embodiments, a device (e.g., the device 422) that processes the information 2800 may determine a user interacting with the interface (e.g., the interface 410). In such embodiments, the device may determine whether actions in 2840 can be performed for the light bulb based on whether the user has access as indicated by the access control 2840 of the record 2840.

In some embodiments, a record (e.g., the record 2802 or the record 2804) in the information 2800 may include information about notifications 2850 that may be provided about the actions 2810 or the actions 2820 that may be initiated for the record. The notifications 2850 may indicate the users that can be notified regarding the actions performed for a corresponding record. In FIG. 28, the notifications 2850 may indicate one or more users that may be notified about activation of actions 2820. For example, the record 2804 may include a user, such as a user (e.g., "User 3") that may be provided with a notification when the actions 2820 are initiated. The notifications may include sending a message the user. The message may be communicated to devices associated with a user, such as an access device or a computing device. The message may include an email, an SMS message, a video message, other types of communication messages, or combinations thereof. A notification may be useful to enable a user to become aware of the presence of others based on the actions performed in response to interaction with an interface. The presence of a user at a location may be inferred from a notification about an action performed with respect to actions 2810, 2820 that may be performed at the location. In this example, the notifications may be useful for a parent to learn when their son and/or daughter are present at a location where actions 2810, 2820 are performed on the devices.

In some embodiments, the information 2800 may indicate modes of operation. For example, the information 2800 may indicate one or more modes of operation corresponding to the actions 2810, 2820 that may be performed. In one example, each record (e.g., the record 2802 and the record 2804) may correspond to one or more modes. The modes may be used to determine actions to be performed based on the information 2800. Criteria that may be received from a user may indicate modes of operation to be associated with actions. In some embodiments, a user may indicate a mode of operation at an interface of a device, such as a visual interface presented on the display 2622 of the access device 108. The mode of operation, if selected before interaction with an interface for controlling a network device, may be used to determine the actions 2810 and the actions 2820 that can be performed. In one example, the record 2802 include a mode indicating when the actions 2810 and the actions 2820 in the record 2802 may be performed. In some embodiments, the information 2800 may include criteria such as a schedule (e.g., a date and/or a time) when actions 2810, 2820 corresponding to a record may be performed. Thus, the actions 2810, 2820 may be performed in response to interaction with an interface during a time corresponding to the schedule.

FIG. 29 illustrates examples of information 2900 including criteria of initiating actions according to some embodiments. Specifically, the information 2900 may be stored by a device including any one of the access device 108, the device 422, the network device 2702, the network device 2704, the network device 2706, or the network device 2708). For example, the information 2900 can be included in the information 2740 and/or the information 540. The information 2900 may be useful to enable a device to determine actions to perform, when to perform those actions, and/or how to perform those actions. FIG. 29 shows an example representative of the type of information including criteria that a device may use to determine actions to be initiated based on input received from interaction with an interface (e.g., a physical interface or a graphical interface). In some embodiments, the information 2900 may include more or fewer actions and/or criteria. The information 2900 may be included in or may correspond to rules associated with network devices.

The information 2900 in FIG. 29 shows an example of criteria for performing actions with respect to a variety of scenes 2910. In this example, actions 2920 and additional actions 2930 may be associated with a scene. In some embodiments, actions may be performed based on a selected scene. The information 2900 indicates states and/or settings/attributes related to operation of network devices. As shown, actions may be performed to adjust network devices according to the states and/or settings/attributes corresponding to a scene. The actions may be initiated based upon the criteria for a scene. In the example shown in FIG. 29, the information 2900 may include scenes such as a movie scene 2902, a normal scene 2904, a reading scene 2906, and a default scene 2908. Any number of states, settings, and/or attributes may be specified for network devices controlled for a scene. In some embodiments, network devices may be adjusted to an "OFF" power state, while others are adjusted for their settings/attributes in an "ON" power state.

Scenes may correspond to preferences of a user for performing actions and controlling operation of network devices. The preferences may be based on environmental preferences that are based on use of network devices. In the example provided, for example, a movie scene may correspond to preferences for operating network devices while a movie is being watched. For the movie scene 2910, the additional actions 2930 may include adjusting network devices, such as a speakers, living room lighting, and appliances (e.g., a popcorn maker). The additional actions 2930 may include adjusting attributes and settings of these network devices. When a user interacts with an interface configured to control a light bulb for a time period satisfying the activation time, the actions 2930 may be performed. In some embodiments, the scenes 2910 may include a default scene 2908. For example, the default scene may be activated when interaction with an interface to control the light bulb lasts for at least the activation time.

The information 2900 may include multiple records 2902-2908, each record containing action(s) 2920 and additional action(s) 2930 to initiate after the action(s) 2920 are initiated. The actions 2920, 2930 corresponding to a record may be performed based on a scene 2910 in the scene 2910 indicated in a record. Network devices, such as those indicated in the records, may be configured to operate according to the chosen scene. In some embodiments, a scene may be chosen via interaction with an interface (e.g., an interface presented on the display 2622). In some embodiments, a scene 2910 may be triggered upon satisfaction of an activation time 2940 corresponding to a record. The activation time 2940 may indicate a time when additional actions 2930 are initiated. The additional actions 2930 may be initiated when interaction with an interface occurs for at least the activation time 2940. The interaction may correspond to controlling a network device (e.g., the light bulb 2708) identified in the actions 2920. The additional actions 2930 may be configured for the scene 2910. By interacting with an interface for the activation time, the additional actions 2920 may be initiated according to the scene.

In some embodiments, notifications 2940 may be sent upon activation of a scene. For each of the scenes 2902-2908, notifications may be sent to different users. The user may be associated with information to determine a destination (e.g., email address, device address, phone number, etc.) for delivery of a notification. The notification may be sent either when a scene is activated, deactivated, or both.

Throughout FIGS. 30-35, various graphical interfaces (e.g., displays) and/or physical interfaces (e.g., a switch, a button, or the like) are shown for initiating and/or configuring actions in accordance with some embodiments. A physical interface may be on a device (e.g., the network device 2702, the network device 2704, the network device 2706, or the network device 2708) that is controlled using the physical interface. A physical interface may be on a device (e.g., the device 422) in communication with one or more devices (e.g., the network device 2702, the network device 2704, the network device 2706, or the network device 2708) that are controlled by the physical interface. A graphical interface may be displayed by an access device (e.g., the access device 108) rendering one or more visual interfaces to enable control of operation of network devices (e.g., the network devices 2702, 2704, 2706, 2708).

A device controlled by an interface (e.g., a physical interface or a graphical interface) may include or be communicatively coupled to a network device. Visual interfaces may be rendered upon execution of a visual interface module by an application on an access device (e.g., the access device 108). The visual interfaces may be shown with one or a combination of modular tiles, interactive areas, interactive elements, icons, links, command regions, windows, toolbars, sub-menus, drawers, and buttons that are used to initiate actions, invoke routines, monitor network devices, configure network devices, control network devices, or invoke other functionality. The initiated actions may include, but may not be limited to, displaying a status of a network device, displaying a current state of a network device, displaying historical data associated with a network device, displaying a last known status of a network device, adjusting one or more settings and/or one or more attributes related to operation of a network device, adjusting one or more secondary settings of a network device, sending notifications, implementing rules that cause other actions to be performed, initiating actions, or a combination thereof. For brevity, the differences occurring within the figures, as compared to previous or subsequent figures, are described and illustrated below for purposes of illustration.

FIG. 30 shows an example of interfaces presented by a device (e.g., the access device 108 or the device 422) according to some embodiments. In particular, FIG. 30 shows a display 3005 that presents a graphical interface with modular tiles 3002, 3004, 3006 for interacting with network devices in a network. The modular tile 3002, modular tile 3004, and the modular tile 3006 may correspond to network device 2702, network device 2704, and network device 2706, respectively. A modular tile may enable interactions to monitor and/or control operation of a network device corresponding to the modular tile. Interaction with a modular tile may enable a user to initiate one or more actions in addition to operating a network device corresponding to the modular tile. The additional action(s) may offer enhanced functionality that may not be available from a typical interface (e.g., a graphical interface or physical interface) that enables a user to control operation of a network device. The additional action(s) may include actions, for example, the additional action(s) 2820 or the additional action(s) 2930. The FIGS. 33-35 described further below may enable a user to configure such additional action(s).

A modular tile may include interactive areas or interactive elements to enable interaction with the modular tile. The modular tiles 3002, 3004, 3006 may each include respective icons 3080, 3082, 3084, and respective names 3040, 3042, 3044 corresponding to a network device. For example, the modular tile 3002 corresponds to the network device 2702 (e.g., a light bulb) and includes an interactive element depicted as a power button 3030 for turning the network device 2702 on and off. In another example, the modular tile 3004 corresponds to the network device 2704 (e.g., a motion sensor) and includes an interactive element depicted as a power button 3032 for turning the network device 2704 on and off. In another example, the modular tile 3006 corresponds to the network device 2706 (e.g., a light bulb) and includes an interactive element depicted as a power button 3034 for turning the network device 2706 on and off. An interactive element shown as a control (e.g., power button) may be displayed based on a state of the network device corresponding to the control. An appearance of the interactive element may be altered to be visibly illuminated, colored, shaded, bolded, animated, modified to a different shape, or a combination thereof. Although depicted as a corresponding to a single network device, each modular tile may correspond to multiple network devices, or a group of network devices. For purposes of illustration, a modular tile may be described herein as enabling control for operation of a network device. However, in some embodiments, a modular tile may enable control for operation of multiple network devices, some or all of which may be different.

In some embodiments, a modular tile may be customizable by developers and/or manufacturers of the corresponding network devices. For, example, name 3044 of the modular tile 3004 is customized to indicate the name of a specific type of sensor (e.g., "Security Sensor"). In additional or alternative embodiments, a modular tile may convey status information about a corresponding network device or network devices, including, but not limited to, a firmware version, a last known firmware update status, status for connectivity to a cloud network, registration status (i.e., an indication that the network device has a key or does not), a primary mode of the network device (i.e., on, off), a secondary mode of the network device (i.e., standby, high, low, eco), other modes of operation, a schedule, a scene that is enabled using the network device, settings (e.g., speed or sensitivity) for the network device, one or more attributes (e.g., brightness) related to operation of the network device, additional actions that have been initiated based on interaction with a modular tile, rules that may be in effect for the network device or related to operation of the network device, or a combination thereof.

Each of the modular tiles 3002, 3004, 3006 may be chosen and displayed based on the type and/or capabilities of a network device (e.g., the network devices 3002, 3004, 3006). The display 3005 may be flexible and may dynamically display the most appropriate modular tile 3002 based on an environment in which the application executes. For instance, the display 3005 may enables a mechanism in which a user may pre-configure a modular tile to display an appropriate message for a network device.

FIG. 30 shows that display 3005 may include interactive elements (e.g., selectable icons and links) 3014, 3016, 3018, 3020, 3022, and 3024 outside of the modular tiles 3002, 3004, 3006. For example, refresh icon 3014 may be selected to refresh information presented in display 3005, such as, for example, status and state information displayed in the modular tiles 3002, 3004, 3006. For instance, one or more of the statuses for each of the modular tiles 3002, 3004, 3006, respectively, may be refreshed on an automatic, periodic basis, in addition to being manually updated when refresh icon 3014 is interacted with (e.g., selected).

In some embodiments, the display 3005 may include an edit link 3016. Interaction with the edit link 3016 may enable one or more of the modular tiles 3002, 3004, 3006 to be editable. For example, edit link 3016 may be selected to sort or re-order the sequence of the modular tiles 3002, 3004, 3006 displayed in the display 3005. Upon interaction with the edit link 3016, one or more of the modular tiles 3002, 3004, 3006 may be interacted with to be disabled or removed. Devices icon 3018 may be selected to cause a graphical interface to be presented with one or more network devices that are discovered in a network.

In some embodiments, the display 3005 may include a rules icon 3020. Interaction with a rules icon 3020 may enable a graphical interface that enables customization of display rules pertaining to the network devices. The graphical interface may provide one or more interactive elements to control one or more rules related to control of the network devices (e.g., the network devices 2702, 2704, 2706). In some embodiments, interaction with the rules icon 3020 may enable a graphical interface to enable a user to configure rules, modes, notifications, additional actions, or combinations thereof, any or all of which may be stored locally on the device (i.e., the information 2740, the information 540, the information 2800, or the information 2900 stored on the cache 2602) presenting the display 3005 or other network devices (e.g., the network devices 2702, 2704, 2706). The graphical interface may be presented in the display 3005 or may be shown separately from the display 3005.

In some embodiments, the display 3005 may include a news icon 3022. Interaction with the news icon 3022 may enable a graphical interface to be display which presents news including information associated with the network devices and/or the applications. For instance, interaction with the news icon 3022 may cause a graphical interface to be displayed in the access device to present information related to the network devices controlled via the modular tiles 3002, 3004, 3006 and/or information relevant to the application, such as notifications of available tile updates.

In some embodiments, the display 3005 may include a more icon 3024. Interaction with the more icon 3024 may provide one or more additional graphical interfaces to enable access to additional features for controlling and/or monitoring the network devices in a network. For example, an additional graphical interface may be displayed to control one or more settings and/or attributes of any network devices connected to a network. In another example, an additional graphical interface may be displayed to configure secondary options to be initiated by an interface used to control a network device. An example of an additional graphical interface is described with reference to FIG. 35.

The display 3005 may receive input to adjust one or more settings and/or one or more attributes related to operation of a network device corresponding to a tile presented in the display 3005. The functionalities may include secondary functionalities, tertiary functionalities, etc. beyond primary functionalities (e.g., power control). The display 3005 may be interactive or may include interactive areas configured to receive input to assist the user in controlling functionality, settings, and/or attributes of a network device identified in the display 3005. The display 3005 may be interactive or may include interactive areas to enable initiation of actions and additional actions. The additional actions may include controlling operation of network devices identified in the display 3005 as well as or in addition to other devices not shown.

Each modular tile 3002-3006 may be interactive to receive input. The input received via a modular tile may be used to control operation of a network device corresponding to the modular tile. The input may include one or more contacts by a user. A contact may include a tap, a touch, a pinch, a drag, a click, a swipe, a circular motion, a selection, a continuous movement, other motions, other user interactions, user movements, or combinations thereof. In some embodiments, the input may be received as a single input or a series of inputs to control the network device corresponding to the modular tile. The contact may occur in one or more directions on the display 3005 or a modular tile.

In one illustrative example, the display 3005 can receive input via an interactive area 3050 of the modular tile 3006. The input may be used to control operation of the network device 306 corresponding to the modular tile 3006. The interactive area 3050 may coincide with an interactive element (e.g., the button 3034). The input may be received during a time period (e.g., a first time period). The input may include data corresponding to contact with the interactive area 3050. The contact may be continuous during the time period. The first time period may correspond to a time period when interaction within the interactive area 3050 began until an activation time. The input received during the time period may cause an action (e.g., an action) to be performed. The action may include operation of the network device 2706. The input may correspond to an adjustment for controlling operation of the network device 2706. The network device 2706 may be controlled based on the adjustment. For example, a power state of the network device 2706 may be changed in response to the input. In this example, the network device 2706 is turned to an "on" power state.

The adjustment for controlling operation of the network device 2706 may include adjusting an attribute or an setting (e.g., brightness) of the network device 2706. The adjustment to the attribute can be based on an amount of the input, a length of time when the input is received, a distance of movement corresponding to the input, a direction of the input, or any other data obtained from the input. The network device can be adjusted from a last known state of operation or last known state of an attribute or setting.

In some embodiments, the display 3005 may be modified to a display 3010 in response to the input received during the first time period. The display 3010 may be different from the display 3005 based on the input received during the first time period. Continuing with the example above, the display 3005 may be modified to cause the button to be displayed with an indication that the network device 2706 has a power state of "ON."

Input may be received via the display 3010 during a time period (e.g., a second time period) occurring after the first time period. The second time period may occur immediately after the first time period. In some embodiments, the second time period may begin before an activation time (e.g., the activation time 2830) has been reached. The activation time may correspond to a threshold time or a threshold time period, which when reach, additional actions may be performed based on the input received via the display 3010. The second time period may end at a time that occurs at the threshold time period has been reach or exceeded. The input may be received via the interactive area 3050 in which input was received during the first time period. The input may correspond to continuous contact with the interactive area through the first time period and the second time period. The input received via the interactive area during the second time period may cause one or more additional actions (e.g., the additional action 2820 or the additional actions 2930) to be performed. In some embodiments, the additional actions may be performed when the threshold time period has been reached. In the example shown in FIG. 30, the additional actions may include changing a power state to "OFF" for the network device 2702 and the network device 2704 corresponding to the modular tiles 3002 and 3004, respectively. The icons 3030 and 3032 are shown as unshaded to reflect that the network device 2702 and the network device 2704 are off. Therefore, the additional actions may be performed if the threshold time period has been reached at any point during the second time period.

In some embodiments, the display 3010 may be modified to a display 3015 in response to the input received during the second time period. The display 3015 may be different from the display 3010 based on the input received during the second time period. For example, the modular tile 3002 and/or the modular tile 3004 may be modified if a status of a corresponding network device changes in response to the action. As explained above, an additional action may include controlling operation of network devices such as the network device 2702 or the network device 2704 corresponding to the modular tile 3000 and the modular tile 3002, respectively.

Figure 31:
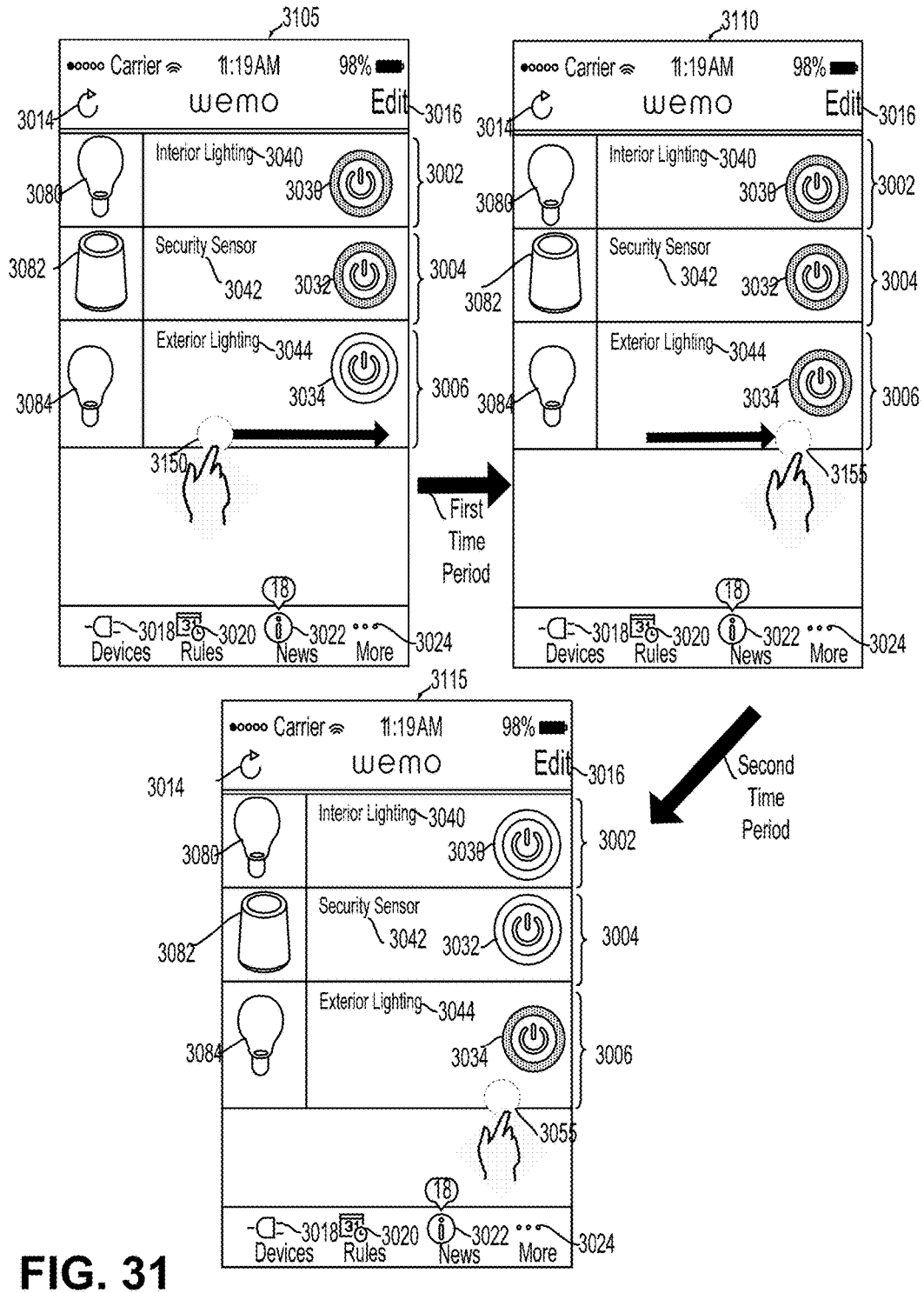

FIG. 31 shows another example of interfaces presented by a device (e.g., the access device 108 or the device 422) according to some embodiments. The display 3105 may include elements described with reference to FIG. 30, such as elements included in the display 3005. The display 3105 includes a graphical interface with the modular tiles 3002, 3004, 3006. The modular tile 3002, modular tile 3004, and the modular tile 3006 may correspond to network device 2702, the network device 2702, and the network device 2706, respectively. The example shown in FIG. 31 also enables a user to initiate one or more additional actions besides controlling operation of a network device identified in the display. For example, interaction with a modular tile may enable a user to initiate one or more additional actions in addition to controlling operation of a network device corresponding to the modular tile.

In the example of FIG. 31, input may be received via a modular tile, such as the modular tile 3006, in the display 3105. The modular tiles 3002-3006 may be interactive to receive input. For example, input may be received via interaction with an area (e.g., an area 3150) of the modular tile 3006. Similar to the example described with reference to FIG. 30, the input may be used to control operation of the network device 2706 corresponding to the modular tile 3006. The input may be received during a time period (e.g., a first time period). The input may include data corresponding to interaction with the area 3150. The interaction with the area 3150 may include one or more contacts with the area 3150 by a user. A contact may include a tap, a touch, a click, a swipe, a motion, a selection, a continuous movement, other motions, other interactions, or combinations thereof.

In the example shown in FIG. 31, the input may correspond to a swipe motion of a user's finger from the interactive area 3150 to a different interactive area 3155 in the tile 3006 during the first time period. The input may include data about the movement in the tile to a different interactive area 3155. The input corresponding to the interaction may be received during the first time period. The first time period may end before, after, or at a beginning of a threshold time period. A threshold time period may be based on an activation time (e.g., the activation time 2830). The activation time may be based on information (e.g., the information 2740, the information 2800 or the information 2900) stored at the device presenting where the interaction occurs. The information may indicate an activation time corresponding to input received for operation of the network device corresponds to the tile 3006. The input received during the first time period may cause an action (e.g., an action) to be performed. The action may include operation of the network device 2706. The input may correspond to an adjustment for controlling operation of the network device 2706. The network device 2706 may be controlled based on the adjustment. For example, a power state of the network device 2706 may be changed in response to the input. In this example, the power state for the network device 2706 is adjusted to an "ON" state.

The adjustment for controlling operation of the network device 2706 may include adjusting an attribute or an setting (e.g., brightness) of the network device 2706. The adjustment to the attribute can be based on an amount of the input, a length of time when the input is received, a distance of movement corresponding to the input, a direction of the input, or any other data obtained from the input. The network device 2706 can be adjusted from a last known state of operation or last known state of an attribute or setting.

In some embodiments, the display 3105 may be modified to a display 3110 in response to the input received during the first time period. The display 3110 may be different from the display 3105 based on the input received during the first time period. Continuing with the example above, the display 3105 may be modified to cause the button to be displayed with an indication that the network device 2706 has a power state of "ON."

Input may be received via the display 3110 during a time period (e.g., a second time period) occurring after the first time period. The second time period may occur immediately after the first time period. In some embodiments, the second time period may begin before an activation time (e.g., the activation time 2830) has been reached. The activation time may correspond to a threshold time or a threshold time period, which when reached, additional actions may be performed based on the input received via the display 3110. The second time period may end at a time that occurs at the threshold time period has been reach or exceeded. The input may be received via the interactive area 3155 in which input was received during the first time period. The input may correspond to continuous contact with the interactive area 3155 during the second time period. In one example, touching the interactive area 3155 immediately after the first time may indicate continuous contact with the interactive area during the second time period. The input received via the interactive area during the second time period may cause one or more additional actions (e.g., the additional action 2820 or the additional actions 2930) to be performed. In some embodiments, the additional actions may be performed when the threshold time period has been reached. Therefore, the additional actions may be performed if the threshold time period has been reached at any point during the second time period.

In some embodiments, the display 3110 may be modified to a display 3115 in response to the input received during the second time period. The display 3115 may be different from the display 3110 based on the input received during the second time period. For example, the modular tile 3002 and/or the modular tile 3004 may be modified if a status of a corresponding network device changes in response to the action. Similar to the example shown in FIG. 30, an additional action may include controlling operation of network devices such as the network device 2702 or the network device 2704 corresponding to the modular tile 3000 and the modular tile 3002, respectively.

FIG. 32 shows another example of interfaces presented by a device (e.g., the device 422) according to some embodiments. Specifically, FIG. 32 illustrates various different types of interaction with a physical interface 3202 (e.g., the interface 410) of a device (e.g., the device 2722). In this example, the physical interface 3202 is a control switch with one or more interactive areas (e.g., a touch pad) and/or interactive elements (e.g., buttons). The interface 3202 may be configured to control operation of at least one network device (e.g., the network device 2706).

FIG. 32 illustrates an example of interaction with the physical interface 3202 during different stages occurring two time periods, a first time period and a second time period. Each display shown below the physical interface shows a status of a network device controlled by interaction with the physical interface 3202 during the different stages.

Beginning at first stage, a user may interact with one of many different interactive areas to control operation of a device corresponding to the physical interface 3202. Interaction with an interactive area may include one or more contacts with the interactive area. In this example, the device corresponding to the physical interface 3202 is the network device 2706, labeled as "Exterior Lighting" in the display 3205. The physical interface 3202 may have one or more interactive elements such as a button 3204. The physical interface 3202 may have one or more interactive areas 3208, 3214 with which the user can physically interact. The interactive areas 3208, 3214 may exist on the physical interface 3202. The physical interface 3202 shown is one of many embodiments of a physical interface.

In some embodiments, physical interface 3202 may be configured to detect a presence of another device (e.g., access device 108 or other type of device) within proximity of the physical interface 3202. The input received based on detecting the presence of another device may be used to control operation of a network device corresponding to physical interface 3202. In some embodiments, a presence of a device may cause a setting or an attribute of a network device to be adjusted. A setting or an attribute may be adjusted with respect to a distance of a device detected as being present near physical interface 3202. For example, the brightness of a light bulb may be adjusted based on the proximity of a device to physical interface 3202. In another example, a power state of a network device may be adjusted based on detection of the presence of a device. In one example, physical interface 3202 could sense a person in possession of a device coming into the room causing a lighting system to be activated upon entry of the person. The lighting system can be adjusted (e.g., deactivated) as the person leaves the room with the device.

In some embodiments, physical interface 3202 may include or be coupled to one or more sensors (e.g., a temperature sensor, a pressure sensor, a light sensor, a motion sensor, or combinations thereof). A sensor may detect the presence of a person or an object (e.g., a device). Input received via physical interface 3202 may be used to control operation of a network device. For example, the presence of an object or the occurrence of an event based on detected input via a sensor may cause operation of a network device to be controlled. In some embodiments, an attribute or a setting of a network device may be adjusted accordingly based on the type of input received from a sensor. A network device may be adjusted based on an occurrence of an event corresponding to input, a distance of an object that is detected, a type of event that is detected by a sensor, other conditions based on input received from a sensor, or combinations thereof. For example, a light system may be activated or deactivated by a gesture from a person detected by physical interface 3202.

Specifically in FIG. 32, an example is shown of controlling operation of a network device based on interaction by a user with physical interface 3202. During the first stage, a display 3205 may be presented at an access device (e.g., the access device 108) showing a status of network devices including the device corresponding to the physical interface 3202. The display 3205 may include elements described with reference to FIG. 30. The network device 2706 is shown as having a power state "OFF" indicated by the icon 3034. A user may interact with any one of the interactive areas of the physical interface 3202 in the first stage during the first time period. A second stage may be reached when a user continues interaction with the physical interface 3202 during the first time period. In one example, a user may press on the interactive area 3208 during the first time period. In another example, a user may interact with the physical interface 3202 by moving a finger from one interactive area 3214 to another interactive area 3216. In some embodiments, a user may repeatedly press or hold down the interactive element 3204 in one direction to control the network device 2706.

A user may reach the second stage by interacting with the physical interface 3202 for the entirety of the first time period. A user may complete interaction by stopping contact with the physical interface 3202. In some embodiments, a user may make continuous contact with the physical interface for a second time period until a third stage is reached. The continuous contact may be uninterrupted from interaction during the first time period. The second time period may occur immediately after the first time period.

Upon reaching the second stage, the network device 2706 including the physical interface 3202 may process the input received during the first time period and determine an action for controlling operation of the network device 2706. The network device 2706 may perform the action. The network device 2706 may store an updated status. The updated status may be communicated to an access device to update the display 3205. The display 3205 may be modified to the display 3210 to indicate that the network device 306 has changed to a power state of "ON." The icon 3034 may be modified to reflect the updated status.

A user may continue interaction with the physical interface 3202 at the second stage through the second time period. As explained above, in some embodiments, the user may continue interaction at any one of the interactive areas 3208, 3214, 3212. The interaction may continue from the second stage to the third stage during the second time period.

The network device 2706 may process the input to determine whether an additional action has been configured corresponding to the interaction during the second time period. In some embodiments, the network device 2706 may determine whether the threshold time period has occurred or been exceeded. In some embodiments, the threshold time period may be reached during the second time period. Upon determining that a user has interacted with the physical interface for the threshold time period, the network device 2706 may perform additional actions that have been configured. In this example, the additional actions include changing a power state of other devices, such as the network devices corresponding to the modular tiles, 3002, 3004. The additional actions may include changing the power state to "OFF" for the network devices corresponding to the modular tiles 3002, 3004. The display 3210 may be updated to present the display 3215 during the third stage. The modular tiles 3002, 3004 are shown as updated with the icon 3030 and the icon 3032 modified to indicate an "OFF" power state.

FIG. 33 shows an example of a graphical interface presented by a device according to some embodiments of the present disclosure. Specifically, FIG. 33 shows a display 3305 presented by an access device. Interaction with the display 3305 may enable a user to initiate and configure additional actions in accordance with some embodiments. The display 3305 may include elements described with reference to FIG. 30, such as elements included in the display 3005. The display 3305 includes a graphical interface with the modular tiles 3002, 3004, 3006. The modular tile 3002, modular tile 3004, and the modular tile 3006 may correspond to network device 2702, the network device 2704, and the network device 2706, respectively. Interaction with a modular tile may enable a user to initiate one or more actions in addition to controlling operation of a network device corresponding to the modular tile.

In some embodiments, a modular tile may include one or more interactive elements to cause the display 3305 to be modified to present one or more visual interfaces. For example, the modular tile 3006 may include an interactive element 3304. Interaction with the interactive element 3304 may cause a visual interface 3302 to be presented by the access device shown in FIG. 33. The display 3305 may be modified to a display 3315 to present the visual interface 3302 as shown in FIG. 33. The display 3315 may include some elements of the display 3305.

The visual interface 3302 may include one or more interactive elements to enable configuration of actions (e.g., additional actions) for one or more of the modular tiles 3002-3006 and additional actions. For example, interactive elements shown in the visual interface may enable configuration of actions to be initiated for interaction with the modular tile 3006. An interactive element 3310 in the visual interface 3302 may enable configuration of actions to be performed in response to interaction with the modular tile 3006. Interaction with the interactive element 3310 to an "ON" state may cause all or a combination of the interactive elements 3312, 3314, 3316, 3318, 3320, 3322, 3324, 3326, 3328 to be enabled for interaction in the display 3310.

Additional actions may be determined based on criteria determined from input to one or more of the interactive elements 3314, 3316, 3318, 3320, 3322, 3324, 3326. The additional actions and/or the criteria for performing additional actions may be stored by a device, e.g., the access device 108, the device 422, or any of the network devices 2702, 2704, 2706.

The visual interface may include the interactive element 3312 (e.g., "Activation Time"). Interaction with the interactive element 3312 may enables a user to indicate a time period (e.g., an activation time) for initiating additional actions. In the example shown in FIG. 33, the activation time is configured to 5 seconds. As explained earlier, interaction with an area in the modular tile 3006 occurring for longer than the activation time may cause additional actions to be initiated.

The visual interface 3302 may include the interactive element 3314 (e.g., "Notification(s)"). Interaction with the interactive element 3314 may enable a user to input notifications to be sent. Although not shown, the interactive element 3314 or other interactive elements may be presented to enable a user to indicate what type of notifications to send, when to send the notifications, and/or the criteria for sending notifications. The input may include information about of users, devices, addresses, contact information, combinations thereof, or any other information that can be used to determine a destination where notifications are to be sent. As described above, an additional action may include sending a notification to users. The notification may be sent to a user via one or more communication techniques that enable the notification to be received by the user. For example, a notification may be sent as an SMS message to devices associated with a user. The notification may include information about or relating to additional actions that are initiated via interaction with the modular tile 3006. The notification may include details about the additional actions that are performed, the actions that are performed, a network device corresponding to the modular tile 3006 by which the secondary notification was initiated, a time when the actions are performed, or any other information related to the additional actions that are initiated.

The visual interface 3302 may include the interactive element 3316 (e.g., "Access Control"). Interaction with the interactive element 3316 may enable a user to indicate criteria related to access control for actions. The interactive element 3316 may enable receipt of information indicating who (e.g., users or devices) that may initiate actions. For example, the interactive element 3316 may enable a user to indicate the users that are permitted to initiate actions via the modular tile 3006. The interactive element 3316 may enable a user to indicate other criteria for enforcing access control. The criteria may include user names, user email addresses, contact information, or the like.

The visual interface 3302 may include the interactive element 3318 (e.g., "Mode(s)"). The interactive element 3318 may enable a user to configure modes. The modes may include, among many others, away modes, home modes, and/or sleep modes. As described in this disclosure, a mode may indicate preferences or criteria for performing actions, such as controlling operation of network devices and sending notifications. The modes may be configured in a separate graphical or visual interface.

The visual interface 3302 may include the interactive element 3320 (e.g., "Device(s) Settings/Attributes"). The interactive element 3320 may enable a user to indicate device settings and/or attributes to be adjusted. Actions may include adjusting devices according to the device settings and/or attributes configured using the interactive element 3320. For example, the interactive element 3320 may be interactive to enable a user to indicate criteria, such as settings and attributes for a network device or group of network devices. The network device(s) may be adjusted to the settings and/or attributes as an action. In some embodiments, the interactive element 3320 may include a control 3324 to enable selection of a network device or group of network devices to adjust. The interactive element 3320 may include a control 3326 to enable selection of an attribute or a setting to adjust for a network device or group of network devices. The interactive element 3320 may include a control 3328 to enable selection of criteria (e.g., a value or a state) to set for an attribute or a setting chosen using the control 3326. The interactive element 3320 may enable a user to configure an action for an adjustment of multiple network devices or multiple groups of network devices based on settings and/or attributes.

The visual interface 3302 may include an interactive element 3322, which enables one or more interactive elements, not shown in the visual interface 3302, to be displayed in the visual interface 3302. The display 3315 may show more or fewer interactive elements to configure an action. In some embodiments, multiple visual interfaces, such as the visual interface 3302, may be shown in the display 3315. The visual interface 3302 may enable multiple actions to be controlled, each corresponding to a different modular tile. The visual interface may enable multiple actions to be configured for a single modular tile. In some embodiments, each action may be configured for a different activation time. In the example shown, multiple actions may be performed according to the criteria indicated by the interactive elements 3312, 3314, 3316, 3318, 3320, 3322, 3324, 3326, 3328.

The visual interface 3302 may include an interactive element 3306. Interaction with the interactive element 3306 may cause the display 3315 to be modified such that the visual interface 3302 is no longer visible or hidden in the display 3315.

FIG. 34 shows an example of a graphical interface presented by a device according to some embodiments of the present disclosure. Specifically, FIG. 34 shows an example of a display 3405 presented by an access device according to some embodiments. The display 3405 may be used to initiate and configure actions in accordance with some embodiments. The display 3405 may include elements described with reference to FIG. 30, such as elements included in the display 3005. The display 3405 includes a graphical interface with the modular tiles 3002, 3004, 3006. The modular tile 3002, modular tile 3004, and the modular tile 3006 may correspond to network device 2702, the network device 2704, and the network device 2706, respectively. Interaction with a modular tile may enable a user to initiate one or more actions in addition to controlling operation of a network device corresponding to the modular tile.

In the example shown in FIG. 34, the display 3405 may include the visual interface 3402. The visual interface 3402 may be displayed by interacting with an interactive element on the modular tile 3006. The visual interface 3402 may include an interactive element 3406 to cause the visual interface 3402 to be hidden from display. The visual interface 3402 may include an interactive element 3410, which may enable configuration of actions to be performed in response to interaction with the modular tile 3006. Interaction with the interactive element 3410 to an "OFF" state may cause the visual interface 3402 to hide other interactive elements used to configure actions.

The display 3405 may be adjusted to the display 3415 when the interactive element 3410 is adjusted to an "ON" state. In the "ON" state, the visual interface 3402 may include one or more interactive elements to enable configuration of actions for one or more of the modular tiles 3002-3006. In the example shown, the visual interface 3402 may enable actions to be configured for the modular tile 3006. The visual interface 3402 may include an interactive element 3420 (e.g., "Scene(s)"). The interactive element 3420 may enable a user to select a scene to perform as an additional action upon interaction with the modular tile 3006. The scene may be associated with criteria for performing actions. For example, the information 2900 may be stored by a device to determined actions to perform based on a selected scene. The interactive element 3420 may include an interactive element 3430 to select one of many scenes, which may have been pre-determined or specified by a user. The interactive element 3420 may include a scroll bar 3440 to view other scenes not visible. The visual interface may include an interactive element 3450 (e.g., "More") to view additional interactive elements to configure actions. In some embodiments, selecting the interactive element 3450 may cause another graphical interface to be shown, such as the one shown in FIG. 35.

FIG. 35 shows an example of a graphical interface presented by a network device according to some embodiments of the present disclosure. Specifically, FIG. 35 shows an example of a display 3505 presented by an access device according to some embodiments. The display 3500 may present one or more interactive components (e.g., elements interactive areas, controls, or the like) to configure actions for a modular tile corresponding to a network device. The display 3500 may include one or more elements described earlier, such as interactive elements included in FIG. 30. In some embodiments, the display 3500 may be presented in response to an interaction with any of the displays described with reference to FIGS. 30-34 or an interaction with a tile, such as any one of the tiles 3002, 3004, 3006 described earlier. For example, the display 3500 may be presented in response to an interaction with the rules icon 3020, the more icon 3024, or any of the interactive elements 3322, 3422, 3550 described earlier. Upon configuring actions via the display 3500, actions may be performed in response to interaction with an interactive area to which the actions are assigned.

In the example shown in FIG. 35, the display 3500 includes one or more graphical interfaces. The display 3500 may include one or more interactive elements. In some embodiments, the display 3500 may include an interactive element to configure one or more additional actions. For example, the display 3500 may include an interactive element 3510 to configure an action (e.g., "Action 1") and an interactive element 3540 to configure a secondary action (e.g., "Action 2"). An additional action may be configured to be performed based on one or more criteria.

In some embodiments, each of the interactive element 3510 and the interactive element 3540 may control presentation of one or more components (e.g., interactive elements or graphical interfaces) to be displayed. The components may enable configuration of criteria for one or more additional actions. The components may include present one or more options for selection of one or more criteria for the additional actions. The options may include values, ranges, or any other criteria that may be chosen. The components may be interactive to receive input indicating criteria for the additional action.

In one example, interaction with the interactive element 3510 may enable components such as an interactive element 3512, an interactive element 3514, an interactive element 3516, an interactive element 3518, an interactive element 3522, and an interactive element 3534 to be displayed. These interactive elements are illustrated as examples. Some embodiments may include more or fewer interactive elements, which may be displayed or arranged differently and which may be configured differently.

The interactive element 3512 may enable a user to configure of a time period (e.g., "Activation Time"). The time period (e.g., 5 seconds) may be when an action is triggered in response to interaction with an interactive area. For example, as explained earlier, the time period may be a threshold time period at or after which an action may be performed.

The interactive element 3514 may enable a user to configure notification(s) (e.g., "Notification"). The interactive element 3514 may enable a user to provide input for sending notifications such as a type of notification, where to send a notification, and/or how to send a notification. Additional actions may include sending notifications based on the input received The interactive element 3516 may enable a user to input information related to access control for performing actions. The interactive element 3516 may receive input about users that may be permitted to initiate additional actions.

The interactive element 3518 may enable a user to input one or more modes. Additional actions may be performed based on the chosen mode(s). In some embodiments, other criteria may be stored in association with the mode(s).

The interactive element 3520 may enable a user to input one or more scenes. Additional actions may be performed based on the chosen scene(s). In some embodiments, other criteria may be stored in association with the scene(s).

The interactive element 3522 may enable a user to input schedules for performing additional actions. The schedules may include a date and/or time when additional actions are to be initiated.

The interactive element 3534 (e.g., "Device Settings/Attributes"). The interactive element 3534 may enable a user to indicate device settings and/or attributes to be adjusted. Additional actions may include adjusting network devices according to the device settings and/or attributes configured using the interactive element 3534. For example, the interactive element 3534 may be interactive to enable a user to indicate criteria, such as settings and attributes for a network device or group of network devices. The network device(s) may be adjusted to the settings and/or attributes as an action. In some embodiments, the interactive element 3534 may include a control 3526 to enable selection of a network device or group of network devices to adjust. The interactive element 3534 may include a control 3528 to enable selection of an attribute or a setting to adjust for a network device or group of network devices. The interactive element 3534 may include a control 3530 to enable selection of criteria (e.g., a value or a state) to set for an attribute or a setting chosen using the control 3528. The interactive element 3534 may enable a user to configure an action for an adjustment of multiple network devices or multiple groups of network devices based on settings and/or attributes.

The display 3500 may include an interactive element 3550 (e.g., "More") to cause the display 3500 to change to show additional interactive elements when one or more interactive elements are unable to be displayed in the display 3500.

Figure 36:
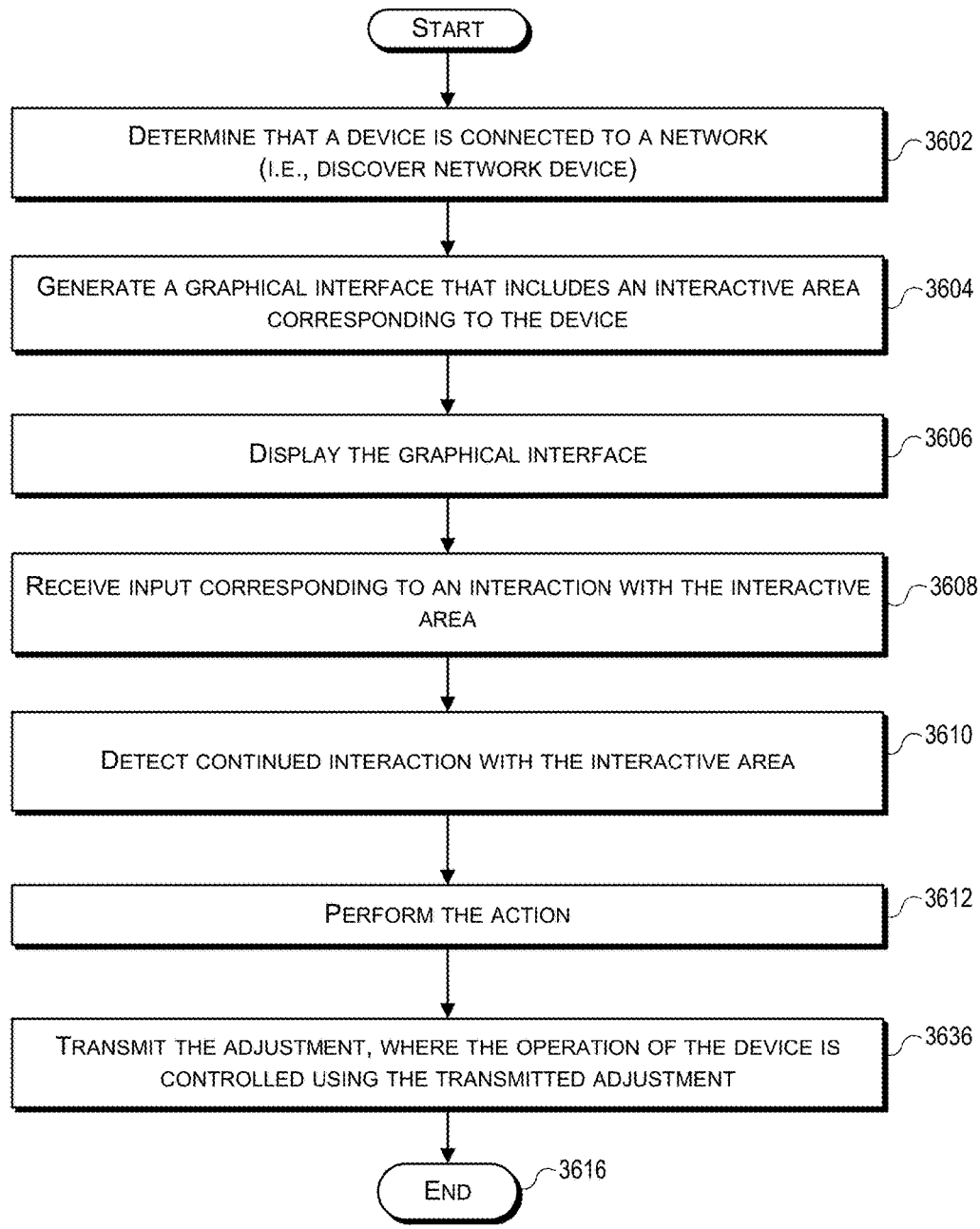
FIG. 36 is a flowchart illustrating a process for initiating actions using an interface configured to control operation of a network device in accordance with some embodiments.
Figure 37:
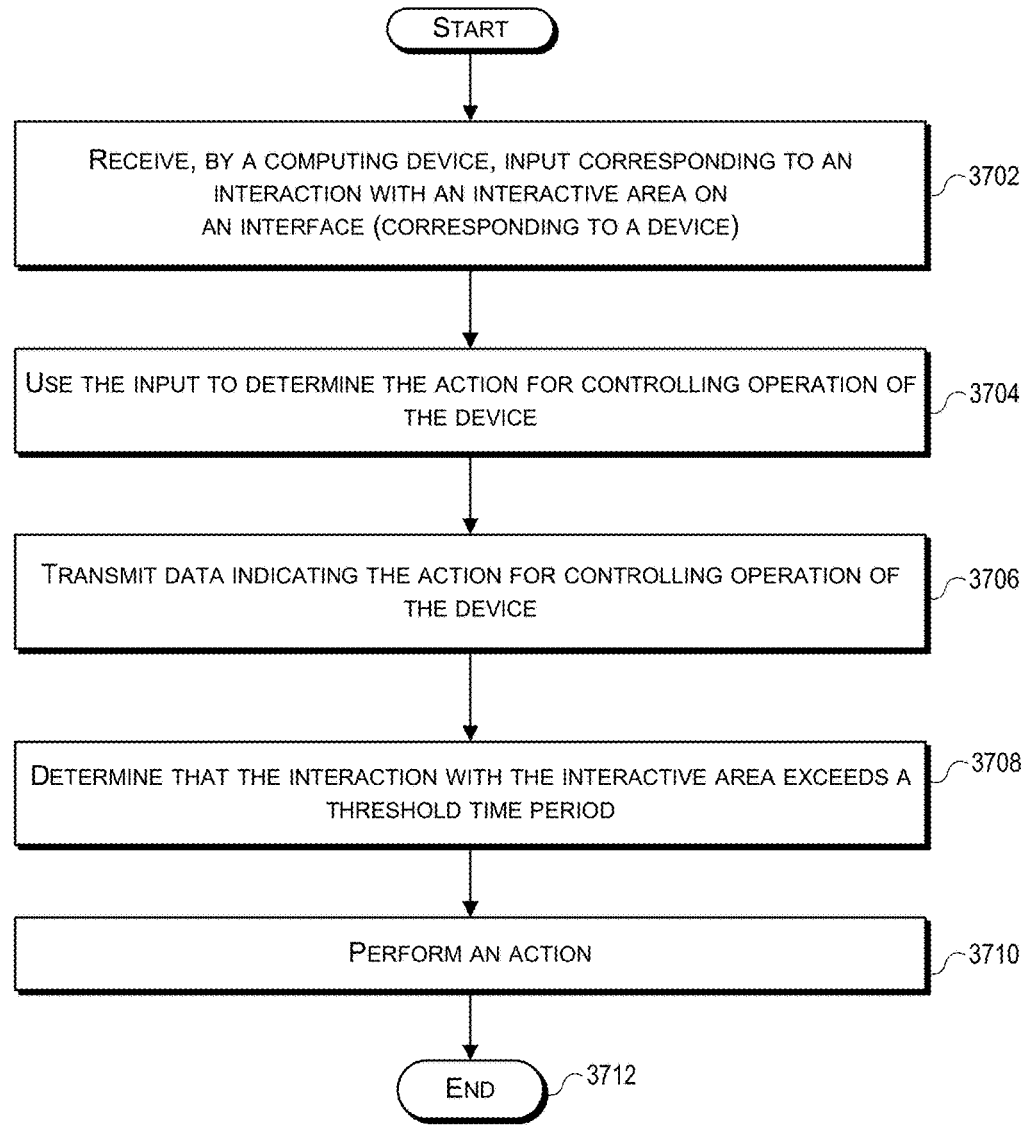
FIG. 37 is a flowchart illustrating a process for initiating actions using an interface configured to control operation of a network device in accordance with some embodiments.
Figure 38:
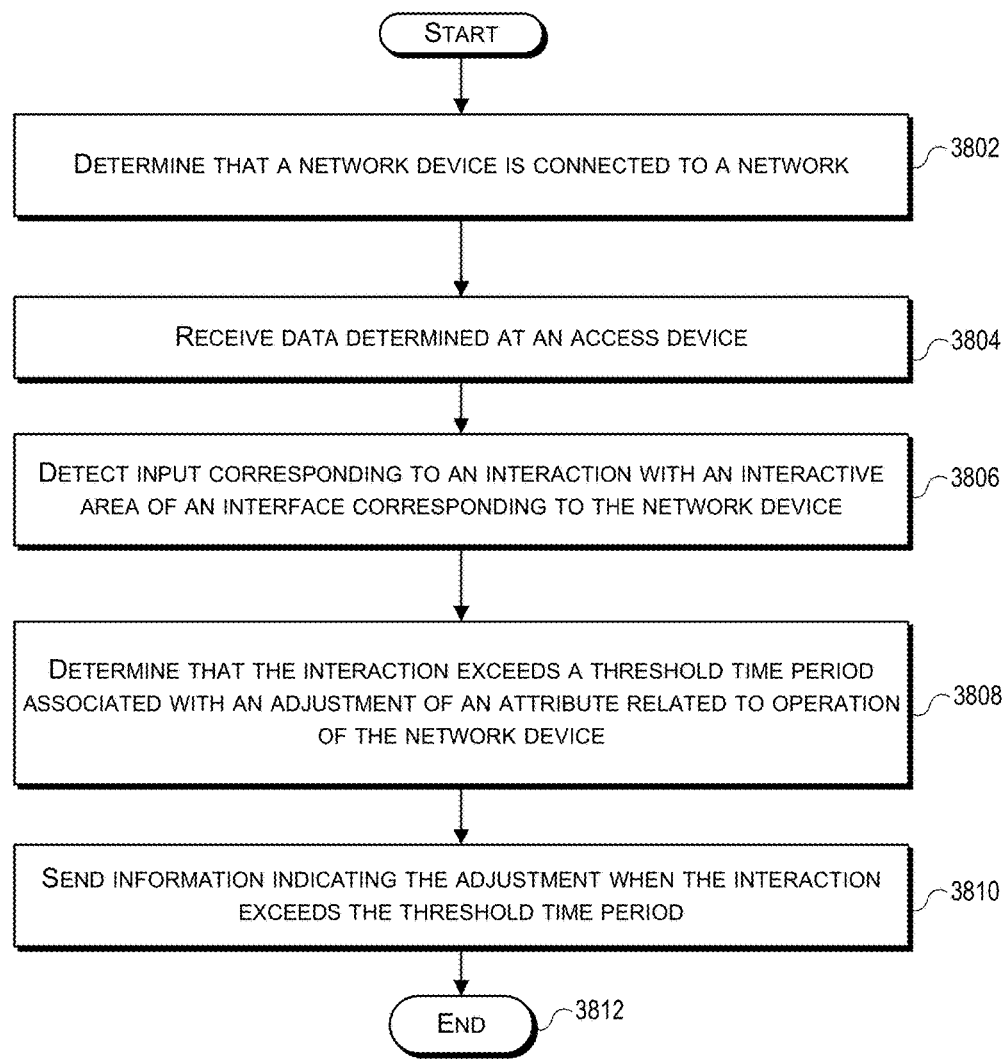
FIG. 38 is a flowchart illustrating a process for initiating actions using an interface configured to control operation of a network device in accordance with some embodiments.

Now turning to FIGS. 36-38, flowcharts are illustrated of processes for initiating actions using an interface configured to control operation of a network device. FIG. 36 is an example of a process to initiate actions from a graphical interface presented at a device (e.g., the access device 108). FIG. 37 is an example of a process to initiate actions from a physical interface on a device (e.g., the device 422). The physical interface may correspond to a network device to be controlled. FIG. 38 is an example of a process for initiating actions using an interface configured to control operation of a network device in accordance with some embodiments.

In FIG. 36, a flowchart is illustrated of embodiments of a process 3600 for initiating actions using an interface configured to control operation of a network device in accordance with some embodiments. Specifically, the process 3600 provides techniques to enable one or more actions (e.g., additional actions) to be performed in response to continued interaction with an interactive area of an interface corresponding to a network device. The one or more actions may include controlling operation of network devices connected to a network. The action(s) may include actions besides controlling operation of the network device corresponding to the interactive area of an interface in which continued interaction occurs.

In some embodiments, the techniques to enable one or more actions in response to continued interaction with an interactive area may be implemented by a computing device (e.g., the access device 108 of FIG. 1) regardless of whether the computing device is connected to a network or in remote communication with the network. For example, the process 3600 may be performed by a computing device (e.g., the access device 108 of FIG. 1) that is not connected to the network or not in communication with the network (i.e., at a remote location outside the network).

Process 3600 is illustrated as a logical flow diagram, the operation of which represents operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Additionally, the process 3600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Beginning at block 3602, a network device (e.g., network device 302, network device 304, network device 306, or network device 308) may be determined to be connected to a network (e.g., the network 300). Determining that a network device is connected to a network may include performing operations to discover that the network device is on the network. For example, block 3602 may be performed as part of discovery process to identify one or more network devices connected to the network. To determine that a network device is connected to a network, local storage of a computing device (e.g., access device 108) may be searched for a unique identifier associated with the network device. A unique identifier may be associated with the network device when the network device connects to the network. As such, locating a unique identifier in storage may indicate that the network device is connected to the network and thus, has been discovered. A unique identifier for the network device may be received from the network device itself or from the network upon establishing connection with the network.

At block 3604, a graphical interface (e.g., any one of the displays 2622, 3005, 3105, 3205, 3305, or 3505) may be generated. The graphical interface may include an interactive area corresponding to one or more network devices connected to a network. The interactive area may be interactive to control operation of the network device. At block 3606, the process 3600 may include displaying the graphical interface generated at block 3604.

At block 3608, input corresponding to an interaction with the interactive area may be received. The interactive area may correspond to one or more network devices connected to a network. The input received via the interactive area may be associated with an adjustment for controlling operation of a network device connected to a network. For example, the access device 108 may receive, via the display 3005, input corresponding to interaction at area 3050 corresponding to the button 3034. In some embodiments, the input may include information corresponding to an adjustment for an attribute or a setting related to operation of the network device. For example, the input may include information corresponding to a value to set or update an attribute or a setting related to operation of the network device. The input may include data that may be used to determine information (e.g., an adjustment) to control operation of a network device.

In some embodiments, an adjustment to a network device may correspond to input based on interaction with the interactive area. The input may correspond to or indicate a frequency of contact with the interactive area, a distance over which the interaction occurred in the interactive area, a duration (e.g., a time period) of the interaction with the interactive area, type of contact with the interactive area, or combinations thereof. A type of contact with the interactive area may include physical contact with the interactive area by a user. Examples of a physical contact may include, without limitation, touching, selecting, swiping, tapping, pressing, and/or any type of movement with the interactive area. The physical contact with the interactive area may include one or more contacts with the interactive area. In some embodiments, the input corresponding to interaction with an interactive area may occur during a pre-determined time period.

At block 3610, a continued interaction with the interactive area included in the graphical interface may be detected. The continued interaction may cause one or more actions to be performed at block 3612 explained below. The interactive area may correspond to the network device connected to a network. Continued interaction with the interactive area may be detected by determining that the interaction with the interactive area at block 3608 satisfies one or more criteria (e.g., a pre-determined time period) for the interactive area at block 3608. The one or more criteria for continued interaction may be based in interaction with an interactive area, such as a frequency of contact with the interactive area, a distance over which the interaction occurred in the interactive area, a duration (e.g., a time period) of the interaction with the interactive area, type of contact (e.g., a physical contact) with the interactive area, or combinations thereof.

In one illustrative example, the continued interaction with the interactive area may correspond to an interaction with the interactive area exceeding a pre-determined time period. The interaction with the interactive area may begin at block 3608. In some embodiments, continuous interaction (e.g., a physical contact) with the interactive area is maintained during the interaction and the continued interaction. For example, a continued interaction may correspond to pressing the button 3034 at the area 3050 beyond a pre-determined time period.

At block 3612, one or more actions (e.g., an additional action) may be performed. An action may be performed in response to detecting a continued interaction with an interactive area described above with reference to block 3610.

In some embodiments, an action may include controlling operation of one or more network devices. An action may be device specific such that the action is performed for a type of network device. An operation of a network device may be controlled by transmitting an adjustment to the network device. In some embodiments, performing an action may include transmitting a request including an adjustment for controlling operation of one or more network devices connected to a network. The adjustment may be specific to a type of network device controlled by the action. Examples of an action may include, without limitation, initiating a scene for operation of network devices or initiating a mode for operation (e.g., home modes, away modes, or sleep modes) of one or more network devices. A network device controlled in response to a continued interaction with the interactive area may correspond to a network device that is different than the one corresponding to the interactive area. For example, a continued interaction with an interactive area corresponding to a network device may cause an action to be performed for a different network device.

In some embodiments, an action may be performed based on a rule. The rule may indicate one or more actions to perform for controlling operation of a network device. The rule may be related to operation of one or more other network devices connected to the network. The rule may be based on a time, a date, an event, a condition related to operation of a network device, or combinations thereof. In some embodiments, the action may be performed according to a schedule (e.g., a scheduled action). In some embodiments, the rule to perform an action may be modified or created based on one or more criteria received via a graphical interface.

In some embodiments, an action may include sending a notification. The notification may be send to a network to which network devices are connected. The notification may be related to operation of a network device (e.g., the network device determined at 3602). For example, the notification may indicate an adjustment to a network device based on an adjustment corresponding to the input received at 3608. The notification may include an electronic message (e.g., an email message or a text message).

In some embodiments, a computing device may store information indicating one or more actions that can be performed in response to continued interaction with an interactive area. For example, as described with reference to FIG. 3, the access device 108 may store information in cache. The information may include information stored on a computing device, such as information 2800 of FIG. 28 or information 2900 of FIG. 29.

At block 3614, an adjustment may be transmitted. The adjustment may be based on the input received via interaction with an interactive area corresponding to a network device. The adjustment may be transmitted to a network to which a network device is connected. The network device may correspond to the interactive area from which input was received for an adjustment. Operation of the network device may be controlled using the transmitted adjustment.

In some embodiments, the adjustment may be transmitted in an updated status for one or more network devices connected to the network. The updated status may be transmitted to the network via the cloud network 114 if the network device transmitting the updated status is not located in the network. The transmitted adjustment may be received by a network device to which the adjustment is to be made. In some embodiments, when the network device 306 is not powered to an "on" state, the network device 306 may receive the transmitted adjustment upon reconnecting to the network after switching to an "on" state. At block 3616, the process 3600 may end.

It will be appreciated that process 3600 is illustrative and that variations and modifications are possible. Steps described as sequential may be executed in parallel, order of steps may be varied, and steps may be modified, combined, added or omitted. For example, the adjustment transmitted at block 3614 may be performed before, concurrently with, or after an action is performed at block 3612. Process 3600 may be performed for different network devices that are connected to a network. It should be noted that process 3600 may be performed concurrently each of the network devices that are connected to the network. Process 3600 may be performed for any number of network devices that can be controlled via a graphical interface displayable by a computing device. Further, the process 3600 may be performed for several actions that may be performed in response to continued interaction with an interactive area corresponding to a network device.

FIG. 37 is a flowchart illustrating embodiments of a process 3700 for initiating actions using an interface configured to control operation of a network device in accordance with some embodiments. Specifically, the process 3700 provides techniques to enable one or more actions to be performed in response to continued interaction over a time period with an interactive area corresponding to a network device. The techniques may be implemented by a computing device (e.g., the computing device 2722 or any of the network devices 2702, 2704, 2706, 2708) regardless of whether the computing device is connected to a network to which network devices are connected or whether the computing device is in communication with the network via a remote connection (e.g., via cloud 114). The actions performed in response to continued interaction may include controlling operation of different network devices connected to a network.

Process 3700 is illustrated as a logical flow diagram, the operation of which represents operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Additionally, the process 3700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Beginning at block 3702, input corresponding to an interaction with an interactive area on an interface (e.g., a physical interface or a graphical interface) may be received. The interface may correspond to or be associated with a network device. For example, the device 2722 may receive input corresponding to an interaction with an interactive area on the interface 2710. The interface 2710 may be configured to control the network device 2702. The input may correspond to an action for controlling operation of the network device.

As explained above, input corresponding to an interaction with an interactive area may correspond to or indicate a frequency of contact with the interactive area, a distance over which the interaction occurred in the interactive area, a duration (e.g., a time period) of the interaction with the interactive area, type of contact with the interactive area, or combinations thereof. A type of contact with the interactive area may include physical contact with the interactive area by a user.

At block 3704, the input may be used to determine the action for controlling operation of the network device. Continuing with the example above, the device 2722 may process the input to determine an action for controlling operation of the network device 2702 corresponding to the interface 2710. In some embodiments, the device 2722 may use information stored in the cache 2730, e.g., the information 2800 or the information 2900, to determine an action to perform to control the network device 2702. Using the information, the action may be determined based on the type of input, a frequency of the input, a duration of the input, or other rules based on input. For example, the device 2722 may determine that the action for controlling the network device 2702 includes changing a power state of the network device 2702. In some embodiments, the action may be determined based on information stored by another network device connected to the network, such as information stored by one of network devices 2702, 2704, 2706, 2708.

In some embodiments, an action may include controlling operation of one or more network devices. An action may be device specific such that the action is performed for a type of network device. An operation of a network device may be controlled by transmitting an adjustment to the network device. In some embodiments, performing an action may include transmitting a request including an adjustment for controlling operation of one or more network devices connected to a network. The adjustment may be specific to a type of network device controlled by the action. Examples of an action may include, without limitation, initiating a scene for operation of network devices or initiating a mode for operation (e.g., home modes, away modes, or sleep modes) of one or more network devices.

In some embodiments, an action may be performed based on a rule. The rule may indicate one or more actions to perform for controlling operation of a network device. The rule may be related to operation of one or more other network devices connected to the network. The rule may be based on a time, a date, an event, a condition related to operation of a network device, or combinations thereof. In some embodiments, the action may be performed according to a schedule (e.g., a scheduled action). In some embodiments, the rule to perform an action may be modified or created based on one or more criteria received via a graphical interface.

In some embodiments, an action may include sending a notification. The notification may be send to a network to which network devices are connected. The notification may be related to operation of a network device (e.g., the network device determined at 3602). For example, the notification may indicate an adjustment to a network device based on an adjustment corresponding to the input received at 3608.

At block 3706, data may be transmitted to indicate the action for controlling operation of the network device. For example, upon processing the input to determine the action for controlling operation of the network device 2706, the device 2722 may transmit data indicating the action(s) determined based on the input at 3704. Transmitting the data may cause the action to be performed. For example, the network device 2706 may perform the action (e.g., change a power state) based on receive instructions indicated in the transmitted data.

At block 3708, a determination may be made that the interaction with the interactive area exceeds a threshold time period. For example, the device 2722 may determine whether a user interacts (e.g., contacts) an interactive area on the interface 2710 for more than a threshold time period (e.g., the activation time 2830). The threshold time period may be associated with one or more actions 2820 to be initiated upon exceeding the threshold time period.

At block 3710, an action may be performed when the threshold time period is exceeded. Performing the action may include transmitting data to the network device. The data may indicate the action(s) to perform and/or other criteria related to performing those actions. The data may indicate adjustments to attributes and/or settings (e.g., a power state) to be changed. An action may be performed based on the transmitted data.

It will be appreciated that process 3700 is illustrative and that variations and modifications are possible. Steps described as sequential may be executed in parallel, order of steps may be varied, and steps may be modified, combined, added or omitted. Process 3700 may be performed for each network device that is determined to be connected to the network. It should be noted that process 3700 may be performed concurrently for other network devices that are determined to be connected to the network. Process 3700 may be performed for any number of network devices that can be controlled via a graphical interface displayable by a computing device. Further, the process 3700 may be performed for several actions that may be performed in response to continued interaction with an interactive area corresponding to a network device.

FIG. 38 is a flowchart illustrating embodiments of a process 3800 for initiating actions using an interface configured to control operation of a network device in accordance with some embodiments. Specifically, the process 3800 provides techniques to enable one or more actions to be performed in response to continued interaction over a time period with an interactive area corresponding to a network device. The techniques may be implemented by a computing device (e.g., the computing device 2722 or any of the network devices 2702, 2704, 2706, 2708) regardless of whether the computing device is connected to a network to which network devices are connected or is in remote communication with the network. The actions performed in response to continued interaction may include controlling operation of different network devices connected to a network.

Process 3800 is illustrated as a logical flow diagram, the operation of which represents operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Additionally, the process 3800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Beginning at block 3802, a network device (e.g., the network device 2702, the network device 2704, the network device 2706, or the network device 2708) may be determined to be connected to a network (e.g., the network 2700). Determining that a device is connected to a network may include performing operations to discover that the device on the network.

At block 3804, data determined at an access device may be received. For example, in FIG. 27B, device 2722 may receive data determined at access device 108. In another example, network device 2702 may receive data determined at access device 108. The data may include data corresponding to information 2740 stored in cache 2602. As explained above, information 2740 may be determined using access device 108. For example, data corresponding to information 2740 may be determined based on input corresponding to interaction with an interactive area of a graphical interface displayed by access device 108. The data received from an access device may indicate an adjustment corresponding to each of one or more attributes or one or more settings related to operation of a network device (e.g., network device 2708). The received data may indicate a threshold time period associated with an adjustment corresponding to an attribute or a setting for a network device.

At block 3806, input may be detected corresponding to interaction with an interactive area of an interface corresponding to the network device. The interaction may be performed by movement in the interactive area. For example, the interaction may be performed by one or more contacts with the interactive area. The interactive area may correspond to one or more network devices connected to a network. The input may be detected based on data received at a device from the interface. The detected input may be associated with an adjustment for controlling operation of a network device connected to a network. In one example, the input may be detected corresponding to interaction with an interactive area of interface 410. In another example, the input may be detected corresponding to interaction at area 3050 of interface 3005.

In some embodiments, the detected input may include information corresponding to an adjustment for an attribute or a setting related to operation of the network device. For example, the input may include information corresponding to a value to set or update an attribute or a setting related to operation of the network device. The input may include data that may be used to determine information (e.g., an adjustment) to control operation of a network device.

At block 3808, using the detected input, a determination is made as to whether the interaction with the interactive area of the interface exceeds a threshold time period. In some embodiments, the interaction exceeds a threshold time period when the interaction with the interactive area is continuous and occurs for a duration of the threshold time period.

At block 3810, information indicating an adjustment may be sent. The adjustment may correspond to an adjustment of an attribute related to operation of a network device corresponding to the interactive area. The information may be sent when an interaction with the interactive area exceeds the threshold time period associated with the adjustment. The sent information may cause operation of the network device to be controlled using the adjustment. The information may be sent by transmitting the information. In some embodiments, the information may be sent by storing the information into memory. Process 3800 may end at 3812.

In some embodiments, process 3800 may include determining a status related to operation of the network device using the adjustment. For example, device 2722 may determine a status related to operation of network device 2708. A message indicating that the status may be sent. For example, the message may be sent from device 2722 to access device 108. The sent message may cause a modification to a graphical interface displayed by the access device. The modification may include displaying the status.

In some embodiments, process 3800 may include generating and displaying a graphical interface. The graphical interface includes an interactive area to configure operation of one or more network devices connected to the network. Process 3800 may include determining additional data based on input corresponding to an interaction with the interactive area included in the graphical interface. The additional data may indicate a modification to the threshold time period associated with the adjustment. In some embodiments, process 3800 may include determining a status related to operation of the network device using the adjustment. The graphical interface may be modified to indicate that the determined status.

It will be appreciated that process 3800 is illustrative and that variations and modifications are possible. Steps described as sequential may be executed in parallel, order of steps may be varied, and steps may be modified, combined, added or omitted. Process 3800 may be performed for each network device that is determined to be connected to the network. It should be noted that process 3800 may be performed concurrently for other network devices that are determined to be connected to the network. Process 3800 may be performed for any number of network devices that can be controlled via a graphical interface displayable by a computing device. Further, the process 3800 may be performed for several actions that may be performed in response to continued interaction with an interactive area corresponding to a network device.

Figure 39:
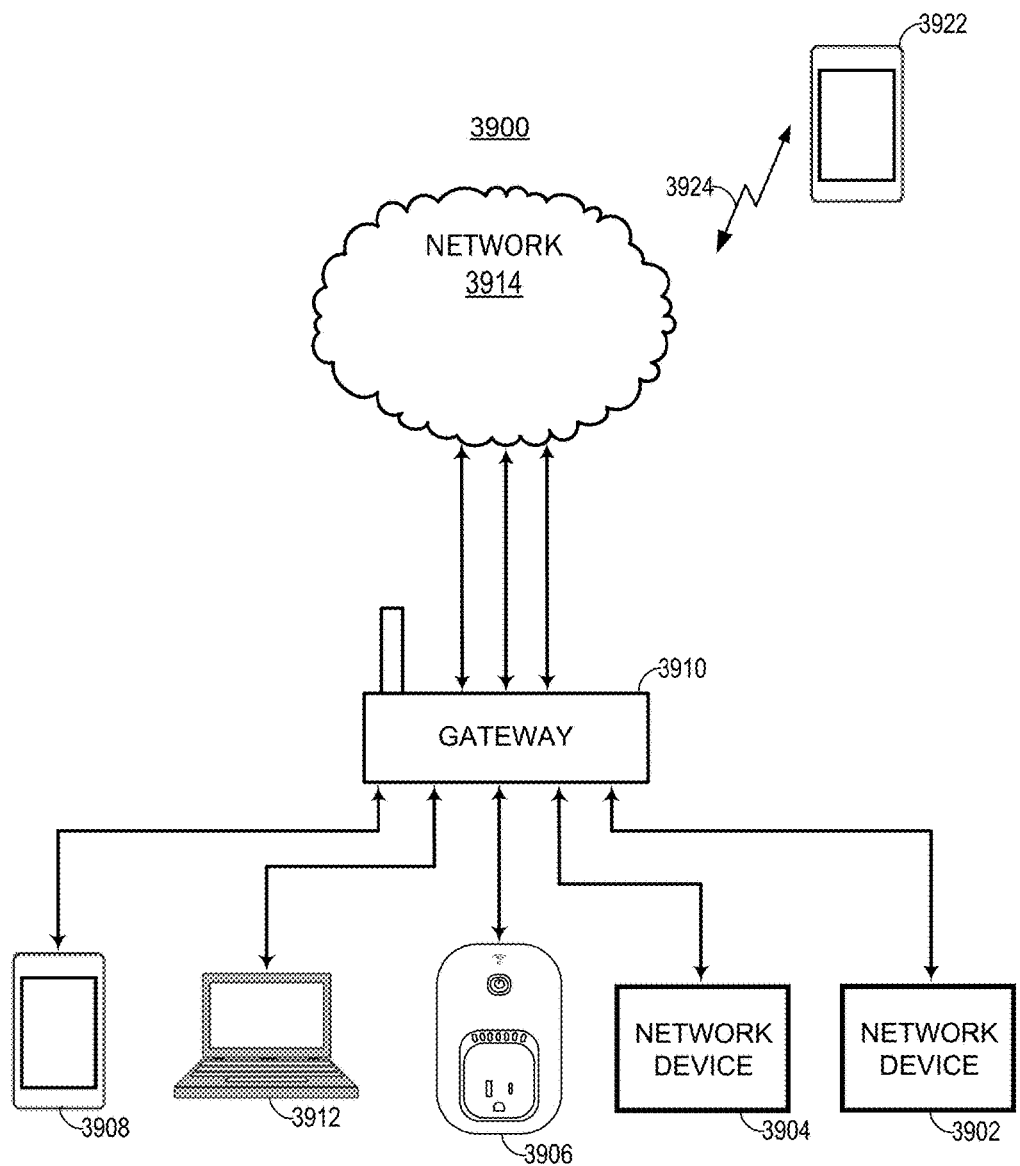
FIG. 39 is an illustration of another example of a network environment, in accordance with some embodiments.

FIG. 39 illustrates an example of a network 3900. Similar to the local area network 100 described above, the network 3900 includes network devices 3902, 3904, 3906, access devices 3908, 3912, a gateway 3910, and an external network 3914. Also illustrated in FIG. 39 is an access device 3922 that can connect to devices on the network 3900 from a remote location that is outside of the range of signals provided by the gateway 3910. The gateway 3910, the network devices 3902, 3904, 3906, the access devices 3908, 3912, 3922, and the external network 3914 may be similar and have the same functionalities and capabilities as the gateway 110 or 112, the network devices 102, 104, or 106, the access device 108, and the external network 114 described above with respect to FIG. 1. It should be appreciated that the network 3900 may have other components than those depicted. Further, the embodiment shown in the figure is only one example of a network that may incorporate an embodiment of the invention. In some other embodiments, network 3900 may have more or fewer components than shown in the figure, may combine two or more components, or may have a different configuration or arrangement of components. For example, while a certain number of network devices, access devices, and gateways are shown in FIG. 39, one of ordinary skill in the art will appreciate that any number of network devices, access devices, and gateways may be included in the network 3900.

Network device 3906 may include an automation switch that a user can remotely access, configure, and control. The network device 3906 also allows a user to remotely access, configure, and control any electronic device that can be plugged into the network device 3906. Network devices 3902 and 3904 may include any type of network device that a user can remotely access, configure, and control, such as a network-connected television, a network-connected video game console, a network-connected video camera, a network-connected appliance, a network-connected light, or any other network-connected device.

Access devices 3908, 3912, and 3922 may include any type of access device that can be used to access devices on the network 3900, including one or more of the network devices 3902, 3904, 3906. For example, similar to the access device 108 described above, access devices 3908, 3912, and 3922 may include any human-to-machine interface with network connection capability that allows access to the network 3900.

In some embodiments, the network 3900 may include a local area network in which the network devices 3902, 3904, 3906 and the access devices 3908, 3912 communicate with one another through the gateway 3910 using wired and wireless connections (e.g., using WiFi™ communication protocols) or communicate with one another directly using one or more direct communication protocols (e.g., UPnP, Bluetooth™, Zigbee™, UWB, WiFi-Direct, BLE, sound frequencies, IR frequencies, and/or the like). Secure connections may be established between the network devices 3902, 3904, 3906 and the one or more service providers through external network 3914. Secure connections may also be established between the access devices 3908, 3912 and one or more service providers through external network 3914. Network address translation (NAT) Traversal applications may be used by networks of the service providers to establish the secure connections. In some examples, the secure connections may include secure TCP connections.

The gateway 3910 may provide NAT services for the network devices 3902, 3904, 3906 and access devices 3908, 3912. The gateway 3910 may perform various types of NAT, including static NAT, dynamic NAT, overloading, overlapping, or any other available NAT service. For example, the gateway 3910 may perform multiplexing to maintain the different secure connections using different TCP or user datagram protocol (UDP) ports. Communications transmitted by the network devices 3902, 3904, 3906 and the access devices 3908, 3912 may include IP packets. One of ordinary skill in the art will appreciate that the communications may include other types of packets. Each IP packet may include a source address, a source port, a destination address, and a destination port. The source address includes the private IP address of the device from which the communication originated. The source port includes the TCP or UDP port number assigned to the packet by the originating device. The destination address includes the IP address of the device to which the communication is destined to be received. The destination port includes the TCP or UDP number that the originating device is requesting be opened. Upon receiving a packet, the gateway 3910 may map private IP addresses of each of the network devices 3902, 3904, 3906 and the access devices 3908, 3912 to one or more public IP addresses maintained by the gateway 3910. The one or more public IP addresses may be assigned to the gateway 3910 (e.g., by an administrator or assignor of IP addresses) and may be unique to that gateway 3910. The gateway 3910 may also map the ports of each of the network devices 3902, 3904, 3906 and the access devices 3908, 3912 to TCP or UDP ports of the gateway 3910.

As illustrated in FIG. 39, multiple client devices (network devices 3902, 3904, 3906 and the access devices 3908, 3912) are connected to the gateway 3910 in order to access network connectivity. A gateway device interface may be provided that allows a user to control and/or configure the client devices.

Figure 40:
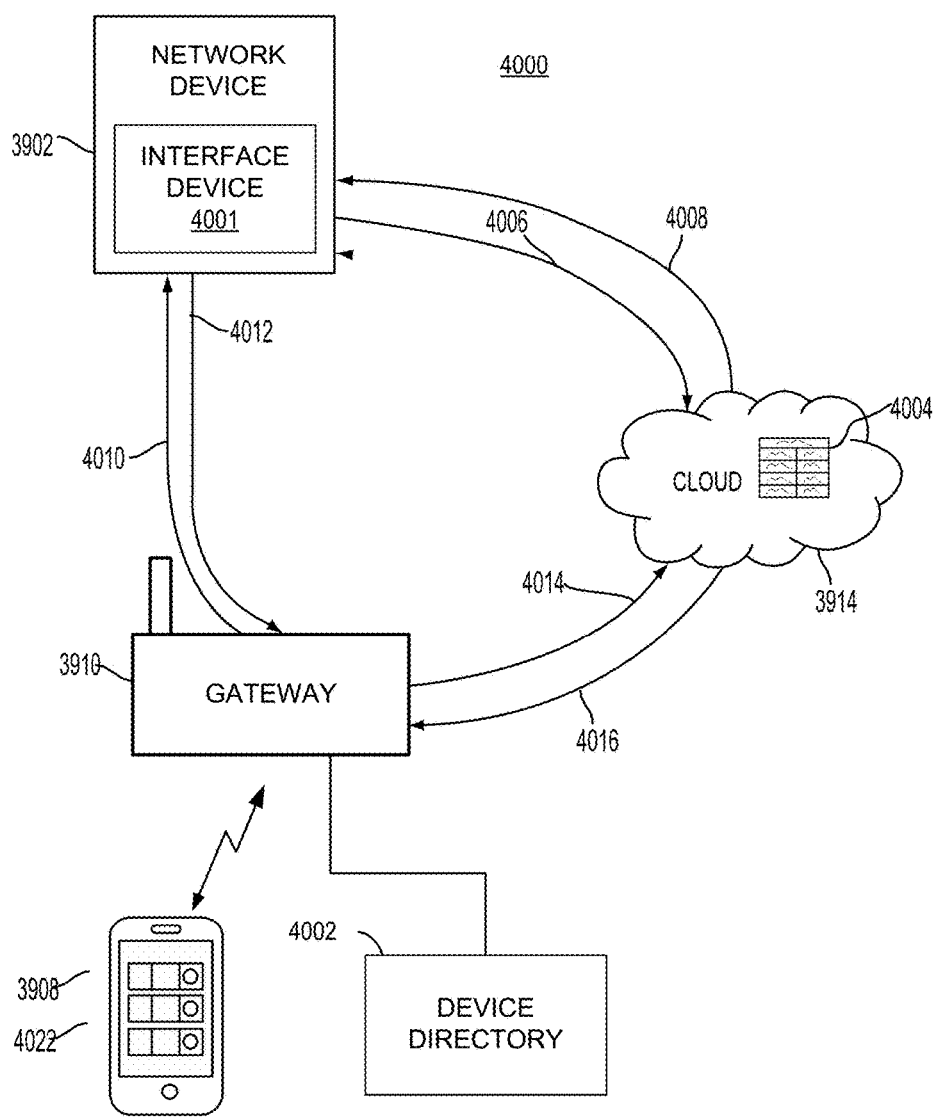
FIG. 40 is an illustration of data flows for providing meta-information and control capabilities of devices connected to a gateway device within an example network environment, in accordance with some embodiments.

FIG. 40 illustrates an embodiment of a system 4000 for detecting network devices (or other client devices) connected to the gateway 3910, and obtaining meta-information and control capabilities of the network devices. The meta-information and the control capabilities may be used to allow users to control the connected devices using the gateway device interface. Gateway 3910 is connected to cloud network 3914, and allows network device 3902 to connect to the cloud network 3914, the Internet, or other external networks using the gateway 3910. In some embodiments, the network device 3902 may be a home automation network device that allows a user to access, monitor, control, and/or configure various home appliances located within the user's home, such as a television, radio, light, microwave, iron, space heater, sensor, and/or the like. In some embodiments, the network device 3902 may include a network-connectable device, such as a smart television that can connect to the Internet, a network-connectable appliance, or any other device that can connect to a communications network.

In an embodiment, a gateway device application may be run on an access device 3908. The application may include a mobile application (e.g., an IoS™ application, an Android™ application, or any other appropriate mobile application). The access device 3908 may execute the application to cause the access device 3908 to present a gateway device interface 4022 displaying information and control objects for each device connected to the gateway 3910. In some embodiments, the access device 3908 may execute a web page that presents the gateway device interface 4022. A user may log in to an account with a user name and a password in order to access the gateway device interface 4022 that is specific to the user's gateway 3910.

In some embodiments, the gateway 3910 can maintain or access a device directory 4002. In some embodiments, the device directory 4002 can be a local cache located in onboard storage of the gateway 3910. In such embodiments, the local device directory 4002 may be associated with the gateway device application executed by or run on access device 3908, and may be accessed only by the gateway device application so that other applications running on the access device 3908 cannot access the device directory 4002. In some embodiments, the device directory 4002 can be a remote storage, database, cache, or other storage mechanism maintained by a web server that provides access to the web-based gateway device interface web page.

The device directory 4002 can contain a list of devices that are known by the gateway 3910 to exist on the local area network (e.g., devices that are connected or that have been connected to the gateway 3910). For example, the device directory 4002 may include a separate record for each known device. The record for a device may include meta-information and control capabilities. The information for a device record may be used to display data related to that device to a user in the gateway device interface. Meta-information for a device may include identifying information of the device, a device specific interface object module indicating a device specific interface object for the device, usage statistics of the device, activity type, status or state of the device, or any other appropriate information that is exposed or published to the gateway device. For example, a connected device may expose identifying information including a unique identifier of the device, such as a universally unique identifier assigned by a cloud server, a MAC address, a serial number of the device, or any other identifier unique to the device. As another example, a connected device may expose a name of its manufacturer. As described in more detail below, the gateway 3910 can determine a device specific interface object for a device using the meta-information exposed by the device. A device specific interface object may include an icon that readily identifies the specific device to a user in the gateway device interface.

In some embodiments, when the gateway device application or web page for the gateway device interface 4022 is run on the access device 3908, the access device 3908 can access information from the device directory 4002 to present the display 4022 with device-specific information. In some embodiments, the gateway 3910 can send the information contained within the device directory 4002 to the access device 3908. In some embodiments, when a web-based gateway graphical interface is used, a web server may send the information contained within the device directory 4002 to the access device 3908. In some embodiments, the access device 3908 may store a local copy of the device directory 4002. The access device 3908 may access information from the local copy of the device directory 4002. In any of these embodiments, the gateway device application or web page can obtain the information in the device directory 4002 in order to display the device-specific information. In an example, the display 3922 can include a displayed tile (e.g., the 4102A displayed in FIG. 41) for each connected network device having a record in the device directory 4002.

Exemplary communications are shown in FIG. 40 that are used to determine the information used to populate the device directory 4002. For example, the gateway 3910 may discover or detect that the network device 3902 is within communication signal range of the gateway 3910. Upon detecting the presence of the network device 3902, the gateway 3910 may send a communication 4010 to the network device 3902. The communication 4010 may include a request to connect and a query for meta-information and/or control capabilities. In some embodiments, a request to connect and a query for meta-information and/or control capabilities may be sent in separate communications. For example, the query may be sent after the network device 3902 is connected to the gateway 3910. In some embodiments, the network device 3902 may initiate the discovery by sending a discovery message (not shown) to the gateway 3910. The discovery of network device 3902 may be initiated when the network device 3902 is rebooted (e.g., powered on, reset or restored to default settings, or the like). For example, when the network device 3902 is rebooted, it may broadcast one or more discovery messages on the local area network to discover gateway devices in the local area network. In one example, a discovery message may be broadcast during a discovery process according to a universal plug and play (UPnP) protocol, a Zigbee™ protocol, a Bluetooth™ protocol, or any other appropriate protocol. In response to the discovery message, the network device 3902 may receive a communications from gateway 3910 indicating that the gateway 3910 is located within the local area network. The communication indicating presence of the gateway 3910 may be part of communication 4010 or may be a separate communication sent prior to communication 4010.

After receiving communication 4010 requesting meta-information and/or control capabilities, the network device 3902 may send communication 4012 to the gateway 3910. The communication 4012 includes the meta-information and the control capabilities that are exposed by the network device 3902. The gateway 3910 may populate the device directory 4002 record for the network device 3902 with the meta-information and the control capabilities, and also with further information determined using the meta-information and the control capabilities. For example, the meta-information includes identifying information of the network device 3902 that is exposed or published for access by the gateway device 3910. For example, the network device 3902 may expose a unique identifier of the device, such as a universally unique identifier, a MAC address, a serial number, or any other identifier unique to the network device 3902. As another example, the network device 3902 may expose a name of its manufacturer. In some embodiments, the particular meta-information and control capabilities that are exposed by the network device 3902 may be determined by the manufacturer of the network device 3902. For example, the manufacturer of the network device 3902 may agree with a manufacturer of the gateway 3910 to allow its network devices to expose their MAC addresses and the name of the manufacturer. The network device 3902 manufacturer may also allow its network devices to expose their control application programming interface (API) to allow the gateway 3910 to know how to control the network device 3902. In some embodiments, a user may specify the level of detail exposed in the meta-information and/or control information.

The gateway 3910 can determine a device specific interface object for the network device 3902 depending on the information included in the meta-information exposed by the network device 3902. A device specific interface object may include an icon that identifies the specific device to a user in the gateway device interface 4022. The device specific interface object may be displayed in the network device's 3902 tile in the gateway device interface 4022 (e.g., the icon 4104A displayed in FIG. 41). For example, an access device, or other device, may execute a device specific interface object module to display a particular device specific interface object that is specific to the network device 3902. In some cases, the device specific interface object module may include instructions or code that can be executed by a processor to cause the device specific interface object to be displayed. Depending on the detail of the meta-information, the device specific interface object may be a generic icon, a default icon, or an icon that is custom and specific to the network device 3902.

For example, the meta-information may include the device specific interface object for the network device 3902. In one example illustrated in FIG. 41, the network device 3902 may include a home automation switch that a user can remotely access, configure, and control, and that also allows a user to remotely access, configure, and control any electronic device that can be plugged into the network device 3902. The home automation switch is displayed in tile 4102A of the gateway device interface 4022 provided in the graphical interface display 4100. The network device 3902 may store its own device specific interface object module, and may send it to the gateway 3910 with the meta-information. The gateway 3910 can then utilize the received device specific interface object module for generating the gateway device interface 4022. For example, the gateway 3910 may transmit the device specific interface object module to the gateway device application running on the access device 3908. The access device 3908 may execute the device specific interface object module (e.g., using a processor) to generate and display the device specific interface object (e.g., icon 4104A in FIG. 41) for identifying the home automation switch and conveying which network device is being viewed in the gateway device interface 4022. In such an example, the device specific interface object may be custom to the network device 3902 or may be a default device specific interface object that is specific to the type of network device 3902 (e.g., a default icon for home automation switches made by a particular manufacturer). The custom or default device specific interface object may readily identify to the user that the network device 3902 that is being controlled or viewed in the gateway device interface 4022 is a home automation switch.

In another example, the meta-information may include identifying information of the network device 3902, but may not include an actual device specific interface object module. For example, the identifying information may include a universally unique identifier, a MAC address, a serial number, make and model of the network device 3902, or other identifying information. The gateway 3910 may use the identifying information to determine a default device specific interface object for the type of network device 3902. For example, the gateway 3910 may send the identifying information to a server in the cloud network 3914. In one example, the gateway 3910 may send communication 4014 with the identifying information including the unique identifier. The cloud network 3914 may be maintained by a manufacturer of the gateway 3910, a manufacturer of the network device 3902, a web server, or other external network provider.

In one example, the cloud network 3914 may be maintained by the gateway 3910 manufacturer. In such an example, the network device 3902 may be registered with the cloud network 3914. For example, the network device 3902 may send information to the cloud network 3914 using communication 4006. The cloud network 3914 server may send information back to network device 3902, such as a confirmation message. The cloud network 3914 may store information related to the network device 3902 in a database 4004. For example, a record may be kept for the network device 3902 that includes information such as device type, make and model, or other details related to the network device 3902. In some embodiments, the cloud network 4004 may store the device specific interface object module corresponding to the device specific interface object of the network device 3902. The cloud network 4004 may store the device specific interface object module in the network device's 3902 record stored in the database 4004. The record may also include other information, such as one or more security keys associated with the network device 3902. The record may be identified using the unique identifier of the network device 3902. The cloud network 3914 server may then send communication 4016 to gateway 3910 with the relevant information from the record identifying the type of the network device 3902. The gateway 3910 may then determine a device specific interface object for the network device 3910 using the information identifying the type of the network device 3902. For example, the communication 4016 may include an indication that the network device 3902 is a smart television. The gateway 3910 may retrieve a default icon for smart televisions, and may assign the default icon to the record associated with the network device 3902 in the device directory 4002. The default icon may then become the device specific interface object for the network device 3902. In one example, the default icon for the network device 3902 may include icon 4104B illustrated in FIG. 41.

In another example, the cloud network 3914 may be maintained by a manufacturer of the network device 3902. For example, gateway 3910 may send the unique identifier to the cloud network 3914 of the network device 3902 manufacturer. The manufacturer may maintain database 4004 that includes records for devices and their identifiers (e.g., MAC addresses, serial numbers, or the like). The record may indicate the types of the devices. The manufacturer may look up the type of the network device 3902 in the database 4004, and may return the information identifying the type of the network device 3902 to the gateway 3910. The gateway 3910 may then determine a device specific interface object for the network device 3910 using the received information. For example, the communication 4016 may include an indication that the network device 3902 is a smart television. The gateway 3910 may retrieve a default icon that is stored for smart televisions, and may assign the default icon to the record associated with the network device 3902 in the device directory 4002. The default icon may then become the device specific interface object for the network device 3902. In one example, the default icon for the network device 3902 may include icon 4104B illustrated in FIG. 41.

In another example, the meta-information may include the type of the network device 3902. For example, the meta-information may indicate to the gateway 3910 that the network device 3902 is a smart television, similar to the examples above. The gateway 3910 may retrieve a default device specific interface object or icon that is stored for smart televisions, and may assign the default icon to the record associated with the network device 3902 in the device directory 4002.

In some embodiments, the gateway 3910 may monitor one or more behavior characteristics of the network device 3902 to determine a type of the network device 3902. For example, the meta-information may not include any information that can be used to identify the specific network device 3902 or the type of the network device 3902. The gateway 3910 is in a position to monitor communications of the devices since it is the gateway for network communications for all connected devices. In one example, the network device 3902 is a smart television. The gateway 3910 may monitor communications to and from the network device 3902 to detect a type, amount, or other characteristic of the communications. For example, the gateway 3910 may determine from one or more communication packets transmitted to the network device 3902 that the network device 3902 is receiving video data. The gateway 3910 may also determine that the network device 3902, over a period of time (e.g., an hour, a day, a week, or other appropriate amount of time) does not receive voice data. The gateway 3910 may determine a type of the network device based on the monitored behavior characteristics. For example, based on the network device 3902 receiving video data and no voice data, the gateway 3910 may determine that the network device 3902 is a smart television. The gateway 3910 may then retrieve a default icon that is stored for smart televisions, and may assign the default icon to the record associated with the network device 3902 in the device directory 4002. In some embodiments, the gateway 3910 may prompt a user to confirm the type of device using the gateway device interface. For example, the gateway device interface may display a notification with an option to confirm the determined type.

In some embodiments, the monitored behavior characteristics may also be stored in the device directory 4002. For example, monitored behavior characteristics, such as bandwidth usage, network usage time, power level, or any other behavior may be stored in the network device's 3902 record. For example, the behavior characteristics may be stored in a usage statistics section of the record. The usage statistics may be displayed to a user in the gateway device interface (e.g., usage statistics 4108B or 4108E).

In some embodiments, the gateway 3910 may be unable to determine a type of the network device 3902. The gateway 3910 may use a generic icon in the event a default or custom icon cannot be assigned to the network device 3902. In some embodiments, a user may select a customized icon for use as the device specific interface object. For example, the gateway device interface may offer a list of selectable icons related to the network device 3902. In another example, the user may upload a picture or other graphic to be used as the device specific interface object.

Figure 42:
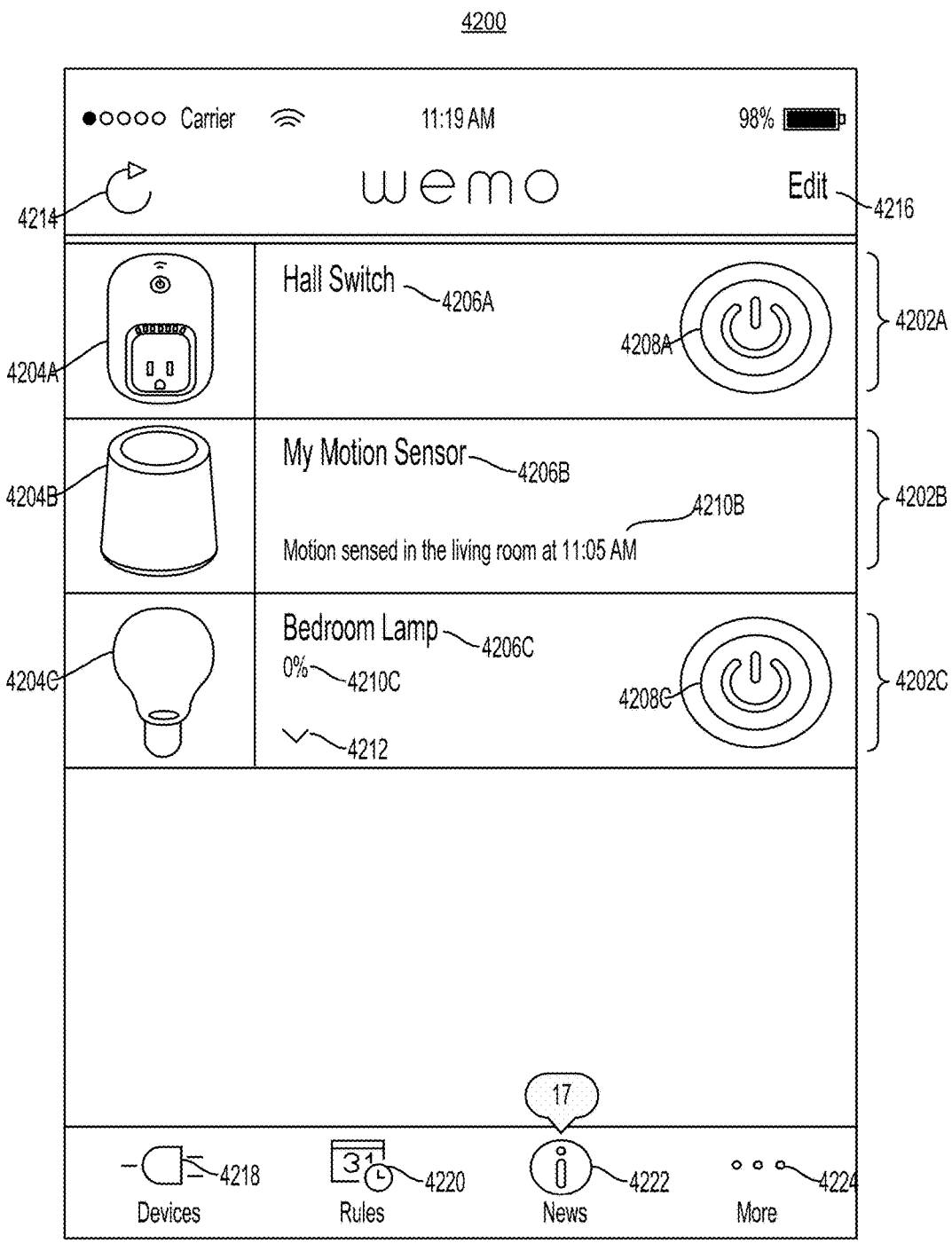
FIG. 42 depicts an example of a proprietary interface of a client device, in accordance with some embodiments.
Figure 43:
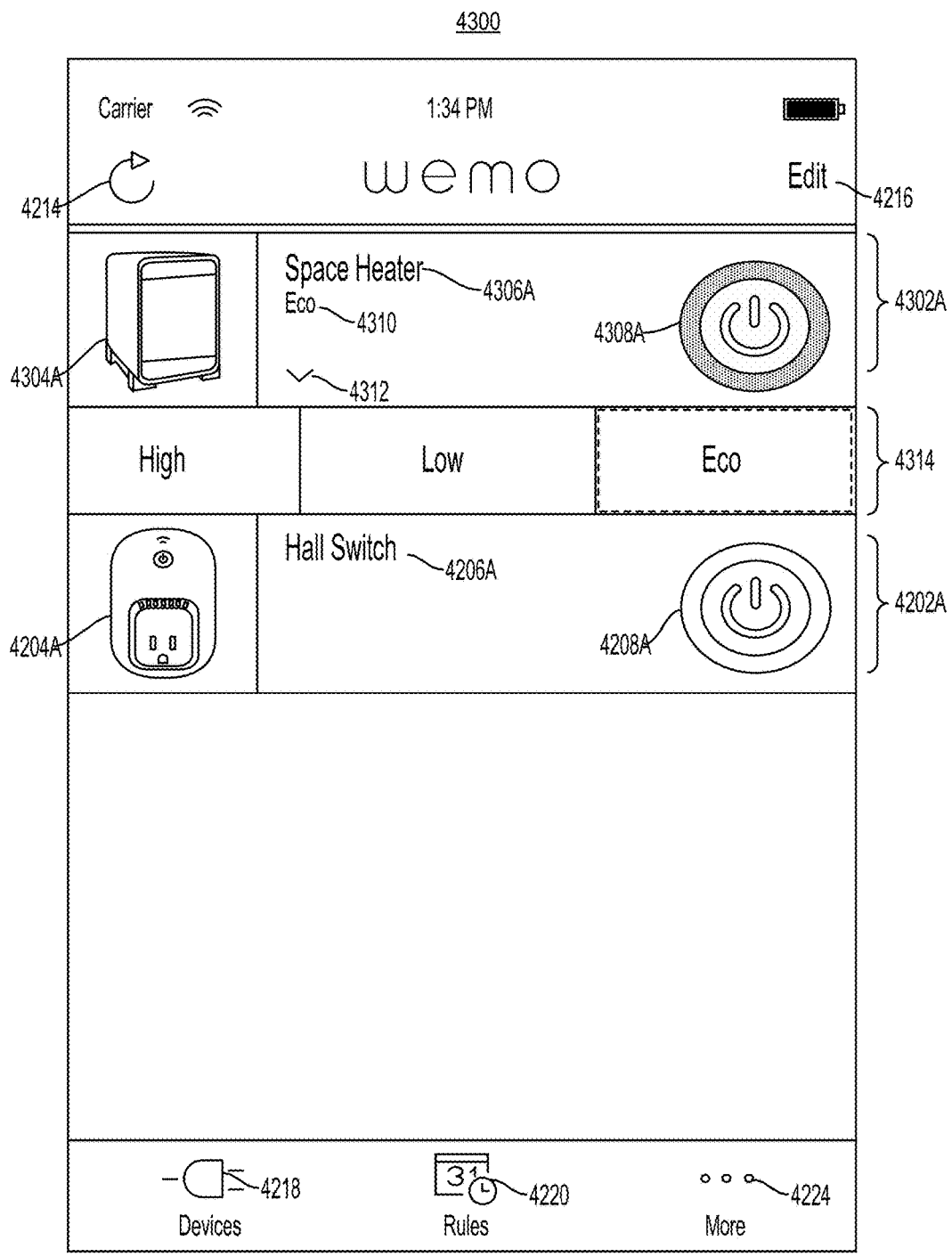
FIG. 43 depicts an example of a proprietary interface of a client device, in accordance with some embodiments.
Figure 44:
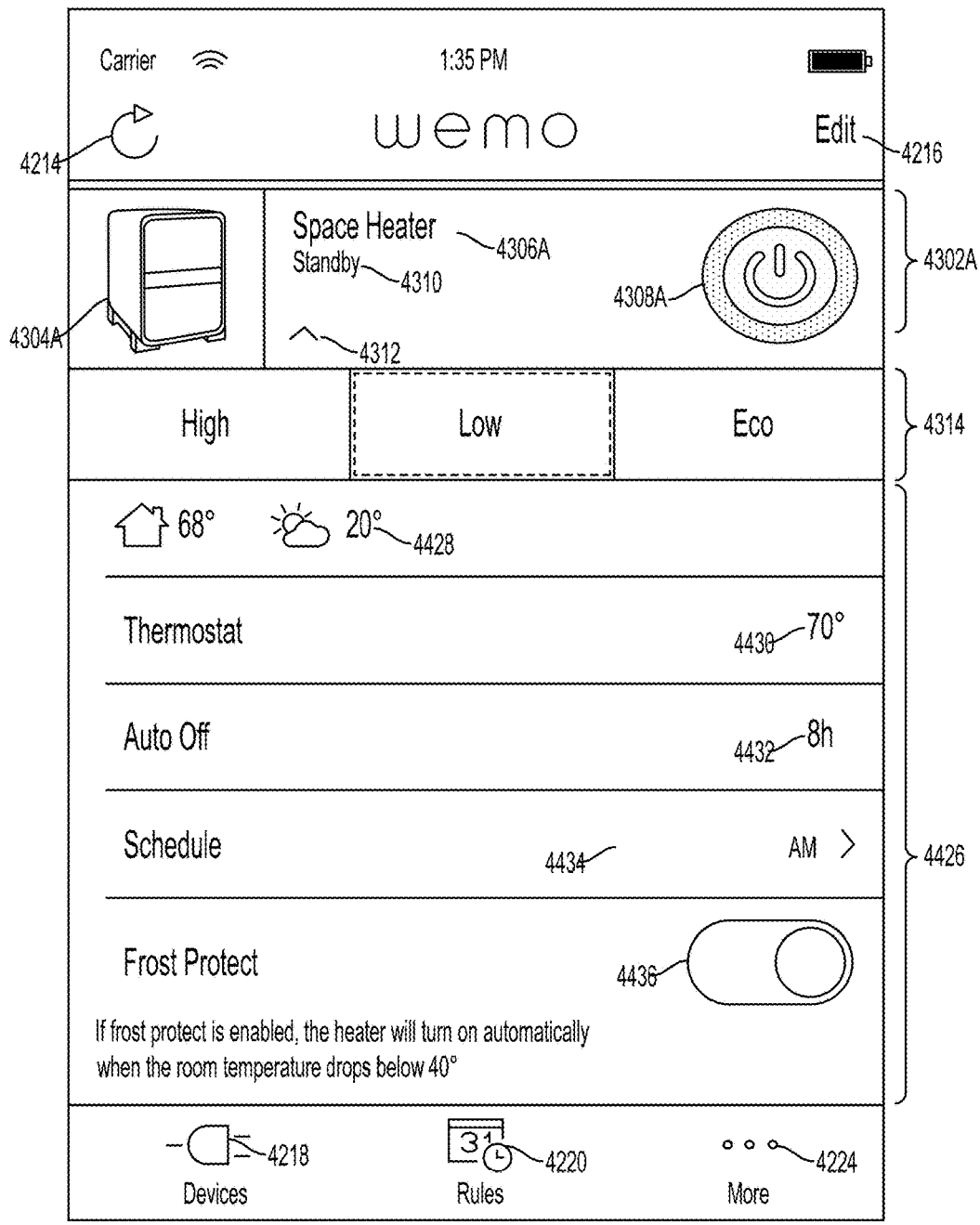
FIG. 44 depicts an example of a proprietary interface of a client device, in accordance with some embodiments.

As previously discussed, the network device 3902 may also send its control capabilities to the gateway 3910. The gateway 3910 can determine one or more primary control capabilities corresponding to the network device 3902 based on the control capabilities. For example, the gateway 3910 may determine that the primary control capabilities of the network device 3902 include turning the network device 3902 on and off. The gateway 3910 may determine the primary control capabilities based on the functions that the gateway 3910 has access to. For example, the network device 3902 may expose less than all of its control capabilities to the gateway 3910 (e.g., only a portion of an API used to control the network device 3902). The gateway device 3910 may transmit the primary control capabilities to the access device 3908. The application running the gateway device interface may use the primary control capabilities to generate and display one or more control objects. As explained with reference to FIG. 41 below, a control object allows a user to control the connected device using the one or more primary control capabilities. The primary control capabilities are a limited set of control capabilities as compared to a full set of control capabilities that are provided in a proprietary interface of the connected device. For example, the primary control capabilities that are facilitated using one or more control objects in the gateway device interface may include turning a network device on or off, whereas a full set of control options provided in a proprietary interface specific to the network device may include an ability to adjust settings, configurations, or other functionalities of the device. An example of a proprietary interface is illustrated in FIGS. 42-44.

In some embodiments, the gateway 3910 can transmit a resource bundle corresponding to network device 3902 to the access device 3908. The resource bundle may include the device specific interface object module and the primary control capabilities or control objects. The resource bundle can be embodied as a structured folder structure whose contents define all visual and interactive elements in a tile for the network device 3902. The resource bundle may include a unique device ID and files defining graphical content to be displayed in the gateway device interface. The graphical content can include definitions of interactive control elements for the interface module. The resource bundle can include templates defining interactive control states for each of the interactive control elements or interface objects, language translations for tile text, any menus for the tile, and graphical content of the menus. In some examples, the resource bundle can define templates, text, and graphical content using a markup language, such as XML, HTML, or any other appropriate markup language.

The gateway 3910 may also send an indicator representing a state of network device 3902 to the access device 3908. In embodiments, the communication 4012 or other communication from network device 3902 can include a last known state of the network device 3902 and/or historical data associated with the network device 3902. The graphical interface display of the gateway device interface 4022 running on the access device 3908 can then reflect a current state and historical data for the network device 3902 using the gateway device interface. In one example using the state information, an interface object or tile for the network device 3902 displayed in the graphical interface display of the gateway device interface 4022 can indicate an 'on' or 'off' state for the network device 102 when the network device is powered on or off.

In some embodiments, the gateway 3910 can send the meta-information of the network device 3902 to other network devices connected to the gateway 3910. The other network devices can utilize the meta-information, for example, to display information related to the network device 3902 in graphical interfaces associated with the devices. For example, a network printer may receive meta-information related to a network-connected camera. A graphical interface used to display printer features and functionality may use the meta-information to display information related to the network-connected camera.

Various graphical interface displays are discussed below with respect to FIGS. 4-7. In some embodiments, the graphical interface displays 4100, 4200, 4300, and 4400 discussed below are displayed on an access device. For ease of explanation, the monitoring and control operations discussed with reference to FIGS. 41-44 are described in the context of an application and/or a gateway device interface executing on an access device with a touchscreen display device. However, the operations are not intended to be limited to an access device. It is to be understood that the graphical interface displays 4100, 4200, 4300, and 4400 illustrated in the exemplary embodiments of FIGS. 41-44 can be readily adapted to be rendered on displays of a variety of computing device platforms running a variety of operating systems.

Figure 41:
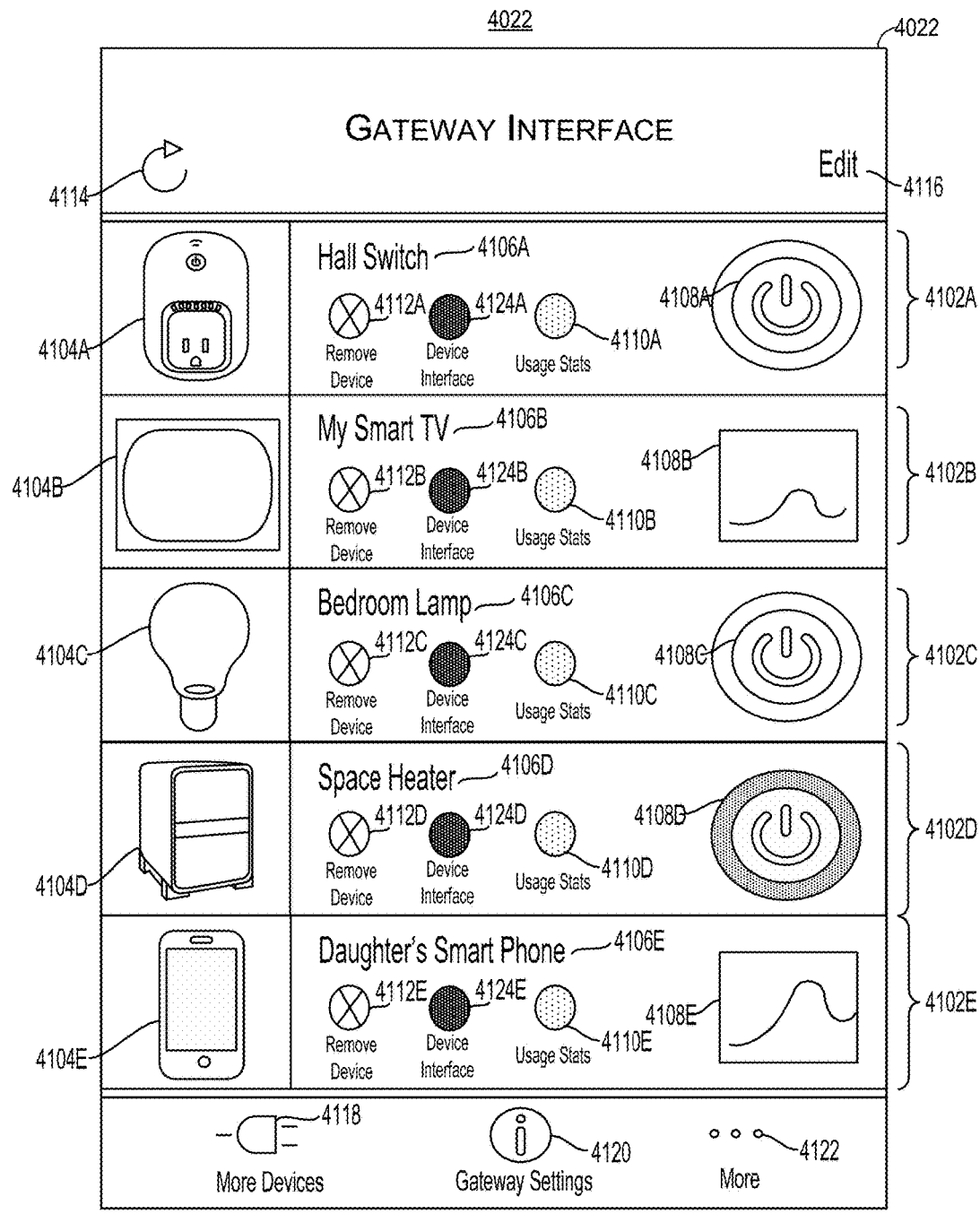
FIG. 41 depicts an example of a gateway device interface, in accordance with some embodiments.

FIG. 41 illustrates an example of a graphical interface display 4100 of the gateway device interface that can be implemented by an access device (e.g., through execution of a mobile application, a web-based application, or any other appropriate program) to allow a user to view information related to and to control different devices that are connected to a gateway device. The graphical interface display 4100 illustrated in FIG. 41 includes tiles 4102A, 4102B, 4102C, 4102D, and 4102E that each display information and/or interactive control objects for various devices connected to a gateway device (e.g., gateway device 3910). A user may interact with the connected devices through the gateway device interface 4022 using the primary control capabilities of the connected devices. The interactions can include monitoring the connected devices, controlling the connected devices, or otherwise interacting with the connected devices.

The tiles 4102A, 4102B, 4102C, 4102D, 4102E include various interactive control elements or objects. The interactive control elements or objects can be selected by a user by providing input using a touchscreen, using an input device, or any other appropriate input device. For example, an input device (a touchscreen, a mouse, or other input device) may receive input corresponding to a user's selection of an interactive control element. The user may cause the input to occur by selecting the interactive control element using the input device, such as by tapping a portion of a touchscreen corresponding to the interactive control element, selecting the interactive control element using a mouse or other pointing device, or the like.

The tiles 4102A, 4102B, 4102C, 4102D, 4102E each include respective icons 4104A, 4104B, 4104C, 4104D, 4104E. As described above with respect to FIG. 40, the icons 4104A, 4104B, 4104C, 4104D, 4104E can be custom for a specific device, default for the type of device, or generic depending on the meta-information provided by each respective device. For example, the icon 4104A includes a specific, custom icon relating to the specific device portrayed in tile 4102A, which includes a home automation switch. In another example, the icon 4104B includes a default icon for a smart television.

The tiles 4102A, 4102B, 4102C, 4102D, 4102E further include names 4106A, 4106B, 4106C, 4106D, 4106E identifying the different network devices. In some embodiments, the names may be automatically created by the gateway device interface. In some embodiments, a user may create the names or may edit the automatically created names.

The tiles 4102A, 4102C, and 4102D also include interactive control elements or objects 4108A, 4108C, and 4108D. For example, tile 4102A corresponds to a home automation switch and shows an interactive control element 4108A depicted as a power button. The interactive control element 4108A is selectable by a user to turn the automation switch on and off. Similarly, tile 4102C shows interactive control element 4108C depicted as a power button 4108C for turning a lamp light on and off. In some embodiments, the device specific interface object (e.g., icon 4104A) includes a control object, and is selectable to control a device using one or more primary control capabilities. For example, in some embodiments, the icon 4104A may be selectable to turn the switch on or off. The interactive control elements 4108A, 4108C, and 4108D provide a user with limited control of the respective devices. A user is required to access a proprietary interface for the different devices in the event the user desires more control functionality. For example, the user may select a device interface interactive element 4124A, 4124B, 4124C, 4124D, or 4124E to access a proprietary interface that allows full control of the respective devices. Upon receiving input corresponding to a selection of a device interface interactive element 4124A, 4124B, 4124C, 4124D, or 4124E, the gateway device interface may cause the selected proprietary interface to launch. The access device running the gateway device interface may then cause a display to toggle from the gateway device interface to the selected proprietary interface corresponding to the respective device. For example, the access device may launch a proprietary application that runs the selected proprietary interface (e.g., a smart light bulb proprietary application running a proprietary interface for controlling or accessing only certain light bulbs, an internet of things security system proprietary application, or the like). Examples of proprietary interfaces are described with respect to FIGS. 42-44.

In some embodiments, one or more of the devices connected to the gateway device may not have provided control capabilities to the gateway device. For example, the gateway device may not have obtained control capabilities for the smart television (TV) depicted in tile 4102B and the smart phone depicted in tile 4102E. In such cases, an interactive control element may not be displayed in the tiles 4102B and 4102E. In some embodiments, usage statistics 4108B and 4108E may be displayed in the tiles 4102B and 4102E. As described above, the usage statistics may include various behavioral characteristics of the smart TV and smart phone, such as bandwidth usage, network usage time, activity type, or any other information. In some embodiments, usage statistics may be displayed for any device depicted in the gateway device interface by selecting respective interactive elements 4110A, 4110B, 4110C, 4110D, or 4110E. The user may be able to monitor activity of the devices based on the usage statistics. For example, the user may include a parent in a household that includes the local area network. The parent may have administrative privileges to control settings of the gateway device interface (e.g., by using specific login credentials). The parent may monitor usage of a child's smart phone to determine whether the child is using the phone more than an allotted amount of time.

In some embodiments, a user may remove a device from the local area network by selecting interactive elements 4112A, 4112B, 4112C, 4112D, 4112E. In one example, selection of interactive element 4112E may disconnect the smart phone from the gateway device. For example, the parent may decide that the child has used the smart phone for more than an allotted amount of time, and may select the interactive element 4112E to prevent the smart phone from connecting to the local area network.

In embodiments, one or more of the tiles 4102A, 4102B, 4102C, 4102D, 4102E may display a current state or status of network devices. For example, a status in tile 4102B may indicate a television-specific status, such as "Television Was Last Viewed at 10 AM." In additional or alternative embodiments, tiles 4002 can convey status information about a network device, including, but not limited to, a firmware version, a last known firmware update status, connectivity to cloud status, registration status (e.g., an indication that the network device has a key or does not), a primary mode of the network device (e.g., on, off), a secondary mode of the device (e.g., standby, high, low, eco), a schedule, and settings for the device. In another example, a status in the tile 4102C for the bedroom lamp device can indicate a brightness level for the lamp. For example, the status may indicate that the lamp is at 0%, corresponding to the lamp being turned off. In some embodiments, a status may be reflected by the interactive control elements 4102A, 4102C, or 4102D. For example, the interactive control element 4108D displayed as a power button for the space heater is shaded to indicate the space heater is currently in an on state.

The graphical interface display 4100 further includes selectable icons and links 4114, 4116, 418, 4120, and 4122 outside of the tile display area. For example, the refresh icon 4114 can be selected to refresh information presented in display 4100, such as, for example, status and state information displayed in tiles 4102A, 4102B, 4102C, 4102D, 4102E. The status information for a device can be refreshed automatically on a periodic basis, and may also be manually updated using selectable refresh icon 4114. In some embodiments, selection of the refresh icon 4114 may cause any newly discovered devices to be displayed in the display 4100. The edit link 4116 can be selected to edit the list of tiles 4102A, 4102B, 4102C, 4102D, 4102E. For example, edit link 4116 can be selected to sort or re-order the sequence of tiles 4102A, 4102B, 4102C, 4102D, 4102E displayed in display 4100. Edit link 4116 can also be selected to delete one of the tiles 4102A, 4102B, 4102C, 4102D, 4102E in cases where a user no longer wants to view a given tile. Devices icon 4118 can be selected to list other discovered devices connected to the gateway device that are not currently displayed in the graphical interface display 4100.

The gateway settings icon 4120 may be selected to access the gateway device settings. For example, a user may provide input to the gateway device interface to change one or more settings of the gateway device. In one example, a user may select an option to change a communication frequency band upon which to exchange communications with devices, such as from 2.4 GHz to 5 GHz, from 5 GHz to 2.4 GHz, or to and from any other appropriate frequency band. In another example, a user may select options to adjust the access credentials used to access the gateway device (e.g., SSID name of network and password), to adjust credentials used to access the gateway device interface or the settings of the gateway device (e.g., login credentials for the gateway device interface), or the like. Other settings may be adjustable by a user, such as remote access settings, time settings, parental controls, backup options, or any other settings for the gateway device. The more icon 4024 can be selected to access additional features of the gateway device interface.

As previously described, the interactive control elements 4108A, 4108C, and 4108D of the gateway device interface provide a user with limited control of the respective devices. In the event a user wants to control a device using a control capability that is outside of the one of the primary control capabilities, the user can be directed to a proprietary interface for the device. The user may select a device interface interactive element 4124A, 4124B, 4124C, 4124D, or 4124E to access a proprietary interface that allows full control of the respective devices. Upon receiving input corresponding to a selection of a device interface interactive element 4124A, 4124B, 4124C, 4124D, or 4124E, the gateway device interface may cause the selected proprietary interface to launch. The access device running the gateway device interface may then cause a display to toggle from the gateway device interface to the selected proprietary interface corresponding to the respective device. In some embodiments, the gateway graphical interface may include the full set of control capabilities for one or more of the devices connected to the gateway.

FIGS. 42-44 illustrate different examples of graphical interface displays 4200, 4300, 4400 of a proprietary interface that can be implemented by an access device (e.g., through execution of a mobile application, a web-based application, or any other appropriate program) to allow a user to control and/or configure devices that utilize the proprietary interface. A proprietary interface may be specific to a single device, or may be specific to multiple devices of a similar or same type (e.g., built by a same manufacturer). For example, network devices 3902, 3904, 206 may be made by a manufacturer that provides the proprietary interface for the network devices 3902, 3904, 3906. In one example, a company may make a line of Internet of Things (IoT) devices that provide home automation capabilities. The company may provide a proprietary application (e.g., mobile application, web-based application, or the like) that generates a proprietary graphical interface that can be used to control and monitor the IoT devices. The proprietary graphical interface allows full control of the different devices that are controllable using the proprietary graphical interface.

Throughout FIGS. 42-44, displays are shown with various tiles, interactive elements, icons, links, command regions, windows, toolbars, sub-menus, drawers, and buttons that are used to initiate action, invoke routines, monitor network devices, configure network devices, control network devices, or invoke other functionality. The initiated actions include, but are not limited to, displaying a current state of a network device, displaying historical data associated with a network device, displaying a last known status of a network device, selecting one or more primary settings for a network device, selecting one or more secondary or tertiary settings of a network device, and other inputs and gestures. For brevity, only the differences occurring within the figures, as compared to previous or subsequent ones of the figures, are described below.

FIG. 42 illustrates a graphical interface display 4200 of a proprietary interface of an application executing on an access device. For example, the proprietary interface may be part of an application provided by a manufacturer of the hall switch shown in tile 4202A, the motion sensor shown in tile 4202B, and the lamp shown in tile 4202C. The hall switch and the lamp are also shown in the graphical interface display 4100 of the gateway device interface. The motion sensor is not shown in the graphical interface display 4100 of the gateway device interface. For example, the motion sensor may not be connected to the gateway, and thus may not be displayed by the gateway device interface. The motion sensor may be connected to the access device using one or more communication signals that are independent of the signals provided by the gateway device. In one illustrative example, the motion sensor may use Bluetooth signals to connect to the access device instead of WiFi signals provided by the gateway device. The graphical interface display 4200 may be displayed as a result of a user selecting one of the device interface interactive elements 4124A or 4124C.

The graphical interface display 4200 includes tiles 4202A, 4202B, and 4202C for interacting with network devices in a network using control capabilities of the network devices. The interactions can include monitoring and controlling the network devices. The tiles 4202A, 4202B, and 4202C each include respective icons 4204A, 4204B, and 4204C, and respective names 4206A, 4206B, and 4206C identifying different network devices. For example, tile 4202A corresponds to a switch and shows an interactive control element depicted as a power button 4208A for turning the switch on and off. Similarly, tile 4202C shows a power button 4208C for turning a lamp on and off.

Display 4200 is a visual interface usable to monitor and control one or more network devices using a full set of control capabilities. Display 4200 includes tiles for discovered network devices. The tiles may include an icon representing a network device and a name for the network device. In the example of FIG. 42, display 4200 includes tiles 4202A, 4202B, and 4202C corresponding to three different network devices. In particular, tile 4202A is configured to control a switch network device. Tile 4202A includes an icon 4204A representing the switch and a name 4206A for the switch. In embodiments, tiles 4202A, 4202B, and 4202C are customizable by developers and/or manufacturers of the network devices. For, example, name 4206A is customized to indicate the name of a specific type of switch (e.g., 'Hall switch'). Tile 4202A also includes an interactive element 4208A that can be selected to control the switch. For example, interactive element 4208A can be selected with a click or press to turn the switch on and off. Tile 4202B includes an icon 4204B for a sensor network device. Tile 4202B includes an icon 4204B representing the sensor and a name 4206B for the sensor (e.g., 'My Motion Sensor'). In some embodiments, tiles 4202 are customizable by developers and/or manufacturers of the network devices to display a current state or status of network devices. For, example, tile 4202B is customized to indicate a sensor-specific status (e.g., 'Motion sensed at 11:05 AM'). In additional or alternative embodiments, tiles 4202 can convey status information about a network device, including, but not limited to, a firmware version, a last known firmware update status, connectivity to cloud status, registration status (i.e., an indication that the network device has a key or does not), a primary mode of the network device (i.e., on, off), a secondary mode of the device (i.e., standby, high, low, eco), a schedule, and settings for the device (see, e.g., schedule 4434 in FIG. 44).

Depending on the type and capabilities of a network device, the network device's tile can display a status or state of the device. For example, FIG. 42 shows how status 4210B indicates when a motion sensor last detected motion. In an embodiment, the display 4200 is flexible and can dynamically display the most appropriate tile 4202 for the environment in which the application is run. For instance, the display 4200 enables a mechanism wherein a user can pre-configure a tile 4202B to display the most appropriate message for a connected sensor. For example, a user can connect any one of a plurality of types of sensors (e.g., water, humidity, temperature/heat, air pressure, light, sound, smoke, carbon monoxide, etc.) to a network. As shown in FIG. 42, instead of presenting a default interface stating a generic message such as 'the sensor has detected something at a certain time,' the tile 4202B can be configured to provide a sensor-specific status (e.g., 'Motion sensed in the living room 11:05 AM' or 'someone is in the living room.'). Similarly, tiles for other types of sensor devices can be configured to present sensor-specific states or status messages such as, for example, 'the leak detector at a certain location has detected elevated levels of moisture' or 'the smoke detector has detected smoke in the kitchen.'

As shown in FIG. 42, the status 4210C in the tile 4202C for the lamp device can indicate a brightness level for the lamp. In the exemplary display 4200, status 4210C indicates that the lamp is at 0%, which corresponds to the lamp being turned off. In an embodiment, this status is also reflected by the power button 4208C for the lamp not being lit up or shaded/bolded. When a network device has extended capabilities, such as secondary or tertiary functionalities, an interactive element 4212 can be selected to expand and contract a menu including controllable settings for the capabilities. The menu can be, for example, a full drop down menu or drawer with interactive elements for setting the extended capabilities of the network device. An example of such a full menu and drawer is provided in FIG. 44, which is discussed below. The full menu and drawer are examples of control capabilities that may not be provided in the gateway graphical interface in some cases.

The display 4200 further includes selectable icons and links 4214, 4216, 4218, 4220, 4222, and 4224 that are located outside of the tile display area. In the example of FIG. 42, refresh icon 4214 can be selected to refresh information presented in display 4200, such as, for example, status and state information displayed in tiles 4202A, 4202B, and 4202C. For instance, the status 4210B in tile 4202B for the motion sensor can be refreshed on an automatic, periodic basis, in addition to being manually updated when refresh icon 4214 is selected. Similarly, the brightness status 4210C in tile 4202C for the lamp can be updated when refresh icon 4214 is selected. The edit link 4216 can be selected to edit the list of tiles 4202A, 4202B, and 4202C. For example, edit link 4216 can be selected to sort or re-order the sequence of tiles 4202A, 4202B, and 4202C displayed in display 4200. Edit link 4216 can also be selected to delete one of the tiles 4202A, 4202B, and 4202C in cases where a user no longer wants to view a given tile. Devices icon 4218 can be selected to list discovered network devices in a network.

Rules icon 4220 can be selected to display rules pertaining to network devices. For example, rules icon 4220 can be selected to display a rule that turns on the lamp of tile 4202C for a specified duration when the motion sensor of tile 4202B detects motion. For example, a user can select rules icon 4220 and create or edit a rule that turns on a porch light for a certain number of minutes when a motion sensor detects motion near the porch. In this way, rules can relate functionalities of multiple network devices to each other. News icon 4222 can be selected to review news items, such as news associated with network devices and/or the application. For instance, news icon 4222 can be selected to view announcements and news items relevant to network devices controlled using tiles 4202A, 4202B, and 4202C, and/or information relevant to the application, such as notifications of available tile updates. The more icon 4224 can be selected to access additional features of the application.

FIG. 43 shows another example of a graphical interface display 4300 of an application executing on an access device. The graphical interface display 4300 displays a space heater, which is also displayed in the gateway device interface 4022 provided in the graphical interface display 4100. In some examples, the application and graphical interface displaying the graphical display 4300 may be launched in response to a user selecting the device interface icon 4124D in order to have access to more control capabilities of the space heater. The graphical interface display 4300 shows the status of the space heater within tile 4302A. For example, tile 4302A can show that the heater is turned by coloring, animating, or shading a portion of power button 4308A. In one embodiment, a portion of power button 4308A can be shaded green or bolded to indicate that the space heater has been turned on. In some embodiments, a sub-menu 4314 can be exposed when the power button 4308A is selected. The sub-menu 4314 provides one or more selectable objects corresponding to secondary settings of the heater. The secondary settings of the sub-menu 4314 provide further functionality that is related to the primary function of turning the network device on. In the example of FIG. 43, sub-menu 4314 is a drawer that shows secondary settings corresponding to high, low, and eco operational modes for the space heater when the power button 4308A is selected to turn the space heater on. In some cases, the sub-menu 4314 is displayed momentarily when the power button 4308A is selected, and may close after a certain period of time. For example, sub-menu 4314 may be temporarily displayed within the context of the heater being turned on. The sub-menu 4314 may include a default choice for a secondary function space heater (e.g., economic or eco mode), and can also be used to select other secondary functions (e.g., high or low). In this way, with a single input of selecting or pressing power button 4302A, both primary and secondary functionalities can be set using a single input. Additional functionalities and capabilities of the space heater can be displayed by selecting interactive element 4312 to expand a full menu of control capabilities of the space heater. An example of the full menu is shown in FIG. 44.

FIG. 44 shows another example of a graphical interface display 4400 of an application executing on an access device. In the example shown in FIG. 44, the status indicator 4310 indicates that the space heater is in standby mode. This status can be visually reinforced by the power button 4308A being lightly shaded. In some examples, the status indicator 4310 and power button 4308A may transition when the status of the space heater is changed. For example, when the power button 4308A is selected to turn on the space heater, and secondary mode of 'low' is selected in sub-menu 4314, the power button 4308A may become illuminated (e.g., shaded, change color, or any other display feature). Additionally, the status indicator 4310 may transition from 'standby' to 'low' to reflect the selection in sub-menu 4314.

The graphical interface display 4400 also displays detailed status and extended functionalities of the space heater within a full menu 4426 accessed using tile 4302A. For example, the full menu 4426 can be displayed when interactive element 4312 is selected. In the example of FIG. 44, the full menu 4426 can include interactive elements 4430, 4432, 4436 for selecting settings or actions corresponding to tertiary or extended functions of the space heater. In particular, the exemplary full menu 4426 is shown displaying temperature readings 4428 (e.g., room temperature and external temperature), thermostat setting 4430, an auto off setting 4432, schedule information 4434 for the space heater, and a frost protection setting 4436. In the example of FIG. 44, the auto off setting 4432 is a selectable duration (e.g., a number of minutes, a number of hours, a number of hours and minutes, or any other appropriate time frame). In some embodiments, the auto off setting 4432 can be changed using a scroll wheel interface element, directly entered as text, or changed using another input mechanism. Full menu 4426 can be implemented as a drawer showing historical data associated with a network device, such as, for example, past temperature readings and patterns of temperature readings. The historical data may be used to determine tertiary settings or functionalities, such as, for example, the frost protection setting 4436. As shown, the frost protection setting 4436 can be toggled on an off within the full menu 4426. As illustrated in the graphical display 4400, the space heater will automatically turn on if the room temperature falls below 40 degrees Fahrenheit. In some cases, certain extended capabilities can be tied to rules. For example, the rule for frost protection can be changed by selecting rules icon 4020 in order to edit the logic for the rule.

As shown in the embodiments of FIGS. 41-44, the status or state of a network device can be indicated within the tile with text and/or graphically. For instance, coloring or shading of an interactive element, such as power button 4308A, can indicate whether a network device is connected to the network, powered off or on, restarting, or in a standby, sleep, or hibernation mode. In one example, part or all of the power button 4308A in the tile 4302A can be shaded green when the space heater is powered on, can be shaded red or un-shaded when the space heater is off, and can be shaded yellow or lightly shaded when the space heater is in standby mode. In additional or alternative embodiments, a power button can pulsate or slowly blink when the device is in a transitional state. Examples transitional states include booting up, restarting, connecting to a network, re-connecting to the network, or the like.

Figure 45:
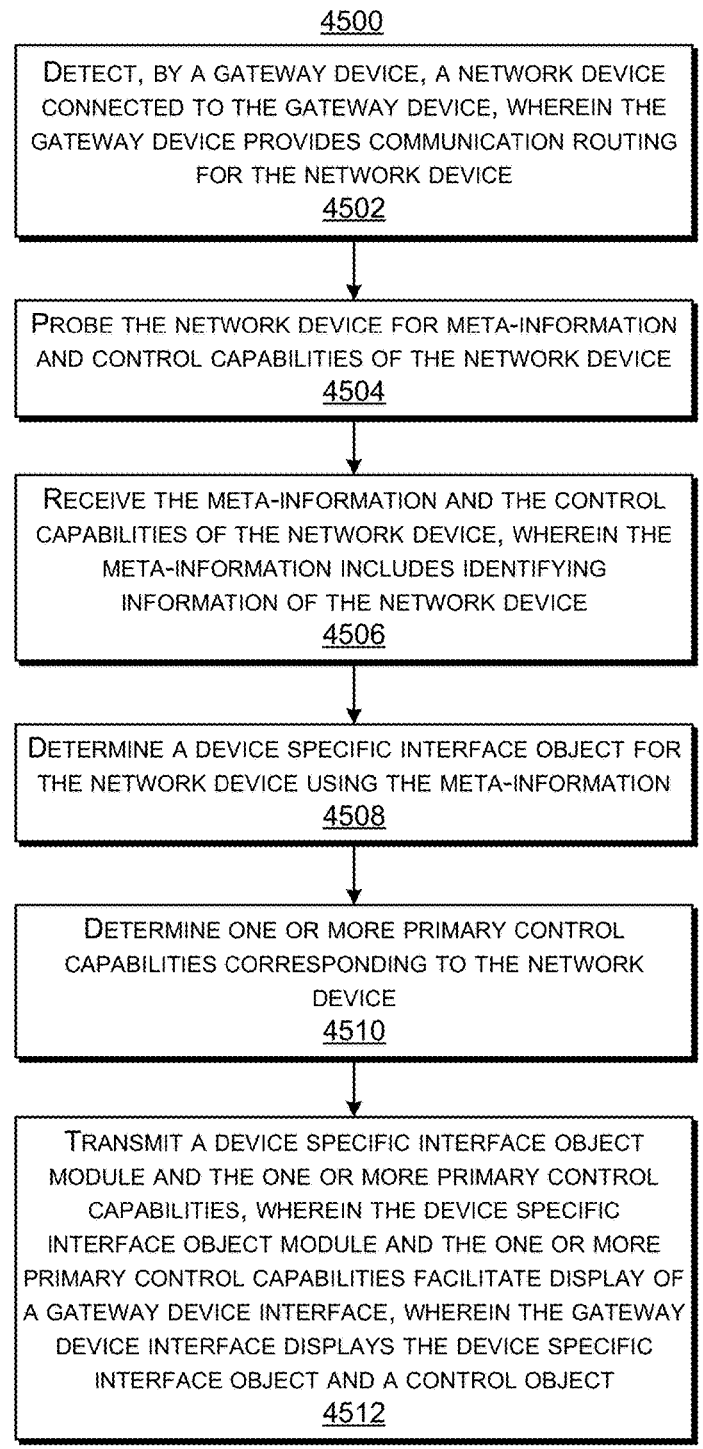
FIG. 45 is a flowchart illustrating an embodiment of a process of detecting a device connected to a gateway device and determining control capabilities and meta-information of the connected device, in accordance with some embodiments.

FIG. 45 illustrates an embodiment of a process 4500 of discovering devices connected to a gateway device and determining control capabilities and meta-information of the connected devices. In some aspects, the process 4500 may be performed by a computing device, such as a gateway device 110, 112, or 3910 shown in FIGS. 1, 39 and 40. While specific examples may be given of a gateway device, such as a router, performing the process 4500, one of ordinary skill in the art will appreciate that other devices may perform the process 4500.

Process 4500 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 4500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a machine-readable storage medium, for example, in the form of a computer program comprising a plurality of instructions executable by one or more processors. The machine-readable storage medium may be non-transitory.

At 4502, the process 4500 includes detecting, by a gateway device, a network device connected to the gateway device, wherein the gateway device provides communication routing for the network device. For example, the gateway device may include the gateway 3910 and the network device may include the network device 3902. The process may include detecting, by the gateway device, multiple network devices connected to the gateway. In some examples, the gateway device may detect connected network devices based on an identifier (e.g., a MAC address, a serial number, or other suitable unique identifier) associated with the connected network devices. For example, the gateway device may be aware that a network device with identifier A is connected to the gateway device, such as using a device directory (e.g., device directory 4002). In some examples, the gateway device may detect the presence of network devices that are connected to the gateway device, or network devices that are not yet connected to the gateway device. For example, the gateway device may detect that the network device is within communication signal range of the gateway device.

At 4504, the process 4500 includes probing the network device for meta-information and control capabilities of the network device. For example, upon detecting the network device, the gateway device may send a communication to the network device. The communication may include a request to connect to the network device in the event the network device is not already connected to the gateway device. The communication may further include a query requesting meta-information and control capabilities of the network device. In some embodiments, a request to connect and a query for meta-information and/or control capabilities may be sent in separate communications. For example, the query may be sent after the network device is connected to the gateway device.

At 4506, the process 4500 includes receiving the meta-information and the control capabilities of the network device, wherein the meta-information includes identifying information of the network device. In some embodiments, the gateway device may populate or update a device directory (e.g., device directory 4002) record for the network device with the received meta-information and the control capabilities, and also with further information determined using the meta-information and the control capabilities. In some examples, the meta-information includes identifying information of the network device that is exposed or published for access by the gateway device, as described above with respect to FIG. 40.

At 4508, the process 4500 includes determining a device specific interface object for the network device using the meta-information. In some examples, a device specific interface object may include an icon that identifies the specific device in a gateway device interface. For example, an access device, or other device, may execute a device specific interface object module to display the device specific interface object that is specific to the network device. Depending on the detail of the meta-information, the device specific interface object may be a generic icon, a default icon, or an icon that is custom and specific to the network device.

The gateway device can determine the device specific interface object for the network device depending on the information included in the meta-information exposed by the network device. In some embodiments, the meta-information includes a device specific interface object module. For example, the network device may store its own device specific interface object module, and may send it to the gateway device with the meta-information. The device specific interface object module may include instructions or code that can be executed by a processor to cause the device specific interface object to be determined and/or displayed. The gateway device can use the received device specific interface object module to determine the device specific interface object for the network device.

In some embodiments, the meta-information includes a unique identifier for the network device, and the process 4500 may further include transmitting the unique identifier to a cloud server, receiving information identifying a type of the network device, and determining the device specific interface object for the network device using the information identifying the type of the network device. For example, as described above with respect to FIG. 40, the gateway 3910 may send identifying information to a server in the cloud network 3914. The cloud network 3914 may be maintained by a manufacturer of the gateway 3910, a manufacturer of the network device 3902, a web server, or other external network provider.

In some embodiments, determining the device specific interface object for the network device further includes monitoring behavior characteristics of the network device, determining a type of the network device based on the monitored behavior characteristics, and determining the device specific interface object for the network device using the determined type of the network device.

At 4510, the process 4500 includes determining one or more primary control capabilities corresponding to the network device. The gateway device can determine the one or more primary control capabilities corresponding to the network device based on the received control capabilities. In one example, the gateway device may determine that the primary control capabilities of the network device include turning the network device on and off.

At 4512, the process 4500 includes transmitting the device specific interface object module and the one or more primary control capabilities, wherein the device specific interface object module and the one or more primary control capabilities facilitate display of a gateway device interface. The gateway device interface displays the device specific interface object and a control object. The control object allows control of the network device using the one or more primary control capabilities. The one or more primary control capabilities include less than all control capabilities of the network device that are provided in a proprietary interface of the network device, as illustrated in FIGS. 41-44.

In some embodiments, the process 4500 further includes transmitting the meta-information of the network device to a second network device. The second network device can utilize the meta-information, for example, to display information related to the network device in graphical interfaces associated with the devices. For example, a network printer may receive meta-information related to a network-connected camera. A graphical interface used to display printer features and functionality may use the meta-information to display information related to the network-connected camera.

In some embodiments, the device specific interface object includes the control object, and the device specific interface object is selectable to control the network device using the one or more primary control capabilities. For example, a displayed icon for the network device may also be selectable to control the network device. In some embodiments, the gateway device interface includes a proprietary interface object. The proprietary interface object is selectable to launch the proprietary interface of the network device to allow execution of a control capability outside of the primary control capabilities. In some embodiments, the gateway device interface displays information corresponding to a plurality of network devices connected to the gateway device.

In some embodiments, a modular visual interface framework may be utilized to dynamically and implicitly provide visual interface modules to an access device 108 so that the access device 108 can be used to control network devices within a network without having to install a new application or a version of an application for each network device. The visual interface modules can enable a user of the access device 108 to remotely control network devices within a network without having to physically interface with the network device. In certain embodiments, an application installed on the access device 108 can have a graphical interface, and the application can be configured to execute one or more visual interface modules usable to control respective network devices in a local area network. The visual interface modules, when executed by an application, can render a visual interface in the graphical interface to enable control of operation of the network device. In some embodiments, the visual interface module can be specific to a given network device.

The visual interface rendered for a visual interface module can be a modular tile that includes information identifying a respective network device and includes interactive areas or interactive elements for controlling and/or monitoring the network device on a network. The visual interface can provide information about a status of the network device corresponding to the tile. The status of a network device may be any changeable variable of that particular network device. For example, the status of a network device may include a state of the network device itself (e.g., on or off) or how the network device is situated within the network with respect to the other network and other devices throughout the network. In certain embodiments, the status can include a value, a state, or other unit of measure corresponding to a setting or an attribute related to operation of a device. The setting or the attribute can be adjustable within a range of values or between different states. For example, the device can be a light bulb and the status can include a value corresponding to brightness (e.g., a percentage of total brightness) emitted by the light bulb when the light bulb is powered-on.

The visual interface can include one or more interactive elements or interactive areas to control one or more settings and/or attributes related to operation of the network device corresponding to the visual interface. The settings and/or attributes can correspond to functionalities or features of the network device. The functionalities can include, for example, powering the network device on and off, or adjusting a setting or an attribute of the network device. In some embodiments, the visual interface may enable a user to initiate additional actions by interacting with an interactive area for a threshold time period. The visual interface can be updated to reflect the status of the network device with respect to the adjustment of one or more attributes and/or settings. Operation and implementation of the modular visual interface framework is described below with reference to FIG. 46. In particular, FIGS. 48-53 show examples of visual interfaces that enable a user to control operation of network devices and to determine a status of the network devices. The visual interfaces shown in the FIGS. 48-53 may enable a user to determine a status of network devices and may enable the user to manage those network devices based on their statuses.

Figure 46:
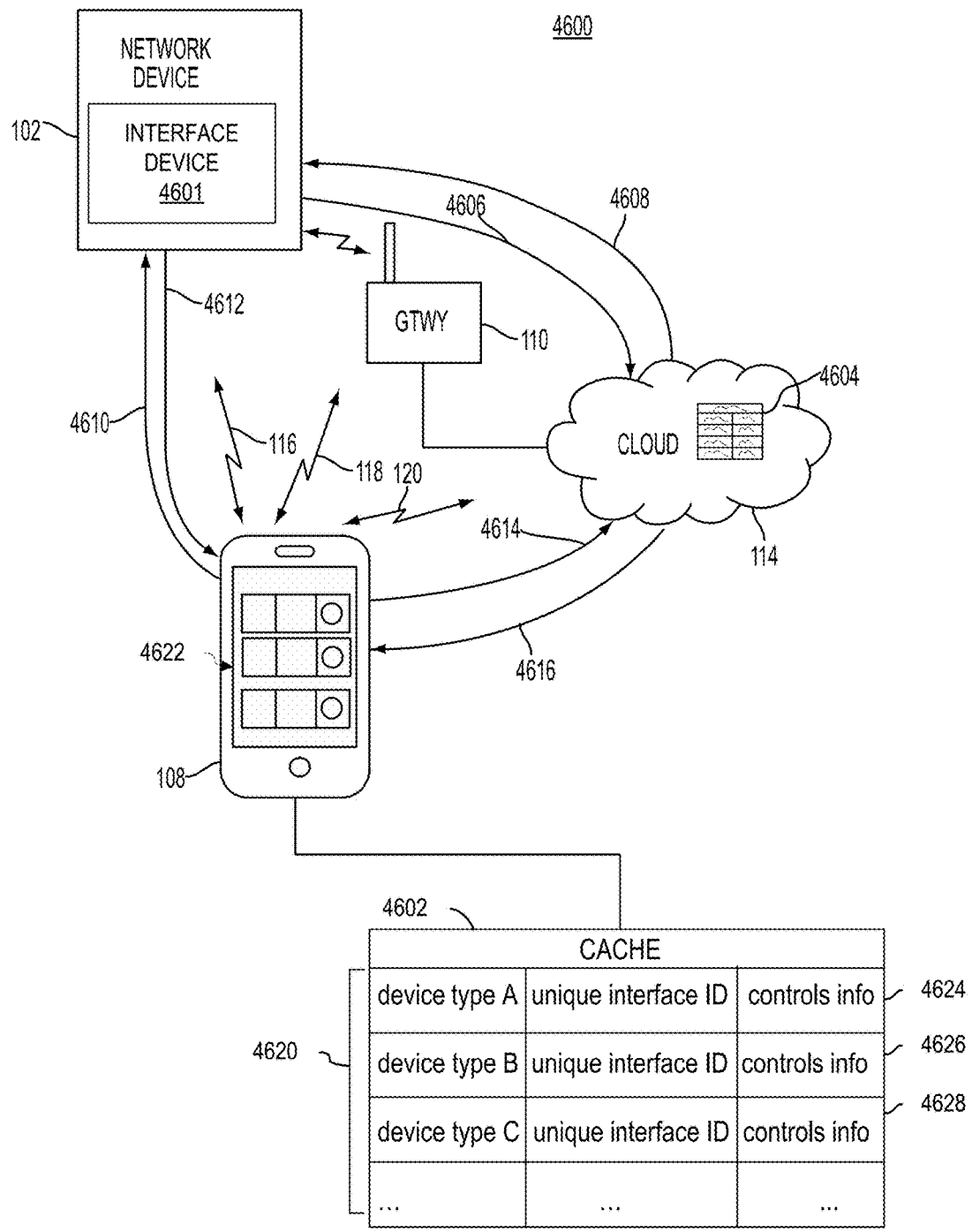
FIG. 46 shows an embodiment of a process for providing a visual interface module for controlling a network device in a wireless network according to some embodiments.

FIG. 46 illustrates an embodiment of a process 4600 for providing a visual interface module for controlling a network device. As shown, the process 4600 may be performed by one or more computing devices, such as the network device 102, a server associated with cloud network 114, or the access device 108 described above with reference to FIG. 1. In some embodiments, the network device 102 is associated with a home automation network, such as the local area network 100 described above with respect to FIG. 1. Process 4600 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various appliances, such as a television, radio, light bulb, microwave, iron, fan, space heater, sensor, and/or the like. In some embodiments, the user can monitor and control network devices by interacting with a visual interface rendered by the gateway 110 (i.e., a web page for gateway 110), a visual interface rendered on display 4622 of the access device 108, or a visual interface rendered by the network device 102.

In an embodiment, an application may be run on the access device 108. The application may cause the access device 108 to present a display 4622 with a modular visual interface for each network device accessible on the local area network 100. When the application is run on the access device 108, the access device 108 can access a cache 4602.

The cache 4602 can be a local cache located in onboard storage of the access device 108. The cache 4602 can contain a known interface list 4620 with records 4624, 4626 and 4628 including interface information for different, known types of network devices. As shown, each of records 4624, 4626 and 4628 can include a device type, a unique interface module ID, and controls information. The known interface list 4620 can include a record for each device known by the access device 108 to exist on the local area network 100. When the application is run on the access device 108, the access device 108 can access the known interfaces 4620 in the cache 4602 to present the display 4622, which lists modular interfaces for each network device on the local area network 100. In an example, the display 4622 can include a modular tile for each connected network device having an interface in the known interface list 4620. Examples of communications used to populate cache 4602 are described in the following paragraphs.

The process 4600 can include utilizing communication 4606 to register a visual interface module for a network device 102 with a server of cloud network 114. For simplicity, communication 4606 is shown as a direct communication between network device 102 and cloud network 114. However, it is to be understood that in an embodiment, communication 4606 can be sent from a manufacturer of network device 102 to cloud network 114. In an additional or alternative embodiment, communication 4606 is sent from third party interface developer to cloud network 114. For example, a third party developer of a visual interface module for network device 102 may initiate communication 4606 to cloud network 114. In the example of FIG. 46, communication 4606 includes registration information for the network device 102. For example, communication 4606 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 4606 can include a resource bundle corresponding to network device 102. The resource bundle can be embodied as a structured folder structure whose contents define all visual and interactive elements/areas in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements/areas for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 4606, the process 4600 includes transmitting an indication that network device 102 is associated with the network. For example, network device 102 may transmit the indication to the server of the cloud network 114. In some embodiments, transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 204 of known interfaces. The access device 108 can download a visual interface module identified in data store 204 from the cloud network 114, which can be used to render a modular interface within display 4622. In an embodiment, data store 4604 can be a tile database where each record in the database is uniquely identified by a tile ID.

Cloud network 114 can use the unique device ID to determine an interface module for network device 102. As shown in FIG. 46, cloud network 114 can access a data store 4604 of visual interface modules. A plurality of uniquely identified interface modules can be stored in data store 4604. For example, each interface module in data store 4604 can be associated with a unique interface module ID. In an embodiment, data store 4604 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 4604. In cases where an existing interface module for network device 102 is not found in data store 4604, cloud network 114 can use information in a resource bundle for the network device 102 to generate an interface module, where the resource bundle is provided as part of a registration process for a given network device. The generated interface module can then be stored in data store 4604 and assigned a unique interface module ID. In some embodiments, information in the resource bundle can be used to update an existing interface module stored in data store 4604. After determining the interface module for network device 102, cloud network 114 sends communication 4608 to network device 102 in order to provide a unique interface module ID to the network device 102. In one embodiment, communication 4608 can include a unique tile ID corresponding to a modular tile for network device 102 that is stored in data store 4604. In some embodiments, communication 4608 includes a unique tile ID corresponding to a modular tile defined for network device 102. Upon receiving communication 4608 with the unique interface module ID (i.e., a unique tile ID), the network device 102 can store the unique interface module ID. In one embodiment, for example, the unique interface module ID can be stored by an interface device 4601 of the network device 102 that is configured to provide the interface module ID to an access device or gateway. In an embodiment, the interface device 4601 is implemented as a 'smart module' in hardware and firmware, such as, for example, a system on a chip (SOC) integrated into the network device 102.

The interface device 4601 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 4601 loses power, information stored in the flash memory may be retained. The DRAM of the interface device 4601 may store various other types of information needed to run the interface device 4601, such as all runtime instructions or code. The flash memory or DRAM or a combination thereof may include all instructions necessary to communicate with network device 102.

The process 4600 can include sending, from the access device 108, intra-network communication 4610 including a query, to the network device 102. The query can be a request for information such as a query for capabilities, a request for an identity of the network device 102, and/or a request for a unique interface module ID. For example, communication 4610 can be sent from access device 108 to network device 102 to query network device 102 about its identity. In response to the query sent from access device 108, the process 4600 can include receiving intra-network communication 4612 at the access device 108 with device information for the network device 102. According to an embodiment, in response to the query, the network device 102 can send communication 4612 to inform the access device 108 of the identity and/or capabilities of the network device 102. For instance, in response to receiving the query, the network device 102 may send communications 4612 to the access device 108 with at least a unique interface module ID. The process 4600 can include utilizing intra-network device communications 4610 and 4612 as part of a discovery process for the network device 102. For example, when the network device 102 is initially connected to the network, it and access device 108 can automatically exchange communications 4610 and 4612 to provide the access device 108 with information that can be used to determine a basic, default visual interface stored in cache 4602.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 4612 may be received when the network device 102 is rebooted (e.g., powered on, reset or restored to default settings, or the like). For example, when the network device 102 is rebooted, it may broadcast one or more messages on the local area network to discover whether there are any access devices in the local area network 100. For example, communication 4612 may be broadcast according to a UPnP protocol during a discovery process. The network device 102 may receive communications 4610 from access device 108 indicating that it is located within the local area network and interrogating network device 102 about its functionalities. That is, after receiving a broadcast message from network device 102, access device 108 may then query network device 102 by sending communication 4610 in order to receive the communication 4612 including information about the network device.

After receiving communication 4612, if the access device 108 can access the cloud network 114, it sends a communication 4614 to the cloud network 114 as a request for an interface module for the network device 102. Communication 4614 is described in further detail below. Otherwise, if the access device 108 cannot access the cloud network 114, the access device 108 looks up the unique interface module ID received from the network device 102 in cache 4602. As discussed above, cache 4602 can be a local cache stored on the access device 108. Basic properties for known interfaces can be stored in cache 4602 as a device type and controls information. These basic properties can include, for example, a default icon, a default name, and interactive elements or interactive areas for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 4614 to query the cloud network 114 about network device 102. The communication 4614 can include at least the unique interface module ID for the network device 102. At this point, the cloud network 114 can compare the unique interface module ID of the network device 102 to known interface module IDs stored in data store 4604 in order to determine that there is a match between the unique interface module ID sent with communication 4614 and a known interface module. If the cloud network 114 finds an interface module in its data store 4604, it transmits the interface module to the access device 108 via communication 4616. For example, if the access device 108 is currently using a default interface module for network device 102 that was determined based on exchanging communications 4610 and 4612, and then subsequently is able to connect to the cloud network 114, communications 4614 and 4616 between the access device 108 and the cloud network 114 can be used to obtain an updated interface module for the network device 102.

Upon receiving communication 4616 from the cloud network 114, the access device 108 populates a record in cache 4602 corresponding to the network device 102 with device type and controls information received via communication 4616. That is, when the access device is remote from the local area network 100, it can exchange communications 4614 and 4616 with the cloud network 114 to receive an interface module for a network device. Information received via communications 4616 can be used to populate records of cache 4602. Records in cache 4602 can be updated using modular interfaces received via communication 4616. In additional or alternative embodiments, new records can be created in cache 4602 when communication 4616 includes a modular interface for a newly discovered network device.

Records 4624, 4626, 4628 in cache 4602 store device types, unique interface module IDs, and controls information for known network devices. The access device 108 uses the records in cache 4602 to render visual interfaces in the display 4622. For example, the display 4622 can include a navigable list of modular tiles corresponding to network devices in the local area network 100.

Display 4622 can also include an indicator representing a state of network device 102. In embodiments, communications 4612 and/or 4614 can include a last known state of the network device 102 and/or historical data associated with the network device 102. In one embodiment, such state information can be based on information received via communication 4612 from the network device 102 when the access device 108 is connected to the local area network 100. In this way, display 4622 of the access device 108 can reflect a current state and historical data for the network device 102 when the access device is not connected to the local area network 100. In additional or alternative embodiments, the state information can be based on information received via communication 4616 from the cloud network 114 when the access device 108 is connected to the cloud network 114. Using the state information, an interface module or tile for the network device 102 within display 4622 can indicate an 'on' or 'off' state for the network device 102 when the network device is powered on or off.

Figure 47:
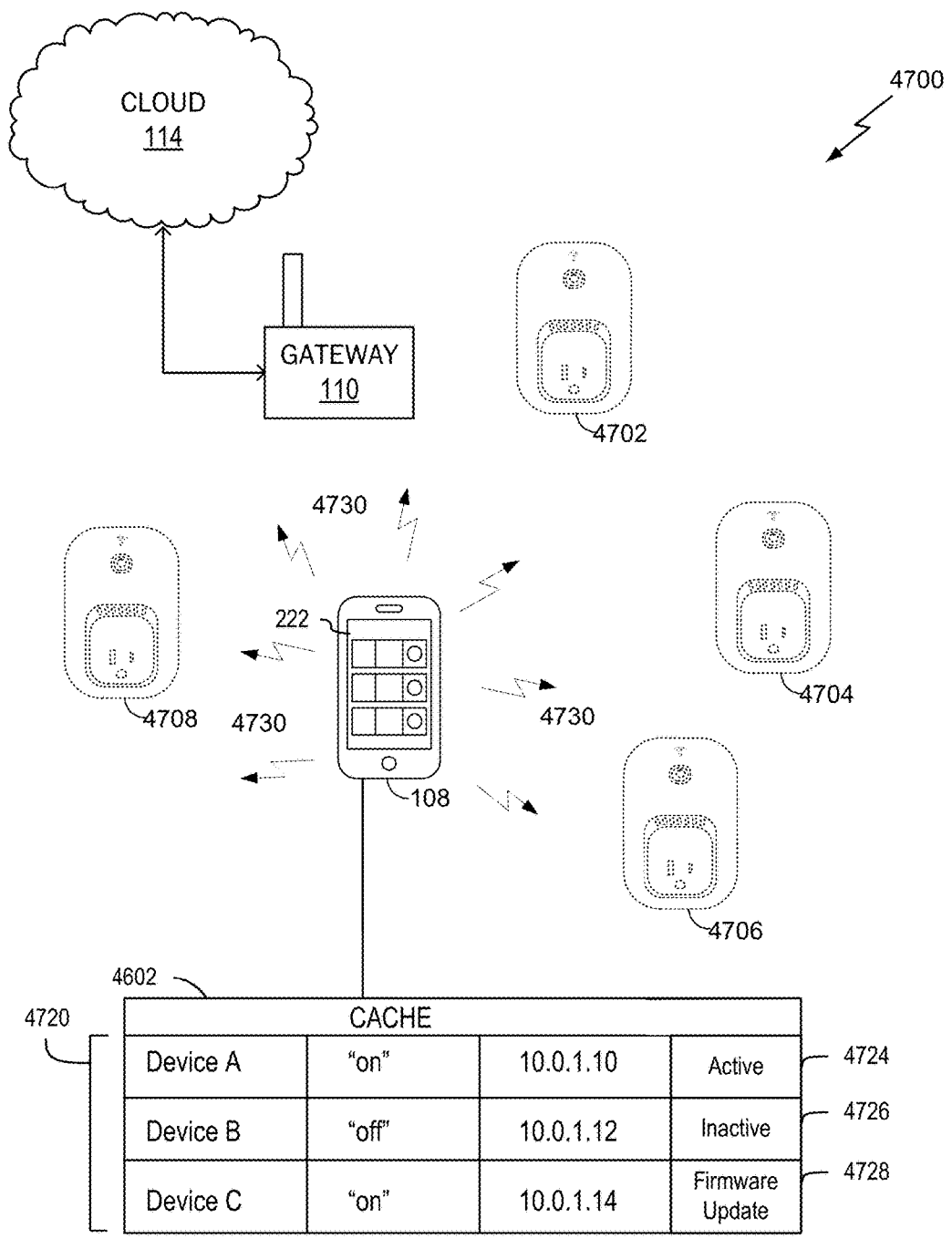
FIG. 47 is an illustration of an example of a network environment, in accordance with some embodiments.

FIG. 47 illustrates an example of a network 4700, according to embodiments of the present invention. Specifically, the network 4700 can be a wireless local area network enabling an access device to communicate with network devices to control adjustment of attributes related to operation of the network devices. Network 4700 includes network device 4702, network device 4704, network device 4706, and network device 4708. The network 4700 also includes access device 108. In other words, the network 4700 may be substantially similar to the network 100 except that access device 108 has been turned on near the network 4700, to which it is associated, or has entered an area to which the network 4700 can reach.

When access device 108 can enter the network 4700 as shown in FIG. 47, access device 108 may be authenticated based on the access device's authentication with the logical network or may otherwise commence communication with cloud network 114. Access device 108 may also communicate notification of its presence or other information directly to other network devices 4702-4708 within network 4700, as shown in FIG. 47 by communication paths 4730. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 4700, including network device 4702, network device 4704, network device 4706, and network device 4708, information/data regarding its status. Such status data may include the fact that it is present and turned on, or other status data/information. At any time that network devices 4702, 4704, 4706 and 4708 recognize that access device 108 is present at network 4700, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 4702-4708 and access device 108 may each receive communication from other network devices around the network 4700, including the status of each of those network devices, network devices 4702-4708 and/or access device 108 may be continuously scanning network 4700 (including, for example, running discovery algorithms) to determine whether any devices within the network have moved, turned on/off or otherwise added to or subtracted from the network 4700, or have otherwise changed statuses.

Since network devices 4702-4708 and access device 108 may each receive communication from other devices around network 4700, including the status of each of those devices, each network device within network 4700 may know the status of each other network device in the network 4700. For example, access device 108 or devices 4702-4708 may not be required to communicate with cloud network 114 in order to obtain one or more of such statuses. Since cloud network 114 is an external network and may be remote from network 4700, communication between network devices within the network 4700 and cloud 114 may take more time than communication between two devices within network 4700. For example, communication between devices within network 4700 may take anywhere from 1 millisecond to 100 milliseconds, while communication between a device within network 4700 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 4700 may choose to send and receive/retrieve statuses directly with other devices within the network 4700 instead of communicating such information via cloud network 114. When a network device receives status data from another network device on the device's local area network 4700, it may store that status data so that it may retrieve and use that status data at a later time.

The network 4700 can enable user to monitor and/or control operation of the network devices 4702-4708. For example, the user can monitor and control network devices by interacting with a visual interface of the gateway 110 (i.e., a web page for gateway 110) and/or a visual interface rendered on display 4622 of the access device 108. In some embodiments, an application may be run on the access device 108. The application may cause the access device 108 to present a graphical interface (e.g., the display 4622) that includes a visual interface for each network device accessible on the network 4700.

The visual interface corresponding to a network device can provide a "status" of the network device. In certain embodiments, the status or state of a network device can be indicated within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a network device. The setting or the attribute can be adjustable within a range of values. For example, the network device can be a light bulb and the status can include a value corresponding to brightness (e.g., a percentage of total brightness) emitted by the light bulb when the light bulb is powered-on. In another example, the network device can be a motion sensor and the status can include a value corresponding to sensitivity of the sensor in a range of values between 0 to 100 when the sensor is powered-on. In yet another example, the network device can be a fan and the status can include a value corresponding to a speed of the fan on a scale of 0 to 100 when the fan is powered-on.

An application operating on the access device 108 can access the cache 4602 to obtain information to display the visual interface for each network device 4702-4708 registered within the network 4700. FIG. 47 also illustrates that each of the network devices 4702-4708 may include a storage device, such as a cache, for storing data, including data regarding its own status and data regarding statuses received from the other network devices within the network 4700.

As explained with reference to FIG. 46, the cache 4602 can contain a known interface list 4620 including interface information for different, known types of network devices. As explained earlier, the known interface list 4620 can include a record for each network device known by the access device 108 to exist on the network 4700. When an application is run on the access device 108, the access device 108 can access the known interfaces 4640 in the cache 4602 to present the display 4622. The display 4622 can present one or more visual interfaces, each corresponding to a network device known to exist on the network 4700. Each visual interface can be generated based on a visual interface module corresponding to each network device on the network 4700. In an example, the display 4622 can include a visual interface (e.g., a module tile) for each network device in the network 4700 having an interface in the known interface list 4620.

The cache 4602 can also contain a known network device list 4720 with a Device A (e.g., network device 4702) last known address 4724, a Device B (e.g., network device 4704) last known address 4726, and a Device C (e.g., network device 4706) last known address 4728. The known device list 4720 can list each network device known by the access device 108 to exist on the local area network 4700. Network devices 4702-4706 can be present on the known device list 4620 because the access device 108 or another device capable of updating the cache 4602 of the access device 108 has previously discovered network devices 4702-4706.

In addition to address information, the cache 4602 can contain known status information 4604 about each network device in the known device list 4720. When the application is run on the access device 108, the access device 108 can access the known status information in the cache 4602 to present a status display 4622. The access device 108 can populate each tile with an indicator representing the respective known status information for each network device in the known device list 4720. For example, the status display 4622 can include an indicator representing an "on" state for Device A 4702 and Device C 4706, and an indicator representing "off" for Device B 4704. The status display 4622 can include an indicator of one or more attributes, one or more settings, or a combination thereof related to operation of each network device in the network 4700. For example, the status display can include a brightness of a bulb (e.g., a brightness of 56 in a range of values between 0 and 100) of the network device 4702 (e.g., a light bulb), a value of sensitivity of a sensor (e.g., a value of 34 in a range of values 0-100) for the network device 4704 (e.g., a motion sensor), and a value of brightness (e.g., 65 percent brightness) for the network device 4706 (e.g., a light bulb). Although shown as having a single indicator for an attribute or a setting related to operation of a network device, the status display 4622 can present a plurality of indicators corresponding to different attributes and/or settings related to operation of a network device.

In some embodiments, the cache 4602 can include other information about a network device. The other information can indicate a network device's firmware version, last known firmware update status, connectivity to cloud status, registration status (e.g., whether the network device has a key or not), and other such information. The cache 4602 can include information that could be used for troubleshooting. In embodiments described below, the access device 108 can access status information from another other device on the network 4700 and can use that information to update its own cache 4602, update the status display 4622, and/or pass the information to the cloud network 114 and/or the gateway 110 for trouble shooting and/or storage.

In some embodiments, a device, such as the access device 108, may determine a current status of one or more network devices. The device may determine a current status of a network device based on status information stored locally in the cache, such as the device list 4720. The device may receive updated status from network devices, the cloud network 114, the gateway 110, or combinations thereof. The updated status may be stored in the cache 4602. The updated status may be compared to a current status know by a network device to determine whether a change has occurred in the status. In some embodiments, a network device (e.g., the network device 4702, the network device 4704, or the network device 4706) may determine its own updated status and whether a change has occurred in its own current status. The status information determined by the network device and sent to an access device for presentation.

In some embodiments, the device (e.g., the access device 108) may determine a type of status corresponding to a change in status. The type of status may correspond to category of status for a device, such as its availability status, operation status, communication status, or an upgrade status (e.g., whether it is receiving an upgrade in firmware, hardware, and/or software). The type of status may be indicated by the updated status. In some embodiments, a device may determine a type of status based on comparison of an updated status to a current status. The information included in the updated status may be processed to determine a type of status. The type of status of an updated status may be compared to a type of status of a current status to determine whether a change in the current status has occurred.

In some embodiments, a device (e.g., the access device 108) may determine whether another device (e.g., the network device 4702, the network device 4704, or the network device 4706) is associated with a status for a time period (e.g., a threshold time period). The time period may correspond to a threshold time period, during which certain events affecting a status of a network device may be expected to occur. For example, a firmware upgrade to a device may last for a period of time, which may be considered the threshold period. A status existing longer than the threshold time period may be presented to a user. Because some events may be expected to last for a period of time, a status may not be presented to a user when a threshold time period has not been reached. In this manner, status updates that worthy attention of a user, such as those exceeding a threshold time period, may be presented to a user rather than all status updates. The threshold time period may correspond to a type of status. In some embodiments, the threshold time period may be chosen based on the type of status determined for an updated status. The device, such as an access device 108, may determine whether a status of the network device does not change for the threshold time period. The device may make such a determination so that the device can determine whether to present a status update in the display 4622. To determine whether the threshold time period is being met, a device may compare the updated status with a previous updated status to determine whether an updated status reflects a change during the threshold time period. The comparison may be performed periodically as updated status is received or may be performed at the conclusion of a threshold time period.

A device seeking to check the status of any other device on the network may communicate with the cloud network 114, to which all devices on the network are connected either directly or indirectly. Since the cloud network 114 and/or the gateway 110 can store an updated table/list of the statuses of each of the devices 4702-4706 within the requesting network's local area network, the cloud network 114 and/or gateway 110 may communicate such status data to the network devices 4702-4706 and the access device 108. For example, if network device 4702 and 4706 were to each turn on and communicate their statuses to cloud network 114, cloud network 114 may analyze the status of network devices 4702 and 4706 and communicate to network devices 4702 and 4706 that they are each connected to the same local area network.

Throughout FIGS. 48-53, various displays are shown for managing presentation of a status of a device in accordance with some embodiments. The displays shown in the FIGS. 48-53 may present one or more graphical or visual interfaces (e.g., a modular tile). Such interfaces may be rendered upon execution of a visual interface module by an application executing on a computing device, e.g., the access device 108. The visual interfaces may be shown with one or a combination of modular tiles, interactive areas, interactive elements, icons, links, command regions, windows, toolbars, sub-menus, drawers, and buttons that are used to initiate actions, invoke routines, monitor network devices, configure network devices, control network devices, or invoke other functionality. The visual interfaces may display a status of a device, display a current state of a device, display historical data associated with a device, display a last known status of a device, receive input to adjust one or more settings and/or one or more attributes related to operation of a device, receiving input to adjust one or more secondary settings of a device, enable a user to cause notifications to be sent, or a combination thereof. For brevity, the differences occurring within the figures, as compared to previous or subsequent figures, are described and illustrated below for purposes of illustration.

Figure 48:
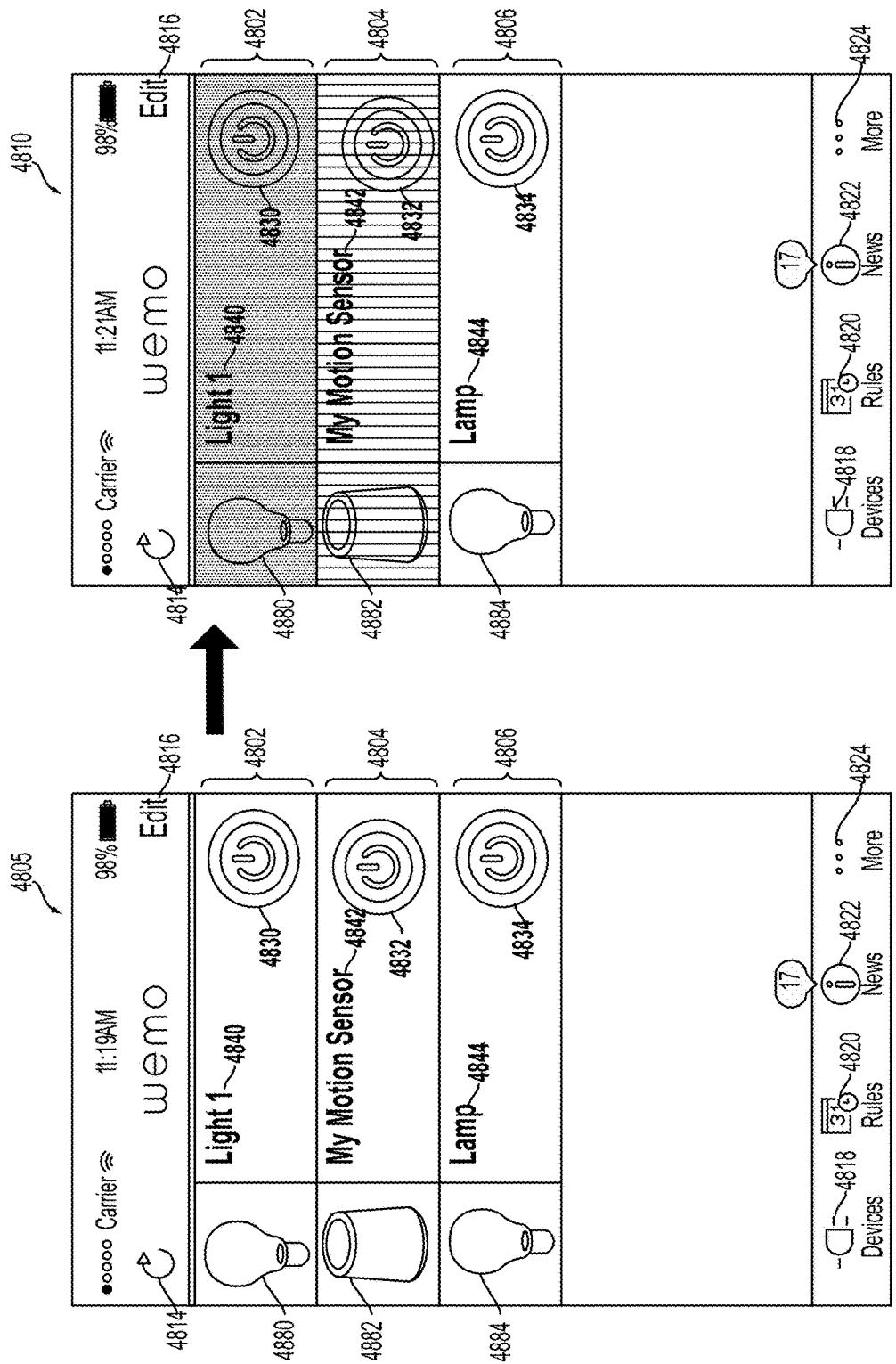
FIGS. 48-53 depict examples of various interfaces for displaying a status associated with network devices in accordance with some embodiments.

FIG. 48 shows an example of interfaces presented by a device (e.g., the access device 108) according to some embodiments. In particular, FIG. 48 shows a display 4805 that presents a graphical interface with modular tiles 4802, 4804, 4806 for interacting with network devices in a network. The modular tile 4802, modular tile 4804, and the modular tile 4806 may correspond to network device 4702, network device 4704, and network device 4706, respectively. A modular tile may enable interactions to monitor and/or control operation of a network device corresponding to the modular tile. Interaction with a modular tile may enable a user to cause a status of the network device to be updated such that the tile may show a current status of the network device. In some embodiments, a modular tile may indicate a current status of a network device and may be modified to show updates in the status.

A modular tile may include interactive areas or interactive elements to enable interaction with the modular tile. In some embodiments, the modular tile may be an interactive area or an interactive element to receive input to control operation of a network device corresponding to the tile. The modular tiles 4802, 4804, 4806 may each include respective icons 4880, 4882, 4884, and respective names 4840, 4842, 4844 corresponding to a network device. For example, the modular tile 4802 corresponds to the network device 4702 (e.g., a light bulb) and includes an interactive element depicted as a power button 4830 for turning the network device 4702 on and off. In another example, the modular tile 4804 corresponds to the network device 4704 (e.g., a motion sensor) and includes an interactive element depicted as a power button 4832 for turning the network device 4704 on and off. In another example, the modular tile 4806 corresponds to the network device 4706 (e.g., a light bulb) and includes an interactive element depicted as a power button 4834 for turning the network device 4706 on and off.

An interactive element shown as a control (e.g., power button) in a modular tile may be displayed based on a state or a status of the network device corresponding to the tile including the control. An appearance of the interactive element may be altered to be visibly illuminated, colored, shaded, bolded, animated, modified to a different shape, or a combination thereof. In some embodiments, the interactive element may be modified to a modified interactive element. The modified interactive element may have a modified appearance that is different from an appearance of the interactive element before modification. Although depicted as a corresponding to a single network device, each modular tile may correspond to multiple network devices, or a group of network devices. For purposes of illustration, a modular tile may be described herein as enabling control for operation of a network device. However, in some embodiments, a modular tile may enable control for operation of multiple network devices, some or all of which may be different.

In some embodiments, the modular tile may be an interactive element that is modified to reflect a status of a network device corresponding to the tile. The tile may be modified to a modified tile. The modified tile may have a modified appearance (e.g., a modified graphical appearance) that is different from an appearance (e.g., a graphical appearance) of the tile before modification. The appearance may be modified to reflect a current status or state of a network device corresponding to the tile. An appearance of the tile may be modified. For example, the tile may be modified to be visibly illuminated, colored, shaded, bolded, animated, modified to a different shape, or a combination thereof.

In some embodiments, a modular tile may be customizable by developers and/or manufacturers of the corresponding network devices. For, example, name 4844 of the modular tile 4804 is customized to indicate the name of a specific type of sensor (e.g., "My Motion Sensor"). In additional or alternative embodiments, a modular tile may convey status information about a corresponding network device or network devices, including, but not limited to, a firmware version, a last known firmware update status, status for connectivity to a cloud network, an availability of the network device or network devices on the network, a firmware update status, a hardware update state, a software update status, connectivity errors or issues that the network device(s) may have encountered, communication issues between the network device(s) and other network devices, a power state, registration status (i.e., an indication that the network device has a key or does not), a primary mode of the network device (i.e., on, off), a secondary mode of the network device (i.e., standby, high, low, eco), other modes of operation, a schedule, settings (e.g., speed or sensitivity) for the network device, one or more attributes (e.g., brightness) related to operation of the network device, rules that may be in effect for the network device or related to operation of the network device, or a combination thereof.

Each of the modular tiles 4802, 4804, 4806 may be chosen and displayed based on the type and/or capabilities of a network device (e.g., the network devices 4802, 4804, 4806). The display 4805 may be flexible and may dynamically display the most appropriate modular tile 4802 based on an environment in which the application executes. For instance, the display 4805 may enables a mechanism in which a user may pre-configure a modular tile to display an appropriate message for a network device.

FIG. 48 shows that display 4805 may include interactive elements (e.g., selectable icons and links) 4814, 4816, 4818, 4820, 4822, and 4824 outside of the modular tiles 4802, 4804, 4806. For example, refresh icon 4814 may be selected to refresh information presented in display 4805, such as, for example, status and state information displayed in or indicated by the modular tiles 4802, 4804, 4806. For instance, one or more of the statuses for each of the modular tiles 4802, 4804, 4806, respectively, may be refreshed on an automatic, periodic basis, in addition to being manually updated when refresh icon 4814 is interacted with (e.g., selected).

In some embodiments, the display 4805 may include an edit link 4816. Interaction with the edit link 4816 may enable one or more of the modular tiles 4802, 4804, 4806 to be editable. For example, edit link 4816 may be selected to sort or re-order the sequence of the modular tiles 4802, 4804, 4806 displayed in the display 4805. Upon interaction with the edit link 4816, one or more of the modular tiles 4802, 4804, 4806 may be interacted with to be disabled or removed. Devices icon 4818 may be selected to cause a graphical interface to be presented with one or more network devices that are discovered in a network.

In some embodiments, the display 4805 may include a rules icon 4820. Interaction with a rules icon 4820 may enable a graphical interface that enables customization of display rules pertaining to the network devices. The graphical interface may provide one or more interactive elements to control one or more rules related to control of the network devices (e.g., the network devices 4702, 4704, 4706). In some embodiments, interaction with the rules icon 4820 may enable a graphical interface to enable a user to configure rules of operation, modes of operation, notifications, or combinations thereof, any or all of which may be stored locally on the network device presenting the display 4805 or other network devices (e.g., the network devices 4702, 4704, 4706). The graphical interface may be presented in the display 4805 or may be shown separately from the display 4805.

In some embodiments, the display 4805 may include a news icon 4822. Interaction with the news icon 4822 may enable a graphical interface to be display which presents news including information associated with the network devices and/or the applications. For instance, interaction with the news icon 4822 may cause a graphical interface to be displayed in the access network device to present information related to the network devices controlled via the modular tiles 4802, 4804, 4806 and/or information relevant to the application, such as notifications of available tile updates.

In some embodiments, the display 4805 may include a more icon 4824. Interaction with the more icon 4824 may provide one or more additional graphical interfaces to enable access to additional features for controlling and/or monitoring the network devices in a network. For example, an additional graphical interface may be displayed to control one or more settings and/or attributes of any network devices connected to a network. In another example, an additional graphical interface may be displayed to configure secondary options to be initiated by an interface used to control a network device. In yet another example, an additional graphical interface may be displayed to present network devices that have a status indicating unavailability of the network device. In some embodiments, a modular tile may be removed from display upon determination of unavailability of the network device corresponding to the tile. An example of an additional graphical interface is described with reference to FIG. 53.

The display 4805 may receive input to adjust one or more settings and/or one or more attributes related to operation of a network device corresponding to a tile presented in the display 4805. The functionalities may include secondary functionalities, tertiary functionalities, etc. beyond primary functionalities (e.g., power control). The display 4805 may be interactive or may include interactive areas configured to receive input to assist the user in controlling functionality, settings, and/or attributes of a network device identified in the display 4805. The display 4805 may be interactive or may include interactive areas to enable initiation of actions and additional actions. For example, each modular tile 4802-4806 may be interactive to receive input. The input received via a modular tile may be used to control operation of a network device corresponding to the modular tile. The input may include one or more contacts by a user. A contact may include a tap, a touch, a click, a swipe, a circular motion, a selection, a continuous movement, other motions, other user interactions, user movements, or combinations thereof. In some embodiments, the input may be received as a series of inputs to control the network device corresponding to the modular tile. The contact may occur in one or more directions on the display 4805 or a modular tile.

The adjustment for controlling operation of the network device 4706 may include adjusting an attribute or an setting (e.g., brightness) of the network device 4706. The adjustment to the attribute can be based on an amount of the input, a length of time when the input is received, a distance of movement corresponding to the input, a direction of the input, or any other data obtained from the input. The network device can be adjusted from a last known state of operation or last known state of an attribute or setting.

In some embodiments, the display 4805 may be modified to a display 4810 to reflect a current status of a network device corresponding to one of the modular tiles 4802-4806. For example, the display 4805 may be modified to the display 4810 to show a change in current status of the network device (e.g., the network device 4702) corresponding to the modular tile 4802 and the network device (e.g., the network device 4704) corresponding to the modular tile 4804. In some embodiments, a graphical appearance of a modular tile or one of its components may be modified to reflect a change in status of the network device corresponding to the modular tile. For example, the graphical appearance of the modular tile 4802 may be modified to a grey color or shaded to indicate that the network device (e.g., "Light 1") is not on the network. In some embodiments, a modular tile or its components may be disabled to prevent a user from controlling operation of a network device using the modular tile or a component that permits interaction. A modular tile or any of its components may be disabled to prevent a user from controlling operation of a network device when a network device has a certain status (e.g., inactive or unavailable on the network). In another example, the graphical appearance of the modular tile 4804 is modified to a different color or pattern to indicate that the network device (e.g., "My Motion Sensor") is undergoing a firmware update. In some embodiments, a graphical appearance of a modular tile may be displayed in one of many different patterns and/or colors to reflect a type of status. In the display 4810, a graphical appearance of the modular tile 4804 may be modified differently than the graphical appearance of the modular tile 4802 to illustrate a different in types of status, In some embodiments, the modular tile or a component of a modular tile may not be modified to reflect a change in status until a threshold time period is reached. The threshold time period may enable a determination to be made as to whether the change is temporary or due to a brief event (e.g., a firmware update or intermittent problem) as opposed to a problem or a status that may last much longer. By making such a determination, the status of a modular tile can be updated to reflect events of relevance to a user. Whereas indicating a status change immediately upon such determination, a user may be burdened and possibly prevented from using a network device when such status may change again. Therefore, it may be desirable to indicate a change in the current status of a network device upon determining that an updated status of a network device is not temporary, but rather may last longer than the threshold time period. Such a technique may provide assurances to a user that a status of a network device has in fact changed. In some embodiments, the threshold time may correspond to a type of status. For example, a threshold time for a firmware update to a network device may be 17 seconds corresponding to amount of time needed to perform an update. In another example, the threshold time for an inactive network device may correspond to 1 minute, after which a system may be able to confirm that a network device has in fact become inactive such that the network device may not receive communication.

Figure 49:
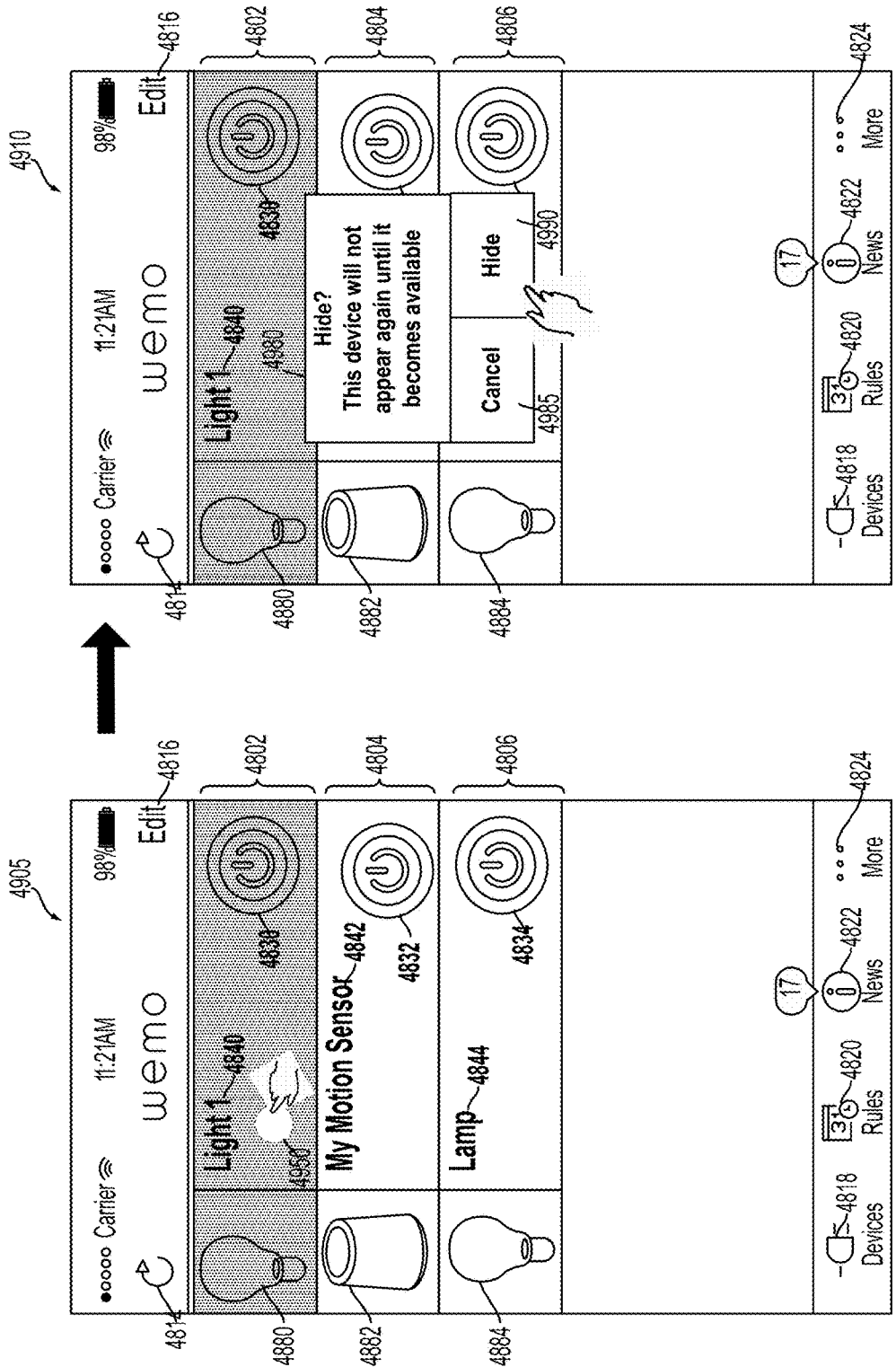

FIG. 49 shows another example of interfaces presented by a device (e.g., the access device 108) according to some embodiments. The display 4905 may include elements described with reference to FIG. 48, such as elements included in the display 4805. The display 4905 includes a graphical interface with the modular tiles 4802, 4804, 4806. The modular tile 4802, modular tile 4804, and the modular tile 4806 may correspond to network device 4702, the network device 4702, and the network device 4706, respectively. Specifically, FIG. 49 shows techniques for removing a modular tile from a display present by a network device. In some embodiments, a modular tile may be removed when an updated status of a network device corresponds to certain types of statuses. For example, when a network device becomes inactive, a user may interact with a modular tile corresponding to the network device to request the modular tile to be removed. Removing a modular tile may prevent a user from attempting to control a network device, which may or may not be operational depending on the type of status (e.g., inactive or unavailable). Further, by removing modular tiles, organization of network devices shown on a display may be improved so as to enable a user to identify information about network devices that are operational (e.g., active or available).

In one example, input may be received via a modular tile, such as the modular tile 4802, in the display 4905. The modular tiles 4802-4806 may be interactive to receive input. For example, input may be received via interaction with an area (e.g., an area 4950) of the modular tile 4802. In some embodiments, the area may correspond to the button (e.g., the button 4830) in a modular tile. In some embodiments, a modular tile or one of its components may be interactive when a corresponding network device has a certain type of status. In this example, the modular tile 4802 may have an appearance of the modular tile 4802 in the display 4810. The appearance of the modular tile 4802 in the display 4905 may indicate a certain type of status of a network device, such as unavailability or an inactive state of the network device. The input received in the area 4950 may include one or more contacts with the area 4950 by a user. A contact may include a tap, a touch, a click, a swipe, a motion, a selection, a continuous movement, other motions, other types of interactions, or combinations thereof. In some embodiments, the input received may correspond to a request to remove the modular tile 4802.

In some embodiments, a display, such as the display 4905, may be modified to the display 4910 to present an additional graphical interface 4980 in response to the input received for the modular tile 4802. The graphical interface 4980 may be presented to enable a user to confirm a request to remove the modular tile 4802. The graphical interface 4980 may be presented in the display 4910 or in a different display on the same network device. The graphical interface 4980 may provide additional information about a status of a network device corresponding to the modular tile requested for removal. One or more interactive elements may be included in the graphical interface 4980. For example, an interactive element 4985 (e.g., "Cancel") in the graphical interface 4980 may enable a user to cancel a request to remove the modular tile 4802. In another example, an interactive element 4990 (e.g., "Hide") in the graphical interface 4980 may enable a user to confirm a request to remove the modular tile 4802. By confirming, the modular tile 4802 may be removed. A graphical interface like the graphical interface 4980 may be presented for other modular tiles in response to input received via those modular tiles.

Figure 50:
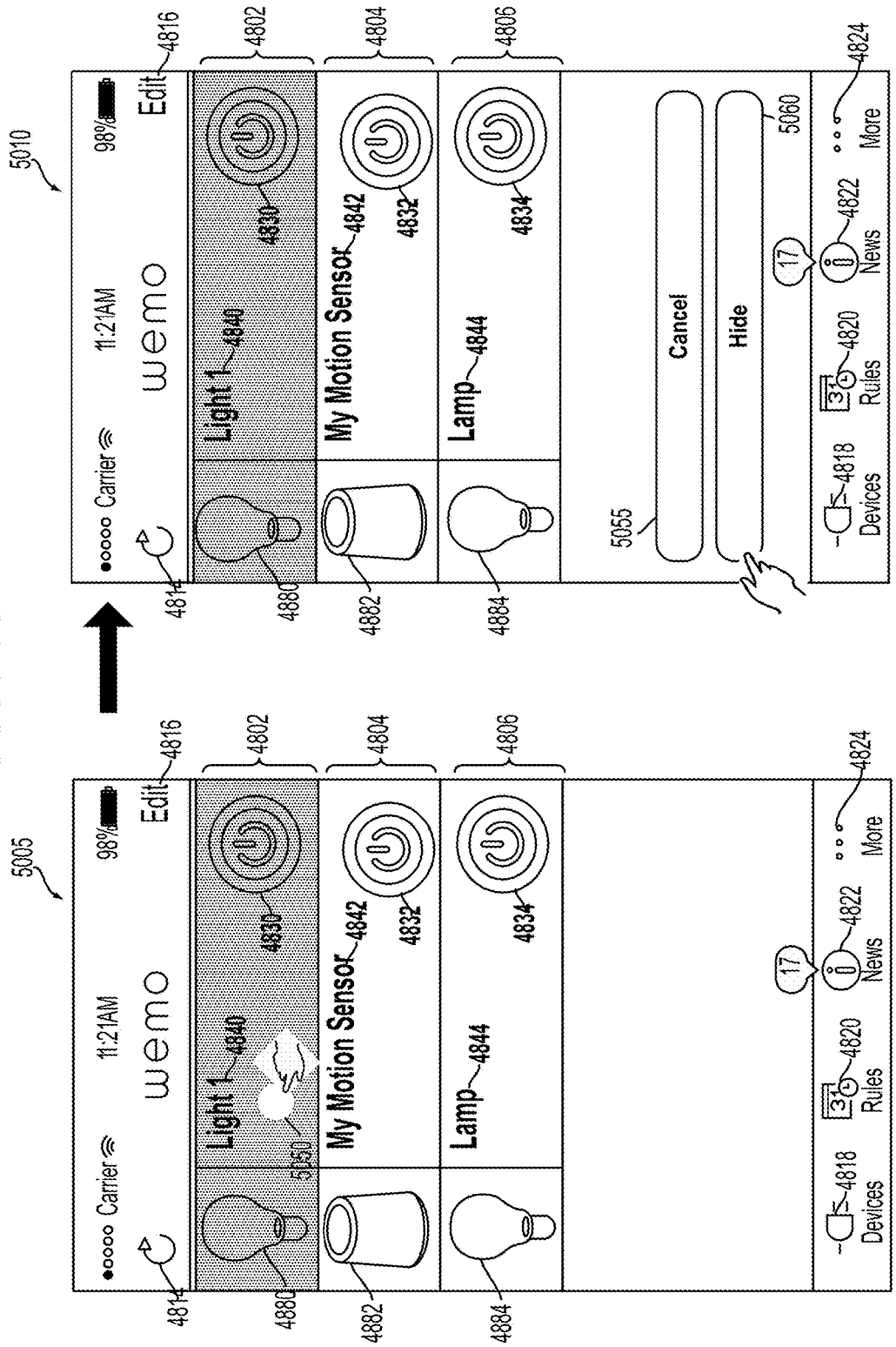

FIG. 50 shows another example of interfaces presented by a device (e.g., the access device 108) according to some embodiments. The display 5005 may include elements described with reference to FIG. 48, such as elements included in the display 4805. The display 5005 includes a graphical interface with the modular tiles 4802, 4804, 4806. The modular tile 4802, modular tile 4804, and the modular tile 4806 may correspond to network device 4702, the network device 4702, and the network device 4706, respectively. Specifically, FIG. 50 shows techniques for removing a modular tile from a display present by a device. In some embodiments, a modular tile may be removed when an updated status of a network device corresponds to certain types of statuses. The example in FIG. 50 illustrates another technique for enabling a user to request a modular tile to be removed.

In one example, input may be received via a modular tile, such as the modular tile 4802, in the display 5005. The modular tiles 4802-4806 may be interactive to receive input. For example, input may be received via interaction with an area (e.g., an area 5050) of the modular tile 4802. In some embodiments, the area may correspond to the button (e.g., the button 4830) in a modular tile. In some embodiments, a modular tile or one of its components may be interactive when a corresponding network device has a certain type of status. In this example, the modular tile 4802 may have an appearance of the modular tile 4802 in the display 4810. The appearance of the modular tile 4802 in the display 5005 may indicate a certain type of status of a network device, such as unavailability or an inactive state of the network device. The input received in the area 5050 may include one or more contacts with the area 5050 by a user. In some embodiments, the input received may correspond to a request to remove the modular tile 4802.

In some embodiments, a display, such as the display 5005, may be modified to the display 5010 to present one or more interactive elements 5055, 5060 in response to the input received for the modular tile 4802. The interactive elements 5055, 5060 may be presented to enable a user to confirm a request to remove the modular tile 4802. The display 5010 may be modified to provide additional information about a status of a network device corresponding to the modular tile requested for removal. In the example of FIG. 50, the interactive element 5055 (e.g., "Cancel") may enable a user to cancel a request to remove the modular tile 4802. The interactive element 5060 (e.g., "Hide") may enable a user to confirm a request to remove the modular tile 4802. By confirming, the modular tile 4802 may be removed. Interactive elements such as the interactive elements 5055, 5060 may be presented for other modular tiles in response to input received via those modular tiles.

Figure 51:
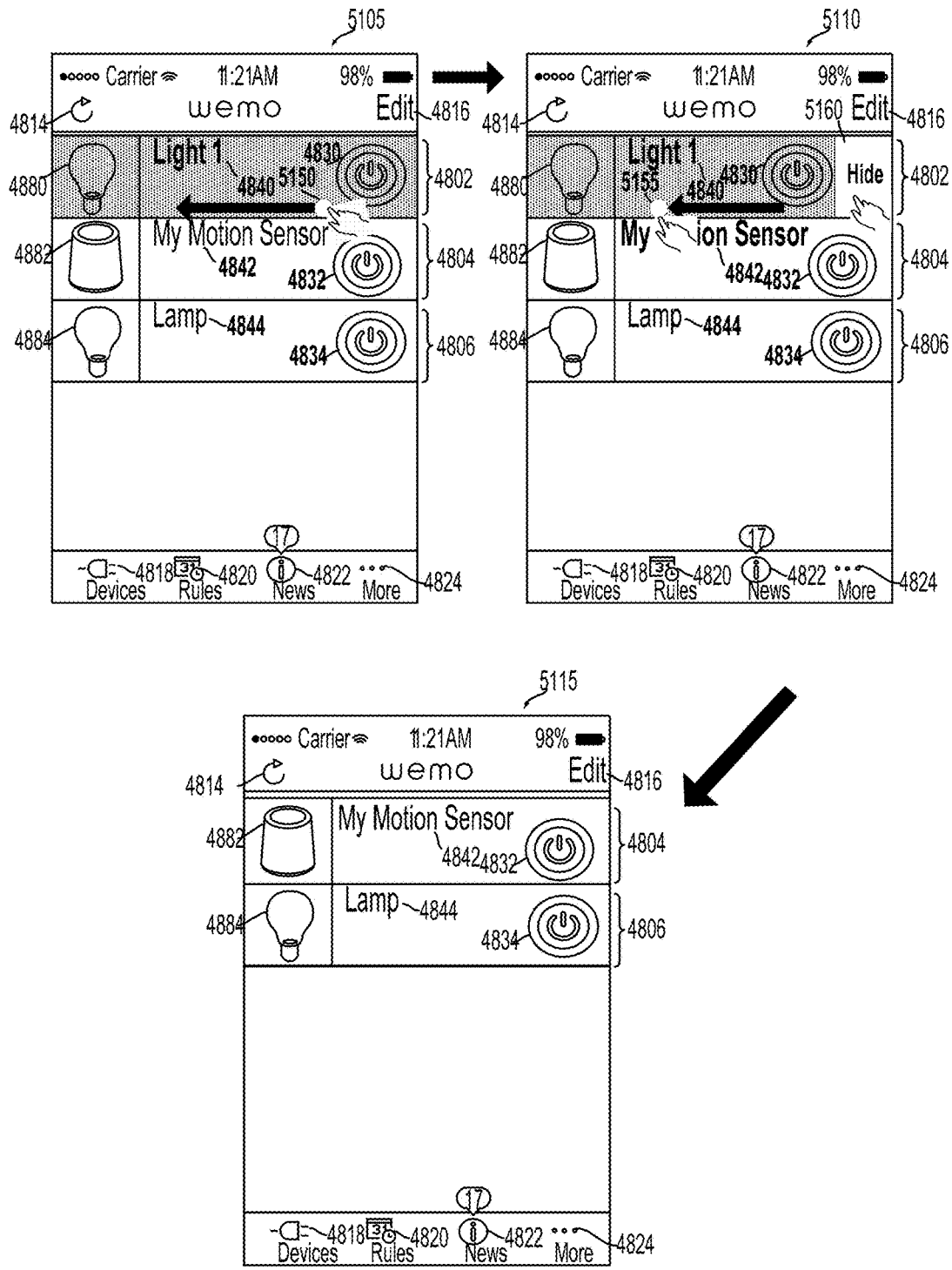

FIG. 51 shows another example of interfaces presented by a device (e.g., the access device 108) according to some embodiments. The display 5105 may include elements described with reference to FIG. 48, such as elements included in the display 4805. The display 5105 includes a graphical interface with the modular tiles 4802, 4804, 4806. The modular tile 4802, modular tile 4804, and the modular tile 4806 may correspond to network device 4702, the network device 4702, and the network device 4706, respectively. Specifically, FIG. 51 shows other techniques for removing a modular tile from a display present by a device. In some embodiments, a modular tile may be removed when an updated status of a network device corresponds to certain types of statuses. The example in FIG. 51 illustrates another technique for enabling a user to request a modular tile to be removed.

In one example, input may be received via a modular tile, such as the modular tile 4802, in the display 5005. The modular tiles 4802-4806 may be interactive to receive input. For example, input may be received via interaction with an area (e.g., an area 5150) of the modular tile 4802. In some embodiments, a modular tile or one of its components may be interactive when a corresponding network device has a certain type of status. In this example, the modular tile 4802 may have an appearance of the modular tile 4802 in the display 5110. The appearance of the modular tile 4802 in the display 4810 may indicate a certain type of status of a network device, such as unavailability or an inactive state of the network device. The input received in the area 5050 may include one or more contacts with the area 5050 by a user. In some embodiments, the input received may correspond to a request to remove the modular tile 4802. In the example shown in FIG. 51, a user may provide input beginning with an interaction at the interactive area 5050 and continuing to an interactive area 5155 shown in the display 5110. The input may correspond to a swipe movement or a motion across the modular tile 4802. In some embodiments, the display 5110 may be modified to enable a user to perform continuous interaction within a modular tile.

The display 5110 may be presented with a modified modular tile based on the modular tile 4802. The modular tile 4802 may be modified to present an interactive element 5160 (e.g., "Hide") in response to the input corresponding to the interaction from the interactive area 5150 to the interactive area 5155. The interactive element 5160 may be interactive to receive input. Interaction with the interactive element 5160 may cause the modular tile 4802 in the display 5110 to be removed. The display 5110 may be modified to the display 5115 in which the modular tile 4802 is removed in response to interaction with the interactive element 5160.

Figure 52:
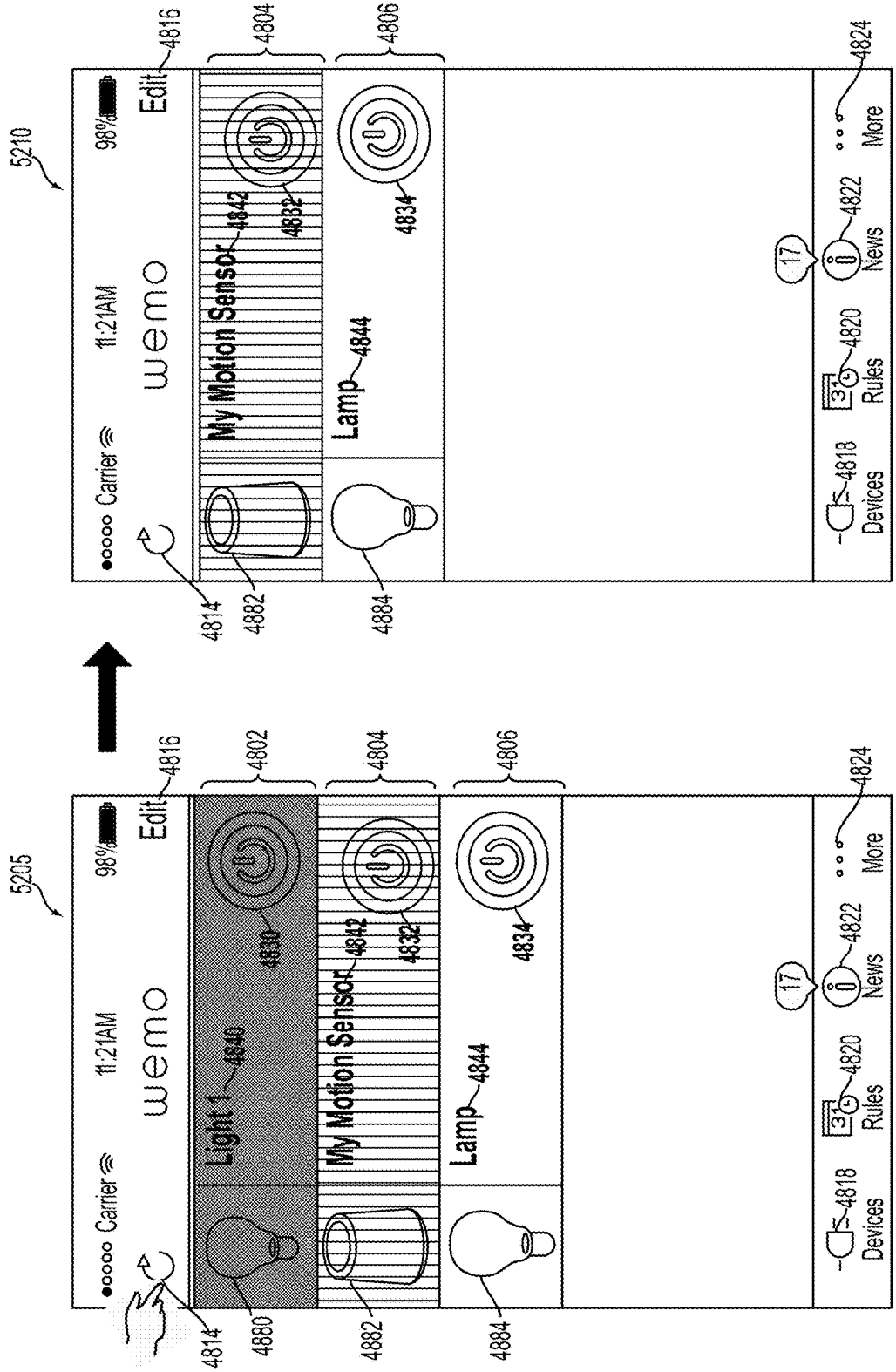

FIG. 52 shows another example of interfaces presented by a device (e.g., the access device 108) according to some embodiments. Specifically, FIG. 52 shows other techniques for removing a modular tile from a display present by a device. In some embodiments, a modular tile may be removed when an updated status of a network device corresponds to certain types of statuses. The example in FIG. 52 illustrates another technique for enabling a user to request a modular tile to be removed.

The display 5205 may include elements described with reference to FIG. 48, such as elements included in the display 4805. The display 5205 includes a graphical interface with the modular tiles 4802, 4804, 4806. The modular tile 4802, modular tile 4804, and the modular tile 4806 may correspond to network device 4702, the network device 4702, and the network device 4706, respectively. In this example, the modular tile 4802 may have an appearance of the modular tile 4802 and the modular tile 4804 may have an appearance of the modular tile 4804 in the display 4810. The appearance of the modular tile 4802 and the modular tile 4804 in the display 5205 may indicate a certain type of status of a network device. For example, the modular tile 4802 may indicate unavailability of the network device 4702 and the modular tile 4804 may indicate a firmware update of the network device 4704.

In the example shown in FIG. 52, a user may interact with the refresh icon 5214 in the display 5205 to refresh information shown in the display 5205. For instance, one or more of the statuses for each of the modular tiles 4802, 4804, 4806, respectively, may be refreshed when the refresh icon 4814 is interacted with (e.g., selected). To refresh the information, the device presenting the display may obtain updated status information about the network devices corresponding to the modular tiles 4802-4806. As explained above, an access device (e.g., the access device 108) may maintain status information about network devices in a known device list 4720. The access device may access the cache 4602 to determine updated status information about each device in the known device list 4720.

In some embodiments, receiving input via the refresh icon 5214 may cause the modular tiles 4802-4806 presented in the display 5205 to be refreshed. The display 5105 may be modified to the display 5110 to display an updated status of network devices corresponding to the modular tiles 4802-4806. In some embodiments, new modular tiles may be presented corresponding to network devices that are connected to a network and/or that have a certain type of status (e.g., available, active, etc.). In some embodiments, one or more of the existing modular tiles 4802-4806 in the display 5105 may be removed based on a type of status. For example, the modular tile 4802 may be removed and not presented in the display 5210 because the network device corresponding to the modular tile 4802 is inactive or unavailable. However, the modular tile 4804 may not be removed because the sensor corresponding to the modular tile 4804 is undergoing a firmware update, which may last for a short time. In such instances, it may be desirable for modular tiles certain types of statuses to remain in a display.

In some embodiments, rather than removing a modular tile, a modular tile may be placed in a different position in the display 5210, such as at the bottom of an order of modular tiles.

Figure 53:
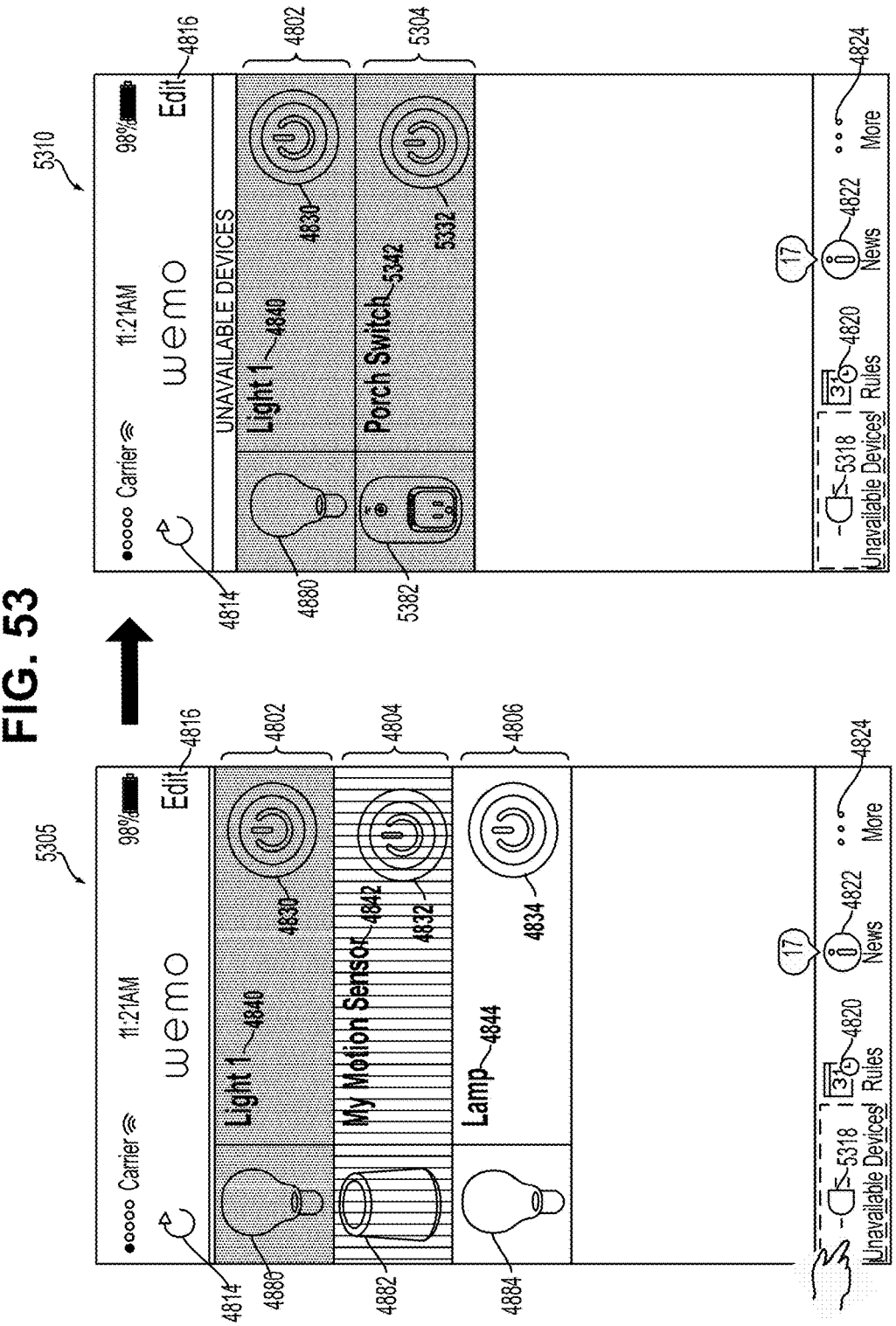

FIG. 53 shows another example of interfaces presented by a device (e.g., the access device 108) according to some embodiments. Specifically, FIG. 53 illustrates graphical interfaces for managing information about devices that are unavailable. For purposes of illustration, FIG. 53 is described according to an example of devices that are unavailable. The techniques described for FIG. 53 may be implemented for modular tiles corresponding to network devices having other types of statuses.

The display 5305 may include elements described with reference to FIG. 5, such as elements included in the display 4805. The display 5305 includes a graphical interface with the modular tiles 4802, 4804, 4806. The modular tile 4802, modular tile 4804, and the modular tile 4806 may correspond to network device 4702, the network device 4702, and the network device 4706, respectively. In this example, the modular tile 4802 may have an appearance of the modular tile 4802 and the modular tile 4804 may have an appearance of the modular tile 4804 in the display 4810. The appearance of the modular tile 4802 and the modular tile 4804 in the display 5305 may indicate a certain type of status of a network device. For example, the modular tile 4802 may indicate unavailability of the network device 4702 and the modular tile 4804 may indicate a firmware update of the network device 4704.

The display 5305 may include an interactive element 5318 (e.g., "Unavailable Devices"). Interaction with the interactive element 5318 may cause the display 5310 to be generated and presented at a device. The display 5310 may present one or more modular tiles 4802, 5304 corresponding, each corresponding to network devices that are unavailable. In some embodiments, one or more of the modular tiles 4802 may have been presented in the display 5305. In some embodiments, the modular tile 5304 may have been previously removed from another display. Although the display 5310 shows network devices that are unavailable, the display 5310 may present modular tiles corresponding to network devices having other types of statuses. The modular tiles 4802, 5304 may be added back to a display such as the display 5305 when a status of the network device corresponding to the modular tile changes from unavailable to another type of status. In some embodiments, the modular tiles shown in a separate display, e.g., the display 5310, may be added back to the display 5305. For example, a user may interact with one or more of the modular tiles 4802 and 5304 to cause these them to be added back to the display 5305. The tiles may be added even if the network devices are unavailable or inactive.

Figure 54:
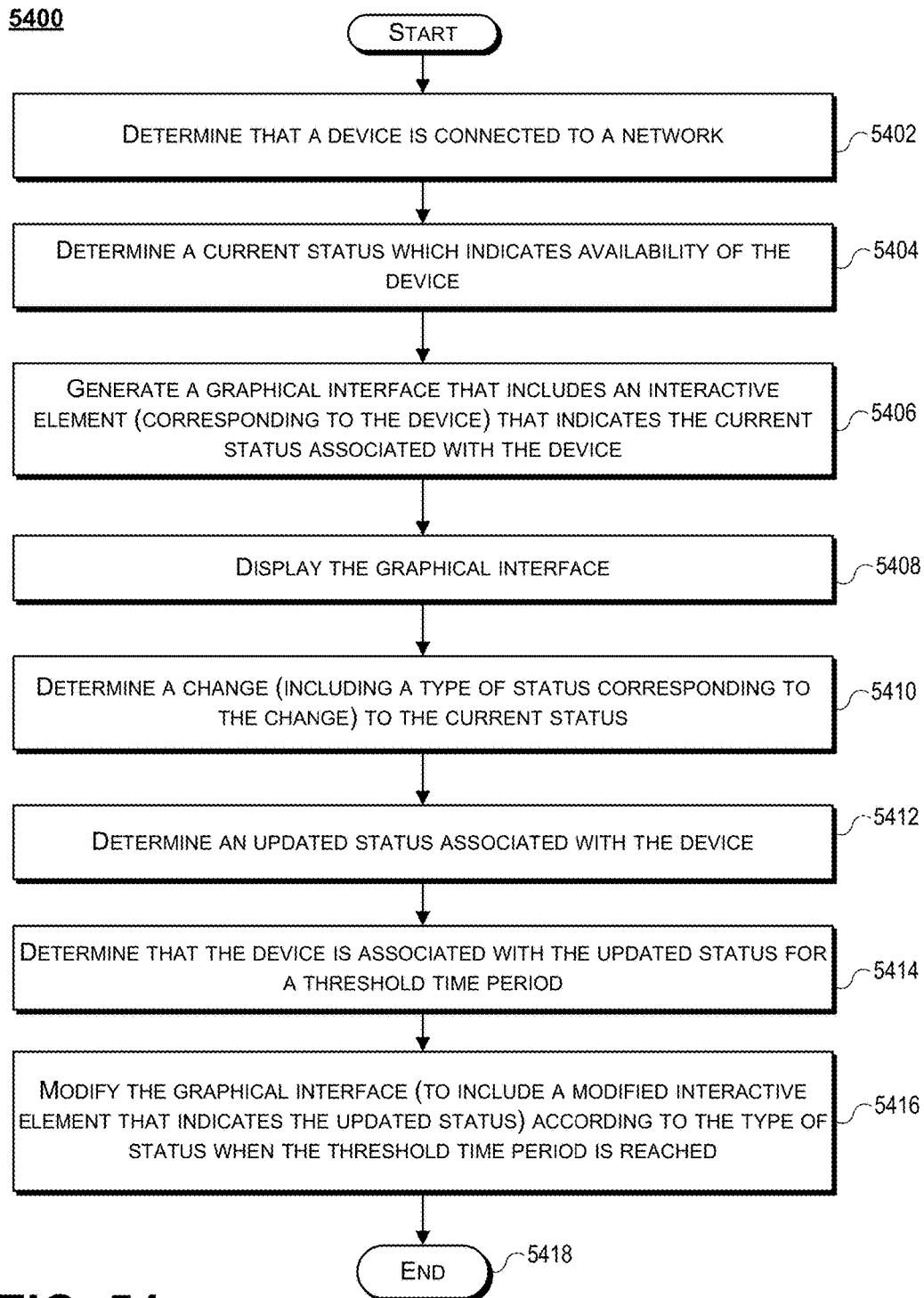
FIG. 54 is a flowchart illustrating a process for displaying a status associated with network devices in accordance with some embodiments.

FIG. 54 shows flowchart is illustrated of embodiments of a process 5400 for displaying a status associated with network devices according to some embodiments of the present disclosure. Specifically, the process 5400 provides a technique for presenting a status of network devices on a network. For example, the process 5400 may be performed by a computing device (e.g., the access device 108) to present a status of network devices (e.g., the network devices 4702, 4704, 4706) on a network (e.g., the local network 4700). A computing network device may implement the process 5400 regardless of whether the computing network device is within a network to which network devices are connected or remotely in communication with the network.

Process 5400 is illustrated as a logical flow diagram, the operation of which represents operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations may be combined in any order and/or in parallel to implement the processes.

Additionally, the process 5400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Beginning at block 5402, the process 5400 may determine that a network device (e.g., network device 4702, network device 4704 or network device 4706) is connected to a network (e.g., the network 4700). Determining that a network device is connected to a network may include locating a unique identifier associated with the network device. A unique identifier for the network device may be received from the network device itself or from the network. 5402 may be performed as part of discovery process to identify network devices in the network. The process 5400 may be performed by a computing device that is not located within the network (i.e., at a remote location outside the network).

At block 5404, the process 5400 may determine a current status of the network device. For example, the access device 108 may determine a current status of one or more of the network devices 4702, 4704, 4706. The status may be determined based on information (e.g., the device list 4720) stored in memory (e.g., the cache 4602) accessible to a computing device. The information may indicate the current status of the network device. In some embodiments, the process 5400 may include determining the current status of the network device based on an updated status received directly from the network device (e.g., the network device 4702, the network device 4704, or the network device 4706), or other devices connected to the network. In some embodiments, the current status may be determined from information received from the cloud network 114. The information may include the status of the network devices on a network. In some embodiments, the process 5400 may include determining the current status from a gateway (e.g., the gateway 110). The current status may be received directly from the gateway or indirectly from the gateway via a cloud network.

In some embodiments, the current status of a network device may indicate information about a status of operation associated with the network device, availability of the network device on a network, other information about a status of the network device, or a combination thereof. For example, a current status of a network device may indicate whether the network device is operational, one or more settings/attributes related to operation of the network device, whether the network device has encountered any communication errors, whether the network device is undergoing updates (e.g., a firmware update, a software update, or a hardware update), or a combination thereof. In another example, a current status of a network device may indicate whether the network device is connected to a network, whether the network device can receive communications from other network devices on the network (e.g., the access device 108, the network device 4702, the network device 4704, or the network device 4706), whether the network device can communicate with one or more gateways of the network, or a combination thereof. In another example, the current status of a network device may indicate whether the network device can communicate with a cloud network (e.g., the cloud network 114).

At block 5406, the process 5400 may include generating a graphical interface (e.g., any one of the displays 4622, 4805, 4905, 5005, 5105, 5205, 5305, 5310) that includes an interactive element (e.g., the modular tile 4802, the modular tile 4804, or the modular tile 4806) corresponding to a network device (e.g., the network device 4702, the network device 4704, or the network device 4706). The interactive element may correspond to a network device on the network. The interactive element may indicate a current status associated with the network device corresponding to the interactive element. For example, a modular tile (e.g., the modular tile 4802, the modular tile 4804, or the modular tile 4806) may indicate a current status of a network device corresponding to the tile. The current status may be indicated by a graphical appearance of the tile which may indicate a current status by shading, coloring, animation, highlighting, or a combination thereof. The graphical appearance may be modified from that which is shown for a different status of the network device. The graphical appearance may include adjusting a size of the tile. At block 5408, the process may include displaying the graphical interface generated at block 5406.

At block 5410, the process 5400 may include determining a change to the current status. The process 5400 may determine a change to the current status by using updated information about a status of the network device. To determine a change, the updated status information about the network device may be compared to the current status. A difference identified based on the comparison may indicate a change in the status. In some embodiments, determining the change may include determining a type of status corresponding to the change. The process 5400 may determine a type of status based on the updated status information. The type of status may for correspond to availability of the network device or operation of the network device.

At block 5412, the process 5400 may include determining an updated status associated with the network device. The updated status associated with the network device may be determined based on the updated status information.

At block 5414, the process 5400 may include determining that the network device is associated with an updated status for a threshold time period. In order words, the process 5400 may determine whether an updated status of the network device has not changed (i.e., remains the same) for a threshold time period. The threshold time period may be based on a type of status. The threshold time period may correspond to a period during which certain events affecting a status of a network device are expected to last. Those events may correspond to a type of status. For example, a threshold time period may correspond to a brief time period when a firmware upgrade is being performed. The threshold time period may correspond to a length of time during which an event should occur that affects a status of a network device. The threshold time period may be brief such that updating a modular tile for a network device is not necessary. In some embodiments, a modular tile corresponding to a network device may not be updated with a status of a network device such as when events occur within the time period. In this example, a modular tile may not be modified during the threshold time period so as to not burden the user with an update that is temporary.

To determine whether the network device is associated with an updated status for the threshold time period, the process 5400 may determine whether the updated status of the network device changes over the threshold time period. For example, the process 5400 may process updated status information received about the network device and compare that information to the updated status determined based on the change. A change in the updated status during the threshold time indicates that the network device does not have the updated status for the entirety of the threshold time period.

Further, the updated status at any given time during the period may be compared with a previous updated status to determine whether the updated status corresponds to a change in a status of the network device. By checking the updated status periodically, the process 5400 can determine whether the updated status has changed corresponding to a change in a status of the network device.

At block 5416, the process 5400 includes modifying the graphical interface according to the type of status when the threshold time period is reached. The graphical interface may be modified when the network device has the updated status for a duration of the threshold time period. For example, a modular tile corresponding to a network device may be modified to indicate a firmware update if the firmware update lasts for the threshold time period. The threshold time period may prevent an update to a modular tile that may burden a user or that may correspond to a change in current status that is expected. By modifying the graphical interface upon satisfaction of the threshold time period, the graphical interface may provide informative updates that are indicative of problems, more than routine changes (e.g., firmware updates) in status. The graphical interface may be modified according to a type of status so as to enable a user to determine a status of a network device based on appearance of the tile. In some embodiments, the interactive element may be modified to indicate the updated status of the network device.

It will be appreciated that process 5400 is illustrative and that variations and modifications are possible. Steps described as sequential may be executed in parallel, order of steps may be varied, and steps may be modified, combined, added or omitted. Process 5400 may be performed for each network device that is determined to be connected to the network. It should be noted that process 5400 might be performed concurrently for other network devices that are connected to the network. Process 5400 may be performed for any number of network devices that can be controlled via a graphical interface displayable by a computing device. Further, the process 5400 may be performed for several actions that may be performed in response to continued interaction with an interactive area corresponding to a network device.

Figure 55:
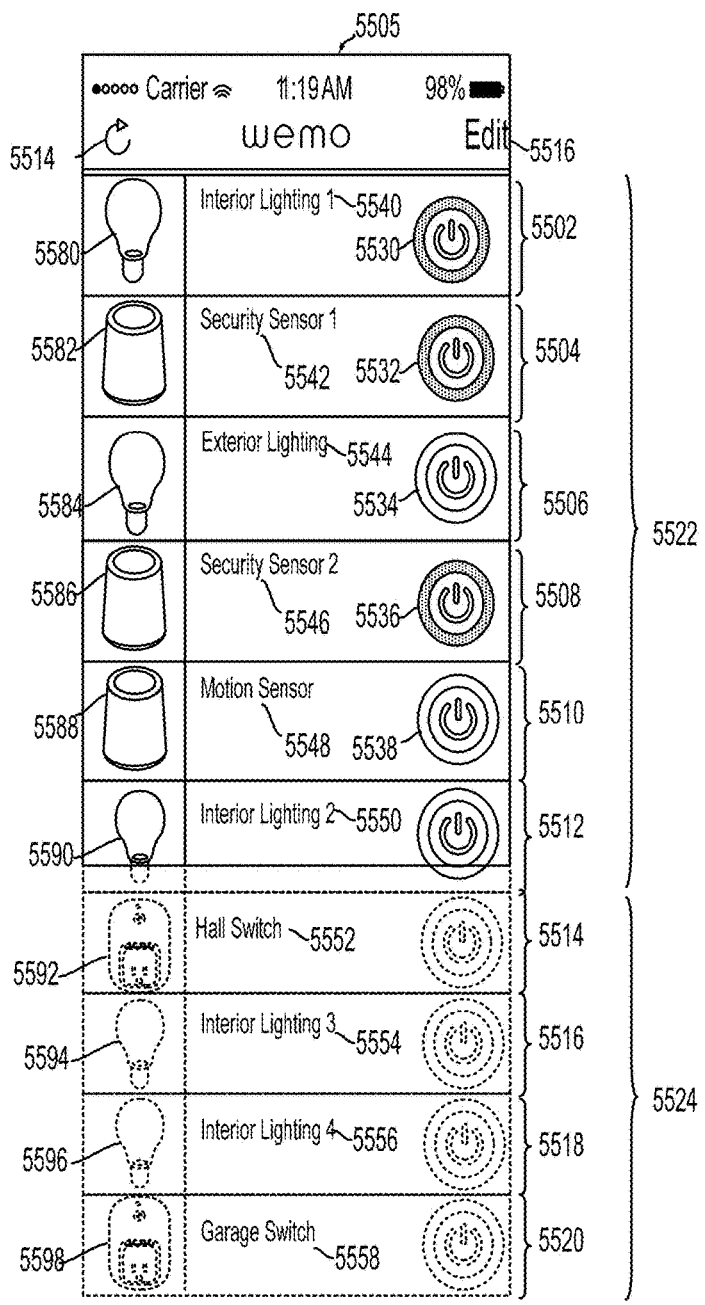
FIG. 55 is an illustration of an example of a proprietary interface of a device, in accordance with some embodiments.

FIG. 55 shows an example of an interface presented by a device (e.g., the access device 108) according to some embodiments. In particular, FIG. 55 shows a display 5505 that presents a graphical interface with modular tiles 5502-5520 for interacting with network devices in a network. The modular tiles 5502-5520 may each correspond to a network device. A modular tile may enable interactions to monitor and/or control operation of a network device corresponding to the modular tile. Interaction with a modular tile may enable a user to initiate one or more actions in addition to operating a network device corresponding to the modular tile. The additional action(s) may offer enhanced functionality that may not be available from a typical interface (e.g., a graphical interface or physical interface) that enables a user to control operation of a network device.

Note that an "access device", such as access device 5508, may be used as an example device that may perform the actions described herein. However, it should be understood that a different device other than an access device may perform the same actions, and are within the scope of the present technology.

A modular tile may include interactive areas or interactive elements to enable interaction with the modular tile. The modular tiles 5502-5520 may each include respective icons 5580-5598, and respective names 5540-5558 corresponding to a network device. For example, the modular tile 5502 corresponds to network device (e.g. a light bulb) and includes an interactive element depicted as a power button 5530 for turning the network device on and off. In another example, the modular tile 5504 corresponds to a different network device (e.g., a security sensor) and includes an interactive element depicted as a power button 5532 for turning the network device on and off. A similar principle applies to modular tiles 5506-5520, and their corresponding network devices. An interactive element shown as a control (e.g., power button) may be displayed based on a state of the network device corresponding to the control. An appearance of the interactive element may be altered to be visibly illuminated, colored, shaded, bolded, animated, modified to a different shape, or a combination thereof. Although depicted as a corresponding to a single network device, each modular tile may correspond to multiple network devices, or a group of network devices. For purposes of illustration, a modular tile may be described herein as enabling control for operation of a network device. However, in some embodiments, a modular tile may enable control for operation of multiple network devices, some or all of which may be different.

In some embodiments, a modular tile may be customizable by developers and/or manufacturers of the corresponding network devices. For, example, name 5544 of the modular tile 5504 is customized to indicate the name of a specific type of sensor (e.g., "Security Sensor"). In additional or alternative embodiments, a modular tile may convey status information about a corresponding network device or network devices, including, but not limited to, a firmware version, a last known firmware update status, status for connectivity to a cloud network, registration status (i.e., an indication that the network device has a key or does not), a primary mode of the network device (i.e., on, off), a secondary mode of the network device (i.e., standby, high, low, eco), other modes of operation, a schedule, a scene that is enabled using the network device, settings (e.g., speed or sensitivity) for the network device, one or more attributes (e.g., brightness) related to operation of the network device, additional actions that have been initiated based on interaction with a modular tile, rules that may be in effect for the network device or related to operation of the network device, or a combination thereof.

Each of the modular tiles may be chosen and displayed based on the type and/or capabilities of a network device associated with each of the modular tiles. The display 5505 may be flexible and may dynamically display the most appropriate modular tile based on an environment in which the application executes. For instance, the display 5505 may enable a mechanism in which a user may pre-configure a modular tile to display an appropriate message for a network device.

FIG. 55 shows that display 5505 may include interactive elements (e.g., selectable icons and links) 5514 and 5516 outside of the modular tiles. For example, refresh icon 5514 may be selected to refresh information presented in display 5505, such as, for example, status and state information displayed in the modular tiles. For instance, one or more of the statuses for each of the modular tiles may be refreshed on an automatic, periodic basis, in addition to being manually updated when refresh icon 5514 is interacted with (e.g., selected).

In some embodiments, the display 5505 may include an edit link 5516. Interaction with the edit link 5516 may enable one or more of the modular tiles to be editable. For example, edit link 5516 may be selected to manually sort or re-order the sequence of the modular tiles displayed in the display 5505. Upon interaction with the edit link 5516, one or more of the modular tiles may be interacted with to be disabled or removed.

Each modular tile 5502-5520 may be interactive to receive input. The input received via a modular tile may be used to control operation of a network device corresponding to the modular tile. The input may include one or more contacts by a user. A contact may include a tap, a touch, a pinch, a drag, a click, a swipe, a circular motion, a selection, a continuous movement, other motions, other user interactions, user movements, or combinations thereof. In some embodiments, the input may be received as a single input or a series of inputs to control the network device corresponding to the modular tile. The contact may occur in one or more directions on the display 5505 or a modular tile.

As noted, each of the modular tiles may be chosen and displayed based on the type and/or capabilities of a network device associated with each of the modular tiles. The display 5505 may be flexible and may dynamically display the most appropriate modular tile based on an environment in which the application executes. For example, an access device may only include a certain amount of physical space to display a certain portion of display 5505. More specifically, only some of the modular tiles 5502-5520 may be displayed at one time on the access device for a user to view, and others of the modular tiles 5502-5520 may be hidden from view (e.g. not displayed on the access device) due to that lack of space. For example, as shown in FIG. 55, modular tiles 5502-5520 are labeled in two groups: modular tile group 5524 and modular tile group 5522. Modular tile group 5522 may, for example, be displayed (and visible) on an access device display at a particular time. Modular tiles 5502-5512, which are a part of modular tile group 5522, are represented in FIG. 55 with solid lines to indicate that the modular tiles are shown to be visible on a display of an access device. Modular tile group 5524 may, for example, be hidden (and not visible) on an access device display at that particular time. Modular tiles 5514-5520, which are a part of modular tile group 5524, are represented in FIG. 55 with dashed lines to indicate that the modular tiles are hidden from the display of the access device.

The display 5505 may be flexible and may dynamically display the most appropriate modular tile based on various factors. Therefore, the modular tile groups 5522 and 5524 may change over time, or in other words may include different modular tiles at different times depending on these factors. These factors (or "parameters") may be related to the user of the access device, the location of the access device, the type of the network device associated with a modular tile, the frequency of use of the network device associated with a modular tile, the use or frequency of use of the network device at a particular day or time, the location of the network device associated with a modular tile, among other factors, or a combination of these factors.

Changes to the order or other aspects of the display of modular tiles within a display such as display 5505 may be based on rules set by a user or other controller of the access device that includes display 5505 or may be based on information gathered by the device over time. For example, changes to the order or other aspects of the display of modular tiles within a display such as display 5505 may be based on rules set by a user. For example, a user may interact with the display to enable a graphical interface that enables customization of display rules pertaining to the network devices represented by the tiles. The graphical interface may provide one or more interactive elements to control one or more rules related to control of the display of the one or more network devices. These rules may be set to always apply or may be set to be based on other factors, such as day or time. For example, a rule may be set that at 5:00 PM every weekday, certain tiles are visible to the user if the user opens the display within that time frame. In another example, a rule may be set that tile 5502 is always listed at the top of the visible display screen that is visible by the user. Such rules may be specific to a particular tile, to a particular network device associated with a tile, to a group of network devices, to one or more network devices included in a scene, among other possibilities.

In another example, changes to the order or other aspects of the display of modular tiles within a display such as display 5505 may be based on information gathered by the device over time. For example, the access device may collect information regarding one or more of the following factors: (1) the tiles that the user has used most often, either over a long period of time or over the recent past; (2) the location of the access device; (3) the type of the network device associated with a modular tile; (4) the frequency of use of the network device associated with a modular tile (5) the use or frequency of use of the network device at a particular day or time; (5) the location of the network device associated with a modular tile; among others.

The access device may collect information related to the tiles that the user has used most often, either over a long period of time or over the recent past. The data collected may be ranked based on perceived or determined relevance (e.g. ore recent data more relevant than older data collected. The access device may cause display 5505 to display a certain tile or set of tiles that the user has used more than any other tile(s). For example, if the user drives a car often and opens/closes the garage door often, then the user may use tile 5520 (garage switch) more often than the reset such that the display 5505 would display tile 5520 to the user at all times. In another example, the use of certain tiles may be tied to a time of year, day of the week, and/or time of day. For example, if a user uses tile 5520 most often between certain hours (e.g. early in the morning when leaving for work, and in the evening when returning home from work), the access device may cause display 5505 to display tile 5520 (e.g. at the top of the list of tiles shown to the user) during those times. However, if the user views the tiles during a different time of day (e.g. lunch time), the display 5505 may display a different tile that the user uses most often during that time of day (e.g. the 5508 because the user checks on the user's security system during lunch every day, as noticed by the access device).

The access device may collect information related to the location of the access device. For example, if the access device is located outside the house (e.g. because the user brought the access device outside the house as detected by a global positioning system (GPS) or otherwise), then display 5505 may display tiles 5506 (exterior lighting) and 5520 (garage switch) because the access device may be able to assume that these tiles are most relevant to the user based on the location of the access device (and presumably the location of the user).

The access device may also collect information related to patterns of behavior of the user or any other interactions with the display. For example, information related to the frequency of use of the network device associated with a modular tile may be used. For example, if the user uses a certain network device or set of network devices more often than others (either via interacting with the network device via display 5505 or otherwise), then the access device may assume that the user is more likely to use that network device during any given instance of the user viewing and using display 5505. For example, if the user is indoors and is close to both security sensor 1 (tile 5504) and interior lighting 1 (tile 5502), but the user uses network device associated with tile 5504 (security sensor 1) twice as often as the network device associated with tile 5502 (light), then the display 5505 may tile 5504 instead of tile 5502. However, the display may also display both tiles 5504 and 5502 if both tiles 5502 and 5504 are more likely to be relevant or used by the user than the other tiles in display 5505.

When determining which information may be relevant to which tile or network device, the type of network device and other factors may be considered. For example, certain parameters may be most relevant to a garage door opener network device but may not be relevant for an indoor basement light switch. For example, time of day and day of week may be relevant to a garage door opener network device, but may not be as relevant for the indoor basement light switch. In another example, location of the access device (and, for example, the user holding the access device) may be highly relevant for the indoor basement light switch because if the user is not in the basement, the tile associated with that network device may not be relevant to the user at that time. In an alternative embodiment, certain network devices may be relevant based on their association, or grouping, with other network devices. For example, if an indoor light switch is determined to be relevant because the user is near (e.g. within a predetermined amount of space of that network device) that light switch and/or because the user regularly uses that light switch at that particular day and time of day, then other light switches in that room or on that floor may also be determined to be relevant because the likelihood of the user using those devices at that time is greater than if the user were not in that room. Network device grouping, or devices in the same scene, as described herein may also contribute to grouping for tile ordering and listing purposes.

The access device may also use other actions taken by the user to collect information relevant to which tiles the display 5505 should show the user. For example, the access device may use information inputted by the user, such as bibliographic information related to the user's personal choices, names, pictures, or other information inputted related the network devices connected to the network and associated with each tile, or other information. In addition, the access device may use information gathered by other parts of the access device other than the user's interaction with the display 5505. For example, as noted, information collected from use of the GPS within the access device to determine the location of the access device at any given time. In another example, information related to the user's personal preferences gathered from the user's use of other applications on the access device may be used. As noted, rules may also be created by the user to instruct the access device (or display 5505) to act in a certain way (e.g. display certain tiles before others, possibly only in certain situations or at certain times).

Since display 5505 may be dynamic, and may adjust based on the information collected about the user and use of the access device, display 5505 may display a message to the user to indicate that a change is being made (e.g. a rule is being changed) based on other information it collected, or may ask the user if the user would like to change a certain rule or setting based on such information. In such a situation, the user may elect to either make the suggested change or to not make the suggested change.

Figure 56:
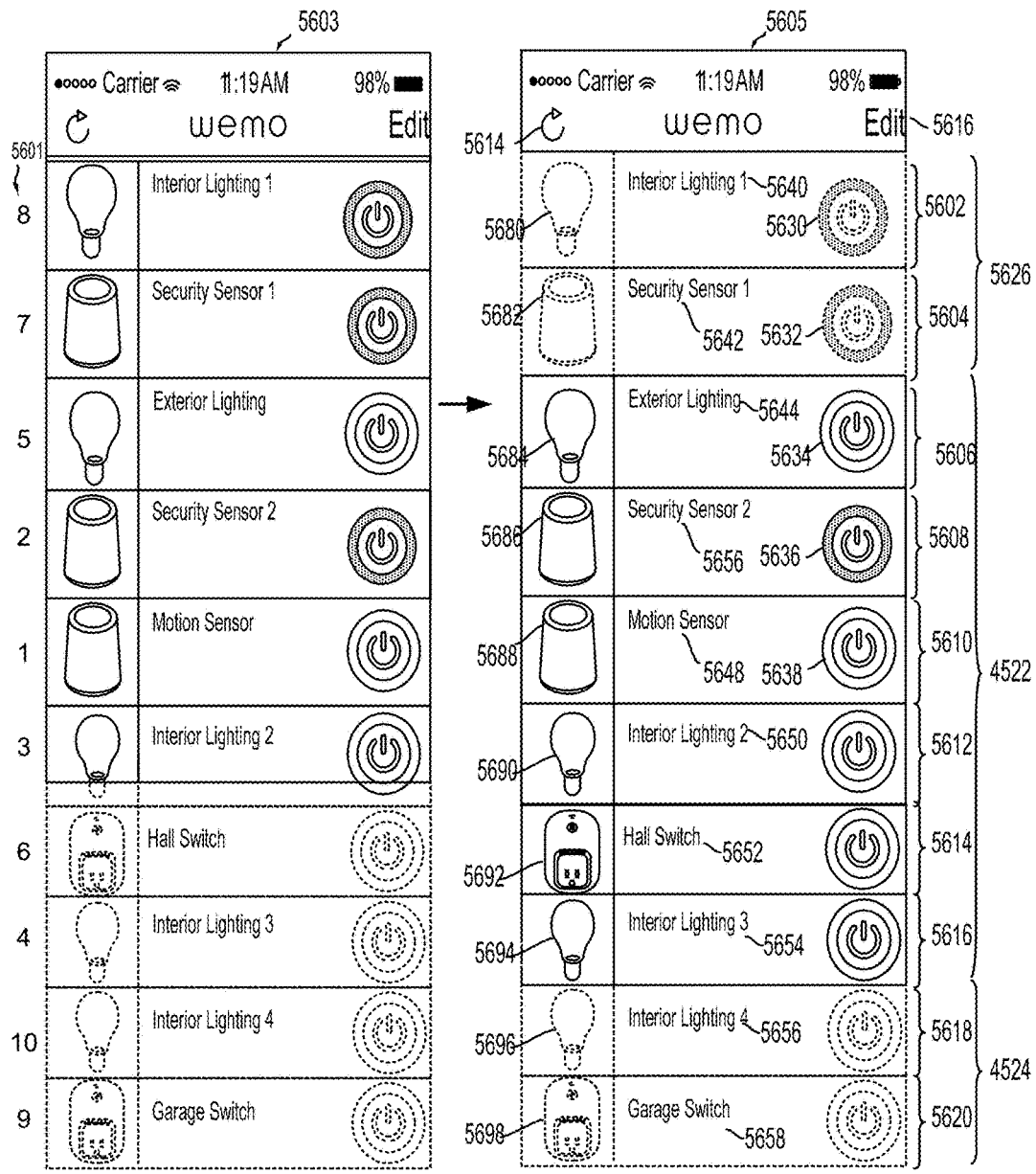
FIG. 56 is an illustration of example proprietary interfaces of a device, in accordance with some embodiments.

Based on all of the information collected and used to determine which tiles should be visible to the user at a certain time, the tiles (and, in turn, the network devices associated with the tiles) may be given a ranking (or "rating" or "score") regarding its importance to the user at that time. FIG. 56 shows an example of two interfaces presented by a device (e.g., the access device 5508) according to some embodiments. In particular, FIG. 56 shows a display 5603 that presents a graphical interface with modular tiles for interacting with network devices in a network and rankings 5601 associated with each tile, according to embodiments of the present technology. Rankings 5601 may indicate one or more different aspects of the relevance or usefulness of the network devices associated with each modular tile. For example, the rankings 5601 may be based on any information collected by the access device as described herein. For example, the rankings may be based on a determined likelihood of use of each tile or network device associated with each tile. For example, the tile representing the motion sensor may be assigned a ranking of "1" based on one or more of the factors and types of information described herein, such as a user's frequent use of the motion sensor compared to other tiles, the location of the access device, the use or frequency of use of the network device at the particular day or time that the display 5603 is displaying the tiles, the location of the motion sensor, among other factors. The ranking may be based on these factors as compared to the same or similar factors relevant to other tiles or network devices associated with those tiles, such as security sensor 2. Security sensor 2 may be assigned a ranking of "2", as shown in FIG. 56 in display 5603 based on factors or parameters that indicated that security sensor 2 may not be as relevant to the user as the motion sensor, but more relevant than the other tiles in display 5603 or the network devices associated with those tiles. However, both the motion sensor and security sensor 2 may be shown to the user in display 5603 because the display can show the user more than one tile at a time. However, interior lighting 4, assigned a ranking of "10", may not be visible to the user since that tile is indicated as the least relevant to the user at that time, and display 5603 may not be able to show the motion sensor tile, security sensor 2 tile, and interior lighting 4 tile all at the same time due to a lack of space on the access device display. However, for certain devices, the display of the device may be large enough to display all ten tiles. On the other hand, a user may own more than ten network devices, and therefore may include more than ten modular tiles on display 5603, again requiring that certain tiles not be shown to the user at a certain time.

Tiles may also be moved within display 5603 such that the tiles are listed in a different order. For example, the tiles may be listed in order of ranking as assigned by the rankings 5601, or the tiles may be listed in a different order based on different factors (e.g. groups, scenes, etc.). However, it may not be preferable to change the listing order of the tiles while a user is viewing display 5603 because such changes on the fly may confuse the user. As an alternative, tiles (or groups of tiles, such as group 5522) may be set to only change upon start-up of the application that displays display 5605, or for example after the user has left the display (or just not viewed the display) for a certain predetermined period of time.

FIG. 56 also shows a display 5605 that presents a graphical interface with modular tiles 5602-5620 for interacting with network devices in a network. The modular tiles 5602-5620 may each correspond to a network device. Display 5605 has been adjusted from, for example, display 5505, to show a different set of tiles to the user. In other words, group 5522 of visible tiles has shifted to include modular tiles 5606-5616. Similarly, the modular tiles that are not visible to a user have also shifted. For example, group 5524 has shifted to include only tiles 5618 and 5620. A new group of modular tiles 5626 not visible to the user includes tiles 5602 and 5604. Groups 5522 and 5524 may have shifted (and group 5626 created) because of changes in how the different tiles and their corresponding network devices have changed in ranking, for example within rankings 5601. Rankings 5601 may have shifted in a variety of different ways. For example, as a general matter, rankings 5601 may have shifted because the information collected and used to determine rankings 5601 may have changed. For example, rankings 5601 may have shifted because the user moved to a different location (e.g. within their house), the display 5605 may be viewed at a different time than display 5505 was being viewed, a network device may have moved location, one or more new network devices may have been added to the network, one or more network devices may have been removed from the network, among other possible changes. In other words, if any information collected by the access device changes over time, the rankings 5601 may change, which may cause the display to shift and a different set of tiles to be visible to the user. More specifically, due to the change in rankings, the tiles may shift positions on the display or order in the list of tiles. This allows the list to stay in whatever prior order but increases the availability of the likeliest devices to be selected. As an alternative or in addition, the list may shift down or up within the display so that a different set of tiles are visible to the user. This allows the list to stay in whatever prior order but increases the availability of the likeliest devices to be selected by the user.

Figure 57:
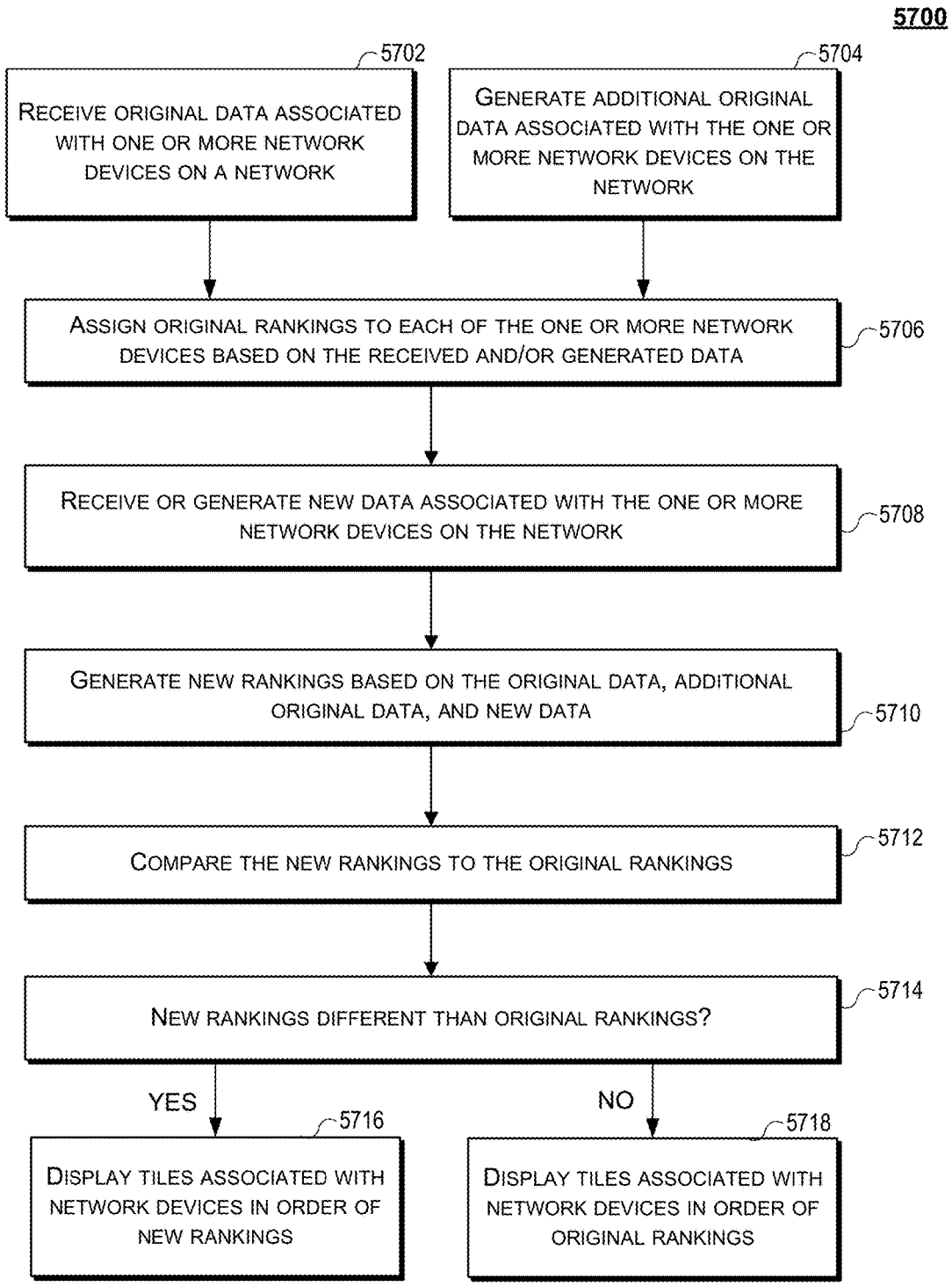
FIG. 57 is shows an embodiment of a process for displaying tiles based on data and rankings, in accordance with some embodiments.

FIG. 57 shows a flow chart including an example method of displaying dynamic rankings of modular tiles and their associated network devices, according to embodiments of the present technology. The example method begins with steps 5702 and 5704. Step 5702 includes receiving original data associated with one or more network devices on a network. Step 5704 includes generating additional original data associated with one or more network devices on a network. The data in both steps 5702 and 5704 may also be associated with tiles associated with the network devices. The data may be associated with a history of a user's interaction with the network device(s) or a user's interaction with one or more tiles associated with the network device(s). The process may also function with only step 5702 or step 5704.

Step 5706 may include assigning original rankings of each of the one or more network devices based on the received and/or generated data. These rankings may dynamically change over time, which may change the order the network devices (or their associated tiles) are listed, as described further with respect to steps 5708-5718.

Step 5708 may include receiving or generating (or both) new data associated with the one or more network devices on the network. This new data may include new data or data that has changed from the last time data corresponding to the network devices (or tiles associated with the network devices) were received or generated. Step 5710 includes generating new rankings based on the original data, additional data, and new data. In other words, step 5710 includes updating the rankings based on the new data. Step 5712 includes comparing the new rankings to the original rankings, and step 5714 includes determining whether the new rankings are different than the original rankings. Steps 5712 and 5714 may be completed at the same time or may be the same step.

In step 5716, if the new rankings are different than the original rankings, tiles associated with the network devices may be displayed in order of the new rankings. The new and original rankings may be determined to be "different" if they are different in any respect, or if they are different enough such that they cross a predetermined threshold of difference. In step 5718, if the new rankings are determined to not be different than the original rankings, tiles associated with the network devices may be displayed in order of the original rankings. However, step 5718 may be completed such that the result is to display the tiles in order of the new rankings (e.g. if the new rankings are the same as or only slightly different than the original rankings, but the new rankings more accurately reflect the current state or relevance of the network devices and their associated modular tiles.

FIGS. 58-62 relate to techniques for controlling operation of network devices, in accordance with some embodiments. The techniques may include managing information about settings for operation of network devices. The techniques may include controlling the interfaces presented at a device (e.g., an access device) to control operation of network devices. The techniques may include implementation of one or more data structures. Each data structure may be implemented using one or more types of data structures, including without limitation, an array, a linked list, a hash table, a tree, or other programming structure that stores data.

In FIG. 58, data structure is depicted for storing information related to controlling operation of network devices. The information stored using the data structure may be stored locally on an access device, for example, the information stored in onboard storage (e.g., local cache) of the access device. The information may include device-specific information, such as information about the network devices to which an access device is connected, status information about the network devices, group information about the network devices, and/or interface information for displaying interface(s) to control operation of the network devices. The information stored in the data structure(s) may enable an access device to dynamically present interfaces for controlling operation of many different types of network devices, some of which may have different settings and/or attributes for their operation. The device information stored on an access device may be received from network devices, a network including the network devices, and/or a remote network that has access to a network including the network devices. The device information may be received as part of a registration process and updates about the device.

FIG. 58 depicts a data structure 5810 that is stored on a device, such as an access device. Data structure 5810 may store device information about network devices connected to a network. For example, data structure 5810 may include a field 5820 ("Device Identifier") that has device identifier information for network devices accessible to an access device, such as network device A ("Device A"), network device B ("Device B"), network device C ("Device C"), and network device D ("Device D"). One or more of the network devices identified by the device identifiers may be different.

Data structure 5810 may include a field 5830 that has device type information (e.g., a value indicating a device type) indicating a device type for each of the devices identified in field 5820. The value may be a numeric value that is defined for a device type. For example, field 5830 may have a value indicating "a light bulb" device type for Device A, a value indicating "a heater" device type for Device B, a value indicating "a heater" device type of Device C, and a value indicating "a sensor" device type of Device D.

Data structure 5810 may store interface information for different device types of known network devices. Data structure 5810 may include a field 5840 that has interface information indicating an interface identifier (ID) (e.g., a unique interface module ID). The interface ID may be associated with one or more interfaces (e.g., a graphical interface) that are defined for a device type. The interface ID may be used to retrieve a modular interface for displaying at an access device for a network device. In some embodiments, the access device can access a network (e.g., a remote network) to obtain interfaces for network devices. In the example shown in FIG. 58, field 5840 may include an interface identifier ("Interface_ID1") for Device A, an interface identifier ("Interface_ID2") for Device B, an interface identifier ("Interface_ID3") for Device C, and an interface identifier ("Interface_ID4") for Device D. Based on the devices for which interfaces are to be presented at an access device, the interface identifier can be used to retrieve an interface to display for the devices.

Data structure 5810 may include a field 5850 that has control information about the devices identified by device identifier 5820. For example, the control information in field 5850 for a device may include settings information about one or more settings for operation of the device. In some embodiments, the settings information may include a reference (e.g., a location in memory) to a different data structure that stores settings information for a device. Examples of settings information are described with reference to FIGS. 60 and 61. The setting(s) may correspond to capabilities of a device. The settings information may include a value corresponding to the setting. The settings may include primary functionality (e.g., a primary setting), a secondary functionality (e.g., a secondary setting), a tertiary functionality (e.g., a tertiary setting), and any other dependent functionality.

The interfaces for a device type may be based on the capabilities of the device. In some embodiments, multiple interfaces may be defined for different devices that have the same device type. The different devices may have different capabilities although being associated with the same device type. The capabilities of the devices may be determined by information provided by a manufacturer of the devices. In some embodiments, a device may be modified with logic (e.g., software, hardware, firmware, or a combination thereof) to access hardware (e.g., a host board) on the device to determine capabilities of the device. Determining the capabilities may include determining values for one or more settings and/or attributes of the device. Based on the capabilities, interfaces may be defined to control operation of a device. The interfaces may include interactive elements that enable adjustment of the settings. The scale of the settings may or may not correspond to the values defined by the capabilities corresponding to those settings. As such, an access device or the device may perform processing to translate or convert values of settings defined for the device.

In some embodiments, some of the devices for which information is stored in data structure 5810 may be associated with a group of devices. A group of devices may have devices that have different device types. As such the interfaces presented for different devices in a group may be the individual interfaces displayed for those devices and/or interfaces that provide interactive elements to control operation of some or all of the devices in a group. When devices have different capabilities, and thus, different settings, an access device may perform processing to determine common capabilities or to determine operation of different capabilities of the devices as a group.

To control operation of devices, one or more data structures may be created to store information including settings information about capabilities of those devices. The data structures may be device-specific and may be stored according to a setting hierarchical data structure, such as hierarchical data structure 5900 in FIG. 59. In at least one embodiment, a hierarchical data structure 5900 may be device-specific such that it is defined for a device type. As will be described further below, data structure 5900 may be created based on a template of settings for a device type. As discussed above, settings may be predefined based on a type of device. The settings for a device type may be provided by a network device for which the settings apply, or may be determined by another device (e.g., an access device). The value of each setting may be stored using a data structure that has settings information for the setting.

Data structure 5900 may be defined for different network devices that have the same device type. Data structure 5900 may be used to determine whether a conflict exists in controlling operation of a group of network devices, some of which have different setting hierarchy although having the same device type.

Figure 59:
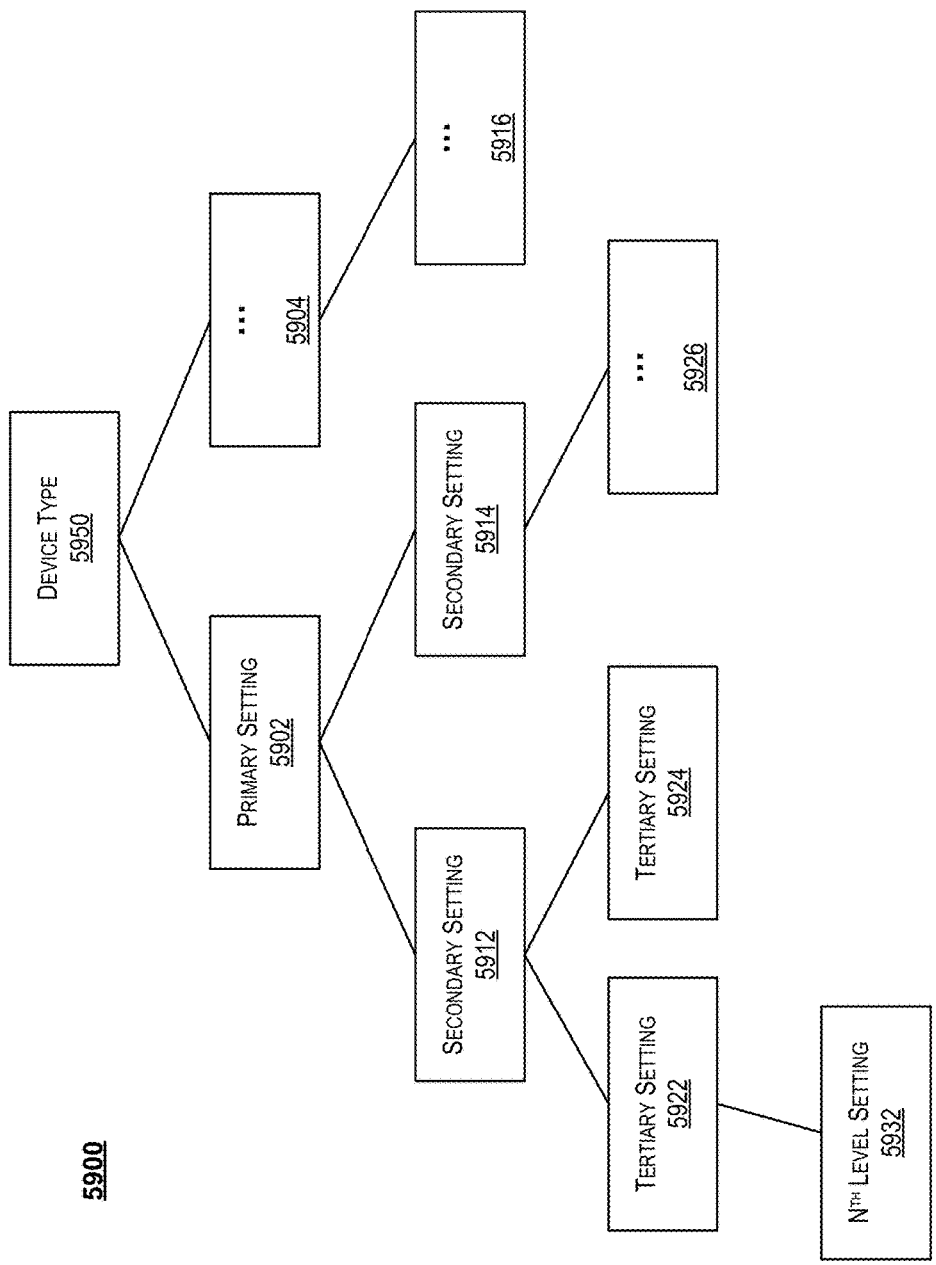
Figure 60:
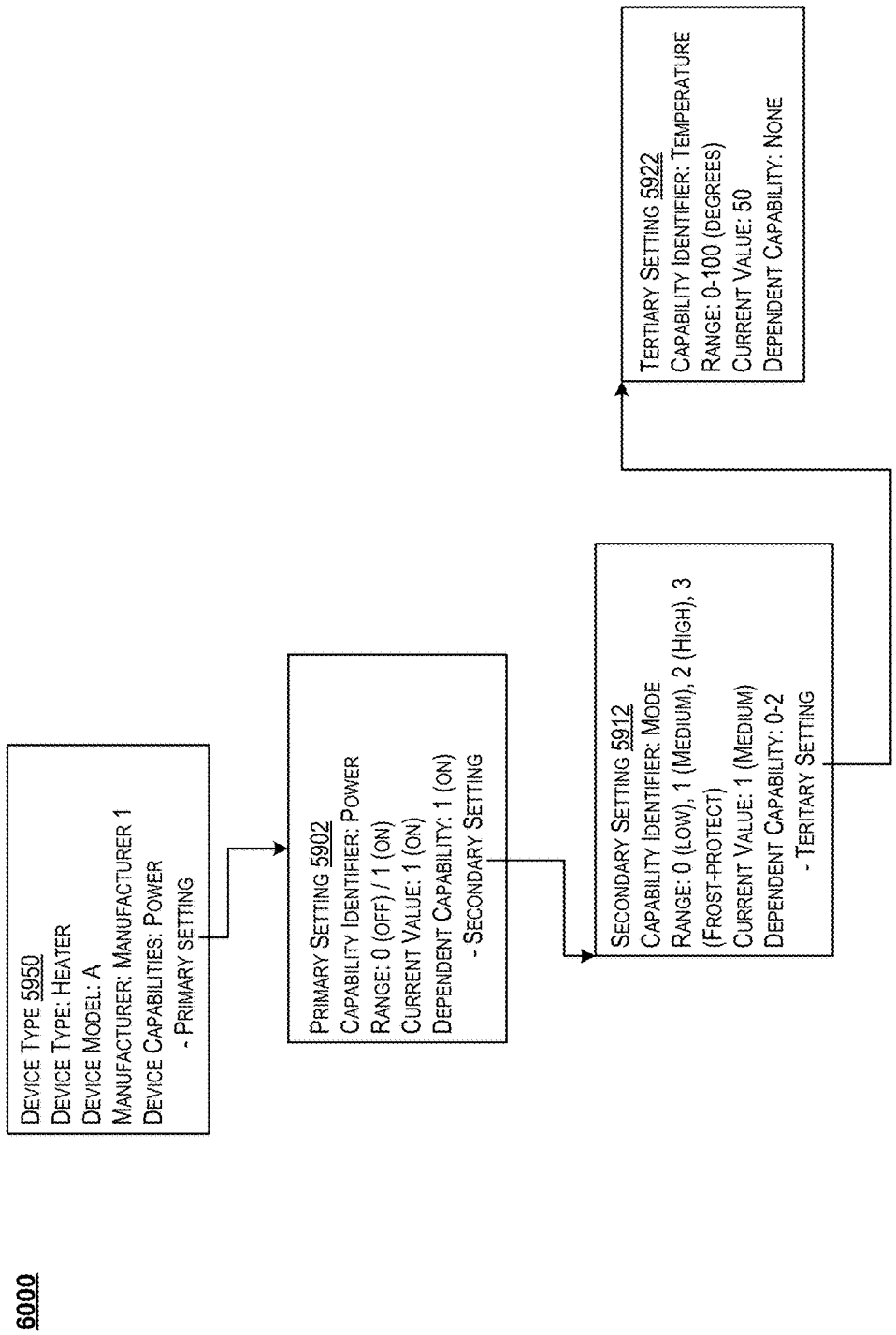

Data structure 5900 may be created differently for different device types. The examples shown in FIG. 60, depict details of the data stored for settings within data structure 5900. Data structure 5900 may be created for each network device that has a device type. Each instance of data structure 5900 may vary based on the capabilities of the device for which data structure 5900 is created, such that it may include fewer or more of the data structures in data structure 5900 depending on the capabilities of the device. Data structure 5900 can be defined according to alternative arrangements such that data structure 5900 is not arranged as a hierarchical structure, but has an arrangement that illustrates the relationships between the data structures shown in FIG. 59.

Data structure 5900 may have a data structure 5950 ("root node") that stores device-specific information for a device having a device type defined by data structure 5900. Root node 5950 may store information about a device including its device type and other information about the capabilities (e.g., a device model). The information in root node 5950 may be used to determine the data structures in data structure 5900.

Root node 5950 may include a reference (e.g., a location in memory) to one or more data structures 5902, 5904, each for a different primary setting for a device having the device type indicated by root node 5950. For example, data structure 5900 may have multiple data structures 5902, 5904, each for a different primary setting (e.g., $1^{st}$ primary setting, . . . nth primary setting). In the example of FIG. 59, data structure 5902 represents a primary setting for a network device. The primary setting may correspond to a primary capability of the network device, one that may not depend on another setting for operation of the network device. A capability may be a primary capability as other settings (e.g., secondary settings or tertiary settings) may be dependent on adjustment of the primary capability. For example, a heater's primary capability may be power, such that its power setting (e.g., power on or power off) control power operation of the heater.

A data structure for a primary setting of a network device may indicate a reference to one or more data structures for one or more secondary settings of a network device. A secondary setting for a network device may be a setting that controls operation of the network device, but that is dependent on a primary setting having a particular value. For example, a heater may have a primary setting for power, and a secondary setting for heating modes (e.g., low, medium, high, and frost protect). In the example of FIG. 59, data structure 5902 indicates a reference to two data structures, data structure 5912 and data structure 5914, each for a different secondary setting, and data structure 5916 (e.g., a secondary setting for an $n^{th}$ primary setting) may have a secondary setting 5916. Each data structure for a secondary setting may include a value for the secondary setting of a secondary capability of a network device.

A data structure for a secondary setting of a network device may indicate a reference to one or more data structure for one or more tertiary settings of a network device. A tertiary setting for a network device may be a setting that controls operation of the network device, but that is dependent on a secondary setting having a particular value. For example, a heater may have a tertiary setting for temperature that is activated for certain values of a secondary setting for heating modes. The range of values that can be adjusted for the temperature may be limited based on the different heating modes. In the example of FIG. 59, secondary setting data structure 5912 has a reference to two tertiary settings corresponding to data structure 5922 and data structure 5924. Data structure 5914 has a reference to a single tertiary setting corresponding to data structure 5926.

Although not shown, data structure 5900 may have any number of levels, each corresponding to a different level of settings. For purposes of illustration, data structure 5900 is shown having an $n^{th}$ level of setting correspond to data structure 5932, which is referenced by data structure 5922. The $n^{th}$ level of setting may correspond to a setting that is dependent on a $n-1^{th}$ level of setting for a network device.

Now turning to FIG. 60, data structures are shown for managing operation of network devices. In the example shown in FIG. 60, data structure 5950 is created for a device type of a heater. Data structure 5950 may store information about a type of device including other device information such as model and manufacturer information about the device. In some instances, network devices may have the same device type, but may be different by model, manufacturer, or other criteria such that their setting relationship is not identical. The settings hierarchy may be defined based on the device information in data structure 5950. The settings hierarchy may be used to standardize the settings of network devices, including those that have similar or identical capabilities.

Data structure 5950 may include a reference to a primary capability defined by a primary setting (e.g., a power setting). In the example of FIG. 60, data structure 5950 includes a reference to data structure 5902 for a primary setting for the heater. Data structure 5950 may store information about a primary setting, among others, such as a capability identifier ("Power"), a range ("0-1"), a current value of the setting ("1"), or a reference to a secondary setting if one is enables based on the primary setting. The value of a setting according to a range of the setting may correspond to a state of the setting for a network device.

The capability identifier may be used to reference the setting for which a value applies. When an access device is adjusting a network device, the access device may transmit the capability identifier with the value of the setting. In some embodiments, other information about a setting may be transmitted with the value of the setting.

The network device may determine operation of a network device based on the data transmitted about a setting. The setting hierarchy can be used to determine whether a value of a setting is permitted based on a current value of the setting or other settings from which a setting is dependent on. In some embodiments, a data structure storing setting information may include information indicating whether a conflict exists with the setting or another other setting.

In the example of FIG. 60, data structure 5902 includes a reference to data structure 5912 for a secondary setting. In this example, data structure 5912 represents setting information for a secondary setting corresponding to a mode of operation that is enabled when the power setting for the heater is in a power on state. Data structure 5912 may include a capability identifier ("Mode"), a range (e.g., 0—low, 1—medium, 2—high, 3—frost-protect), and a current value of the setting ("1"). Data structure 5912 may include a dependent capability that indicates the values on which a tertiary setting depends.

Data structure 5922 in the example of FIG. 60 may represent setting information for a tertiary setting corresponding to a temperature capability of a heater when specific modes (e.g., low, medium, or high) are enabled. Data structure 5922 may include a capability identifier ("Temperature"), a range (e.g., 0-100 degrees), and a current value of the setting (e.g., "50"). Data structure 5922 may not include a dependent capability therefore there may not be a reference to another data structure. A tertiary setting for a heater may be enabled when the mode is any one of the values 0-2. Data structure 5912 includes a reference to data structure 5922 for the tertiary setting.

Figure 61:
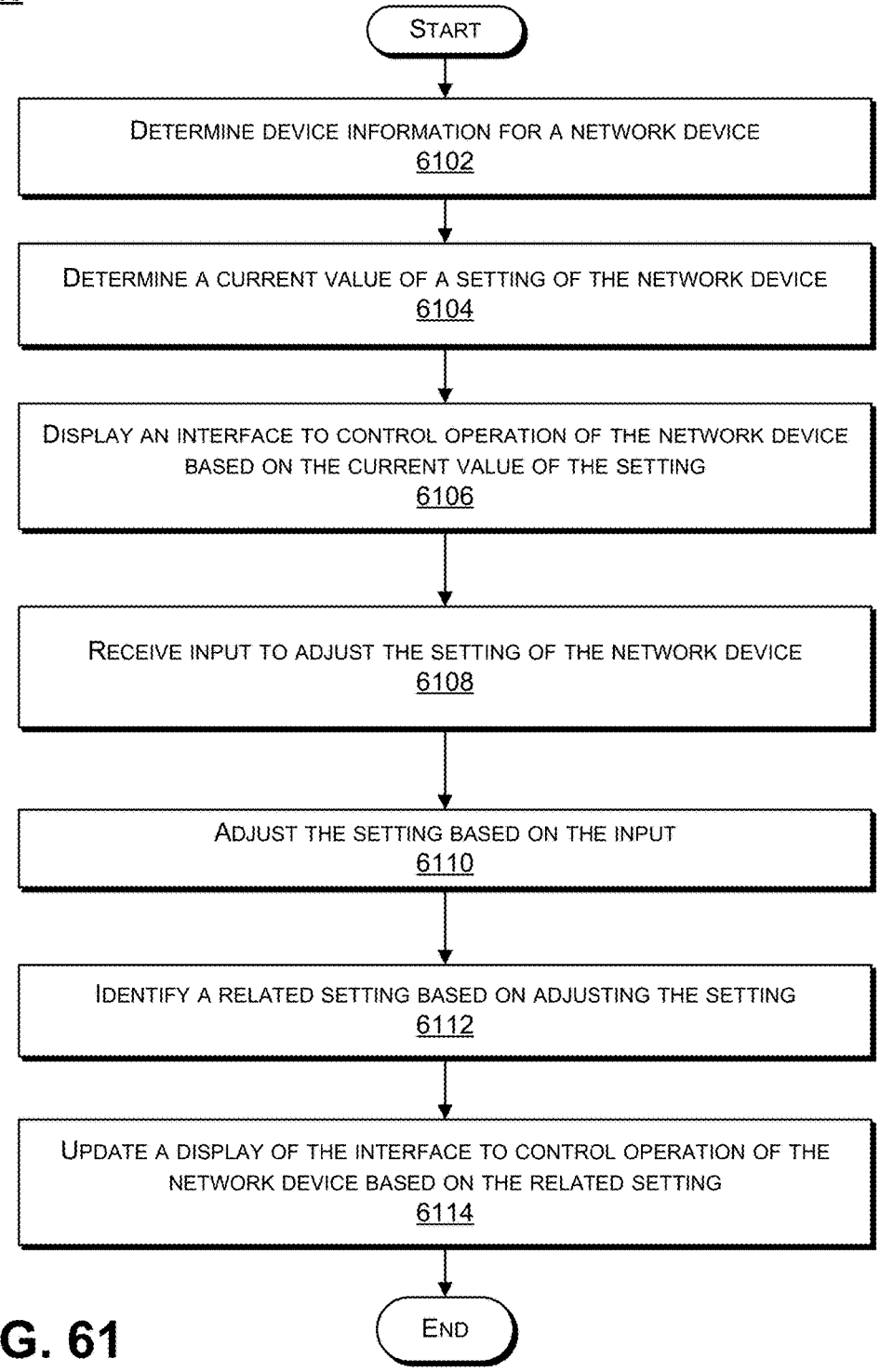
FIGS. 61 and 62 depict processes for controlling operations of network devices, in accordance with some embodiments.
Figure 62:
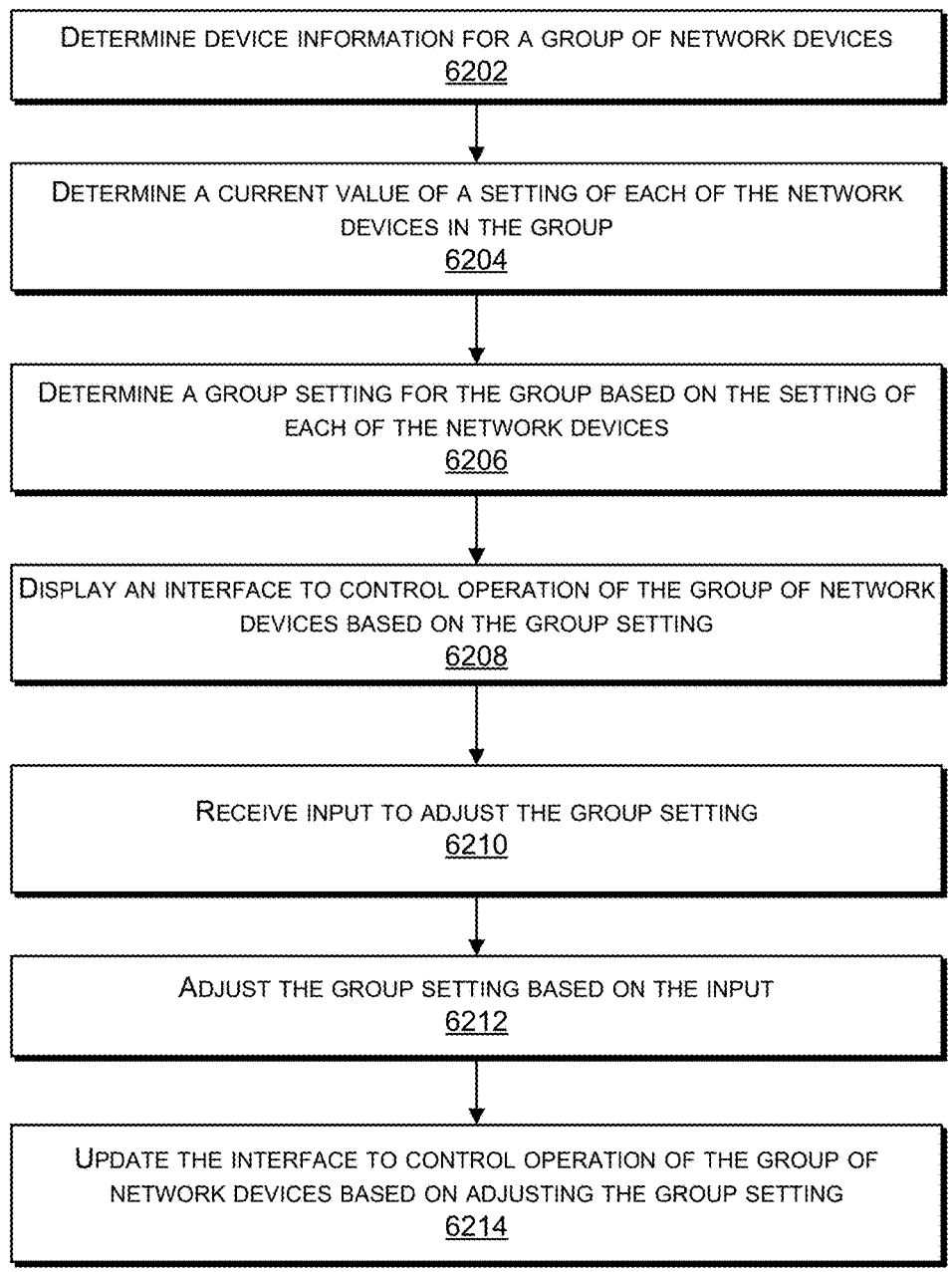

FIGS. 61 and 62 depict processes for controlling operations of network devices, in accordance with some embodiments. These processes can be implemented by a device, such as an access device that can control operation of network devices.

In FIG. 61, a process 6100 is depicted for adjusting a setting of a network device using one or more data structures (e.g., a setting hierarchy). Process 6100 may begin at step 6102 where device information is determined for a network device. Device information may be obtained from local storage of an access device that implements process 6100, from a local network that includes the network device, a remote network, or the network device itself. Device information may indicate information about the network device such as a device type and settings information.

At step 6104, a current value of a setting of a network device is determined. An access device may determine the current value of one or more settings for a network device. The current value may be determined using the device information, such as information stored in data structure 5810. A record in data structure 5810 corresponding to a network device may be obtained. The control information 5850 for a record may be used to reference settings information in one or more data structures, such as any of the data structures in FIG. 60. The data structures for settings can be traversed to identify a current value for each setting, or a specific setting.

At step 6106, an interface is displayed to control operation of one or more network devices. The interface may be selected based on a device type of each network device. In some embodiments, an interface ID for a network device may be used to retrieve one or more interfaces that enable control of the network device. The settings information determined at step 6104 may be used to determine a state of operation based on each setting of a network device. In some instances, a setting may have a zero value or some other value indicating that the setting is not active. The interface may be selected for display based on the settings that are active. The interface may display settings information for a particular level of settings based on traversing the data structures storing settings information.

At 6108, an input may be received to adjust a setting of a network device displayed at step 6106. The input may be received because of one or more interactions with the interface. The setting may be active or inactive on the interface. The interface may be displayed with multiple settings, including a setting in a lowest level in the hierarchy of settings for a network device that has multiple levels of settings. Based on interaction with the interface displayed for a network device, input may be received to change a value of a setting.

At step 6110, the setting for which input is received at step 6108 may be adjusted based on the input. The input may correspond to a value based on adjustment of values for a setting in the interface. The values for a setting displayed in the interface may correspond to a range of values for the setting defined for the network device. In some embodiments, the scale of the values for the setting (e.g., a range of values between 0 and 10) may be different from the range of the values defined for a setting. As such, the input may correspond to a value of a setting to be adjusted to a range of values. The value indicated by the input may be adjusted (e.g., converted) to a range of values defined for the setting.

Adjusting a setting based on the input may include transmitting data to cause operation of the network device to be adjusted based on the setting. The data may include the value of the setting to adjust or the value after the adjustment. The value may be transmitted with an identifier of the setting (e.g., a capability identifier) so that the network device knows the setting to adjust. The information about adjusting the setting may be transmitted directly to the network device or through another device or network (e.g., a local network or a remote network).

At step 6112, a related setting may be identified based on adjusting the setting at step 6110. The data structures storing setting information for a network device can be used to determine whether one or more additional settings are activated. For example, a primary setting that is adjusted to a particular value may cause one or more secondary settings (e.g., a related setting) to be active. Based on adjusting the setting at step 6110, a related setting (e.g., a secondary setting or tertiary setting) can be identified. A related setting may be identified based on the value of the setting adjusted.

At step 6114, an interface displayed at step 6106 may be updated to display a related setting to control operation of the network device. Using an interface identifier of the network device, one or more interfaces for the related setting can be retrieved. The interface at an access device may be updated to display an interface corresponding to the related setting. For example, an interface corresponding to the related setting may be presented in a sub-menu (e.g., peeka-boo drawer). The related setting may be presented and enabled when the value of the setting is adjusted to a value at which the related setting can be enabled. In some embodiments, the interface may be displayed with all or part of the interface displayed at 6106. The interface may be displayed with a current value of the related setting obtained from the setting information for the related setting.

The interface may be displayed with one or more interactive elements corresponding to other settings that are related to the related setting. The setting(s) related to the related setting may be obtained from setting information in the data structures storing setting information. The value of the related setting can be analyzed to determine whether the value satisfies a threshold for enabling or disabling the other settings that are related.

Process 6100 may end after step 6114.

In FIG. 62, a process 6200 is depicted for adjusting a setting of a group of network devices using one or more data structures (e.g., a setting hierarchy). Process 6200 may begin at step 6202, by determining device information for a group of network devices. As disclosed herein, network devices may be organized as a group. Device information gathered for network devices in a group may be stored to indicate a relationship. For example, data structures described with reference to FIGS. 58-60 for different network device may be stored in association with each other to indicate a relationship as a group of network devices.

At step 6204, a current value of a setting of each of the network devices in a group may be determined. At step 6206, a group setting may be determined for a group of network devices. As disclosed herein, a group of network devices may include similar or different network devices. The setting hierarchy may be used to determine a setting that can be designated as a group setting. In some embodiments, a group setting may be a setting that is common or similar to each of the network devices in the group. A common or similar setting between network devices may be one which corresponds to the same capability for each of those network devices. Using the setting hierarchy (e.g., data structure 5900) for each different type of device, processing can be performed to determine a setting that is common, such as a power setting, which each network device may have. A device, such as an access device, can search through the data structures of a setting hierarchy for each network device to compare the settings until a common/similar setting is identified. Such a determination can be predetermined such that data is stored indicating compatibility between network devices, such as common/similar settings. In some embodiments, an access device can determine that no group setting exists for a group of network devices. Based on such a determination, the interface may be updated to indicate that the group of devices do not have a common/similar setting. The setting hierarchy can be updated with information to indicate the setting of each network device that belongs to the group.

At step 6208, an interface may be displayed to control operation of a group of network devices. The interface ID for each network device may be used to determine the interface for each of the network devices. Interfaces may be identified based on a group setting for a group of network devices. A common/similar setting, once identified, can be presented in an interface enabling control of that setting for the entire group of network devices. Upon controlling the group setting, different interfaces can be displayed for each of the different network devices in the group upon adjustment of the group setting.

At step 6210, one or more inputs may be received to adjust the group setting, displayed at step 6208. The input may be received because of one or more interactions with the interface. The input may be an adjustment for the group setting displayed in the interface. For example, where a group setting is a power setting, a user may interact with the interface to adjust the power setting to a power on position. At step 6212, the group setting may be adjusted based on the input. Continuing with the previous example, the data structure for a power setting for each of the network devices in the group may be adjusted to the value corresponding to the adjustment with the power setting displayed in the interface. In some instances where network devices are different device types, the value for the common/similar setting may be based on a different scale or range. Therefore, the value corresponding to the scale of the group setting may be converted to a scale of the setting of each network device and each network device in the group may be adjusted according to the converted value for the setting with respect to the scale of the network device. The value to adjust the setting may be stored in a data structure that stores setting information and may be sent to the network devices in the group for adjusting their operation.

At step 6214, the interface to control operation of the group of devices may be updated. Based on adjusting the group setting for the network devices, an interface may be retrieved for the network devices that are adjusted for the group setting. An interface may be retrieved for each of the network devices, where the interface is one which displays interactive to controls to operate each of the network devices based on adjustment of the group setting. An interface for a network device may enable control of a setting that is enabled based on adjustment of the group setting. For example, where the group setting is a power setting, each interface of the network devices may display a control to adjust the setting that is enabled based on adjusting the power setting. One or more of the interfaces for the network devices may be displayed in the interface displayed at step 6208, or may be displayed individually. In some embodiments, a single interface may be displayed with interactive elements to control operation of each of the network devices in the group.

Process 6200 may end after step 6214.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

Substantial variations may be made in accordance with specific requirements. For example, particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, by a computing device, information associated with a device connected to a network, wherein the information includes criteria for operation of the device, and wherein the device is different than the computing device;
   storing the information on a cache of the computing device;
   receiving updated information associated with the device, wherein the updated information includes updates to the stored information;
   modifying the information stored on the cache using the updated information;
   detecting a request for current information associated with the device;
   determining whether an amount of computing resources available for the computing device satisfies a resource threshold;
   determining whether updates exist for the information stored on the cache when the resource threshold is satisfied;
   retrieving the current information from the information stored on the cache, wherein the retrieved current information is a latest version of the updated information stored on the cache;
   transmitting the retrieved current information to the network, wherein when the current information is received, the current information is displayed on a display associated with the device; and
   receiving, at the display, a user input associated with the current information.

2. The method of claim 1, wherein the information includes device information identifying devices connected to the network.

3. The method of claim 1, wherein the request includes a discovery request for current device information identifying devices connected to the network.

4. The method of claim 1, wherein the computing device is included in a router device.

5. The method of claim 1, wherein the criteria includes operation criteria and instruction criteria.

6. The method of claim 1, further comprising:
transmitting, to the network, a request for updates to the stored information, wherein the request indicates a version of the information currently stored on the cache.

7. The method of claim 1, wherein the updated information is received from a device connected to the network.

8. The method of claim 1, wherein modifying the information stored on the cache includes:
identifying a difference between the updated information and the information stored on the cache; and
updating the cache with the updated information based on the identified difference.

9. The method of claim 1, wherein requests for current information associated with a device are received and transmitted using a cloud network.

10. A system, comprising:
one or more data processors; and
a non-transitory computer readable storage medium containing instructions which when executed on the one or more data processors, cause the one or more processors to perform operations including:
receiving, by a computing device, information associated with a device connected to a network, wherein the information includes criteria for operation of the device, and wherein the network device is different than the computing device;
storing the information on a cache of the computing device;
receiving updated information associated with the device, wherein the updated information includes updates to the stored information;
modifying the information stored on the cache using the updated information;
detecting a request for current information associated with the device;
determining whether an amount of computing resources available for the computing device satisfies a resource threshold;
determining whether updates exist for the information stored on the cache when the resource threshold is satisfied;
retrieving the current information from the information stored on the cache, wherein the retrieved current information is a latest version of the updated information stored on the cache;
transmitting the retrieved current information to the network, wherein when the current information is received, the current information is displayed on a display associated with the device; and
receiving, at the display, a user input associated with the current information.

11. The system of claim 10, wherein the information includes device information identifying devices connected to the network.

12. The system of claim 10, wherein the request includes a discovery request for current device information identifying devices connected to the network.

13. The system of claim 10, wherein the computing device is included in a router device.

14. The system of claim 10, wherein the criteria includes operation criteria and instruction criteria.

15. The system of claim 10, wherein the operations further comprise:
transmitting, to the network, a request for updates to the stored information, wherein the request indicates a version of the information currently stored on the cache.

16. The system of claim 10, wherein the updated information is received from a device connected to the network.

17. The system of claim 10, wherein modifying the information stored on the cache includes:
identifying a difference between the updated information and the information stored on the cache; and
updating the cache with the updated information based on the identified difference.

18. The system of claim 10, wherein requests for current information associated with a device are received and transmitted using a cloud network.

19. A computer-program product tangibly embodied in a non-transitory machine-readable storage medium, including instructions configured to cause a data processing apparatus to perform operations including:
receiving, by a computing device, information associated with a device connected to a network, wherein the information includes criteria for operation of the device, and wherein the network device is different than the computing device;
storing the information on a cache of the computing device;
updated information associated with the device, wherein the updated information includes updates to the stored information;
modifying the information stored on the cache using the updated information;
detecting a request for current information associated with the device;
determining whether an amount of computing resources available for the computing device satisfies a resource threshold;
determining whether updates exist for the information stored on the cache when the resource threshold is satisfied;
retrieving the current information from the information stored on the cache, wherein the retrieved current information is a latest version of the updated information stored on the cache;
transmitting the retrieved current information to the network, wherein when the current information is received, the current information is displayed on a display associated with the device; and
receive, at the display, a user input associated with the current information.

20. The computer-program product of claim 19, wherein the information includes device information identifying devices connected to the network.

21. The computer-program product of claim 19, wherein the request includes a discovery request for current device information identifying devices connected to the network.

22. The computer-program product of claim 19, wherein the computing device is included in a router device.

23. The computer-program product of claim 19, wherein the criteria includes operation criteria and instruction criteria.

24. The computer-program product of claim 19, further comprising:
   transmitting, to the network, a request for updates to the stored information, wherein the request indicates a version of the information currently stored on the cache.

25. The computer-program product of claim 19, wherein the updated information is received from a device connected to the network.

26. The computer-program product of claim 19, wherein modifying the information stored on the cache includes:
   identifying a difference between the updated information and the information stored on the cache; and
   updating the cache with the updated information based on the identified difference.

27. The computer-program product of claim 19, wherein requests for current information associated with a device are received and transmitted using a cloud network.

\* \* \* \* \*